US008402473B1

(12) United States Patent
Becker et al.

(10) Patent No.: US 8,402,473 B1
(45) Date of Patent: Mar. 19, 2013

(54) MANAGING CONSISTENT INTERFACES FOR DEMAND BUSINESS OBJECTS ACROSS HETEROGENEOUS SYSTEMS

(75) Inventors: Igor Becker, Sandhausen (DE); Joachim Fiess, Karlsruhe (DE); Thomas Roesch, Sandhausen (DE); Eugen Hermann, Wiesloch (DE); Fahmi Cheikhrouhou, Sandhausen (DE); Gerlinde Graewe, Waghaeusel (DE); Andreas Huber-Buschbeck, Heiligkreuzsteinach (DE); Jozsef Murvai, Szigetszentmiklos (HU); Zoltan Biro, Gyomro (HU)

(73) Assignee: SAP AG, Walldorf (DE)

( * ) Notice: Subject to any disclaimer, the term of this patent is extended or adjusted under 35 U.S.C. 154(b) by 1170 days.

(21) Appl. No.: 11/864,866

(22) Filed: Sep. 28, 2007

Related U.S. Application Data

(60) Provisional application No. 60/848,497, filed on Sep. 28, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................................ 719/313

(58) Field of Classification Search ................... 719/313
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

He, Ning et al.; "B2B Contract Implementation Using Windows DNS"; 2001; pp. 71-79.

(Continued)

*Primary Examiner* — Andy Ho
*Assistant Examiner* — Timothy A Mudrick
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. Specifically, example business objects include DemandPlan, DemandPlanningCharacteristicValueCombination, and DemandViewOfPromotion.

3 Claims, 263 Drawing Sheets

U.S. PATENT DOCUMENTS

| | | | | |
|---|---|---|---|---|
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwartzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,536,697 | B2 | 5/2009 | Wiseman et al. | |
| 7,574,383 | B1 | 8/2009 | Parasnis et al. | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1* | 10/2002 | Ojha et al. | 705/8 |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1* | 11/2002 | Singh et al. | 705/10 |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 | 1/2004 | Wiseman et al. | |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0187140 | A1 | 9/2004 | Aigner et al. | |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1* | 7/2005 | Thomas | 705/10 |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |
| 2005/0209732 | A1 | 9/2005 | Audimoolam et al. | |
| 2005/0210406 | A1 | 9/2005 | Biwer et al. | |
| 2005/0216321 | A1 | 9/2005 | Veit | |
| 2005/0216371 | A1 | 9/2005 | Fotteler et al. | |
| 2005/0216421 | A1 | 9/2005 | Barry et al. | |
| 2005/0222888 | A1 | 10/2005 | Hosoda et al. | |
| 2005/0222896 | A1 | 10/2005 | Rhyne et al. | |
| 2005/0222945 | A1 | 10/2005 | Pannicke et al. | |
| 2005/0228821 | A1 | 10/2005 | Gold | |
| 2005/0234754 | A1 | 10/2005 | Veit | |
| 2005/0246240 | A1 | 11/2005 | Padilla | |
| 2005/0256753 | A1 | 11/2005 | Veit et al. | |
| 2006/0004934 | A1 | 1/2006 | Guldner et al. | |
| 2006/0005098 | A1 | 1/2006 | Lotz et al. | |
| 2006/0020515 | A1 | 1/2006 | Lee et al. | |
| 2006/0026586 | A1 | 2/2006 | Remmel et al. | |

| | | | |
|---|---|---|---|
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0078799 | A1 | 4/2007 | Huber-Buschbeck et al. |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0214065 | A1 | 9/2007 | Kahlon et al. |
| 2007/0225949 | A1 | 9/2007 | Sundararajan et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0294159 | A1 | 12/2007 | Cottle |
| 2008/0005012 | A1 | 1/2008 | Deneef |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0133303 | A1 | 6/2008 | Singh et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248431 | A1 | 10/2009 | Schoknecht et al. |
| 2009/0248547 | A1 | 10/2009 | Doenig et al. |
| 2009/0271245 | A1 | 10/2009 | Joshi et al. |
| 2009/0300578 | A1 | 12/2009 | Neil |
| 2009/0326988 | A1 | 12/2009 | Barth et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0161425 | A1 | 6/2010 | Sideman |
| 2011/0046775 | A1 | 2/2011 | Bailey et al. |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

FSML-Financial Services Markup Language (Jul. 14, 1999) http://xml.coverpages.org/FSML-v1500a.pdf; pp. 1-159.

Webster's Revised Unabridged Dictionary (1913+1828); Def. "merchandise".

Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.

Office Action issued in related U.S. Appl. No. 11/640,422 on Apr. 2, 2009; 13 pages.

Office Action issued in related U.S. Appl. No. 11/640,422 on Dec. 30, 2009; 9 pages.

Office Action issued in related U.S. Appl. No. 11/803,178 on Jun. 29, 2009; 5 pages.

Office Action issued in related U.S. Appl. No. 11/803,178 on Mar. 4, 2010; 43 pages.

Office Action issued in related U.S. Appl. No. 11/775,821 on Jan. 22, 2010; 16 pages.

Office Action issued in related U.S. Appl. No. 11/364,538 on Aug. 4, 2009; 5 pages.

Office Action issued in related U.S. Appl. No. 11/364,538 on Mar. 4, 2010; 40 pages.

Office Action issued in related U.S. Appl. No. 11/731,857 on May 15, 2009; 11 pages.

Office Action issued in related U.S. Appl. No. 11/731,857 on Feb. 4, 2010; 22 pages.

Office Action issued in related U.S. Appl. No. 11/864,786 on Jun. 22, 2009; 7 pages.

Office Action issued in related U.S. Appl. No. 11/864,786 on Mar. 3, 2010; 12 pages.

Office Action issued in related U.S. Appl. No. 11/864,832 on Sep. 18, 2009; 14 pages.

Notice of Allowance issued in related U.S. Appl. No. 11/864,832 on Mar. 24, 2010; 11 pages.

Office Action issued in related U.S. Appl. No. 12/059,867 on Aug. 18, 2009; 37 pages.

Office Action issued in related U.S. Appl. No. 12/059,867 on Feb. 22, 2010; 24 pages.

Office Action issued in related U.S. Appl. No. 12/060,178 on Dec. 7, 2009; 6 pages.

Office Action issued in related U.S. Appl. No. 12/060,171 on Aug. 11, 2009; 11 pages.

Office Action issued in related U.S. Appl. No. 12/060,171 on Mar. 19, 2010; 10 pages.

Office Action issued in related U.S. Appl. No. 11/145,464 on Aug. 5, 2009; 31 pages.

Office Action issued in related U.S. Appl. No. 11/145,464 on Feb. 5, 2010; 57 pages.

Office Action issued in related U.S. Appl. No. 11/155,368 on May 14, 2009; 6 pages.

Office Action issued in related U.S. Appl. No. 11/155,368 on Dec. 10, 2009; 43 pages.

Office Action issued in related U.S. Appl. No. 11/166,065 on Jun. 24, 2009; 6 pages.

Office Action issued in related U.S. Appl. No. 11/166,065 on Mar. 3, 2010; 25 pages.

Communication Pursuant to Article 94(3) EPC issued in related European Application No. 05757432.9 on Jan. 26, 2009; 4 pages.

Supplementary European Search Report issued in related European Application No. 05823434.5 on Sep. 28, 2009; 3 pages.

Supplementary European Search Report issued in related European Application No. 05766672.9 on Oct. 6, 2009; 3 pages.

SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the $17^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; $27^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.

International Search Report and Written Opinion of the International Searching Authority issued in International Application No. PCT/US2007/011378 on Apr. 30, 2008; 17 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Born, Marc et al.; "Customizing UML for Component Design"; www.dot-profile.de; UML Workshop, Palm Springs, CA; Nov. 2000.
"Header", Newton's Telecom Dictionary; 12th Edition, 2004; pp. 389-390.
Jaeger, Dirk et al.; "Using UML for Software Process Modeling"; 1999, pp. 91-108.
Newton's Telecom Dictionary; 18th Edition; 2002; pp. 347, 454.
Proceedings of OMG Workshops; http://www.omg.org/news/meetings/workshops/proceedings.htm; pp. 1-3. Retrieved on Mar. 17, 2005.
"UML in the .com Enterprise: Modeling CORBA, Components, XML/XMI and Metadata Workshop"; <http://www.omg.org/news/meetings/workshops/uml_presentations.htm> retrieved on Mar. 17, 2005.
International Preliminary Report on Patentability under Chapter I issued in International Application No. PCT/US2007/011378 on Nov. 17, 2008; 11 pages.
International Preliminary Report on Patentability under Chapter I issued in International Application No. PCT/US2005/021481 on Dec. 20, 2006; 6 pages.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
Notice of Allowance issued in related U.S. Appl. No. 12/147,449 on Apr. 28, 2011; 9 pages.
Notice of Allowance issued in related U.S. Appl. No. 11/731,857 on Apr. 11, 2011; 8 pages.
Notice of Allowance issued in U.S. Appl. No. 12/323,139 on Mar. 4, 2011; 13 pages.
Office Action issued in related U.S. Appl. No. 12/059,804 on Apr. 28, 2011; 14 pages.
Office Action issued in related U.S. Appl. No. 12/060,192 on Apr. 14, 2011; 18 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in U.S. Appl. No. 12/147,414 on Apr. 14, 2011; 30 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Office Action issued in U.S. Appl. No. 11/864,811 on Mar. 18, 2011; 10 pages.
Newton's Telecom Dictionary; 18th Edition; 2002; pp. 347, 464.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.

Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Office Action issued in U.S. Appl. No. 12/147,378 on Jun. 17, 2011; 10 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in related U.S. Appl. No. 11/864,832 on Jul. 7, 2011; 11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) issued in European Application No. 05766672.9 on Jul. 14, 2011; 4 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Jan. 23, 2012; 16 pages.
Notice of Allowance issued in U.S. Appl. No. 12/060,192 on Mar. 2, 2012; 18 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Notice of Allowance issued in U.S. Appl. No. 12/060,155 on Apr. 24, 2012; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Office Action issued in U.S. Appl. No. 12/816,293 on Apr. 25, 2012; 10 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012; 12 pages.
Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.

* cited by examiner

FIG. 27E
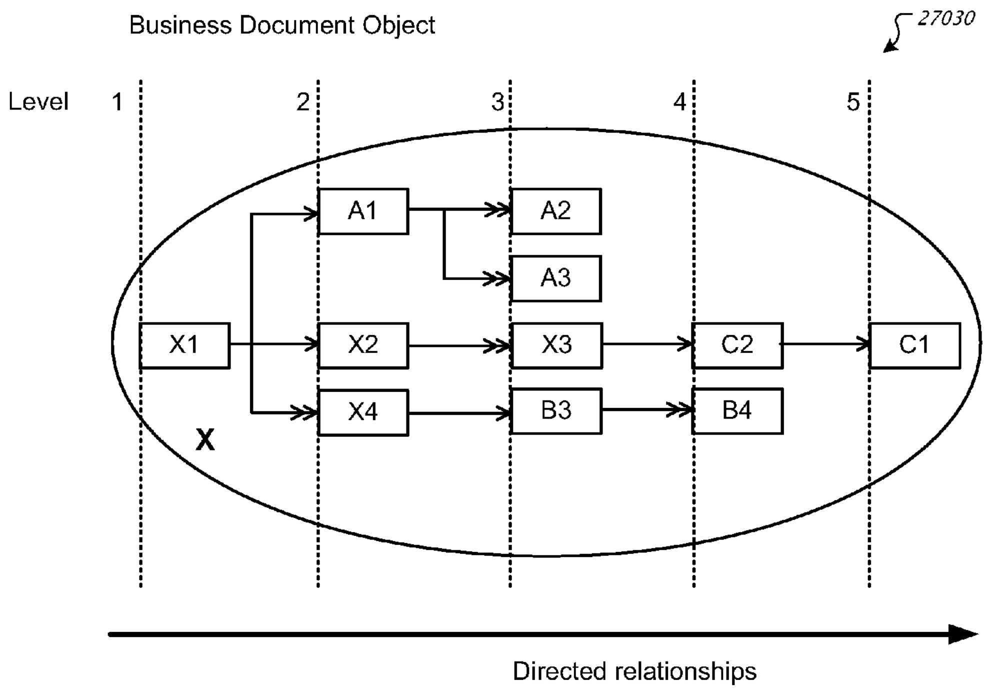
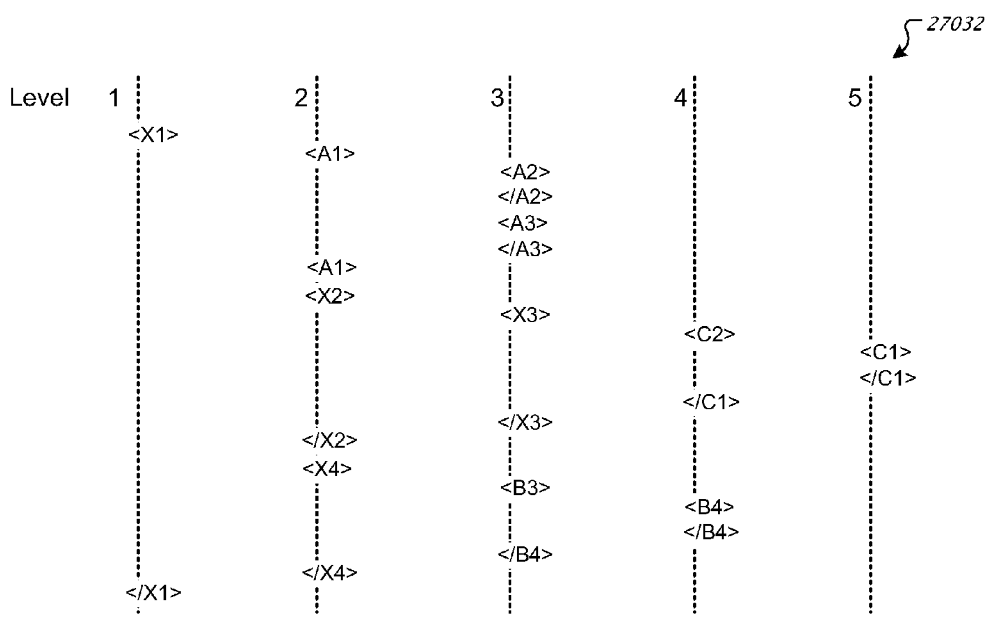

FIG. 47

| Package | level1 | level2 | level3 | Cardinality | Datatype Name |
|---|---|---|---|---|---|
| DemandPlanCancelConfirmationMessage_sync 47000 | DemandPlanCancelConfirmationMessage_sync 47002 | | | | DemandPlanCancelConfirmationMessage_sync 47004 |
| DemandPlan 47006 | | DemandPlan 47008 | | 0..1 47010 | |
| | | | ID 47012 | 1 47014 | DemandPlanID 47016 |
| Log 47018 | | Log 47020 | | 1 47022 | Log 47024 |

FIG. 48

| Package | level1 | level2 | level3 | Cardinality | Datatype Name |
|---|---|---|---|---|---|
| DemandPlanCancelRequest-Message_sync 48000 | DemandPlanCancelRequest-Message_sync 48002 | | | | DemandPlanCancelRequest-Message_sync 48004 |
| DemandPlan 48006 | | DemandPlan 48008 | | 1 48010 | |
| | | | ID 48012 | 1 48014 | DemandPlanID 48016 |

FIG. 49

| Package | level1 | level2 | level3 | Cardinality | Datatype Name |
|---|---|---|---|---|---|
| DemandPlanCreateConfirmationMessage_sync 49000 | DemandPlanCreateConfirmationMessage_sync 49002 | | | | DemandPlanCreateConfirmationMessage_sync 49004 |
| DemandPlan 49006 | | DemandPlan 49008 | | 0..1 49010 | |
| | | | ID 49012 | 1 49014 | DemandPlanID 49016 |
| | | | DemandPlanningScenarioID 49018 | 1 49020 | DemandPlanningScenarioID 49022 |
| | | | SystemAdministrativeData 49024 | 1 49026 | SystemAdministrativeData 49028 |
| Log 49030 | | Log 49032 | | 1 49034 | Log 49036 |

FIG. 50

| Package | level1 | level2 | level3 | Cardinality | Datatype Name |
|---|---|---|---|---|---|
| DemandPlanCreateRequestMessage_sync 50000 | DemandPlanCreateRequestMessage_sync 50002 | | | | DemandPlanCreateRequestMessage_sync 50004 |
| DemandPlan 50006 | | DemandPlan 50008 | | 1 50010 | |
| | | | ID 50012 | 1 50014 | DemandPlanID 50016 |
| | | | DemandPlanningScenarioID 50018 | 1 50020 | DemandPlanningScenarioID 50022 |

FIG. 51-1

| Package | level1 | level2 | level3 | level4 | level5 | level6 | level7 | level8 | level9 | Cardinality | Datatype Name |
|---|---|---|---|---|---|---|---|---|---|---|---|
| DemandPlanFunctionExecuteConfirmationMessage_sync 51000 | DemandPlanFunctionExecuteConfirmationMessage_sync 51002 | | | | | | | | | | DemandPlanFunctionExecuteConfirmationMessage_sync 51004 |
| MessageHeader 51006 | | MessageHeader 51008 | | | | | | | | 1 51010 | BusinessDocumentMessageHeader 51012 |
| | | | ID 51014 | | | | | | | 1 51016 | BusinessDocumentMessageID 51018 |

FIG. 51-2

| Package | level1 | level2 | level3 | level4 | level5 | level6 | level7 | level8 | level9 | Cardinality | Datatype Name |
|---|---|---|---|---|---|---|---|---|---|---|---|
| | | | Creation-DateTime 51020 | | | | | | | 1 51022 | DateTime 51024 |
| | | | … | | | | | | | 0..1 51026 | |
| Demand-Plan 51028 | | DemandPlan 51030 | | | | | | | | 0..1 51032 | |
| | | | ID 51034 | | | | | | | 1 51036 | DemandPlanID 51038 |
| | | | Demand-Planning-ViewID 51040 | | | | | | | 1 51042 | DemandPlanningViewID 51044 |

FIG. 51-3

| Package | level1 | level2 | level3 | level4 | level5 | level6 | level7 | level8 | level9 | Cardinality | Datatype Name |
|---|---|---|---|---|---|---|---|---|---|---|---|
| | | | De-mand-Plan-Func-tionID 51046 | | | | | | | 1 51048 | DemandPlan-FunctionID 51050 |
| De-mand-PlanSe lection 51052 | | | Selec-tion 51054 | | | | | | | 1 51056 | |
| | | | | De-mand-Plan-Ver-sion 51058 | | | | | | 1 51060 | |
| | | | | | Planning-VersionID 51062 | | | | | 1 51064 | PlanningVer-sionID 51066 |

FIG. 51-4

| Package | level1 | level2 | level3 | level4 | level5 | level6 | level7 | level8 | level9 | Cardinality | Datatype Name |
|---|---|---|---|---|---|---|---|---|---|---|---|
| | | | | Char-acteristicValue 51068 | | | | | | 0..N 51070 | |
| | | | | | Demand-PlanCharacteristi-cID 51072 | | | | | 1 51074 | Demand-PlanCharacteris-ticID 51076 |
| | | | | | Selec-tionBy-Demand-PlanCharacteris-ticValue 51078 | | | | | 1 51080 | |
| | | | | | | Inclusion-Exclu-sionCode 51082 | | | | 0..1 51084 | InclusionExclu-sionCode 51086 |

FIG. 51-5

| Package | level1 | level2 | level3 | level4 | level5 | level6 | level7 | level8 | level9 | Cardinality | Datatype Name |
|---|---|---|---|---|---|---|---|---|---|---|---|
| | | | | | | Inclusion-Exclu-sionName 51088 | | | | 0..1 51090 | MEDIUM_Name 51092 |
| | | | | | | Inclusion-Exclu-sionDe-scription 51094 | | | | 0..1 51096 | LONG_Description 51098 |
| | | | | | | Interval-Bound-aryType-Code 51100 | | | | 1 51102 | IntervalBound-aryTypeCode 51104 |
| | | | | | | Interval-Bound-aryTypeName 51106 | | | | 1 51108 | MEDIUM_Name 51110 |

FIG. 51-6

| Package | level1 | level2 | level3 | level4 | level5 | level6 | level7 | level8 | level9 | Cardinality | Datatype Name |
| --- | --- | --- | --- | --- | --- | --- | --- | --- | --- | --- | --- |
| | | | | | | Interval-Bound-aryTypeDescription 51112 | | | | 0..1 51114 | LONG_Description 51116 |
| | | | | | | Lower-Bound-aryDe-mand-PlanCharacteris-ticValue 51118 | | | | 0..1 51120 | Demand-PlanCharacteris-ticValue 51122 |
| | | | | | | Upper-Bound-aryDe-mand-PlanCharacteris-ticValue 51124 | | | | 0..1 51126 | Demand-PlanCharacteris-ticValue 51128 |

FIG. 51-7

| Package | level1 | level2 | level3 | level4 | level5 | level6 | level7 | level8 | level9 | Cardinality | Datatype Name |
|---|---|---|---|---|---|---|---|---|---|---|---|
| Plan-ningLe vel 51130 | | | Plan-ningLe vel 51132 | | | | | | | 1..N 51134 | |
| | | | | Ordi-nal-Num-ber-Value 51136 | | | | | | 1 51138 | OrdinalNumber-Value 51140 |
| | | | | Char-acter-istic 51142 | | | | | | 0..N 51144 | |
| | | | | | Demand-PlanChar acteristi-cID 51146 | | | | | 1 51148 | Demand-PlanCharacteris-ticID 51150 |

FIG. 51-8

| Package | level1 | level2 | level3 | level4 | level5 | level6 | level7 | level8 | level9 | Cardinality | Datatype Name |
|---|---|---|---|---|---|---|---|---|---|---|---|
| | | | | Char-acteris ticVal-ue-Com-bina-tion 51152 | | | | | | 1..N 51154 | |
| | | | | | Demand-PlanChar acteris-ticValue-Combina-tionID 51156 | | | | | 0..1 51158 | DemandPlan-ningCharacteris-ticValueCombi-nationID 51160 |
| | | | | | Charac-teris-ticValue 51162 | | | | | 0..N 51164 | |

FIG. 51-9

| Package | level1 | level2 | level3 | level4 | level5 | level6 | level7 | level8 | level9 | Cardinality | Datatype Name |
|---|---|---|---|---|---|---|---|---|---|---|---|
| | | | | | | Demand-PlanCharacteristi-cID 51166 | | | | 1 51168 | Demand-PlanCharacteris-ticID 51170 |
| | | | | | | Demand-PlanCharacteris-ticValue 51172 | | | | 1 51174 | Demand-PlanCharacteris-ticValue 51176 |
| | | | | | KeyFigure 51178 | | | | | 1..N 51180 | |
| | | | | | | Demand-PlanKey-FigureID 51182 | | | | 1 51184 | Demand-PlanKeyFigureID 51186 |
| | | | | | | Measure-UnitCode 51188 | | | | 0..1 51190 | MeasureUnit-Code 51192 |

FIG. 51-10

| Package | level1 | level2 | level3 | level4 | level5 | level6 | level7 | level8 | level9 | Cardinality | Datatype Name |
|---|---|---|---|---|---|---|---|---|---|---|---|
| | | | | | | Measure-UnitName 51194 | | | | 0..1 51196 | MEDIUM_Name 51198 |
| | | | | | | Measure-UnitDe-scription 51200 | | | | 0..1 51202 | LONG_Descripti on 51204 |
| | | | | | | Cur-rencyCod e 51206 | | | | 0..1 51208 | CurrencyUnit-Code 51210 |
| | | | | | | Cur-rencyNam e 51212 | | | | 0..1 51214 | MEDIUM_Name 51216 |
| | | | | | | Cur-rencyDe-scription 51218 | | | | 0..1 51220 | LONG_Descripti on 51222 |
| | | | | | | Value 51224 | | | | 1..N 51226 | |

FIG. 51-11

| Package | level1 | level2 | level3 | level4 | level5 | level6 | level7 | level8 | level9 | Cardinality | Datatype Name |
|---|---|---|---|---|---|---|---|---|---|---|---|
| | | | | | | | TimeSeri-esPerio-dID 51228 | | | 1 51230 | TimeSeriesPeri-odID 51232 |
| | | | | | | | Float-Value 51234 | | | 0..1 51236 | FloatValue 51238 |
| | | | | | | | Fixing-Code 51240 | | | 0..1 51242 | FixingCode 51244 |
| | | | | | | | Fixing-Name 51246 | | | 0..1 51248 | MEDIUM_Name 51250 |
| | | | | | | | FixingDe-scription 51252 | | | 0..1 51254 | LONG_Descripti on 51256 |
| | | | | | | | | Prop-erty 51258 | | 0..N 51260 | |

FIG. 51-12

| Package | level1 | level2 | level3 | level4 | level5 | level6 | level7 | level8 | level9 | Cardinality | Datatype Name |
|---|---|---|---|---|---|---|---|---|---|---|---|
| | | | | | | | | | ID 51262 | 1 51264 | PropertyID 51266 |
| | | | | | | | | | Value 51268 | 1 51270 | PropertyValue 51272 |
| Time-Seri-esPe-riod 51274 | | | Time-Seri-esPe-riod 51276 | | | | | | | 0..N 51278 | |
| | | | | ID 51280 | | | | | | 1 51282 | TimeSeriesPeri-odID 51284 |
| | | | | Date-Period 51286 | | | | | | 1 51288 | CLOSED_DateP eriod 51290 |
| Log 51292 | | Log 51294 | | | | | | | | 1 51296 | Log 51298 |

FIG. 52-1

| Package | level1 | level2 | level3 | level4 | level5 | level6 | level7 | Cardinality | Datatype Name |
|---|---|---|---|---|---|---|---|---|---|
| Demand-PlanFunc-tionExecuteRequestMes-sage_sync 52000 | Demand-PlanFunc-tion-ExecuteRequestMes-sage_sync 52002 | | | | | | | | DemandPlan-Function-ExecuteRe-questMes-sage_sync 52004 |
| Message-Header 52006 | | Mes-sage-Header 52008 | | | | | | 1 52010 | BusinessDocu-mentMessage-Header 52012 |
| | | | ID 52014 | | | | | 1 52016 | BusinessDocu-mentMessageID 52018 |
| | | | Creation-DateTime 52020 | | | | | 1 52022 | DateTime 52024 |
| | | | … | | | | | 0..1 52026 | |

FIG. 52-2

| Package | level1 | level2 | level3 | level4 | level5 | level6 | level7 | Cardinality | Datatype Name |
|---|---|---|---|---|---|---|---|---|---|
| Demand-Plan 52028 | | Demand Plan 52030 | | | | | | 1 52032 | |
| | | | ID 52034 | | | | | 1 52036 | DemandPlanID 52038 |
| | | | Demand-Planning-ViewID 52040 | | | | | 1 52042 | DemandPlan-ningViewID 52044 |
| | | | Demand-PlanFunc-tionID 52046 | | | | | 1 52048 | DemandPlan-FunctionID 52050 |
| Demand-PlanSele ction 52052 | | | Selection 52054 | | | | | 1 52056 | |
| | | | | ID 52058 | | | | 0..1 52060 | Demand-PlanSelectionID 52062 |

FIG. 52-3

| Package | level1 | level2 | level3 | level4 | level5 | level6 | level7 | Cardinality | Datatype Name |
|---|---|---|---|---|---|---|---|---|---|
| | | | | Demand-PlanVer-sion 52064 | | | | 0..1 52066 | |
| | | | | | Planning-VersionID 52068 | | | 1 52070 | PlanningVer-sionID 52072 |
| | | | | Character-isticValue 52074 | | | | 0..N 52076 | |
| | | | | | Demand-PlanCharac-teristicID 52078 | | | 1 52080 | Demand-PlanCharacter-isticID 52082 |
| | | | | | Selection-ByDemand-PlanCharac-teristicValue 52084 | | | 1 52086 | |

FIG. 52-4

| Package | level1 | level2 | level3 | level4 | level5 | level6 | level7 | Cardinality | Datatype Name |
|---|---|---|---|---|---|---|---|---|---|
| | | | | | | InclusionExclusionCode 52088 | | 0..1 52090 | InclusionExclusionCode 52092 |
| | | | | | | IntervalBoundaryTypeCode 52094 | | 1 52096 | IntervalBoundaryTypeCode 52098 |
| | | | | | | LowerBoundaryDemandPlanCharacteristicValue 52100 | | 0..1 52102 | DemandPlanCharacteristicValue 52104 |
| | | | | | | UpperBoundaryDemandPlanCharacteristicValue 52106 | | 0..1 52108 | DemandPlanCharacteristicValue 52110 |

FIG. 52-5

| Package | level1 | level2 | level3 | level4 | level5 | level6 | level7 | Cardinality | Datatype Name |
|---|---|---|---|---|---|---|---|---|---|
| Plan-ningLevel 52112 | | | Plan-ningLevel 52114 | | | | | 1..N 52116 | |
| | | | | Ordinal-Number-Value 52118 | | | | 1 52120 | OrdinalNum-berValue 52122 |
| | | | | Character-istic 52124 | | | | 0..N 52126 | |
| | | | | | Demand-PlanCharac-teristicID 52128 | | | 1 52130 | Demand-PlanCharacter-isticID 52132 |
| | | | | Character-isticVal-ueCombi-nation 52134 | | | | 0..N 52136 | |

FIG. 52-6

| Package | level1 | level2 | level3 | level4 | level5 | level6 | level7 | Cardinality | Datatype Name |
|---|---|---|---|---|---|---|---|---|---|
| | | | | | Demand-PlanCharacteristicValueCombinationID 52138 | | | 0..1 52140 | DemandPlanningCharacteristicValueCombinationID 52142 |
| | | | | | CharacteristicValue 52144 | | | 0..N 52146 | |
| | | | | | | Demand-PlanCharacteristicID 52148 | | 1 52150 | Demand-PlanCharacteristicID 52152 |
| | | | | | | Demand-PlanCharacteristicValue 52154 | | 1 52156 | Demand-PlanCharacteristicValue 52158 |
| | | | | | KeyFigure 52160 | | | 1..N 52162 | |

FIG. 52-7

| Package | level1 | level2 | level3 | level4 | level5 | level6 | level7 | Cardinality | Datatype Name |
|---|---|---|---|---|---|---|---|---|---|
| | | | | | | Demand-PlanKeyFig-ureID 52164 | | 1 52166 | Demand-PlanKeyFig-ureID 52168 |
| | | | | | | Measure-UnitCode 52170 | | 0..1 52172 | MeasureUnit-Code 52174 |
| | | | | | | Currency-Code 52176 | | 0..1 52178 | CurrencyUnit-Code 52180 |
| | | | | | | Value 52182 | | 1..N 52184 | |
| | | | | | | | TimeSer-iesPerio-dID 52186 | 1 52188 | TimeSeriesPe-riodID 52190 |
| | | | | | | | Value 52192 | 1 52194 | FloatValue 52196 |

FIG. 52-8

| Package | level1 | level2 | level3 | level4 | level5 | level6 | level7 | Cardinality | Datatype Name |
|---|---|---|---|---|---|---|---|---|---|
| TimeSeriesPeriod 52198 | | | TimeSeriesPeriod 52200 | | | | | 0..N 52202 | |
| | | | | ID 52204 | | | | 1 52206 | TimeSeriesPeriodID 52208 |
| | | | | DatePeriod 52210 | | | | 1 52212 | CLOSED_DatePeriod 52214 |

FIG. 53-1

| Package | level1 | level2 | level3 | level4 | level5 | level6 | Cardinality | Datatype Name |
|---|---|---|---|---|---|---|---|---|
| Demand-PlanKeyFig-ureValueByE-lementsQue-ryMes-sage_sync 53000 | Demand-PlanKey-FigureVal-ueByEle-mentsQue-ryMes-sage_sync 53002 | | | | | | | Demand-PlanKeyFigure-ValueByEle-mentsQuery-Message_sync 53004 |
| Message-Header 53006 | | Message Header 53008 | | | | | 1 53010 | BusinessDocu-mentMessage-Header 53012 |
| | | | ID 53014 | | | | 1 53016 | BusinessDocu-mentMessageID 53018 |
| | | | Creation-DateTime 53020 | | | | 1 53022 | DateTime 53024 |
| | | | … | | | | 0..1 53026 | |

FIG. 53-2

| Package | level1 | level2 | level3 | level4 | level5 | level6 | Cardinality | Datatype Name |
|---|---|---|---|---|---|---|---|---|
| Selection 53028 | | Demand-PlanKey-Figure-ValueSe-lection-ByEle-ments 53030 | | | | | 1 53032 | |
| | | | Demand-PlanID 53034 | | | | 1 53036 | DemandPlanID 53038 |
| | | | Demand-Planning-ViewID 53040 | | | | 0..1 53042 | DemandPlan-ningViewID 53044 |
| | | | TimeSeri-esPeriod 53046 | | | | 0..1 53048 | |
| | | | | DatePeriod 53050 | | | 1 53052 | CLOSED_DateP eriod 53054 |

FIG. 53-3

| Package | level1 | level2 | level3 | level4 | level5 | level6 | Cardinality | Datatype Name |
| --- | --- | --- | --- | --- | --- | --- | --- | --- |
| | | | | Calenda-rUnitCode 53056 | | | 0..1 53058 | CalendarUnit-Code 53060 |
| | | | | FiscalYear-VariantCode 53062 | | | 0..1 53064 | FiscalYearVari-antCode 53066 |
| Demand-PlanSelection 53068 | | | Demand-PlanSelection 53070 | | | | 1 53072 | |
| | | | | ID 53074 | | | 0..1 53076 | Demand-PlanSelectionID 53078 |
| | | | | Demand-PlanVersion 53080 | | | 0..1 53082 | |
| | | | | | PlanningVersionID 53084 | | 1 53086 | PlanningVer-sionID 53088 |

FIG. 53-4

| Package | level1 | level2 | level3 | level4 | level5 | level6 | Cardinality | Datatype Name |
|---|---|---|---|---|---|---|---|---|
| | | | | Characteristic Value 53090 | | | 0..N 53092 | |
| | | | | | DemandPlanCharacteristicID 53094 | | 1 53096 | DemandPlanCharacteristicID 53098 |
| | | | | | SelectionByDemandPlanCharacteristicValue 53100 | | 1 53102 | |
| | | | | | | InclusionExclusionCode 53104 | 0..1 53106 | InclusionExclusionCode 53108 |
| | | | | | | IntervalBoundaryTypeCode 53110 | 1 53112 | IntervalBoundaryTypeCode 53114 |

FIG. 53-5

| Package | level1 | level2 | level3 | level4 | level5 | level6 | Cardinality | Datatype Name |
|---|---|---|---|---|---|---|---|---|
| | | | | | | LowerBoundaryDemandPlanCharacteristicValue 53116 | 0..1 53118 | DemandPlanCharacteristicValue 53120 |
| | | | | | | UpperBoundaryDemandPlanCharacteristicValue 53122 | 0..1 53124 | DemandPlanCharacteristicValue 53126 |
| DemandPlanPlanningLevel 53128 | | | DemandPlanPlanningLevel 53130 | | | | 1..N 53132 | |
| | | | | OrdinalNumberValue 53134 | | | 1 53136 | OrdinalNumberValue 53138 |

FIG. 53-6

| Package | level1 | level2 | level3 | level4 | level5 | level6 | Cardinality | Datatype Name |
|---|---|---|---|---|---|---|---|---|
| | | | | Characteris-tic 53140 | | | 0..N 53142 | |
| | | | | | DemandPlanChar-acteristicID 53144 | | 1 53146 | Demand-PlanCharacteris-ticID 53148 |
| Demand-PlanKey-Figure 53150 | | | Demand-PlanKey-Figure 53152 | | | | 0..N 53154 | |
| | | | | ID 53156 | | | 1 53158 | Demand-PlanKeyFigureID 53160 |

FIG. 54-1

| Package | level1 | level2 | level3 | level4 | level5 | level6 | level7 | level8 | level9 | Cardinality | Datatype Name |
|---|---|---|---|---|---|---|---|---|---|---|---|
| DemandPlanKeyFigureValueByElementsResponseMessage_sync 54000 | DemandPlanKeyFigureValueByElementsResponseMessage_sync 54002 | | | | | | | | | | DemandPlanKeyFigureValueByElementsResponseMessage_sync 54004 |
| MessageHeader 54006 | | MessageHeader 54008 | | | | | | | | 1 54010 | BusinessDocumentMessageHeader 54012 |
| | | | ID 54014 | | | | | | | 1 54016 | BusinessDocumentMessageID 54018 |

FIG. 54-2

| Package | level1 | level2 | level3 | level4 | level5 | level6 | level7 | level8 | level9 | Cardinality | Datatype Name |
|---|---|---|---|---|---|---|---|---|---|---|---|
| | | | Creation DateTime 54020 | | | | | | | 1 54022 | DateTime 54024 |
| | | | … | | | | | | | 0..1 54026 | |
| Demand-Plan 54028 | | De-mand-Plan 54030 | | | | | | | | 0..1 54032 | |
| | | | ID 54034 | | | | | | | 1 54036 | DemandPlanID 54038 |
| | | | Demand Planning ViewID 54040 | | | | | | | 0..1 54042 | DemandPlan-ningViewID 54044 |

FIG. 54-3

| Package | level1 | level2 | level3 | level4 | level5 | level6 | level7 | level8 | level9 | Cardinality | Datatype Name |
|---|---|---|---|---|---|---|---|---|---|---|---|
| | | | SystemAdministrativeData 54046 | | | | | | | 1 54048 | SystemAdministrativeData 54050 |
| DemandPlanSelection 54052 | | | Selection 54054 | | | | | | | 1 54056 | |
| | | | | DemandPlanVersion 54058 | | | | | | 1 54060 | |
| | | | | | Planning-VersionID 54062 | | | | | 1 54064 | PlanningVersionID 54066 |
| | | | | CharacteristicValue 54068 | | | | | | 0..N 54070 | |

FIG. 54-4

| Package | level1 | level2 | level3 | level4 | level5 | level6 | level7 | level8 | level9 | Cardinality | Datatype Name |
|---|---|---|---|---|---|---|---|---|---|---|---|
| | | | | | Demand-PlanChar-acteristicID 54072 | | | | | 1 54074 | Demand-PlanCharacteris-ticID 54076 |
| | | | | | Selection-ByDemand PlanChar-acteris-ticValue 54078 | | | | | 1 54080 | |
| | | | | | | Inclu-sionEx-clusion-Code 54082 | | | | 0..1 54084 | InclusionExclu-sionCode 54086 |
| | | | | | | Inclu-sionEx-clusion-Name 54088 | | | | 0..1 54090 | MEDIUM_Name 54092 |

FIG. 54-5

| Package | level1 | level2 | level3 | level4 | level5 | level6 | level7 | level8 | level9 | Cardinality | Datatype Name |
|---|---|---|---|---|---|---|---|---|---|---|---|
| | | | | | | Inclu-sionEx-clusion-Descrip-tion 54094 | | | | 0..1 54096 | LONG_Description 54098 |
| | | | | | | Interval-Bound-aryType-Code 54100 | | | | 1 54102 | IntervalBound-aryTypeCode 54104 |
| | | | | | | Interval-Bound-aryTypeName 54106 | | | | 1 54108 | MEDIUM_Name 54110 |
| | | | | | | Interval-Bound-aryTypeDescription 54112 | | | | 0..1 54114 | LONG_Description 54116 |

FIG. 54-6

| Package | level1 | level2 | level3 | level4 | level5 | level6 | level7 | level8 | level9 | Cardinality | Datatype Name |
|---|---|---|---|---|---|---|---|---|---|---|---|
| | | | | | | LowerBoundaryDemandPlanCharacteristicValue 54118 | | | | 0..1 54120 | DemandPlanCharacteristicValue 54122 |
| | | | | | | UpperBoundaryDemandPlanCharacteristicValue 54124 | | | | 0..1 54126 | DemandPlanCharacteristicValue 54128 |
| PlanningLevel 54130 | | | PlanningLevel 54132 | | | | | | | 1..N 54134 | |

FIG. 54-7

| Package | level1 | level2 | level3 | level4 | level5 | level6 | level7 | level8 | level9 | Cardinality | Datatype Name |
|---|---|---|---|---|---|---|---|---|---|---|---|
| | | | | Ordinal-Number-Value 54136 | | | | | | 1 54138 | OrdinalNumber-Value 54140 |
| | | | | Charac-teristic 54142 | | | | | | 0..N 54144 | |
| | | | | | Demand-PlanChar-acteristicID 54146 | | | | | 1 54148 | Demand-PlanCharacteris-ticID 54150 |
| | | | | Charac-teris-ticValue-Combina-tion 54152 | | | | | | 1..N 54154 | |

FIG. 54-8

| Package | level1 | level2 | level3 | level4 | level5 | level6 | level7 | level8 | level9 | Cardinality | Datatype Name |
|---|---|---|---|---|---|---|---|---|---|---|---|
| | | | | | Demand-PlanChar-acteris-ticValue-Combina-tionID 54156 | | | | | 0..1 54158 | DemandPlan-ningCharacteris-ticValueCombi-nationID 54160 |
| | | | | | Character-isticValue 54162 | | | | | 0..N 54164 | |
| | | | | | | Demand-PlanChar acteristi-cID 54166 | | | | 1 54168 | Demand-PlanCharacteris-ticID 54170 |
| | | | | | | Demand-PlanChar acteris-ticValue 54172 | | | | 1 54174 | Demand-PlanCharacteris-ticValue 54176 |

FIG. 54-9

| Package | level1 | level2 | level3 | level4 | level5 | level6 | level7 | level8 | level9 | Cardinality | Datatype Name |
|---|---|---|---|---|---|---|---|---|---|---|---|
| | | | | | KeyFigure 54178 | | | | | 1..N 54180 | |
| | | | | | | Demand-PlanKey-FigureID 54182 | | | | 1 54184 | Demand-PlanKeyFig-ureID 54186 |
| | | | | | | Meas-ureUnit-Code 54188 | | | | 0..1 54190 | MeasureUnit-Code 54192 |
| | | | | | | Meas-ureUnit-Name 54194 | | | | 0..1 54196 | MEDIUM_Name 54198 |
| | | | | | | Meas-ureUnit-Descrip-tion 54200 | | | | 0..1 54202 | LONG_Descripti on 54204 |

FIG. 54-10

| Package | level1 | level2 | level3 | level4 | level5 | level6 | level7 | level8 | level9 | Cardinality | Datatype Name |
|---|---|---|---|---|---|---|---|---|---|---|---|
| | | | | | | Currency Code 54206 | | | | 0..1 54208 | CurrencyUnit-Code 54210 |
| | | | | | | Currency Name 54212 | | | | 0..1 54214 | MEDIUM_Name 54216 |
| | | | | | | Cur-rencyDe-scription 54218 | | | | 0..1 54220 | LONG_Description 54222 |
| | | | | | | Value 54224 | | | | 1..N 54226 | |
| | | | | | | | Time-Series-PeriodID 54228 | | | 1 54230 | TimeSeriesPeri-odID 54232 |
| | | | | | | | Value 54234 | | | 0..1 54236 | FloatValue 54238 |

FIG. 54-11

| Package | level1 | level2 | level3 | level4 | level5 | level6 | level7 | level8 | level9 | Cardinality | Datatype Name |
|---|---|---|---|---|---|---|---|---|---|---|---|
| | | | | | | | Fixing-Code 54240 | | | 0..1 54242 | FixingCode 54244 |
| | | | | | | | Fixing-Name 54246 | | | 0..1 54248 | MEDIUM_Name 54250 |
| | | | | | | | Fixing-Descrip-tion 54252 | | | 0..1 54254 | LONG_Descripti on 54256 |
| | | | | | | | | Prop-erty 54258 | | 0..N 54260 | |
| | | | | | | | | | ID 54262 | 1 54264 | PropertyID 54266 |
| | | | | | | | | | Value 54268 | 1 54270 | PropertyValue 54272 |

FIG. 54-12

| Package | level1 | level2 | level3 | level4 | level5 | level6 | level7 | level8 | level9 | Cardinality | Datatype Name |
|---|---|---|---|---|---|---|---|---|---|---|---|
| Time-Series-Period 54274 | | | Time-Series-Period 54276 | | | | | | | 1..N 54278 | |
| | | | | ID 54280 | | | | | | 1 54282 | TimeSeriesPeri-odID 54284 |
| | | | | DatePe-riod 54286 | | | | | | 1 54288 | CLOSED_DateP eriod 54290 |
| | | | | Calenda-rUnit-Code 54292 | | | | | | 0..1 54294 | CalendarUnit-Code 54296 |
| | | | | Calenda-rUnit-Name 54298 | | | | | | 0..1 54300 | MEDIUM_Name 54302 |

FIG. 54-13

| Package | level1 | level2 | level3 | level4 | level5 | level6 | level7 | level8 | level9 | Cardinality | Datatype Name |
|---|---|---|---|---|---|---|---|---|---|---|---|
| | | | | Calenda-rUnitDe-scription 54304 | | | | | | 0..1 54306 | LONG_Descripti on 54308 |
| | | | | Fis-calYear-Variant-Code 54310 | | | | | | 0..1 54312 | FiscalYearVari-antCode 54314 |
| | | | | Fis-calYear-Variant-Name 54316 | | | | | | 0..1 54318 | MEDIUM_Name 54320 |
| | | | | Fis-calYear-Variant-Descrip-tion 54322 | | | | | | 0..1 54324 | LONG_Descripti on 54326 |

FIG. 54-14

| Package | level1 | level2 | level3 | level4 | level5 | level6 | level7 | level8 | level9 | Cardinality | Datatype Name |
|---|---|---|---|---|---|---|---|---|---|---|---|
| | | | | Description 54328 | | | | | | 0..1 54330 | LEN60_Description 54332 |
| CharacteristicValueDescription 54334 | | | CharacteristicValueDescription 54336 | | | | | | | 0..N 54338 | |
| | | | | DemandPlanCharacteristicID 54340 | | | | | | 1 54342 | DemandPlanCharacteristicID 54344 |
| | | | | DemandPlanCharacteristicValue 54346 | | | | | | 1 54348 | DemandPlanCharacteristicValue 54350 |

FIG. 54-15

| Package | level1 | level2 | level3 | level4 | level5 | level6 | level7 | level8 | level9 | Cardinality | Datatype Name |
|---|---|---|---|---|---|---|---|---|---|---|---|
| | | | | Descrip-tion 54352 | | | | | | 0..1 54354 | LEN60_Description 54356 |
| Log 54358 | | Log 54360 | | | | | | | | 1 54362 | Log 54364 |

FIG. 55-1

| Package | level1 | level2 | level3 | level4 | level5 | level6 | level7 | level8 | level9 | Cardinality | Datatype Name |
|---|---|---|---|---|---|---|---|---|---|---|---|
| DemandPlanKeyFigureValueChangeConfirmationMessage_sync 55000 | DemandPlanKeyFigureValueChangeConfirmationMessage_sync 55002 | | | | | | | | | | DemandPlanKeyFigureValueChangeConfirmationMessage_sync 55004 |
| MessageHeader 55006 | | MessageHeader 55008 | | | | | | | | 1 55010 | BusinessDocumentMessageHeader 55012 |
| | | | ID 55014 | | | | | | | 1 55016 | BusinessDocumentMessageID 55018 |

FIG. 55-2

| Package | level1 | level2 | level3 | level4 | level5 | level6 | level7 | level8 | level9 | Cardinality | Datatype Name |
|---|---|---|---|---|---|---|---|---|---|---|---|
| | | | Creation-DateTime 55020 | | | | | | | 1 55022 | DateTime 55024 |
| | | | … | | | | | | | 0..1 55026 | |
| Demand Plan 55028 | | De-mand-Plan 55030 | | | | | | | | 0..1 55032 | |
| | | | ID 55034 | | | | | | | 1 55036 | DemandPlanID 55038 |
| | | | Demand-Planning-ViewID 55040 | | | | | | | 0..1 55042 | DemandPlan-ningViewID 55044 |
| De-mand | | | Selection 55048 | | | | | | | 1 55050 | |

FIG. 55-3

| Package | level1 | level2 | level3 | level4 | level5 | level6 | level7 | level8 | level9 | Cardinality | Datatype Name |
|---|---|---|---|---|---|---|---|---|---|---|---|
| PlanSelection 55046 | | | | DemandPlanVersion 55052 | | | | | | 1 55054 | |
| | | | | | PlanningVersionID 55056 | | | | | 1 55058 | PlanningVersionID 55060 |
| | | | | CharacteristicValue 55062 | | | | | | 0..N 55064 | |
| | | | | | DemandPlanCharacteristicID 55066 | | | | | 1 55068 | DemandPlanCharacteristicID 55070 |

FIG. 55-4

| Package | level1 | level2 | level3 | level4 | level5 | level6 | level7 | level8 | level9 | Cardinality | Datatype Name |
|---|---|---|---|---|---|---|---|---|---|---|---|
| | | | | | Selection-ByDemandPlanChar-acteris-ticValue 55072 | | | | | 1 55074 | |
| | | | | | | Inclusion-Exclusion-Code 55076 | | | | 0..1 55078 | InclusionExclu-sionCode 55080 |
| | | | | | | Inclusion-Exclusion-Name 55082 | | | | 0..1 55084 | MEDIUM_Name 55086 |
| | | | | | | Inclusion-Exclusion-Description 55088 | | | | 0..1 55090 | LONG_Description 55092 |

FIG. 55-5

| Package | level1 | level2 | level3 | level4 | level5 | level6 | level7 | level8 | level9 | Cardinality | Datatype Name |
|---|---|---|---|---|---|---|---|---|---|---|---|
| | | | | | | Interval-Bound-aryType-Code 55094 | | | | 1 55096 | IntervalBound-aryTypeCode 55098 |
| | | | | | | Interval-Bound-aryTypeName 55100 | | | | 1 55102 | MEDIUM_Name 55104 |
| | | | | | | Interval-Bound-aryTypeDescription 55106 | | | | 0..1 55108 | LONG_Description 55110 |
| | | | | | | Lower-Boundary-Demand-PlanChar-acteris-ticValue 55112 | | | | 0..1 55114 | Demand-PlanCharacter-isticValue 55116 |

FIG. 55-6

| Package | level1 | level2 | level3 | level4 | level5 | level6 | level7 | level8 | level9 | Cardinality | Datatype Name |
|---|---|---|---|---|---|---|---|---|---|---|---|
| | | | | | | Upper-Boundary-Demand-PlanChar-acteris-ticValue 55118 | | | | 0..1 55120 | Demand-PlanCharacter-isticValue 55122 |
| Plan-ningLevel 55124 | | | Plan-ningLevel 55126 | | | | | | | 1..N 55128 | |
| | | | | Ordinal-Number-Value 55130 | | | | | | 1 55132 | OrdinalNum-berValue 55134 |
| | | | | Charac-teristic 55136 | | | | | | 0..N 55138 | |
| | | | | | Demand-PlanChar-acteristicID 55140 | | | | | 1 55142 | Demand-PlanCharacter-isticID 55144 |

FIG. 55-7

| Package | level1 | level2 | level3 | level4 | level5 | level6 | level7 | level8 | level9 | Cardinality | Datatype Name |
|---|---|---|---|---|---|---|---|---|---|---|---|
| | | | | Charac-teris-ticValue-Combina-tion 55146 | | | | | | 1..N 55148 | |
| | | | | | Demand-PlanChar-acteris-ticValue-Combina-tionID 55150 | | | | | 0..1 55152 | DemandPlan-ningCharacteris-ticValueCombi-nationID 55154 |
| | | | | | Character-isticValue 55156 | | | | | 0..N 55158 | |
| | | | | | | Demand-PlanChar-acteristicID 55160 | | | | 1 55162 | Demand-PlanCharacter-isticID 55164 |

FIG. 55-8

| Package | level1 | level2 | level3 | level4 | level5 | level6 | level7 | level8 | level9 | Cardinality | Datatype Name |
|---|---|---|---|---|---|---|---|---|---|---|---|
| | | | | | | Demand-PlanChar-acteris-ticValue 55166 | | | | 1 55168 | Demand-PlanCharacter-isticValue 55170 |
| | | | | | KeyFigure 55172 | | | | | 1..N 55174 | |
| | | | | | | Demand-PlanKey-FigureID 55176 | | | | 1 55178 | Demand-PlanKeyFig-ureID 55180 |
| | | | | | | Measure-UnitCode 55182 | | | | 0..1 55184 | MeasureUnit-Code 55186 |
| | | | | | | Measure-UnitName 55188 | | | | 0..1 55190 | MEDIUM_Name 55192 |
| | | | | | | Measure-UnitDe-scription 55194 | | | | 0..1 55196 | LONG_Descripti on 55198 |

FIG. 55-9

| Package | level1 | level2 | level3 | level4 | level5 | level6 | level7 | level8 | level9 | Cardinality | Datatype Name |
|---|---|---|---|---|---|---|---|---|---|---|---|
| | | | | | | Currency-Code 55200 | | | | 0..1 55202 | CurrencyUnit-Code 55204 |
| | | | | | | Currency-Name 55206 | | | | 0..1 55208 | MEDIUM_Name 55210 |
| | | | | | | Currency-Description 55212 | | | | 0..1 55214 | LONG_Description 55216 |
| | | | | | | Value 55218 | | | | 1..N 55220 | |
| | | | | | | | Time-Series-PeriodID 55222 | | | 1 55224 | TimeSeriesPe-riodID 55226 |
| | | | | | | | Value 55228 | | | 0..1 55230 | FloatValue 55232 |
| | | | | | | | Fixing-Code 55234 | | | 0..1 55236 | FixingCode 55238 |

FIG. 55-10

| Package | level1 | level2 | level3 | level4 | level5 | level6 | level7 | level8 | level9 | Cardinality | Datatype Name |
|---|---|---|---|---|---|---|---|---|---|---|---|
| | | | | | | | Fixing-Name 55240 | | | 0..1 55242 | MEDIUM_Name 55244 |
| | | | | | | | Fixing-Descrip-tion 55246 | | | 0..1 55248 | LONG_Description 55250 |
| | | | | | | | | Prop-erty 55252 | | 0..N 55254 | |
| | | | | | | | | | ID 55256 | 1 55258 | PropertyID 55260 |
| | | | | | | | | | Value 55262 | 1 55264 | PropertyValue 55266 |
| Time-Seri-esPe-riod 55268 | | | TimeSeri-esPeriod 55270 | | | | | | | 0..N 55272 | |
| | | | | ID 55274 | | | | | | 1 55276 | TimeSeriesPe-riodID 55278 |

FIG. 55-11

| Package | level1 | level2 | level3 | level4 | level5 | level6 | level7 | level8 | level9 | Cardinality | Datatype Name |
|---|---|---|---|---|---|---|---|---|---|---|---|
| | | | | DatePe-riod 55280 | | | | | | 1 55282 | CLOSED_Date Period 55284 |
| Log 55286 | | Log 55288 | | | | | | | | 1 55290 | Log 55292 |

FIG. 56-1

| Package | level1 | level2 | level3 | level4 | level5 | level6 | level7 | Cardinality | Datatype Name |
|---|---|---|---|---|---|---|---|---|---|
| Demand-PlanKey-Figure-ValueChangeRequestMes-sage_sync 56000 | Demand-PlanKey-FigureVal-ueChange Request-Mes-sage_sync 56002 | | | | | | | | Demand-PlanKeyFigure-ValueChangeRequestMes-sage_sync 56004 |
| Mes-sage-Header 56006 | | Message Header 56008 | | | | | | 1 56010 | BusinessDocu-mentMessage-Header 56012 |
| | | | ID 56014 | | | | | 1 56016 | BusinessDocu-mentMessageID 56018 |
| | | | Creation-DateTime 56020 | | | | | 1 56022 | DateTime 56024 |
| | | | … | | | | | 0..1 56026 | |

FIG. 56-2

| Package | level1 | level2 | level3 | level4 | level5 | level6 | level7 | Cardinality | Datatype Name |
|---|---|---|---|---|---|---|---|---|---|
| Demand Plan 56028 | | Demand-Plan 56030 | | | | | | 1 56032 | |
| | | | ID 56034 | | | | | 1 56036 | DemandPlanID 56038 |
| | | | Demand-Planning-ViewID 56040 | | | | | 0..1 56042 | DemandPlan-ningViewID 56044 |
| De-mand PlanS elec-tion 56046 | | | Selection 56048 | | | | | 1 56050 | |
| | | | | ID 56052 | | | | 0..1 56054 | Demand-PlanSelectionID 56056 |
| | | | | DemandPlan-Version 56058 | | | | 0..1 56060 | |

FIG. 56-3

| Package | level1 | level2 | level3 | level4 | level5 | level6 | level7 | Cardinality | Datatype Name |
|---|---|---|---|---|---|---|---|---|---|
| | | | | | PlanningVersionID 56062 | | | 1 56064 | PlanningVersionID 56066 |
| | | | | CharacteristicValue 56068 | | | | 0..N 56070 | |
| | | | | | DemandPlanCharacteristicID 56072 | | | 1 56074 | DemandPlanCharacteristicID 56076 |
| | | | | | SelectionByDemandPlanCharacteristicValue 56078 | | | 1..N 56080 | |
| | | | | | | InclusionExclusionCode 56082 | | 0..1 56084 | InclusionExclusionCode 56086 |

FIG. 56-4

| Package | level1 | level2 | level3 | level4 | level5 | level6 | level7 | Cardinality | Datatype Name |
|---|---|---|---|---|---|---|---|---|---|
| | | | | | | IntervalBoundaryTypeCode 56088 | | 1 56090 | IntervalBoundaryTypeCode 56092 |
| | | | | | | LowerBoundaryDemandPlanCharacteristicValue 56094 | | 0..1 56096 | DemandPlanCharacteristicValue 56098 |
| | | | | | | UpperBoundaryDemandPlanCharacteristicValue 56100 | | 0..1 56102 | DemandPlanCharacteristicValue 56104 |
| PlanningLevel 56106 | | | PlanningLevel 56108 | | | | | 1..N 56110 | |
| | | | | OrdinalNumberValue 56112 | | | | 1 56114 | OrdinalNumberValue 56116 |

FIG. 56-5

| Package | level1 | level2 | level3 | level4 | level5 | level6 | level7 | Cardinality | Datatype Name |
|---|---|---|---|---|---|---|---|---|---|
| | | | | Characteristic 56118 | | | | 0..N 56120 | |
| | | | | | Demand-PlanCharac-teristicID 56122 | | | 1 56124 | Demand-PlanCharacteris-ticID 56126 |
| | | | | Characteris-ticValueCom-bination 56128 | | | | 1..N 56130 | |
| | | | | | Demand-Planning-Characteris-ticValueCom-binationID 56132 | | | 0..1 56134 | DemandPlan-ningCharacteris-ticValueCombi-nationID 56136 |
| | | | | | Characteris-ticValue 56138 | | | 0..N 56140 | |

FIG. 56-6

| Package | level1 | level2 | level3 | level4 | level5 | level6 | level7 | Cardinality | Datatype Name |
|---|---|---|---|---|---|---|---|---|---|
| | | | | | | Demand-PlanCharac-teristicID 56142 | | 1 56144 | Demand-PlanCharacteris-ticID 56146 |
| | | | | | | Demand-PlanCharac-teristicValue 56148 | | 1 56150 | Demand-PlanCharacteris-ticValue 56152 |
| | | | | | KeyFigure 56154 | | | 1..N 56156 | |
| | | | | | | Demand-PlanKeyFig-ureID 56158 | | 1 56160 | Demand-PlanKeyFig-ureID 56162 |
| | | | | | | Measure-UnitCode 56164 | | 0..1 56166 | MeasureUnit-Code 56168 |
| | | | | | | Currency-Code 56170 | | 0..1 56172 | CurrencyCode 56174 |

FIG. 56-7

| Package | level1 | level2 | level3 | level4 | level5 | level6 | level7 | Cardinality | Datatype Name |
|---|---|---|---|---|---|---|---|---|---|
| | | | | | | Value 56176 | | a 56178 | |
| | | | | | | | TimeSeriesPeriodID 56180 | 1 56182 | TimeSeriesPeriodID 56184 |
| | | | | | | | Value 56186 | 1 56188 | FloatValue 56190 |
| TimeSeriesPeriod 56192 | | | TimeSeriesPeriod 56194 | | | | | 1..N 56196 | |
| | | | | ID 56198 | | | | 1 56200 | TimeSeriesPeriodID 56202 |
| | | | | DatePeriod 56204 | | | | 1 56206 | CLOSED_DatePeriod 56208 |

FIG. 57-1

| Package | level1 | level2 | level3 | level4 | level5 | level6 | level7 | level8 | level9 | Cardinality | Datatype Name |
|---|---|---|---|---|---|---|---|---|---|---|---|
| Demand-PlanKey-Figure-Value-Simulate-Confirma-tionMes-sage_sync 57000 | De-mand-PlanKe yFig-ureVal-ueSimu late-Confir-mation-Mes-sage_s ync 57002 | | | | | | | | | | Demand-PlanKeyFigure-ValueSimulate-Confirmation-Message_sync 57004 |
| Demand Plan 57006 | | De-mand-Plan 57008 | | | | | | | | 0..1 57010 | |
| | | | ID 57012 | | | | | | | 1 57014 | DemandPlanID 57016 |

FIG. 57-2

| Package | level1 | level2 | level3 | level4 | level5 | level6 | level7 | level8 | level9 | Cardinality | Datatype Name |
|---|---|---|---|---|---|---|---|---|---|---|---|
| | | | Demand Planning ViewID 57018 | | | | | | | 0..1 57020 | DemandPlanningViewID 57022 |
| DemandPlanSelection 57024 | | | Selection 57026 | | | | | | | 1 57028 | |
| | | | | Demand Plan-Version 57030 | | | | | | 1 57032 | |
| | | | | | Planning-VersionID 57034 | | | | | 1 57036 | PlanningVersionID 57038 |
| | | | | Characteristic Value 57040 | | | | | | 0..N 57042 | |

FIG. 57-3

| Package | level1 | level2 | level3 | level4 | level5 | level6 | level7 | level8 | level9 | Cardinality | Datatype Name |
|---|---|---|---|---|---|---|---|---|---|---|---|
| | | | | | Demand-PlanChar-acteristicID 57044 | | | | | 1 57046 | Demand-PlanCharacteris-ticID 57048 |
| | | | | | Selection-ByDemand PlanChar-acteris-ticValue 57050 | | | | | 1 57052 | |
| | | | | | | Inclusion-Exclusion-Code 57054 | | | | 0..1 57056 | InclusionExclu-sionCode 57058 |
| | | | | | | Inclusion-Exclusion-Name 57060 | | | | 0..1 57062 | MEDIUM_Name 57064 |

FIG. 57-4

| Package | level1 | level2 | level3 | level4 | level5 | level6 | level7 | level8 | level9 | Cardinality | Datatype Name |
|---|---|---|---|---|---|---|---|---|---|---|---|
| | | | | | | Inclusion-Exclusion-Description 57066 | | | | 0..1 57068 | LONG_Description 57070 |
| | | | | | | Interval-Bound-aryType-Code 57072 | | | | 1 57074 | IntervalBound-aryTypeCode 57076 |
| | | | | | | Interval-Bound-aryTypeName 57078 | | | | 1 57080 | MEDIUM_Name 57082 |
| | | | | | | Interval-Bound-aryTypeDescription 57084 | | | | 0..1 57086 | LONG_Description 57088 |

FIG. 57-5

| Package | level1 | level2 | level3 | level4 | level5 | level6 | level7 | level8 | level9 | Cardinality | Datatype Name |
|---|---|---|---|---|---|---|---|---|---|---|---|
| | | | | | | Lower-Boundary-Demand-PlanChar-acteris-ticValue 57090 | | | | 0..1 57092 | Demand-PlanCharacteris-ticValue 57094 |
| | | | | | | Upper-Boundary-Demand-PlanChar-acteris-ticValue 57096 | | | | 0..1 57098 | Demand-PlanCharacteris-ticValue 57100 |
| Plan-ningLevel 57102 | | | Plan-ningLevel 57104 | | | | | | | 1..N 57106 | |
| | | | | Ordinal-Number-Value 57108 | | | | | | 1 57110 | OrdinalNumber-Value 57112 |

FIG. 57-6

| Package | level1 | level2 | level3 | level4 | level5 | level6 | level7 | level8 | level9 | Cardinality | Datatype Name |
|---|---|---|---|---|---|---|---|---|---|---|---|
| | | | | Charac-teristic 57114 | | | | | | 0..N 57116 | |
| | | | | | Demand-PlanChar-acteristicID 57118 | | | | | 1 57120 | Demand-PlanCharacteris-ticID 57122 |
| | | | | Charac-teris-ticVal-ueCom-bination 57124 | | | | | | 1..N 57126 | |
| | | | | | Demand-PlanChar-acteris-ticValue-Combina-tionID 57128 | | | | | 0..1 57130 | DemandPlan-ningCharacteris-ticValueCombi-nationID 57132 |

FIG. 57-7

| Package | level1 | level2 | level3 | level4 | level5 | level6 | level7 | level8 | level9 | Cardinality | Datatype Name |
|---|---|---|---|---|---|---|---|---|---|---|---|
| | | | | | Character-isticValue 57134 | | | | | 0..N 57136 | |
| | | | | | | Demand-PlanChar-acteristicID 57138 | | | | 1 57140 | Demand-PlanCharacteris-ticID 57142 |
| | | | | | | Demand-PlanChar-acteris-ticValue 57144 | | | | 1 57146 | Demand-PlanCharacteris-ticValue 57148 |
| | | | | | KeyFigure 57150 | | | | | 1..N 57152 | |
| | | | | | | Demand-PlanKey-FigureID 57154 | | | | 1 57156 | Demand-PlanKeyFig-ureID 57158 |
| | | | | | | Measure-UnitCode 57160 | | | | 0..1 57162 | MeasureUnit-Code 57164 |

FIG. 57-8

| Package | level1 | level2 | level3 | level4 | level5 | level6 | level7 | level8 | level9 | Cardinality | Datatype Name |
|---|---|---|---|---|---|---|---|---|---|---|---|
| | | | | | | Measure-UnitName 57166 | | | | 0..1 57168 | MEDIUM_Name 57170 |
| | | | | | | Measure-UnitDe-scription 57172 | | | | 0..1 57174 | LONG_Description 57176 |
| | | | | | | Currency-Code 57178 | | | | 0..1 57180 | CurrencyUnit-Code 57182 |
| | | | | | | Currency-Name 57184 | | | | 0..1 57186 | MEDIUM_Name 57188 |
| | | | | | | Currency-Description 57190 | | | | 0..1 57192 | LONG_Description 57194 |
| | | | | | | Value 57196 | | | | 1..N 57198 | |

FIG. 57-9

| Package | level1 | level2 | level3 | level4 | level5 | level6 | level7 | level8 | level9 | Cardinality | Datatype Name |
|---|---|---|---|---|---|---|---|---|---|---|---|
| | | | | | | | Time-Series-PeriodID 57200 | | | 1 57202 | TimeSeriesPeriodID 57204 |
| | | | | | | | Value 57206 | | | 0..1 57208 | FloatValue 57210 |
| | | | | | | | Fixing-Code 57212 | | | 0..1 57214 | FixingCode 57216 |
| | | | | | | | Fixing-Name 57218 | | | 0..1 57220 | MEDIUM_Name 57222 |
| | | | | | | | Fixing-Description 57224 | | | 0..1 57226 | LONG_Description 57228 |
| | | | | | | | | Property 57230 | | 0..N 57232 | |

FIG. 57-10

| Package | level1 | level2 | level3 | level4 | level5 | level6 | level7 | level8 | level9 | Cardinality | Datatype Name |
|---|---|---|---|---|---|---|---|---|---|---|---|
| | | | | | | | | | ID 57234 | 1 57236 | PropertyID 57238 |
| | | | | | | | | | Value 57240 | 1 57242 | PropertyValue 57244 |
| Time-Seri-esPe-riod 57246 | | | Time-Series-Period 57248 | | | | | | | 0..N 57250 | |
| | | | | ID 57252 | | | | | | 1 57254 | TimeSeriesPeri-odID 57256 |
| | | | | DatePe-riod 57258 | | | | | | 1 57260 | CLOSED_DateP eriod 57262 |
| Log 57264 | | Log 57266 | | | | | | | | 1 57268 | Log 57270 |

FIG. 58-1

| Package | level1 | level2 | level3 | level4 | level5 | level6 | level7 | Cardinality | Datatype Name |
|---|---|---|---|---|---|---|---|---|---|
| DemandPlanKeyFigureValueSimulateRequestMessage_sync 58000 | DemandPlanKeyFigureValueSimulateRequestMessage_sync 58002 | | | | | | | | DemandPlanKeyFigureValueSimulateRequestMessage_sync 58004 |
| DemandPlan 58006 | | Demand Plan 58008 | | | | | | 1 58010 | |
| | | | ID 58012 | | | | | 1 58014 | DemandPlanID 58016 |
| | | | DemandPlanningViewID 58018 | | | | | 0..1 58020 | DemandPlanningViewID 58022 |

FIG. 58-2

| Package | level1 | level2 | level3 | level4 | level5 | level6 | level7 | Cardinality | Datatype Name |
|---|---|---|---|---|---|---|---|---|---|
| De-mand-PlanSel ection 58024 | | | Selection 58026 | | | | | 1 58028 | |
| | | | | ID 58030 | | | | 0..1 58032 | Demand-PlanSelec-tionID 58034 |
| | | | | Demand-PlanVersion 58036 | | | | 0..1 58038 | |
| | | | | | Planning-VersionID 58040 | | | 1 58042 | PlanningVer-sionID 58044 |
| | | | | Characteris-ticValue 58046 | | | | 0..N 58048 | |
| | | | | | Demand-PlanCharac-teristicID 58050 | | | 1 58052 | Demand-PlanCharacter-isticID 58054 |

FIG. 58-3

| Package | level1 | level2 | level3 | level4 | level5 | level6 | level7 | Cardinality | Datatype Name |
|---|---|---|---|---|---|---|---|---|---|
| | | | | | Selection-ByDemand-PlanCharac-teristicValue 58056 | | | 1 58058 | |
| | | | | | | InclusionEx-clusionCode 58060 | | 0..1 58062 | InclusionEx-clusionCode 58064 |
| | | | | | | IntervalBound aryTypeCode 58066 | | 1 58068 | IntervalBound-aryTypeCode 58070 |
| | | | | | | LowerBound-aryDemand-PlanCharac-teristicValue 58072 | | 0..1 58074 | Demand-PlanCharacter-isticValue 58076 |

FIG. 58-4

| Package | level1 | level2 | level3 | level4 | level5 | level6 | level7 | Cardinality | Datatype Name |
|---|---|---|---|---|---|---|---|---|---|
| | | | | | | UpperBoundaryDemandPlanCharacteristicValue 58078 | | 0..1 58080 | DemandPlanCharacteristicValue 58082 |
| PlanningLevel 58084 | | | PlanningLevel 58086 | | | | | 1..N 58088 | |
| | | | | OrdinalNumberValue 58090 | | | | 1 58092 | OrdinalNumberValue 58094 |
| | | | | Characteristic 58096 | | | | 0..N 58098 | |
| | | | | | DemandPlanCharacteristicID 58100 | | | 1 58102 | DemandPlanCharacteristicID 58104 |

FIG. 58-5

| Package | level1 | level2 | level3 | level4 | level5 | level6 | level7 | Cardinality | Datatype Name |
|---|---|---|---|---|---|---|---|---|---|
| | | | | Characteris-ticValue-Combination 58106 | | | | 1..N 58108 | |
| | | | | | Demand-PlanCharac-teristicVal-ueCombina-tionID 58110 | | | 0..1 58112 | DemandPlan-ningCharacter-isticValue-CombinationID 58114 |
| | | | | | Characteris-ticValue 58116 | | | 0..N 58118 | |
| | | | | | | Demand-PlanCharac-teristicID 58120 | | 1 58122 | Demand-PlanCharacter-isticID 58124 |
| | | | | | | Demand-PlanCharac-teristicValue 58126 | | 1 58128 | Demand-PlanCharacter-isticValue 58130 |

FIG. 58-6

| Package | level1 | level2 | level3 | level4 | level5 | level6 | level7 | Cardinality | Datatype Name |
|---|---|---|---|---|---|---|---|---|---|
| | | | | | KeyFigure 58132 | | | 1..N 58134 | |
| | | | | | | Demand-PlanKeyFig-ureID 58136 | | 1 58138 | Demand-PlanKeyFig-ureID 58140 |
| | | | | | | Measure-UnitCode 58142 | | 0..1 58144 | MeasureUnit-Code 58146 |
| | | | | | | Currency-Code 58148 | | 0..1 58150 | CurrencyUnit-Code 58152 |
| | | | | | | Value 58154 | | 1..N 58156 | |
| | | | | | | | Time-Series-PeriodID 58158 | 1 58160 | TimeSeriesPe-riodID 58162 |
| | | | | | | | Value 58164 | 1 58166 | FloatValue 58168 |

FIG. 58-7

| Package | level1 | level2 | level3 | level4 | level5 | level6 | level7 | Cardinality | Datatype Name |
|---|---|---|---|---|---|---|---|---|---|
| Time-Series-Period 58170 | | | TimeSeri-esPeriod 58172 | | | | | 1..N 58174 | |
| | | | | ID 58176 | | | | 1 58178 | TimeSeriesPe-riodID 58180 |
| | | | | DatePeriod 58182 | | | | 1 58184 | CLOSED_Dat ePeriod 58186 |

FIG. 59-1

| Package | level1 | level2 | level3 | level4 | level5 | level6 | level7 | Cardinality | Datatype Name |
|---|---|---|---|---|---|---|---|---|---|
| Demand-PlanKeyFigureValue-UpdateRequestMessage_sync 59000 | DemandPlanKeyFigure-ValueUpdateRequest-Message_sync 59002 | | | | | | | | Demand-PlanKeyFigure-ValueUpdateRequest-Message_sync 59004 |
| Message-Header 59006 | | Message-Header 59008 | | | | | | 1 59010 | BusinessDocumentMessage-Header 59012 |
| | | | ID 59014 | | | | | 1 59016 | BusinessDocumentMessageID 59018 |
| | | | Creation-DateTime 59020 | | | | | 1 59022 | DateTime 59024 |

FIG. 59-2

| Package | level1 | level2 | level3 | level4 | level5 | level6 | level7 | Cardinality | Datatype Name |
|---|---|---|---|---|---|---|---|---|---|
| | | | … | | | | | 0..1 59026 | |
| Demand-Plan 59028 | | De-mand-Plan 59030 | | | | | | 1 59032 | |
| | | | ID 59034 | | | | | 1 59036 | DemandPlanID 59038 |
| | | | Demand-Planning-ViewID 59040 | | | | | 0..1 59042 | DemandPlan-ningViewID 59044 |
| Demand PlanSel ection 59046 | | | Selection 59048 | | | | | 1 59050 | |
| | | | | ID 59052 | | | | 0..1 59054 | Demand-PlanSelectionID 59056 |
| | | | | Demand-PlanVersion 59058 | | | | 0..1 59060 | |

FIG. 59-3

| Package | level1 | level2 | level3 | level4 | level5 | level6 | level7 | Cardinality | Datatype Name |
|---|---|---|---|---|---|---|---|---|---|
| | | | | | PlanningVer-sionID 59062 | | | 1 59064 | PlanningVer-sionID 59066 |
| | | | | Characteris-ticValue 59068 | | | | 0..N 59070 | |
| | | | | | Demand-PlanCharacter-isticID 59072 | | | 1 59074 | Demand-PlanCharacter-isticID 59076 |
| | | | | | SelectionBy-Demand-PlanCharacter-isticValue 59078 | | | 1 59080 | |
| | | | | | | InclusionEx-clusionCode 59082 | | 0..1 59084 | InclusionExclu-sionCode 59086 |

FIG. 59-4

| Package | level1 | level2 | level3 | level4 | level5 | level6 | level7 | Cardinality | Datatype Name |
|---|---|---|---|---|---|---|---|---|---|
| | | | | | | IntervalBoundaryTypeCode 59088 | | 1 59090 | IntervalBoundaryTypeCode 59092 |
| | | | | | | LowerBoundaryDemandPlanCharacteristicValue 59094 | | 0..1 59096 | DemandPlanCharacteristicValue 59098 |
| | | | | | | UpperBoundaryDemandPlanCharacteristicValue 59100 | | 0..1 59102 | DemandPlanCharacteristicValue 59104 |
| PlanningLevel 59106 | | | PlanningLevel 59108 | | | | | 1..N 59110 | |
| | | | | OrdinalNumberValue 59112 | | | | 1 59114 | OrdinalNumberValue 59116 |

FIG. 59-5

| Package | level1 | level2 | level3 | level4 | level5 | level6 | level7 | Cardinality | Datatype Name |
|---|---|---|---|---|---|---|---|---|---|
| | | | | Characteristic 59118 | | | | 0..N 59120 | |
| | | | | | Demand-PlanCharacter-isticID 59122 | | | 1 59124 | Demand-PlanCharacter-isticID 59126 |
| | | | | Characteris-ticValueCom-bination 59128 | | | | 1..N 59130 | |
| | | | | | Demand-PlanCharacter-isticValueCom-binationID 59132 | | | 0..1 59134 | DemandPlan-ningCharacter-isticValueCom-binationID 59136 |
| | | | | | Characteris-ticValue 59138 | | | 0..N 59140 | |

FIG. 59-6

| Package | level1 | level2 | level3 | level4 | level5 | level6 | level7 | Cardinality | Datatype Name |
|---|---|---|---|---|---|---|---|---|---|
| | | | | | | Demand-PlanCharac-teristicID 59142 | | 1 59144 | Demand-PlanCharacter-isticID 59146 |
| | | | | | | Demand-PlanCharac-teristicValue 59148 | | 1 59150 | Demand-PlanCharacter-isticValue 59152 |
| | | | | | KeyFigure 59154 | | | 1..N 59156 | |
| | | | | | | Demand-PlanKeyFig-ureID 59158 | | 1 59160 | Demand-PlanKeyFig-ureID 59162 |
| | | | | | | Measure-UnitCode 59164 | | 0..1 59166 | MeasureUnit-Code 59168 |
| | | | | | | Currency-Code 59170 | | 0..1 59172 | CurrencyUnit-Code 59174 |

FIG. 59-7

| Package | level1 | level2 | level3 | level4 | level5 | level6 | level7 | Cardinality | Datatype Name |
|---|---|---|---|---|---|---|---|---|---|
| | | | | | | Value 59176 | | 1..N 59178 | |
| | | | | | | | Time-Seri-esPe-riodID 59180 | 1 59182 | TimeSeriesPe-riodID 59184 |
| | | | | | | | Value 59186 | 1 59188 | FloatValue 59190 |
| Time-Series-Period 59192 | | | TimeSeri-esPeriod 59194 | | | | | 1..N 59196 | |
| | | | | ID 59198 | | | | 1 59200 | TimeSeriesPe-riodID 59202 |
| | | | | DatePeriod 59204 | | | | 1 59206 | CLOSED_Date Period 59208 |

FIG. 60-1

| Package | level1 | level2 | level3 | level4 | level5 | level6 | level7 | level8 | level9 | Cardinality | Datatype Name |
|---|---|---|---|---|---|---|---|---|---|---|---|
| DemandPlanKeyFigureValueUpdateResponseMessage_sync 60000 | DemandPlanKeyFigureValueUpdateResponseMessage_sync 60002 | | | | | | | | | | DemandPlanKeyFigureValueUpdateResponseMessage_sync 60004 |
| MessageHeader 60006 | | MessageHeader 60008 | | | | | | | | 1 60010 | BusinessDocumentMessageHeader 60012 |
| | | | ID 60014 | | | | | | | 1 60016 | BusinessDocumentMessageID 60018 |
| | | | CreationDateTime 60020 | | | | | | | 1 60022 | DateTime 60024 |

FIG. 60-2

| Package | level1 | level2 | level3 | level4 | level5 | level6 | level7 | level8 | level9 | Cardinality | Datatype Name |
|---|---|---|---|---|---|---|---|---|---|---|---|
| | | | … | | | | | | | 0..1 60026 | |
| Demand-Plan 60028 | | De-mand-Plan 60030 | | | | | | | | 0..1 60032 | |
| | | | ID 60034 | | | | | | | 1 60036 | DemandPlanID 60038 |
| | | | Demand-Planning-ViewID 60040 | | | | | | | 0..1 60042 | DemandPlan-ningViewID 60044 |
| De-mand-PlanSel ection 60046 | | | Selection 60048 | | | | | | | 1 60050 | |
| | | | | Demand Plan-Version 60052 | | | | | | 1 60054 | |

FIG. 60-3

| Package | level1 | level2 | level3 | level4 | level5 | level6 | level7 | level8 | level9 | Cardinality | Datatype Name |
|---|---|---|---|---|---|---|---|---|---|---|---|
| | | | | | PlanningVersionID 60056 | | | | | 1 60058 | PlanningVersionID 60060 |
| | | | | CharacteristicValue 60062 | | | | | | 0..N 60064 | |
| | | | | | DemandPlanCharacteristicID 60066 | | | | | 1 60068 | DemandPlanCharacteristicID 60070 |
| | | | | | SelectionByDemandPlanCharacteristicValue 60072 | | | | | 1 60074 | |

FIG. 60-4

| Package | level1 | level2 | level3 | level4 | level5 | level6 | level7 | level8 | level9 | Cardinality | Datatype Name |
|---|---|---|---|---|---|---|---|---|---|---|---|
| | | | | | | Inclu-sionEx-clusion-Code 60076 | | | | 0..1 60078 | InclusionExclu-sionCode 60080 |
| | | | | | | Inclu-sionEx-clusion-Name 60082 | | | | 0..1 60084 | MEDIUM_Name 60086 |
| | | | | | | Inclu-sionEx-clusion-Descrip-tion 60088 | | | | 0..1 60090 | LONG_Descripti on 60092 |
| | | | | | | Interval-Bound-aryType-Code 60094 | | | | 1 60096 | IntervalBound-aryTypeCode 60098 |

FIG. 60-5

| Package | level1 | level2 | level3 | level4 | level5 | level6 | level7 | level8 | level9 | Cardinality | Datatype Name |
|---|---|---|---|---|---|---|---|---|---|---|---|
| | | | | | | IntervalBoundaryType Name 60100 | | | | 1 60102 | MEDIUM_Name 60104 |
| | | | | | | IntervalBoundaryType Description 60106 | | | | 0..1 60108 | LONG_Description 60110 |
| | | | | | | LowerBoundaryDemandPlanCharacteristicValue 60112 | | | | 0..1 60114 | DemandPlanCharacteristicValue 60116 |

FIG. 60-6

| Package | level1 | level2 | level3 | level4 | level5 | level6 | level7 | level8 | level9 | Cardinality | Datatype Name |
|---|---|---|---|---|---|---|---|---|---|---|---|
| | | | | | | Upper-Bound-aryDe-mand-PlanCha racteris-ticValue 60118 | | | | 0..1 60120 | Demand-PlanCharacter-isticValue 60122 |
| Plan-ningLev el 60124 | | | Plan-ningLevel 60126 | | | | | | | 0..N 60128 | |
| | | | | Ordinal-Num-berValu e 60130 | | | | | | 1 60132 | OrdinalNum-berValue 60134 |
| | | | | Charac-teristic 60136 | | | | | | 0..N 60138 | |

FIG. 60-7

| Package | level1 | level2 | level3 | level4 | level5 | level6 | level7 | level8 | level9 | Cardinality | Datatype Name |
|---|---|---|---|---|---|---|---|---|---|---|---|
| | | | | | DemandPlanCharacteristicID 60140 | | | | | 1 60142 | Demand-PlanCharacteristicID 60144 |
| | | | | Characteristic-ValueCombination 60146 | | | | | | 1..N 60148 | |
| | | | | | DemandPlanCharacteristicValueCombinationID 60150 | | | | | 0..1 60152 | DemandPlanningCharacteristicValueCombinationID 60154 |

FIG. 60-8

| Package | level1 | level2 | level3 | level4 | level5 | level6 | level7 | level8 | level9 | Cardinality | Datatype Name |
|---|---|---|---|---|---|---|---|---|---|---|---|
| | | | | | Charac-teris-ticValue 60156 | | | | | 0..N 60158 | |
| | | | | | | Demand PlanCha racteris-ticID 60160 | | | | 1 60162 | Demand-PlanCharacter-isticID 60164 |
| | | | | | | Demand PlanCha racteris-ticValue 60166 | | | | 1 60168 | Demand-PlanCharacter-isticValue 60170 |
| | | | | | KeyFig-ure 60172 | | | | | 1..N 60174 | |

FIG. 60-9

| Package | level1 | level2 | level3 | level4 | level5 | level6 | level7 | level8 | level9 | Cardinality | Datatype Name |
|---|---|---|---|---|---|---|---|---|---|---|---|
| | | | | | | Demand PlanKey-FigureID 60176 | | | | 1 60178 | Demand-PlanKeyFig-ureID 60180 |
| | | | | | | Meas-ureUnit-Code 60182 | | | | 0..1 60184 | MeasureUnit-Code 60186 |
| | | | | | | Meas-ureUnit-Name 60188 | | | | 0..1 60190 | MEDIUM_Name 60192 |
| | | | | | | Meas-ureUnit-Descrip-tion 60194 | | | | 0..1 60196 | LONG_Description 60198 |
| | | | | | | Currency Code 60200 | | | | 0..1 60202 | CurrencyUnit-Code 60204 |

FIG. 60-10

| Package | level1 | level2 | level3 | level4 | level5 | level6 | level7 | level8 | level9 | Cardinality | Datatype Name |
|---|---|---|---|---|---|---|---|---|---|---|---|
| | | | | | | Currency Name 60206 | | | | 0..1 60208 | MEDIUM_Name 60210 |
| | | | | | | Currency Descrip-tion 60212 | | | | 0..1 60214 | LONG_Description 60216 |
| | | | | | | Value 60218 | | | | 1..N 60220 | |
| | | | | | | | Time-Series-PeriodID 60222 | | | 1 60224 | TimeSeriesPe-riodID 60226 |
| | | | | | | | Value 60228 | | | 0..1 60230 | FloatValue 60232 |
| | | | | | | | Fixing-Code 60234 | | | 0..1 60236 | FixingCode 60238 |

FIG. 60-11

| Package | level1 | level2 | level3 | level4 | level5 | level6 | level7 | level8 | level9 | Cardinality | Datatype Name |
|---|---|---|---|---|---|---|---|---|---|---|---|
| | | | | | | | Fixing-Name 60240 | | | 0..1 60242 | MEDIUM_Name 60244 |
| | | | | | | | Fixing-Descrip-tion 60246 | | | 0..1 60248 | LONG_Description 60250 |
| | | | | | | | | Prop-erty 60252 | | 0..N 60254 | |
| | | | | | | | | | ID 60256 | 1 60258 | PropertyID 60260 |
| | | | | | | | | | Value 60262 | 1 60264 | PropertyValue 60266 |
| Time-Series-Period 60268 | | | TimeSeri-esPeriod 60270 | | | | | | | 0..N 60272 | |
| | | | | ID 60274 | | | | | | 1 60276 | TimeSeriesPe-riodID 60278 |

FIG. 60-12

| Package | level1 | level2 | level3 | level4 | level5 | level6 | level7 | level8 | level9 | Cardinality | Datatype Name |
|---|---|---|---|---|---|---|---|---|---|---|---|
| | | | | DatePe-riod 60280 | | | | | | 1 60282 | CLOSED_Date Period 60284 |
| Log 60286 | | Log 60288 | | | | | | | | 1 60290 | Log 60292 |

FIG. 61

| Package | level1 | level2 | level3 | Cardinality | Datatype Name |
|---|---|---|---|---|---|
| DemandPlanSelectionByIDandSelectionIDQueryMessage_sync 61000 | DemandPlanSelectionByIDandSelectionIDQueryMessage_sync 61002 | | | | DemandPlanSelectionByIDandSelectionIDQueryMessage_sync 61004 |
| Selection 61006 | | DemandPlanSelectionSelectionByIDandSelectionID 61008 | | 1 61010 | |
| | | | DemandPlanID 61012 | 1 61014 | DemandPlanID 61016 |
| | | | DemandPlanSelectionID 61018 | 1 61020 | DemandPlanSelectionID 61022 |

FIG. 62-1

| Package | level1 | level2 | level3 | level4 | level5 | level6 | Cardinality | Datatype Name |
|---|---|---|---|---|---|---|---|---|
| DemandPlanSelectionByIDandSelectionIDResponseMessage_sync 62000 | DemandPlanSelectionByIDandSelectionIDResponseMessage_sync 62002 | | | | | | | DemandPlanSelectionByIDandSelectionIDResponseMessage_sync 62004 |
| DemandPlan 62006 | | Demand Plan 62008 | | | | | 0..1 62010 | |
| | | | ID 62012 | | | | 1 62014 | DemandPlanID 62016 |
| DemandPlanSelection 62018 | | | Selection 62020 | | | | 1 62022 | |
| | | | | ID 62024 | | | 1 62026 | DemandPlanSelectionID 62028 |

FIG. 62-2

| Package | level1 | level2 | level3 | level4 | level5 | level6 | Cardinality | Datatype Name |
|---|---|---|---|---|---|---|---|---|
| | | | | SystemAdmin-istrativeData 62030 | | | 1 62032 | SystemAdminis-trativeData 62034 |
| | | | | DemandPlan-Version 62036 | | | 1 62038 | |
| | | | | | Planning-VersionID 62040 | | 1 62042 | PlanningVer-sionID 62044 |
| | | | | Characteris-ticValue 62046 | | | 0..N 62048 | |
| | | | | | Demand-PlanCharac-teristicID 62050 | | 1 62052 | Demand-PlanCharacteris-ticID 62054 |

FIG. 62-3

| Package | level1 | level2 | level3 | level4 | level5 | level6 | Cardinality | Datatype Name |
|---|---|---|---|---|---|---|---|---|
| | | | | | Selection-ByDemand-PlanCharac-teristicValue 62056 | | 1..N 62058 | |
| | | | | | | InclusionExclu-sionCode 62060 | 0..1 62062 | InclusionExclu-sionCode 62064 |
| | | | | | | InclusionExclu-sionName 62066 | 0..1 62068 | MEDIUM_Name 62070 |
| | | | | | | InclusionExclu-sionDescription 62072 | 0..1 62074 | LONG_Description 62076 |
| | | | | | | IntervalBound-aryTypeCode 62078 | 1 62080 | IntervalBound-aryTypeCode 62082 |
| | | | | | | IntervalBound-aryTypeName 62084 | 1 62086 | MEDIUM_Name 62088 |

FIG. 62-4

| Package | level1 | level2 | level3 | level4 | level5 | level6 | Cardinality | Datatype Name |
|---|---|---|---|---|---|---|---|---|
| | | | | | | IntervalBoundaryTypeDescription 62090 | 0..1 62092 | LONG_Description 62094 |
| | | | | | | LowerBoundary-DemandPlanCharacteristicValue 62096 | 0..1 62098 | DemandPlanCharacteristicValue 62100 |
| | | | | | | UpperBoundary-DemandPlanCharacteristicValue 62102 | 0..1 62104 | DemandPlanCharacteristicValue 62106 |
| | | | | GroupingCharacteristic 62108 | | | 0..N 62110 | |
| | | | | | DemandPlanCharacteristicID 62112 | | 1 62114 | DemandPlanCharacteristicID 62116 |

FIG. 62-5

| Package | level1 | level2 | level3 | level4 | level5 | level6 | Cardinality | Datatype Name |
|---|---|---|---|---|---|---|---|---|
| Log 62118 | | Log 62120 | | | | | 1 62122 | Log 62124 |

FIG. 63

| Package | level1 | level2 | level3 | level4 | Cardinality | Datatype Name |
|---|---|---|---|---|---|---|
| DemandPlanSelection-CancelConfirmation-Message_sync 63000 | DemandPlanSelection-CancelConfirmation-Message_sync 63002 | | | | | DemandPlanSelection-CancelConfirmation-Message_sync 63004 |
| DemandPlan 63006 | | DemandPlan 63008 | | | 0..1 63010 | |
| | | | ID 63012 | | 1 63014 | DemandPlanID 63016 |
| DemandPlanSelec-tion 63018 | | | Selection 63020 | | 1 63022 | |
| | | | | ID 63024 | 1 63026 | DemandPlanSelectionID 63028 |
| Log 63030 | | Log 63032 | | | 1 63034 | Log 63036 |

FIG. 64

| Package | level1 | level2 | level3 | level4 | Cardinality | Datatype Name |
|---|---|---|---|---|---|---|
| DemandPlanSelection-CancelRequestMes-sage_sync 64000 | DemandPlanSelection-CancelRequestMes-sage_sync 64002 | | | | | DemandPlanSelection-CancelRequestMes-sage_sync 64004 |
| DemandPlan 64006 | | DemandPlan 64008 | | | 1 64010 | |
| | | | ID 64012 | | 1 64014 | DemandPlanID 64016 |
| DemandPlanSelection 64018 | | | Selection 64020 | | 1 64022 | |
| | | | | ID 64024 | 1 64026 | DemandPlanSelectionID 64028 |

FIG. 65

| Package | level1 | level2 | level3 | level4 | Cardinality | Datatype Name |
|---|---|---|---|---|---|---|
| DemandPlanSelection-ChangeConfirmation-Message_sync 65000 | DemandPlanSelection-ChangeConfirmation-Message_sync 65002 | | | | | DemandPlanSelection-ChangeConfirmation-Message_sync 65004 |
| DemandPlan 65006 | | DemandPlan 65008 | | | 0..1 65010 | |
| | | | ID 65012 | | 1 65014 | DemandPlanID 65016 |
| DemandPlanSelec-tion 65018 | | | Selection 65020 | | 1 65022 | |
| | | | | ID 65024 | 1 65026 | DemandPlanSelectionID 65028 |
| | | | | SystemAdmin-istrativeData 65030 | 1 65032 | SystemAdministrative-Data 65034 |
| Log 65036 | | Log 65038 | | | 1 65040 | Log 65042 |

FIG. 66-1

| Package | level1 | level2 | level3 | level4 | level5 | level6 | Cardinality | Datatype Name |
|---|---|---|---|---|---|---|---|---|
| Demand-PlanSele-ction-ChangeRe-questMes-sage_sync 66000 | Demand-PlanSele-ction-ChangeRe questMes-sage_sync 66002 | | | | | | | DemandPlanSele ctionChangeRe-questMes-sage_sync 66004 |
| Demand-Plan 66006 | | DemandPlan 66008 | | | | | 1 66010 | |
| | | | ID 66012 | | | | 1 66014 | DemandPlanID 66016 |
| Demand PlanSel ection 66018 | | | Selection 66020 | | | | 1 66022 | |
| | | | | ID 66024 | | | 1 66026 | Demand-PlanSelectionID 66028 |
| | | | | DemandPlan-Version 66030 | | | 1 66032 | |

FIG. 66-2

| Package | level1 | level2 | level3 | level4 | level5 | level6 | Cardinality | Datatype Name |
|---|---|---|---|---|---|---|---|---|
| | | | | | PlanningVer-sionID 66034 | | 1 66036 | PlanningVer-sionID 66038 |
| | | | | Characteris-ticValue 66040 | | | 0..N 66042 | |
| | | | | | Demand-PlanCharacteris-ticID 66044 | | 1 66046 | Demand-PlanCharacteris-ticID 66048 |
| | | | | | SelectionByDe-mandPlanChar-acteristicValue 66050 | | 1..N 66052 | |
| | | | | | | InclusionEx-clusionCode 66054 | 0..1 66056 | InclusionExclu-sionCode 66058 |

FIG. 66-3

| Package | level1 | level2 | level3 | level4 | level5 | level6 | Cardinality | Datatype Name |
|---|---|---|---|---|---|---|---|---|
| | | | | | | IntervalBoundaryTypeCode 66060 | 1 66062 | IntervalBoundaryTypeCode 66064 |
| | | | | | | LowerBoundaryDemandPlanCharacteristicValue 66066 | 0..1 66068 | DemandPlanCharacteristicValue 66070 |
| | | | | | | UpperBoundaryDemandPlanCharacteristicValue 66072 | 0..1 66074 | DemandPlanCharacteristicValue 66076 |
| | | | | GroupingCharacteristic 66078 | | | 0..N 66080 | |

FIG. 66-4

| Package | level1 | level2 | level3 | level4 | level5 | level6 | Cardinality | Datatype Name |
|---|---|---|---|---|---|---|---|---|
| | | | | | Demand-PlanCharacteris-ticID 66082 | | 1 66084 | Demand-PlanCharacteris-ticID 66086 |

FIG. 67

| Package | level1 | level2 | level3 | level4 | Cardinality | Datatype Name |
|---|---|---|---|---|---|---|
| DemandPlanSelectionCreateConfirmationMessage_sync 67000 | DemandPlanSelectionCreateConfirmationMessage_sync 67002 | | | | | DemandPlanSelectionCreateConfirmationMessage_sync 67004 |
| DemandPlan 67006 | | DemandPlan 67008 | | | 0..1 67010 | |
| | | | ID 67012 | | 1 67014 | DemandPlanID 67016 |
| Demand-PlanSelection 67018 | | | Selection 67020 | | 1 67022 | |
| | | | | ID 67024 | 1 67026 | DemandPlanSelectionID 67028 |
| | | | | SystemAdministrativeData 67030 | 1 67032 | SystemAdministrativeData 67034 |
| Log 67036 | | Log 67038 | | | 1 67040 | Log 67042 |

FIG. 68-1

| Package | level1 | level2 | level3 | level4 | level5 | level6 | Cardinality | Datatype Name |
|---|---|---|---|---|---|---|---|---|
| DemandPlanSelectionCreateRequestMessage_sync 68000 | DemandPlanSelectionCreateRequestMessage_sync 68002 | | | | | | | DemandPlanSelectionCreateRequestMessage_sync 68004 |
| DemandPlan 68006 | | DemandPlan 68008 | | | | | 1 68010 | |
| | | | ID 68012 | | | | 1 68014 | DemandPlanID 68016 |
| DemandPlanSelection 68018 | | | Selection 68020 | | | | 1 68022 | |
| | | | | ID 68024 | | | 1 68026 | DemandPlanSelectionID 68028 |
| | | | | DemandPlanVersion 68030 | | | 1 68032 | |

FIG. 68-2

| Package | level1 | level2 | level3 | level4 | level5 | level6 | Cardinality | Datatype Name |
|---|---|---|---|---|---|---|---|---|
| | | | | | Planning-VersionID 68034 | | 1 68036 | PlanningVer-sionID 68038 |
| | | | | Characteris-ticValue 68040 | | | 0..N 68042 | |
| | | | | | Demand-PlanCharac-teristicID 68044 | | 1 68046 | Demand-PlanCharacteris-ticID 68048 |
| | | | | | Selection-ByDemand-PlanCharac-teristicValue 68050 | | 1..N 68052 | |
| | | | | | | InclusionExclu-sionCode 68054 | 0..1 68056 | InclusionExclu-sionCode 68058 |
| | | | | | | IntervalBound-aryTypeCode 68060 | 1 68062 | IntervalBound-aryTypeCode 68064 |

FIG. 68-3

| Package | level1 | level2 | level3 | level4 | level5 | level6 | Cardinality | Datatype Name |
|---|---|---|---|---|---|---|---|---|
| | | | | | | LowerBoundaryDemandPlanCharacteristicValue 68066 | 0..1 68068 | DemandPlanCharacteristicValue 68070 |
| | | | | | | UpperBoundaryDemandPlanCharacteristicValue 68072 | 0..1 68074 | DemandPlanCharacteristicValue 68076 |
| | | | | GroupingCharacteristic 68078 | | | 0..N 68080 | |
| | | | | | DemandPlanCharacteristicID 68082 | | 1 68084 | DemandPlanCharacteristicID 68086 |

FIG. 69

| Package | level1 | level2 | level3 | Cardinality | Datatype Name |
|---|---|---|---|---|---|
| DemandPlanSelection-SimpleByIDQueryMes-sage_sync 69000 | DemandPlanSelection-SimpleByIDQueryMes-sage_sync 69002 | | | | DemandPlanSelection-SimpleByIDQueryMes-sage_sync 69004 |
| Selection 69006 | | DemandPlanSelection-SimpleSelectionByID 69008 | | 1 69010 | |
| | | | DemandPlanID 69012 | 1 69014 | DemandPlanID 69016 |

FIG. 70

| Package | level1 | level2 | level3 | level4 | Cardinality | Datatype Name |
|---|---|---|---|---|---|---|
| DemandPlanSelection-SimpleByIDResponse-Message_sync 70000 | DemandPlanSelection-SimpleByIDResponse-Message_sync 70002 | | | | | DemandPlanSelection-SimpleByIDResponse-Message_sync 70004 |
| DemandPlan 70006 | | DemandPlan 70008 | | | 0..1 70010 | |
| | | | ID 70012 | | 1 70014 | DemandPlanID 70016 |
| DemandPlanSelec-tion 70018 | | | Selection 70020 | | 0..N 70022 | |
| | | | | ID 70024 | 1 70026 | DemandPlanSelec-tionID 70028 |
| Log 70030 | | Log 70032 | | | 1 70034 | Log 70036 |

FIG. 71

| Package | level1 | level2 | level3 | Cardinality | Datatype Name |
|---|---|---|---|---|---|
| DemandPlanSimple-ByDemandPlan-ningScenarioIDQuery-Message_sync 71000 | DemandPlanSimple-ByDemandPlan-ningScenarioIDQue-ryMessage_sync 71002 | | | | DemandPlanSimple-ByDemandPlan-ningScenarioIDQue-ryMessage_sync 71004 |
| Selection 71006 | | DemandPlanSimple-SelectionByDemand-PlanningScenarioID 71008 | | 1 71010 | |
| | | | DemandPlan-ningScenarioID 71012 | 1 71014 | DemandPlan-ningScenarioID 71016 |

FIG. 72

| Package | level1 | level2 | level3 | Cardinality | Datatype Name |
|---|---|---|---|---|---|
| DemandPlanSimpleByDemand-PlanningScenarioIDResponse-Message_sync 72000 | DemandPlanSimpleByDemand-PlanningScenarioIDResponse-Message_sync 72002 | | | | DemandPlanSimpleByDemand-PlanningScenarioIDResponse-Message_sync 72004 |
| DemandPlan 72006 | | DemandPlan 72008 | | 0..1 72010 | |
| | | | ID 72012 | 1 72014 | DemandPlanID 72016 |
| Log 72018 | | Log 72020 | | 1 72022 | Log 72024 |

FIG. 73

| Package | level1 | level2 | level3 | Cardinality | Datatype Name |
|---|---|---|---|---|---|
| DemandPlanVersion-ByIDandVersionPlan-ningVersionIDQuery-Message_sync 73000 | DemandPlanVersion-ByIDandVersionPlan-ningVersionIDQuery-Message_sync 73002 | | | | DemandPlanVersion-ByIDandVersionPlan-ningVersionIDQuery-Message_sync 73004 |
| Selection 73006 | | DemandPlanVersion-SelectionByIDandVer-sionPlanningVersionID 73008 | | 1 73010 | |
| | | | DemandPlanID 73012 | 1 73014 | DemandPlanID 73016 |
| | | | DemandPlan-VersionPlan-ningVersionID 73018 | 1 73020 | PlanningVersionID 73022 |

FIG. 74-1

| Package | level1 | level2 | level3 | level4 | Cardinality | Datatype Name |
|---|---|---|---|---|---|---|
| DemandPlanVersion-ByIDandVersionPlan-ningVersionIDRespon-seMessage_sync 74000 | DemandPlanVersion-ByIDandVersionPlan-ningVersionIDRespon-seMessage_sync 74002 | | | | | DemandPlanVersionBy-IDandVersionPlanning-VersionIDResponse-Message_sync 74004 |
| DemandPlan 74006 | | DemandPlan 74008 | | | 0..1 74010 | |
| | | | ID 74012 | | 1 74014 | DemandPlanID 74016 |
| Version 74018 | | | Version 74020 | | 1 74022 | |
| | | | | PlanningVersionID 74024 | 1 74026 | PlanningVersionID 74028 |
| | | | | ValidityDatePeriod 74030 | 1 74032 | CLOSED_DatePeriod 74034 |

FIG. 74-2

| Package | level1 | level2 | level3 | level4 | Cardinality | Datatype Name |
|---|---|---|---|---|---|---|
| | | | | SystemAdministrativeData 74036 | 1 74038 | SystemAdministrativeData 74040 |
| | | | | Description 74042 | 0..1 74044 | LEN40_Description 74046 |
| Log 74048 | | Log 74050 | | | 1 74052 | Log 74054 |

FIG. 75

| Package | level1 | level2 | level3 | level4 | Cardinality | Datatype Name |
|---|---|---|---|---|---|---|
| DemandPlanVersion-CancelConfirmation-Message_sync 75000 | DemandPlanVersion-CancelConfirmation-Message_sync 75002 | | | | | DemandPlanVersion-CancelConfirmation-Message_sync 75004 |
| DemandPlan 75006 | | DemandPlan 75008 | | | 0..1 75010 | |
| | | | ID 75012 | | 1 75014 | DemandPlanID 75016 |
| Version 75018 | | | Version 75020 | | 1 75022 | |
| | | | | Planning-VersionID 75024 | 1 75026 | PlanningVersionID 75028 |
| Log 75030 | | Log 75032 | | | 1 75034 | Log 75036 |

FIG. 76

| Package | level1 | level2 | level3 | level4 | Cardinality | Datatype Name |
|---|---|---|---|---|---|---|
| DemandPlanVersion-CancelRequestMes-sage_sync 76000 | DemandPlanVersion-CancelRequestMes-sage_sync 76002 | | | | | DemandPlanVersion-CancelRequestMes-sage_sync 76004 |
| DemandPlan 76006 | | DemandPlan 76008 | | | 1 76010 | |
| | | | ID 76012 | | 1 76014 | DemandPlanID 76016 |
| Version 76018 | | | Version 76020 | | 1 76022 | |
| | | | | Planning-VersionID 76024 | 1 76026 | PlanningVersionID 76028 |

FIG. 77-1

| Package | level1 | level2 | level3 | level4 | Cardinality | Datatype Name |
|---|---|---|---|---|---|---|
| DemandPlanVersion-ChangeConfirmation-Message_sync 77000 | DemandPlanVersion-ChangeConfirmation-Message_sync 77002 | | | | | DemandPlanVersion-ChangeConfirmation-Message_sync 77004 |
| DemandPlan 77006 | | DemandPlan 77008 | | | 0..1 77010 | |
| | | | ID 77012 | | 1 77014 | DemandPlanID 77016 |
| Version 77018 | | | Version 77020 | | 1 77022 | |
| | | | | PlanningVersionID 77024 | 1 77026 | PlanningVersionID 77028 |
| | | | | ValidityDatePeriod 77030 | 1 77032 | CLOSED_DatePeriod 77034 |
| | | | | SystemAdministrative-Data 77036 | 1 77038 | SystemAdministrative-Data 77040 |

| Package | level1 | level2 | level3 | level4 | Cardinality | Datatype Name |
|---|---|---|---|---|---|---|
| Log 77042 | | Log 77044 | | | 1 77046 | Log 77048 |

| Package | level1 | level2 | level3 | level4 | Cardinality | Datatype Name |
|---|---|---|---|---|---|---|
| DemandPlanVersion-ChangeRequestMes-sage_sync 78000 | DemandPlanVersion-ChangeRequestMes-sage_sync 78002 | | | | | DemandPlanVersion-ChangeRequestMes-sage_sync 78004 |
| DemandPlan 78006 | | DemandPlan 78008 | | | 1 78010 | |
| | | | ID 78012 | | 1 78014 | DemandPlanID 78016 |
| Version 78018 | | | Version 78020 | | 1 78022 | |
| | | | | Planning-VersionID 78024 | 1 78026 | PlanningVersionID 78028 |
| | | | | Validity-DatePeriod 78030 | 1 78032 | CLOSED_DatePeriod 78034 |

FIG. 79

| Package | level1 | level2 | level3 | level4 | Cardinality | Datatype Name |
|---|---|---|---|---|---|---|
| DemandPlanVersion-CompleteConfirmation-Message_sync 79000 | DemandPlanVersion-CompleteConfirmation-Message_sync 79002 | | | | | DemandPlanVersion-CompleteConfirmation-Message_sync 79004 |
| DemandPlan 79006 | | DemandPlan 79008 | | | 0..1 79010 | |
| | | | ID 79012 | | 1 79014 | DemandPlanID 79016 |
| Version 79018 | | | Version 79020 | | 1 79022 | |
| | | | | Planning-VersionID 79024 | 1 79026 | PlanningVersionID 79028 |
| Log 79030 | | Log 79032 | | | 1 79034 | Log 79036 |

FIG. 80

| Package | level1 | level2 | level3 | level4 | Cardinality | Datatype Name |
|---|---|---|---|---|---|---|
| DemandPlanVersion-CompleteRequest-Message_sync 80000 | DemandPlanVersion-CompleteRequest-Message_sync 80002 | | | | | DemandPlanVersion-CompleteRequest-Message_sync 80004 |
| DemandPlan 80006 | | DemandPlan 80008 | | | 1 80010 | |
| | | | ID 80012 | | 1 80014 | DemandPlanID 80016 |
| Version 80018 | | | Version 80020 | | 1 80022 | |
| | | | | Planning-VersionID 80024 | 1 80026 | PlanningVersionID 80028 |

FIG. 81-1

| Package | level1 | level2 | level3 | level4 | Cardinality | Datatype Name |
|---|---|---|---|---|---|---|
| DemandPlanVersion-CreateConfirmation-Message_sync 81000 | DemandPlanVersion-CreateConfirmation-Message_sync 81002 | | | | | DemandPlanVersion-CreateConfirmation-Message_sync 81004 |
| DemandPlan 81006 | | DemandPlan 81008 | | | 0..1 81010 | |
| | | | ID 81012 | | 1 81014 | DemandPlanID 81016 |
| Version 81018 | | | Version 81020 | | 1 81022 | |
| | | | | PlanningVersionID 81024 | 1 81026 | PlanningVersionID 81028 |
| | | | | ValidityDatePeriod 81030 | 1 81032 | CLOSED_DatePeriod 81034 |
| | | | | SystemAdministrativeData 81036 | 1 81038 | SystemAdministrativeData 81040 |

FIG. 81-2

| Package | level1 | level2 | level3 | level4 | Cardinality | Datatype Name |
|---|---|---|---|---|---|---|
| Log 81042 | | Log 81044 | | | 1 81046 | Log 81048 |

FIG. 82

| Package | level1 | level2 | level3 | level4 | Cardinality | Datatype Name |
|---|---|---|---|---|---|---|
| DemandPlanVersion-CreateRequestMes-sage_sync 82000 | DemandPlanVersion-CreateRequestMes-sage_sync 82002 | | | | | DemandPlanVersion-CreateRequestMes-sage_sync 82004 |
| DemandPlan 82006 | | DemandPlan 82008 | | | 1 82010 | |
| | | | ID 82012 | | 1 82014 | DemandPlanID 82016 |
| Version 82018 | | | Version 82020 | | 1 82022 | |
| | | | | PlanningVersionID 82024 | 1 82026 | PlanningVersionID 82028 |
| | | | | ValidityDatePeriod 82030 | 1 82032 | CLOSED_DatePeriod 82034 |

FIG. 83

| Package | level1 | level2 | level3 | Cardinality | Datatype Name |
|---|---|---|---|---|---|
| DemandPlanVersion-SimpleByIDQuery-Message_sync 83000 | DemandPlanVersion-SimpleByIDQuery-Message_sync 83002 | | | | DemandPlanVersion-SimpleByIDQuery-Message_sync 83004 |
| Selection 83006 | | DemandPlanVersion-SimpleSelectionByID 83008 | | 1 83010 | |
| | | | DemandPlanID 83012 | 1 83014 | DemandPlanID 83016 |

FIG. 84

| Package | level1 | level2 | level3 | level4 | Cardinality | Datatype Name |
|---|---|---|---|---|---|---|
| DemandPlanVersion-SimpleByIDResponse-Message_sync 84000 | DemandPlanVersion-SimpleByIDResponse-Message_sync 84002 | | | | | DemandPlanVersion-SimpleByIDResponse-Message_sync 84004 |
| DemandPlan 84006 | | DemandPlan 84008 | | | 0..1 84010 | |
| | | | ID 84012 | | 1 84014 | DemandPlanID 84016 |
| Version 84018 | | | Version 84020 | | 0..N 84022 | |
| | | | | PlanningVersionID 84024 | 1 84026 | PlanningVersionID 84028 |
| | | | | Description 84030 | 0..1 84032 | LEN40_Description 84034 |
| Log 84036 | | Log 84038 | | | 1 84040 | Log 84042 |

FIG. 98-1

| Package | level1 | level2 | level3 | level4 | level5 | Cardinality | Datatype Name |
|---|---|---|---|---|---|---|---|
| DemandPlanningCharacteristicValue-Combination-ByCharacter-isticVal-ueQueryMes-sage_sync 98000 | DemandPlanningCharacteristicValue-Combina-tionByChar-acteristicVal-ueQueryMes-sage_sync 98002 | | | | | | DemandPlanningCharacteris-ticValueCombi-nationByChar-acteristicVal-ueQueryMes-sage_sync 98004 |
| Selection 98006 | | DemandPlanning Characteris-ticValueCombi-nationSelection-ByCharacteris-ticValue 98008 | | | | 1 98010 | |
| | | | DemandPlan-ningScenarioID 98012 | | | 1 98014 | DemandPlan-ningScenarioID 98016 |
| | | | Characteris-ticValue 98018 | | | 1..n 98020 | |

FIG. 98-2

| Package | level1 | level2 | level3 | level4 | level5 | Cardinality | Datatype Name |
|---|---|---|---|---|---|---|---|
| | | | | Demand-PlanCharacteristicID 98022 | | 1 98024 | Demand-PlanCharacteristicID 98026 |
| | | | | SelectionByDemandPlanCharacteristicValue 98028 | | 1 98030 | |
| | | | | | InclusionExclusionCode 98032 | 0..1 98034 | InclusionExclusionCode 98036 |
| | | | | | IntervalBoundaryTypeCode 98038 | 1 98040 | IntervalBoundaryTypeCode 98042 |
| | | | | | LowerBoundaryDemand-PlanCharacteristicValue 98044 | 0..1 98046 | Demand-PlanCharacteristicValue 98048 |

FIG. 98-3

| Package | level1 | level2 | level3 | level4 | level5 | Cardinality | Datatype Name |
|---|---|---|---|---|---|---|---|
| | | | | | UpperBoundaryDemandPlanCharacteristicValue 98050 | 0..1 98052 | DemandPlanCharacteristicValue 98054 |
| | | | MaximumNumberValue 98056 | | | 0..1 98058 | NumberValue 98060 |
| GroupingCharacteristic 98062 | | | GroupingCharacteristic 98064 | | | 0..n 98066 | |
| | | | | DemandPlanCharacteristicID 98068 | | 1 98070 | DemandPlanCharacteristicID 98072 |

FIG. 99-1

| Package | level1 | level2 | level3 | level4 | level5 | Cardinality | Datatype Name |
|---|---|---|---|---|---|---|---|
| DemandPlanningCharacteristicValue-Combination-ByCharacteristicValueResponseMessage_sync 99000 | DemandPlanningCharacteristicValue-Combina-tionByCharacteristicValueResponseMessage_sync 99002 | | | | | | DemandPlanningCharacteristicValueCombinationByCharacteristicValueResponseMessage_sync 99004 |
| Demand-Planning-Characteristic Value-Combination 99006 | | Demand-Planning-Characteristic Value-Combination 99008 | | | | 0..n 99010 | … |
| | | | ID 99012 | | | 0..1 99014 | DemandPlanning-CharacteristicValueCombinationID 99016 |
| | | | DemandPlanningScenarioID 99018 | | | 1 99020 | DemandPlanningScenarioID 99022 |

FIG. 99-2

| Package | level1 | level2 | level3 | level4 | level5 | Cardinality | Datatype Name |
|---|---|---|---|---|---|---|---|
| | | | Characteris-ticValue 99024 | | | 0..n 99026 | |
| | | | | DemandPlanChar-acteristicID 99028 | | 1 99030 | DemandPlanChar-acteristicID 99032 |
| | | | | DemandPlanChar-acteristicValue 99034 | | 1 99036 | DemandPlanChar-acteristicValue 99038 |
| | | | | Description 99040 | | 0..1 99042 | |
| | | | | | Description 99044 | 0..1 99046 | LEN60_Description 99048 |
| | | | | | ShortDescription 99050 | 0..1 99052 | LEN20_Description 99054 |
| | | | | | MediumDescrip-tion 99056 | 0..1 99058 | LEN40_Description 99060 |

FIG. 99-3

| Package | level1 | level2 | level3 | level4 | level5 | Cardinality | Datatype Name |
|---|---|---|---|---|---|---|---|
| | | | | | LongDescription 99062 | 0..1 99064 | LEN60_Description 99066 |
| Log 99068 | | Log 99070 | | | | 1 99072 | Log 99074 |

FIG. 100

| Package | level1 | level2 | level3 | Cardinality | Datatype Name |
|---|---|---|---|---|---|
| DemandPlanningCharacteristicValueCombinationCancelConfirmationMessage_sync 100000 | DemandPlanningCharacteristicValueCombinationCancelConfirmationMessage_sync 100002 | | | | DemandPlannigCharacteristicValueCombinationCancel-ConfirmationMessage_sync 100004 |
| MessageHeader 100006 | | MessageHeader 100008 | | 0..1 100010 | BasicBusinessDocument-MessageHeader 100012 |
| | | | ID 100014 | 1 100016 | BusinessDocumentMessageID 100018 |
| | | | … | 0..1 100020 | … |
| Log 100022 | | Log 100024 | | 1 100026 | Log 100028 |

FIG. 101-1

| Package | level1 | level2 | level3 | level4 | Cardinality | Datatype Name |
|---|---|---|---|---|---|---|
| DemandPlanningCharacteristicValueCombinationCancelRequestMessage_sync 101000 | DemandPlanningCharacteristicValueCombinationCancelRequestMessage_sync 101002 | | | | | DemandPlannigCharacteristicValueCombinationCancelRequestMessage_sync 101004 |
| MessageHeader 101006 | | MessageHeader 101008 | | | 0..1 101010 | BasicBusinessDocumentMessageHeader 101012 |
| | | | ID 101014 | | 1 101016 | BusinessDocumentMessageID 101018 |
| | | | ... | | 0..1 101020 | ... |
| DemandPlanningCharacteristicValueCombination 101022 | | DemandPlanningCharacteristicValueCombination 101024 | | | 1 101026 | ... |

FIG. 101-2

| Package | level1 | level2 | level3 | level4 | Cardinality | Datatype Name |
|---|---|---|---|---|---|---|
| | | | ID 101028 | | 0..1 101030 | DemandPlanningCharacteristicValueCombinationID 101032 |
| | | | DemandPlanningScenarioID 101034 | | 1 101036 | DemandPlanningScenarioID 101038 |
| | | | CharacteristicValue 101040 | | 0..n 101042 | |
| | | | | DemandPlanCharacteristicID 101044 | 1 101046 | DemandPlanCharacteristicID 101048 |
| | | | | DemandPlanCharacteristicValue 101050 | 1 101052 | DemandPlanCharacteristicValue 101054 |

FIG. 102

| Package | level1 | level2 | level3 | Cardinality | Datatype Name |
|---|---|---|---|---|---|
| DemandPlanningCharacteristicValueCombinationCreateConfirmationMessage_sync 102000 | DemandPlanningCharacteristicValueCombinationCreateConfirmationMessage_sync 102002 | | | | DemandPlannigCharacteristicValueCombinationCreateConfirmationMessage_sync 102004 |
| MessageHeader 102006 | | MessageHeader 102008 | | 0..1 102010 | BasicBusinessDocumentMessageHeader 102012 |
| | | | ID 102014 | 1 102016 | BusinessDocumentMessageID 102018 |
| | | | … | 0..1 102020 | … |
| Log 102022 | | Log 102024 | | 1 102026 | Log 102028 |

FIG. 103-1

| Package | level1 | level2 | level3 | level4 | Cardinality | Datatype Name |
|---|---|---|---|---|---|---|
| DemandPlanningCharacteristicValueCombinationCreateRequestMessage_sync 103000 | DemandPlanningCharacteristicValueCombinationCreateRequestMessage_sync 103002 | | | | | DemandPlannigCharacteristicValueCombinationCreateRequestMessage_sync 103004 |
| MessageHeader 103006 | | MessageHeader 103008 | | | 0..1 103010 | BasicBusinessDocumentMessageHeader 103012 |
| | | | ID 103014 | | 1 103016 | BusinessDocumentMessageID 103018 |
| | | | … | | 0..1 103020 | … |
| DemandPlanningCharacteristicValueCombination 103022 | | DemandPlanningCharacteristicValueCombination 103024 | | | 1 103026 | … |

FIG. 103-2

| Package | level1 | level2 | level3 | level4 | Cardinality | Datatype Name |
|---|---|---|---|---|---|---|
| | | | DemandPlan-ningScenarioID 103028 | | 1 103030 | DemandPlan-ningScenarioID 103032 |
| | | | Characteris-ticValue 103034 | | 1..n 103036 | |
| | | | | Demand-PlanCharac-teristicID 103038 | 1 103040 | DemandPlanCharac-teristicID 103042 |
| | | | | Demand-PlanCharac-teristicValue 103044 | 1 103046 | DemandPlanCharac-teristicValue 103048 |

FIG. 104

| Package | level1 | level2 | Cardinality | Datatype Name |
|---|---|---|---|---|
| DemandPlanningCharacteristicValueCombinationRealignConfirmationMessage_sync 104000 | DemandPlanningCharacteristicValueCombinationRealignConfirmationMessage_syncú 104002 | | | DemandPlannigCharacteristicValueCombinationRealign-ConfirmationMessage_sync 104004 |
| Log 104006 | | Log 104008 | 1 104010 | Log 104012 |

FIG. 105-1

| Package | level1 | level2 | level3 | level4 | Cardinality | Datatype Name |
|---|---|---|---|---|---|---|
| DemandPlanningCharacteristicValueCombinationRealignRequestMessage_sync 105000 | DemandPlanningCharacteristicValueCombinationRealignRequestMessage_sync 105002 | | | | | DemandPlannigCharacteristicValueCombinationRealignRequestMessage_sync 105004 |
| DemandPlanningCharacteristicValueCombination 105006 | | DemandPlanningCharacteristicValueCombination 105008 | | | 1 105010 | … |
| | | | DemandPlanningScenarioID 105012 | | 1 105014 | DemandPlanningScenarioID 105016 |
| | | | SourceCharacteristicValue 105018 | | 1..n 105020 | |
| | | | | Demand-PlanCharacteristicID 105022 | 1 105024 | DemandPlanCharacteristicID 105026 |

FIG. 105-2

| Package | level1 | level2 | level3 | level4 | Cardinality | Datatype Name |
|---|---|---|---|---|---|---|
| | | | | Demand-PlanCharacter-isticValue 105028 | 1 105030 | DemandPlanCharac-teristicValue 105032 |
| | | | TargetCharacter-isticValue 105034 | | 1..n 105036 | |
| | | | | Demand-PlanCharacter-isticID 105038 | 1 105040 | DemandPlanCharac-teristicID 105042 |
| | | | | Demand-PlanCharacter-isticValue 105044 | 1 105046 | DemandPlanCharac-teristicValue 105048 |

FIG. 106

| Package | level1 | level2 | level3 | Cardinality | Datatype Name |
|---|---|---|---|---|---|
| DemandPlanningCharacteristicValueCombinationsCancel-ConfirmationMessage_sync 106000 | DemandPlanningCharacteristicValueCombi-nationsCancelConfir-mationMessage_sync 106002 | | | | DemandPlannigCharacteristicValueCombinationsCancel-ConfirmationMessage_sync 106004 |
| MessageHeader 106006 | | MessageHeader 106008 | | 1 106010 | BasicBusinessDocumentMes-sageHeader 106012 |
| | | | ID 106014 | 1 106016 | BusinessDocumentMessageID 106018 |
| | | | … | 0..1 106020 | … |
| DemandPlanningCharacteristicValueCombinationCan-celConfirmationMes-sage_sync 106022 | | DemandPlanningCharacteristicValueCombi-nationCancelConfirma-tionMessage_sync 106024 | | 1..n 106026 | DemandPlanningCharacteristicValueCombinationCancel-ConfirmationMessage_sync 106028 |
| Log 106030 | | Log 106032 | | 1 106034 | Log 106036 |

FIG. 107

| Package | level1 | level2 | level3 | Cardinality | Datatype Name |
|---|---|---|---|---|---|
| DemandPlanningCharacteristicValueCombinationsCancelRequestMessage_sync 107000 | DemandPlanningCharacteristicValueCombinationsCancelRequestMessage_sync 107002 | | | | DemandPlannigCharacteristicValueCombinationsCancel-RequestMessage_sync 107004 |
| MessageHeader 107006 | | MessageHeader 107008 | | 1 107010 | BasicBusinessDocumentMessageHeader 107012 |
| | | | ID 107014 | 1 107016 | BusinessDocumentMessageID 107018 |
| | | | … | 0..1 107020 | … |
| DemandPlanningCharacteristicValueCombinationCancelRequestMessage_sync 107022 | | DemandPlanningCharacteristicValueCombinationCancelRequestMessage_sync 107024 | | 1..n 107026 | DemandPlanningCharacteristicValueCombinationCancel-RequestMessage_sync 107028 |

FIG. 108-1

| Package | level1 | level2 | level3 | Cardinality | Datatype Name |
|---|---|---|---|---|---|
| DemandPlanningCharacteristicValueCombinationsCreate-ConfirmationMessage_sync 108000 | DemandPlanningCharacteristicValueCombinationsCreateConfirmationMessage_sync 108002 | | | | DemandPlannigCharacteristicValueCombinationsCreateConfirmationMessage_sync 108004 |
| MessageHeader 108006 | | MessageHeader 108008 | | 1 108010 | BasicBusinessDocumentMessageHeader 108012 |
| | | | ID 108014 | 1 108016 | BusinessDocumentMessageID 108018 |
| | | | … | 0..1 108020 | … |
| DemandPlanningCharacteristicValueCombinationCreateConfirmationMessage_sync 108022 | | DemandPlanningCharacteristicValueCombinationCreateConfirmationMessage_sync 108024 | | 1..n 108026 | DemandPlanningCharacteristicValueCombinationCreateConfirmationMessage_sync 108028 |

FIG. 108-2

| Package | level1 | level2 | level3 | Cardinality | Datatype Name |
|---|---|---|---|---|---|
| Log 108030 | | Log 108032 | | 1 108034 | Log 108036 |

FIG. 109

| Package | level1 | level2 | level3 | Cardinality | Datatype Name |
|---|---|---|---|---|---|
| DemandPlanningCharacteristicValueCombinationsCreateRequestMessage_sync 109000 | DemandPlanningCharacteristicValueCombinationsCreateRequestMessage_sync 109002 | | | | DemandPlanningCharacteristicValueCombinationsCreateRequestMessage_sync 109004 |
| MessageHeader 109006 | | MessageHeader 109008 | | 1 109010 | BasicBusinessDocumentMessageHeader 109012 |
| | | | ID 109014 | 1 109016 | BusinessDocumentMessageID 109018 |
| | | | … | 0..1 109020 | … |
| DemandPlanningCharacteristicValueCombinationCreateRequestMessage_sync 109022 | | DemandPlanningCharacteristicValueCombinationCreateRequestMessage_sync 109024 | | 1..n 109026 | DemandPlanningCharacteristicValueCombinationCreateRequestMessage_sync 109028 |

FIG. 123

| Package | | level1 | level2 | level3 | Cardinality | Datatype Name |
|---|---|---|---|---|---|---|
| DemandViewOfPromotionByID-QueryMessage_sync 123000 | | DemandVie-wOfPromotion-ByIDQuery-Message_sync 123002 | | | | DemandVie-wOfPromotion-ByIDQuery-Message_sync 123004 |
| | Selection 123006 | | DemandVie-wOfPromotion-SelectionByID 123008 | | 1 123010 | |
| | | | | DemandVie-wOfPromo-tionID 123012 | 1 123014 | DemandVie-wOfPromo-tionID 123016 |

FIG. 124-1

| Package | | level1 | level2 | level3 | level4 | level5 | Cardinality | Datatype Name |
|---|---|---|---|---|---|---|---|---|
| DemandViewOfPromotionByIDResponseMessage_sync 124000 | | DemandViewOfPromotionByIDResponseMessage_sync 124002 | | | | | | DemandViewOfPromotionByIDResponseMessage_sync 124004 |
| | DemandViewOfPromotion 124006 | | DemandViewOfPromotion 124008 | | | | 0..1 124010 | |
| | | | | ID 124012 | | | 1 124014 | DemandViewOfPromotionID 124016 |
| | | | | DemandPlanID 124018 | | | 1 124020 | DemandPlanID 124022 |

FIG. 124-2

| Package | | | | level1 | level2 | level3 | level4 | level5 | Cardinality | Datatype Name |
|---|---|---|---|---|---|---|---|---|---|---|
| | | | | | | Planning-VersionID 124024 | | | 1 124026 | Planning-VersionID 124028 |
| | | | | | | Demand-PlanKey-FigureID 124030 | | | 1 124032 | Demand-PlanKey-FigureID 124034 |
| | | | | | | Status-Code 124036 | | | 1 124038 | Demand-ViewOf-Promo-tionStatus-Code 124040 |
| | | | | | | Status-Name 124042 | | | 1 124044 | MEDIUM_Name 124046 |
| | | | | | | StatusDe-scription 124048 | | | 0..1 124050 | LONG_Description 124052 |

FIG. 124-3

| Package | | | | level1 | level2 | level3 | level4 | level5 | Cardinality | Datatype Name |
|---|---|---|---|---|---|---|---|---|---|---|
| | | | | | | Description 124054 | | | 0..1 124056 | LEN40_Description 124058 |
| | | | | | | Note 124060 | | | 0..1 124062 | Note 124064 |
| | | | | | | SystemAdministrativeData 124066 | | | 1 124068 | SystemAdministrativeData 124070 |
| | | | | | | Level 124072 | | | 1..N 124074 | |
| | | | | | | | DemandPlanCharacteristicID 124076 | | 1 124078 | DemandPlanCharacteristicID 124080 |
| | | | | | | | OrdinalNumberValue 124082 | | 1 124084 | OrdinalNumberValue 124086 |

FIG. 124-4

| Package | | | | level1 | level2 | level3 | level4 | level5 | Cardinality | Datatype Name |
|---|---|---|---|---|---|---|---|---|---|---|
| | | | | | | TimeSeri-esPeriod 124088 | | | 1..N 124090 | |
| | | | | | | | ID 124092 | | 1 124094 | TimeSeri-esPeriodID 124096 |
| | | | | | | | DatePeriod 124098 | | 1 124100 | CLOSED_DatePeriod 124102 |
| | | | | | | | Calenda-rUnitCode 124104 | | 1 124106 | Calenda-rUnitCode 124108 |
| | | | | | | | Calenda-rUnitName 124110 | | 1 124112 | MEDIUM_Name 124114 |
| | | | | | | | Calenda-rUnitDe-scription 124116 | | 0..1 124118 | LONG_Description 124120 |

FIG. 124-5

| Package | | | | level1 | level2 | level3 | level4 | level5 | Cardinality | Datatype Name |
|---|---|---|---|---|---|---|---|---|---|---|
| | | | | | | | FiscalYear Variant-Code 124122 | | 0..1 124124 | FiscalYear Variant-Code 124126 |
| | | | | | | | FiscalYear Variant-Name 124128 | | 0..1 124130 | MEDIUM_Name 124132 |
| | | | | | | | FiscalYear VariantDe-scription 124134 | | 0..1 124136 | LONG_De scription 124138 |
| | | | | | | Character-isticValue-Combina-tion 124140 | | | 1..N 124142 | |

FIG. 124-6

| Package | | | | level1 | level2 | level3 | level4 | level5 | Cardinality | Datatype Name |
|---|---|---|---|---|---|---|---|---|---|---|
| | | | | | | | Character-isticValue 124144 | | 1..N 124146 | |
| | | | | | | | | Demand-PlanChar-acteristicID 124148 | 1 124150 | Demand-PlanChar-acteristicID 124152 |
| | | | | | | | | Demand-PlanChar-acteris-ticValue 124154 | 1 124156 | Demand-PlanChar-acteris-ticValue 124158 |
| | | | | | | | Expected-Promo-tionEffect 124160 | | 1..N 124162 | |
| | | | | | | | | TimeSeri-esPeriodID 124164 | 1 124166 | TimeSeri-esPeriodID 124168 |

FIG. 124-7

| Package | level1 | level2 | level3 | level4 | level5 | Cardinality | Datatype Name |
|---|---|---|---|---|---|---|---|
| | | | | | Value 124170 | 1 124172 | FloatValue 124174 |
| | | | Property 124176 | | | 0..N 124178 | |
| | | | | ID 124180 | | 1 124182 | PropertyID 124184 |
| | | | | Value 124186 | | 1 124188 | Property-Value 124190 |
| Log 124192 | | Log 124194 | | | | 1 124196 | Log 124198 |

FIG. 125

| Package | | level1 | level2 | level3 | Cardinality | Datatype Name |
|---|---|---|---|---|---|---|
| DemandViewOfPromotionCancelConfirmationMessage_sync 125000 | | DemandViewOfPromotionCancelConfirmationMessage_sync 125002 | | | | DemandViewOfPromotionCancelConfirmationMessage_sync 125004 |
| | DemandViewOfPromotion 125006 | | DemandViewOfPromotion 125008 | | 0..1 125010 | |
| | | | | ID 125012 | 1 125014 | DemandViewOfPromotionID 125016 |
| | Log 125018 | | Log 125020 | | 1 125022 | Log 125024 |

FIG. 126

| Package | | level1 | level2 | level3 | Cardinality | Datatype Name |
|---|---|---|---|---|---|---|
| DemandViewOfPromotionCancelRequestMessage_sync 126000 | | DemandViewOfPromotionCancelRequestMessage_sync 126002 | | | | DemandViewOfPromotionCancelRequestMessage_sync 126004 |
| | DemandViewOfPromotion 126006 | | DemandViewOfPromotion 126008 | | 1 126010 | |
| | | | | ID 126012 | 1 126014 | DemandViewOfPromotionID 126016 |

FIG. 127-1

| Package | | level1 | level2 | level3 | Cardinality | Datatype Name |
|---|---|---|---|---|---|---|
| DemandViewOfPromotion-ChangeConfirmationMes-sage_sync 127000 | | DemandViewOfPro-motionChangeCon-firmationMes-sage_sync 127002 | | | | DemandViewOfPromo-tionChangeConfirma-tionMessage_sync 127004 |
| | DemandVie-wOfPromotion 127006 | | Demand-ViewOf-Promo-tion 127008 | | 0..1 127010 | |
| | | | | ID 127012 | 1 127014 | DemandViewOfPromo-tionID 127016 |
| | | | | StatusCode 127018 | 1 127020 | DemandViewOfPromo-tionStatusCode 127022 |
| | | | | StatusName 127024 | 1 127026 | MEDIUM_Name 127028 |
| | | | | StatusDe-scription 127030 | 0..1 127032 | LONG_Description 127034 |

FIG. 127-2

| Package | | level1 | level2 | level3 | Cardinality | Datatype Name |
|---|---|---|---|---|---|---|
| | | | | SystemAdministrativeData 127036 | 1 127038 | SystemAdministrativeData 127040 |
| | Log 127042 | | Log 127044 | | 1 127046 | Log 127048 |

FIG. 128-1

| Package | | level1 | level2 | level3 | level4 | level5 | Cardinality | Datatype Name |
|---|---|---|---|---|---|---|---|---|
| DemandViewOfPromotionChangeRequestMessage_sync 128000 | | DemandViewOfPromotionChangeRequestMessage_sync 128002 | | | | | | DemandViewOfPromotionChangeRequestMessage_sync 128004 |
| | DemandViewOfPromotion 128006 | | DemandViewOfPromotion 128008 | | | | 1 128010 | |
| | | | | ID 128012 | | | 1 128014 | DemandViewOfPromotionID 128016 |
| | | | | DemandPlanKeyFigureID 128018 | | | 1 128020 | DemandPlanKeyFigureID 128022 |

FIG. 128-2

| Package | | level1 | level2 | level3 | level4 | level5 | Cardinality | Datatype Name |
|---|---|---|---|---|---|---|---|---|
| | | | | StatusCode 128024 | | | 1 128026 | Demand-ViewOf-Promotion-StatusCode 128028 |
| | | | | Description 128030 | | | 0..1 128032 | LEN40_Description 128034 |
| | | | | Note 128036 | | | 0..1 128038 | Note 128040 |
| | | | | Level 128042 | | | 1..N 128044 | |
| | | | | | Demand-PlanChar-acteristicID 128046 | | 1 128048 | Demand-PlanChar-acteristicID 128050 |
| | | | | | Ordinal-Number-Value 128052 | | 1 128054 | Ordinal-Number-Value 128056 |

FIG. 128-3

| Package | | level1 | level2 | level3 | level4 | level5 | Cardinality | Datatype Name |
|---|---|---|---|---|---|---|---|---|
| | | | | TimeSeriesPeriod 128058 | | | 1..N 128060 | |
| | | | | | ID 128062 | | 1 128064 | TimeSeriesPeriodID 128066 |
| | | | | | DatePeriod 128068 | | 1 128070 | CLOSED_DatePeriod 128072 |
| | | | | | CalendarUnitCode 128074 | | 1 128076 | CalendarUnitCode 128078 |
| | | | | | FiscalYearVariantCode 128080 | | 0..1 128082 | FiscalYearVariantCode 128084 |

FIG. 128-4

| Package | | level1 | level2 | level3 | level4 | level5 | Cardinality | Datatype Name |
|---|---|---|---|---|---|---|---|---|
| | | | | Character-isticValue-Combina-tion 128086 | | | 1..N 128088 | |
| | | | | | Character-isticValue 128090 | | 1..N 128092 | |
| | | | | | | Demand-PlanChar-acteristicID 128094 | 1 128096 | Demand-PlanChar-acteristicID 128098 |
| | | | | | | Demand-PlanChar-acteris-ticValue 128100 | 1 128102 | Demand-PlanChar-acteris-ticValue 128104 |
| | | | | | Expected-Promo-tionEffect 128106 | | 1..N 128108 | |

FIG. 128-5

| Package | | level1 | level2 | level3 | level4 | level5 | Cardinality | Datatype Name |
|---|---|---|---|---|---|---|---|---|
| | | | | | | TimeSeri-esPeriodID 128110 | 1 128112 | TimeSeri-esPeriodID 128114 |
| | | | | | | Value 128116 | 1 128118 | FloatValue 128120 |
| | | | | Property 128122 | | | 0..N 128124 | |
| | | | | | ID 128126 | | 1 128128 | PropertyID 128130 |
| | | | | | Value 128132 | | 1 128134 | Property-Value 128136 |

FIG. 129-1

| Package | | level1 | level2 | level3 | Cardinality | Datatype Name |
|---|---|---|---|---|---|---|
| DemandViewOfPromotionCreate-ConfirmationMessage_sync 129000 | | DemandVie-wOfPromotion-CreateConfir-mationMes-sage_sync 129002 | | | | DemandVie-wOfPromotion-CreateConfir-mationMes-sage_sync 129004 |
| | DemandVie-wOfPromotion 129006 | | DemandVie-wOfPromotion 129008 | | 0..1 129010 | |
| | | | | ID 129012 | 1 129014 | DemandVie-wOfPromo-tionID 129016 |
| | | | | StatusCode 129018 | 1 129020 | DemandVie-wOfPromotion-StatusCode 129022 |
| | | | | StatusName 129024 | 1 129026 | MEDIUM_Nam e 129028 |

FIG. 129-2

| Package | | level1 | level2 | level3 | Cardinality | Datatype Name |
|---|---|---|---|---|---|---|
| | | | | StatusDescrip-tion 129030 | 0..1 129032 | LONG_Description 129034 |
| | | | | SystemAdmin-istrativeData 129036 | 1 129038 | SystemAdmin-istrativeData 129040 |
| | Log 129042 | | Log 129044 | | 1 129046 | Log 129048 |

FIG. 130-1

| Package | | level1 | level2 | level3 | level4 | level5 | Cardinality | Datatype Name |
|---|---|---|---|---|---|---|---|---|
| DemandViewOfPromotionCreateRequest-Message_sync 130000 | | Demand-ViewOn-Promotion-CreateRe-questMes-sage_sync 130002 | | | | | | Demand-ViewOf-Promotion-CreateRe-questMes-sage_sync 130004 |
| | Demand ViewOf-Promo-tion 130006 | | Demand-ViewOf-Promotion 130008 | | | | 1 130010 | |
| | | | | ID 130012 | | | 1 130014 | Demand-ViewOf-PromotionID 130016 |
| | | | | Demand-PlanID 130018 | | | 1 130020 | Demand-PlanID 130022 |

FIG. 130-2

| Package | level1 | level2 | level3 | level4 | level5 | Cardinality | Datatype Name |
|---|---|---|---|---|---|---|---|
| | | | Planning-VersionID 130024 | | | 1 130026 | Planning-VersionID 130028 |
| | | | Demand-PlanKey-FigureID 130030 | | | 1 130032 | Demand-PlanKey-FigureID 130034 |
| | | | StatusCode 130036 | | | 1 130038 | Demand-ViewOf-Promotion-StatusCode 130040 |
| | | | Description 130042 | | | 0..1 130044 | LEN40_Description 130046 |
| | | | Note 130048 | | | 0..1 130050 | Note 130052 |
| | | | Level 130054 | | | 1..N 130056 | |

FIG. 130-3

| Package | level1 | level2 | level3 | level4 | level5 | Cardinality | Datatype Name |
|---|---|---|---|---|---|---|---|
| | | | | Demand-PlanCharac-teristicID 130058 | | 1 130060 | Demand-PlanCharac-teristicID 130062 |
| | | | | Ordinal-Number-Value 130064 | | 1 130066 | Ordinal-Number-Value 130068 |
| | | | TimeSeri-esPeriod 130070 | | | 1..N 130072 | |
| | | | | ID 130074 | | 1 130076 | TimeSeri-esPeriodID 130078 |
| | | | | DatePeriod 130080 | | 1 130082 | CLOSED_DatePeriod 130084 |
| | | | | Calenda-rUnitCode 130086 | | 1 130088 | Calenda-rUnitCode 130090 |

FIG. 130-4

| Package | level1 | level2 | level3 | level4 | level5 | Cardinality | Datatype Name |
|---|---|---|---|---|---|---|---|
| | | | | FiscalYear-VariantCode 130092 | | 0..1 130094 | FiscalYear-VariantCode 130096 |
| | | | Characteris-ticValue-Combina-tion 130098 | | | 1..N 130100 | |
| | | | | Characteris-ticValue 130102 | | 1..N 130104 | |
| | | | | | Demand-PlanCharac-teristicID 130106 | 1 130108 | Demand-PlanCharac-teristicID 130110 |
| | | | | | Demand-PlanCharac-teristicValue 130112 | 1 130114 | Demand-PlanCharac-teristicValue 130116 |

FIG. 130-5

| Package | | | | level1 | level2 | level3 | level4 | level5 | Cardinality | Datatype Name |
|---|---|---|---|---|---|---|---|---|---|---|
| | | | | | | | Expected-Promo-tionEffect 130118 | | 1..N 130120 | |
| | | | | | | | | TimeSeri-esPeriodID 130122 | 1 130124 | TimeSeri-esPeriodID 130126 |
| | | | | | | | | Value 130128 | 1 130130 | FloatValue 130132 |
| | | | | | | Property 130134 | | | 0..N 130136 | |
| | | | | | | | ID 130138 | | 1 130140 | PropertyID 130142 |
| | | | | | | | Value 130144 | | 1 130146 | Property-Value 130148 |

FIG. 131

| Package | | level1 | level2 | level3 | Cardinality | Datatype Name |
|---|---|---|---|---|---|---|
| DemandViewOfPromotionSimpleByDemandPlanIDQueryMessage_sync 131000 | | DemandViewOfPromotionSimpleByDemandPlanIDQueryMessage_sync 131002 | | | | DemandViewOfPromotionSimpleByDemandPlanIDQueryMessage_sync 131004 |
| | Selection 131006 | | DemandViewOfPromotionSimpleSelectionByDemandPlanID 131008 | | 1 131010 | |
| | | | | DemandPlanID 131012 | 1 131014 | DemandPlanID 131016 |

FIG. 132-1

| Package | | level1 | level2 | level3 | Cardinality | Datatype Name |
|---|---|---|---|---|---|---|
| DemandViewOfPromotionSimpleByDemandPlanIDResponseMessage_sync 132000 | | DemandViewOfPromotionSimpleByDemandPlanIDResponseMessage_sync 132002 | | | | DemandViewOfPromotionSimpleByDemandPlanIDResponseMessage_sync 132004 |
| | DemandViewOfPromotion 132006 | | DemandViewOfPromotion 132008 | | 0..N 132010 | |
| | | | | ID 132012 | 1 132014 | DemandViewOfPromotionID 132016 |
| | | | | StatusCode 132018 | 1 132020 | DemandViewOfPromotionStatusCode 132022 |
| | | | | StatusName 132024 | 1 132026 | MEDIUM_Name 132028 |

FIG. 132-2

| Package | | level1 | level2 | level3 | Cardinality | Datatype Name |
|---|---|---|---|---|---|---|
| | | | | StatusDescrip-tion 132030 | 0..1 132032 | LONG_Description 132034 |
| | | | | Description 132036 | 0..1 132038 | LEN40_Description 132040 |
| | Log 132042 | | Log 132044 | | 1 132046 | Log 132048 |

FIG. 133-1

| Package | | level1 | level2 | level3 | level4 | Cardinality | Datatype Name |
|---|---|---|---|---|---|---|---|
| DemandViewOfPromotion-SimpleByIDQueryMes-sage_sync 133000 | | DemandVie-wOfPromo-tionSimple-ByIDQuery-Mes-sage_sync 133002 | | | | | DemandVie-wOfPromo-tionSimple-ByIDQuery-Mes-sage_sync 133004 |
| | Selection 133006 | | DemandVie-wOfPromo-tionSelec-tionByID 133008 | | | 1 133010 | |
| | | | | SelectionBy-DemandVie-wOnPromo-tionID 133012 | | 1..N 133014 | SelectionBy-DemandVie-wOfPromo-tionID 133016 |
| | | | | | InclusionEx-clusionCode 133018 | 0..1 133020 | InclusionEx-clusionCode 133022 |

FIG. 133-2

| Package | | level1 | level2 | level3 | level4 | Cardinality | Datatype Name |
|---|---|---|---|---|---|---|---|
| | | | | | Interval-BoundaryTypeCode 133024 | 1 133026 | Interval-BoundaryTypeCode 133028 |
| | | | | | Lower-Boundary-DemandViewOfPromotionID 133030 | 0..1 133032 | DemandViewOfPromotionID 133034 |
| | | | | | Upper-Boundary-DemandViewOfPromotionID 133036 | 0..1 133038 | DemandViewOfPromotionID 133040 |

FIG. 134-1

| Package | | level1 | level2 | level3 | Cardinality | Datatype Name |
|---|---|---|---|---|---|---|
| DemandViewOfPromotionSimpleByIDResponseMessage_sync 134000 | | DemandViewOfPromotionSimpleByIDResponseMessage_sync 134002 | | | | DemandViewOfPromotionSimpleByIDResponseMessage_sync 134004 |
| | DemandViewOfPromotion 134006 | | DemandViewOfPromotion 134008 | | 0..N 134010 | |
| | | | | ID 134012 | 1 134014 | DemandViewOfPromotionID 134016 |
| | | | | StatusCode 134018 | 1 134020 | DemandViewOfPromotionStatusCode 134022 |
| | | | | StatusName 134024 | 1 134026 | MEDIUM_Name 134028 |

FIG. 134-2

| Package | | level1 | level2 | level3 | Cardinality | Datatype Name |
|---|---|---|---|---|---|---|
| | | | | StatusDescrip-tion 134030 | 0..1 134032 | LONG_Description 134034 |
| | | | | Description 134036 | 0..1 134038 | LEN40_Description 134040 |
| | Log 134042 | | Log 134044 | | 1 134046 | Log 134048 |

MANAGING CONSISTENT INTERFACES FOR DEMAND BUSINESS OBJECTS ACROSS HETEROGENEOUS SYSTEMS

RELATED APPLICATION

This application claims the benefit of U.S. Provisional Application No. 60/848,497 filed Sep. 28, 2006, and fully incorporating the contents therein.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax. Semantically related business objects may be grouped into process components that realize a certain business process. The process component exposes its functionality via enterprise services. Process components are part of the business process platform. Defined groups of process components can be deployed individually, where each of these groups is often termed a deployment unit.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of various deployment units Each of these deployment units include one or more business objects. These business objects include, for example, DemandPlan, DemandPlanningCharacteristicValueCombination, and DemandViewOfPromotion. Moreover, these business objects may be involved in a message choreography that depicts one or more messages between applications that can reside in heterogeneous systems. In some cases, the messages may include data from or based on such processes represented by the business object.

In another example, the business objects may include a root node, with a plurality of data elements located directly at the root node, and one or more subordinate nodes of varying cardinality. This cardinality may be 1:1, 1:n, 1:c, 1:cn, and so forth. Each of these subordinate nodes may include it own data elements and may further include other suborindate nodes. Moreover, each node may reference any number of approrpaite dependent objects.

The foregoing example computer implementable methods—as well as other disclosed processes—may also be executed or implemented by or within software. Moreover, some or all of these aspects may be further included in respective systems or other devices for creating and utilizing consistent services or interfaces. The details of these and other aspects and embodiments of the disclosure are set forth in the accompanying drawings and the description below. Other features, objects, and advantages of the various embodiments will be apparent from the description and drawings, as well as from the claims. It should be understood that the foregoing business objects in each deployment unit are for illustration purposes only and other complementary or replacement business objects may be implmented.

BRIEF DESCRIPTION OF THE DRAWINGS

FIGS. 27A-E depict a hierarchization process in accordance with methods and systems consistent with the subject matter described herein;

FIG. 47 shows an exemplary DemandPlanCancelConfirmation Element Structure;

FIG. 48 shows an exemplary DemandPlanCancelRequest Element Structure;

FIG. 49 shows an exemplary DemandPlanCreateConfirmation Element Structure;

FIG. 50 shows an exemplary DemandPlanCreateRequest Element Structure;

FIGS. 51-1 through 51-12 show an exemplary DemandPlanFunctionExecuteConfirmation Element Structure;

FIGS. 52-1 through 52-8 show an exemplary DemandPlanFunctionExecuteRequest Element Structure;

FIGS. 53-1 through 53-6 show an exemplary DemandPlanKeyFigureValueByElementsQuery Element Structure;

FIGS. 54-1 through 54-15 show an exemplary DemandPlanKeyFigureValueByElementsResponse Element Structure;

FIGS. 55-1 through 55-11 show an exemplary DemandPlanKeyFigureValueChangeConfirmation Element Structure;

FIGS. 56-1 through 56-7 show an exemplary DemandPlanKeyFigureValueChangeRequest Element Structure;

FIGS. 57-1 through 57-10 show an exemplary DemandPlanKeyFigureValueSimulateConfirmation Element Structure;

FIGS. 58-1 through 58-7 show an exemplary DemandPlanKeyFigureValueSimulateRequest Element Structure;

FIGS. 59-1 through 59-7 show an exemplary DemandPlanKeyFigureValueUpdateRequest Element Structure;

FIGS. 60-1 through 60-12 show an exemplary DemandPlanKeyFigureValueUpdateResponse Element Structure;

FIG. 61 shows an exemplary DemandPlanSelectionByIDandSelectionIDQuery Element Structure;

FIGS. 62-1 through 62-5 show an exemplary DemandPlanSelectionByIDandSelectionIDResponse Element Structure;

FIG. 63 shows an exemplary DemandPlanSelectionCancelConfirmation Element Structure;

FIG. 64 shows an exemplary DemandPlanSelectionCancelRequest Element Structure;

FIG. 65 shows an exemplary DemandPlanSelectionChangeConfirmation Element Structure;

FIGS. 66-1 through 66-4 show an exemplary DemandPlanSelectionChangeRequest Element Structure;

FIG. 67 shows an exemplary DemandPlanSelectionCreateConfirmation Element Structure;

FIGS. 68-1 through 68-3 show an exemplary DemandPlanSelectionCreateRequest Element Structure;

FIG. 69 shows an exemplary DemandPlanSelectionSimpleByIDQuery Element Structure;

FIG. 70 shows an exemplary DemandPlanSelectionSimpleByIDResponse Element Structure;

FIG. 71 shows an exemplary DemandPlanSimpleByDemandPlanningScenarioIDQuery Element Structure;

FIG. 72 shows an exemplary DemandPlanSimpleByDemandPlanningScenarioIDResponse Element Structure;

FIG. 73 shows an exemplary DemandPlanVersionByIDandVersionPlanningVersionIDQuery Element Structure;

FIGS. 74-1 through 74-2 show an exemplary DemandPlanVersionByIDandVersionPlanningVersionIDResponse Element Structure;

FIG. 75 shows an exemplary DemandPlanVersionCancelConfirmation Element Structure;

FIG. 76 shows an exemplary DemandPlanVersionCancelRequest Element Structure;

FIGS. 77-1 through 77-2 show an exemplary DemandPlanVersionChangeConfirmation Element Structure;

FIG. 78 shows an exemplary DemandPlanVersionChangeRequest Element Structure;

FIG. 79 shows an exemplary DemandPlanVersionCompleteConfirmation Element Structure;

FIG. 80 shows an exemplary DemandPlanVersionCompleteRequest Element Structure;

FIGS. 81-1 through 81-2 show an exemplary DemandPlanVersionCreateConfirmation Element Structure;

FIG. 82 shows an exemplary DemandPlanVersionCreateRequest Element Structure;

FIG. 83 shows an exemplary DemandPlanVersionSimpleByIDQuery Element Structure;

FIG. 84 shows an exemplary DemandPlanVersionSimpleByIDResponse Element Structure;

FIGS. 98-1 through 98-3 show an exemplary DemandPlanningCharacteristicValueCombinationByCharacteristicValueQuery Element Structure;

FIGS. 99-1 through 99-3 show an exemplary DemandPlanningCharacteristicValueCombinationByCharacteristicValueResponse Element Structure;

FIG. 100 shows an exemplary DemandPlanningCharacteristicValueCombinationCancelConfirmation Element Structure;

FIGS. 101-1 through 101-2 show an exemplary DemandPlanningCharacteristicValueCombinationCancelRequest Element Structure;

FIG. 102 shows an exemplary DemandPlanningCharacteristicValueCombinationCreateConfirmation Element Structure;

FIGS. 103-1 through 103-2 show an exemplary DemandPlanningCharacteristicValueCombinationCreateRequest Element Structure;

FIG. 104 shows an exemplary DemandPlanningCharacteristicValueCombinationRealignConfirmation Element Structure;

FIGS. 105-1 through 105-2 show an exemplary DemandPlanningCharacteristicValueCombinationRealignRequest Element Structure;

FIG. 106 shows an exemplary DemandPlanningCharacteristicValueCombinationsCancelConfirmation Element Structure;

FIG. 107 shows an exemplary DemandPlanningCharacteristicValueCombinationsCancelRequest Element Structure;

FIGS. 108-1 through 108-2 show an exemplary DemandPlanningCharacteristicValueCombinationsCreateConfirmation Element Structure;

FIG. 109 shows an exemplary DemandPlanningCharacteristicValueCombinationsCreateRequest Element Structure;

FIG. 118 shows an exemplary DemandViewOfPromotionByIDResponse Message Data Type;

FIG. 119 shows an exemplary DemandViewOfPromotionSimpleByDemandPlanIDQuery Message Data Type;

FIG. 120 shows an exemplary DemandViewOfPromotionSimpleByDemandPlanIDResponse Message Data Type;

FIG. 121 shows an exemplary DemandViewOfPromotionSimpleByIDQuery Message Data Type;

FIG. 122 shows an exemplary DemandViewOfPromotionSimpleByIDResponse Message Data Type;

FIG. 123 shows an exemplary DemandViewOfPromotionByIDQuery Element Structure;

FIGS. 124-1 through 124-7 show an exemplary DemandViewOfPromotionByIDResponse Element Structure;

FIG. 125 shows an exemplary DemandViewOfPromotionCancelConfirmation Element Structure;

FIG. 126 shows an exemplary DemandViewOfPromotionCancelRequest Element Structure;

FIGS. 127-1 through 127-2 show an exemplary DemandViewOfPromotionChangeConfirmation Element Structure;

FIGS. 128-1 through 128-5 show an exemplary DemandViewOfPromotionChangeRequest Element Structure;

FIGS. 129-1 through 129-2 show an exemplary DemandViewOfPromotionCreateConfirmation Element Structure;

Figure 1:
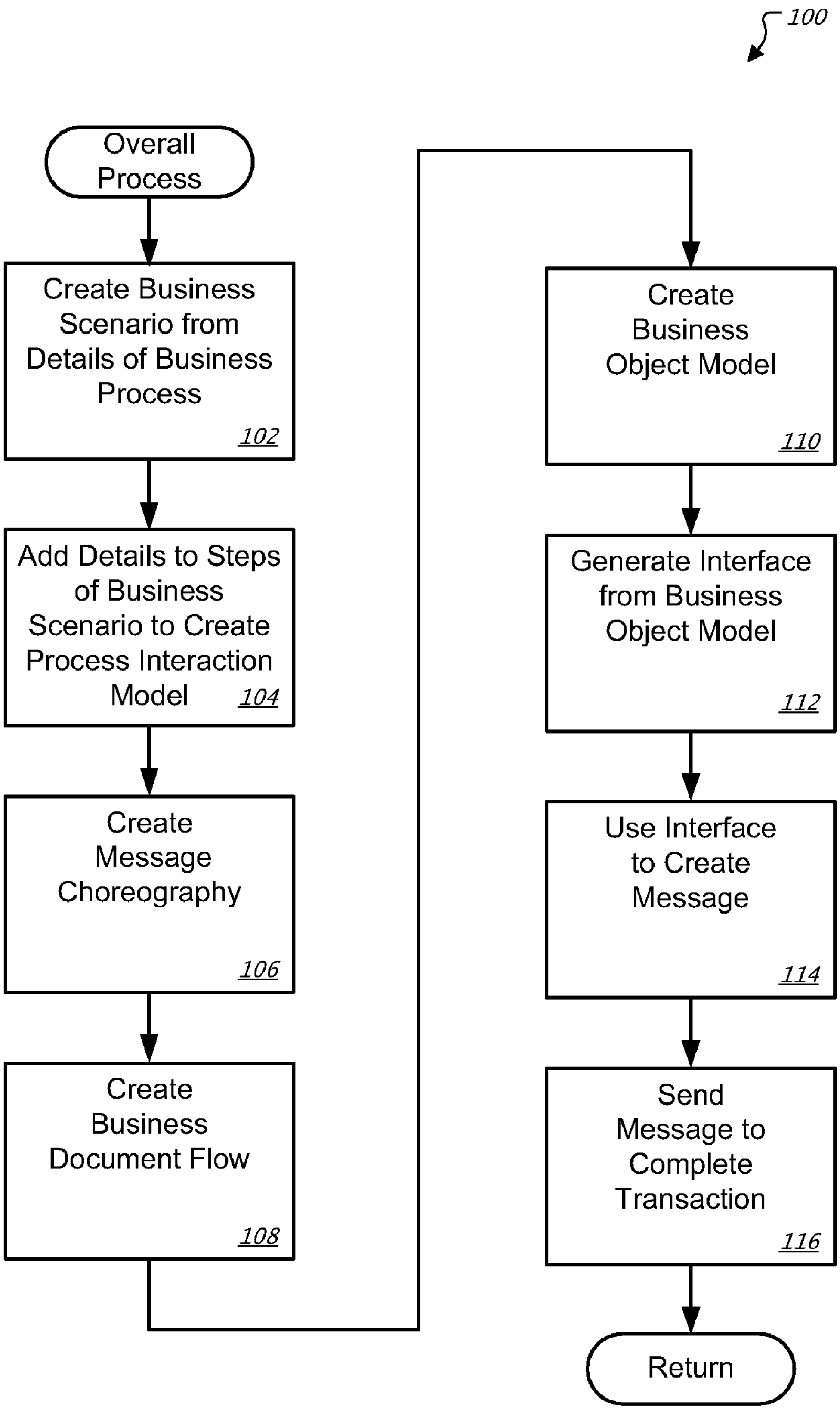
FIG. 1 depicts a flow diagram of the overall steps performed by methods and systems consistent with the subject matter described herein.
Figure 2:
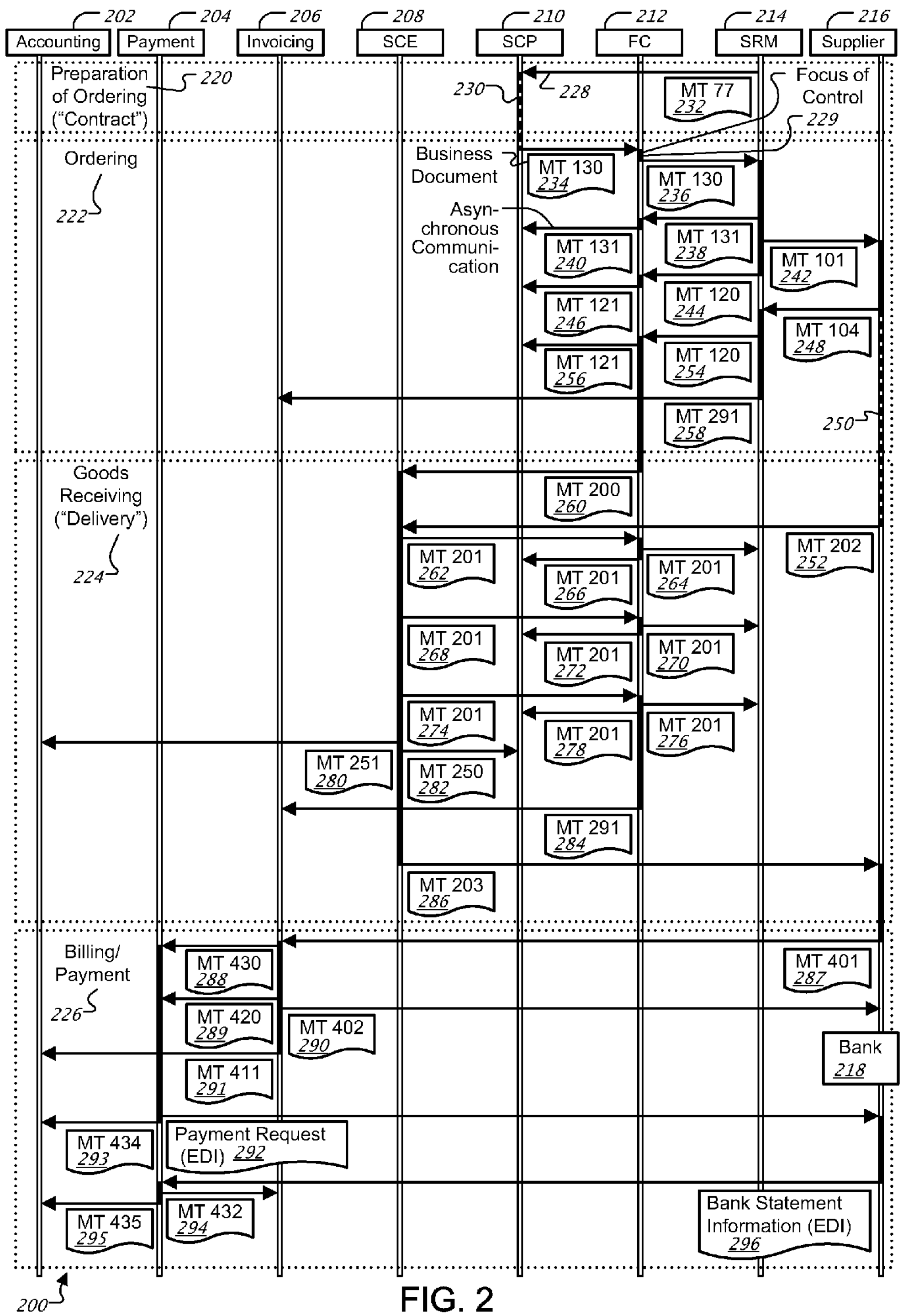
FIG. 2 depicts a business document flow for an invoice request in accordance with methods and systems consistent with the subject matter described herein.

FIGS. 130-1 through 130-5 show an exemplary DemandViewOfPromotionCreateRequest Element Structure;

FIG. 131 shows an exemplary DemandViewOfPromotionSimpleByDemandPlanIDQuery Element Structure;

FIGS. 132-1 through 132-2 show an exemplary DemandViewOfPromotionSimpleByDemandPlanIDResponse Element Structure;

FIGS. 133-1 through 133-2 show an exemplary DemandViewOfPromotionSimpleByIDQuery Element Structure; and FIGS. 134-1 through 134-2 show an exemplary DemandViewOfPromotionSimpleByIDResponse Element Structure.

DETAILED DESCRIPTION

A. Overview

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208.

The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
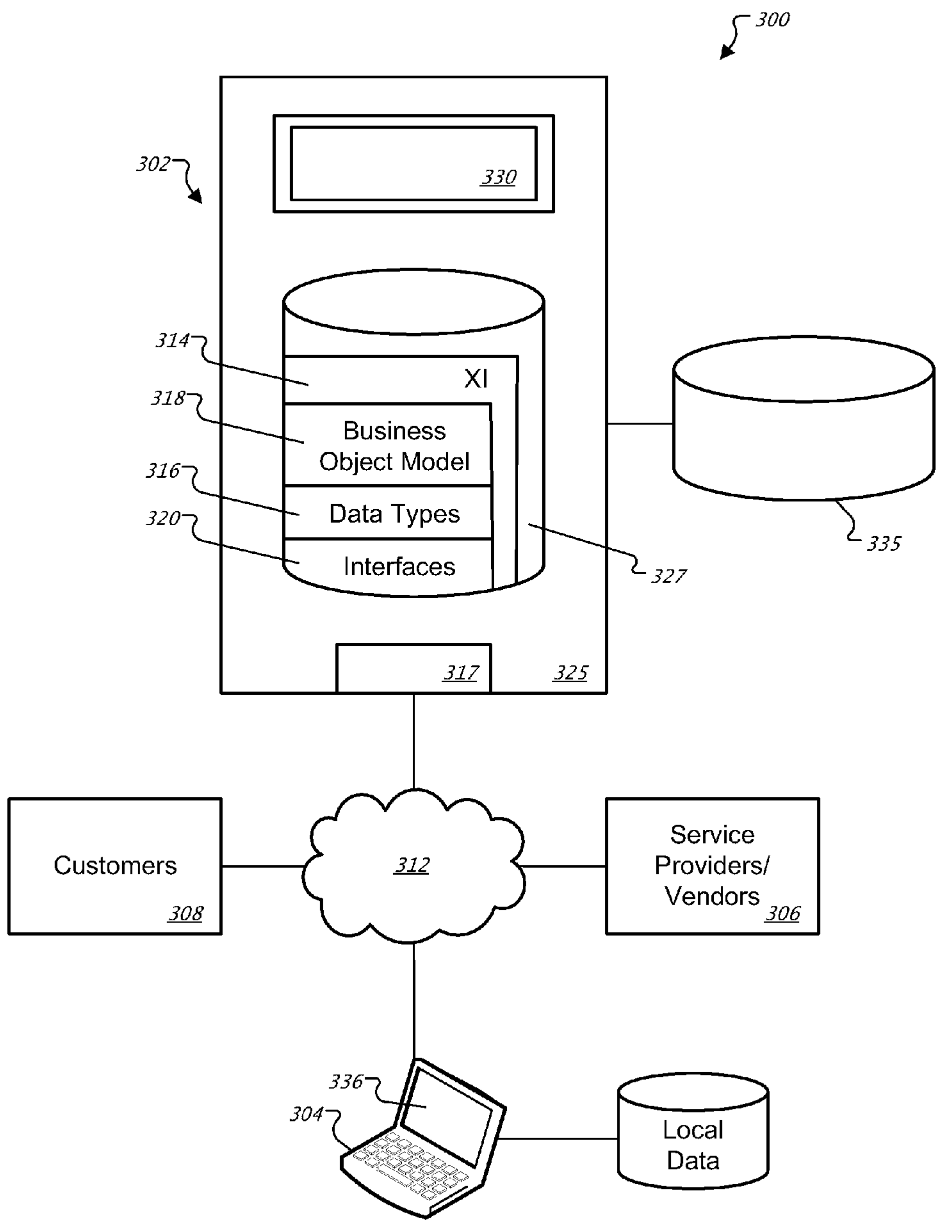
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3 provides merely one example of computers that may be used with the disclosure. Each computer is generally intended to encompass any suitable processing device. For example, although FIG. 3 illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and JavA environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3 illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
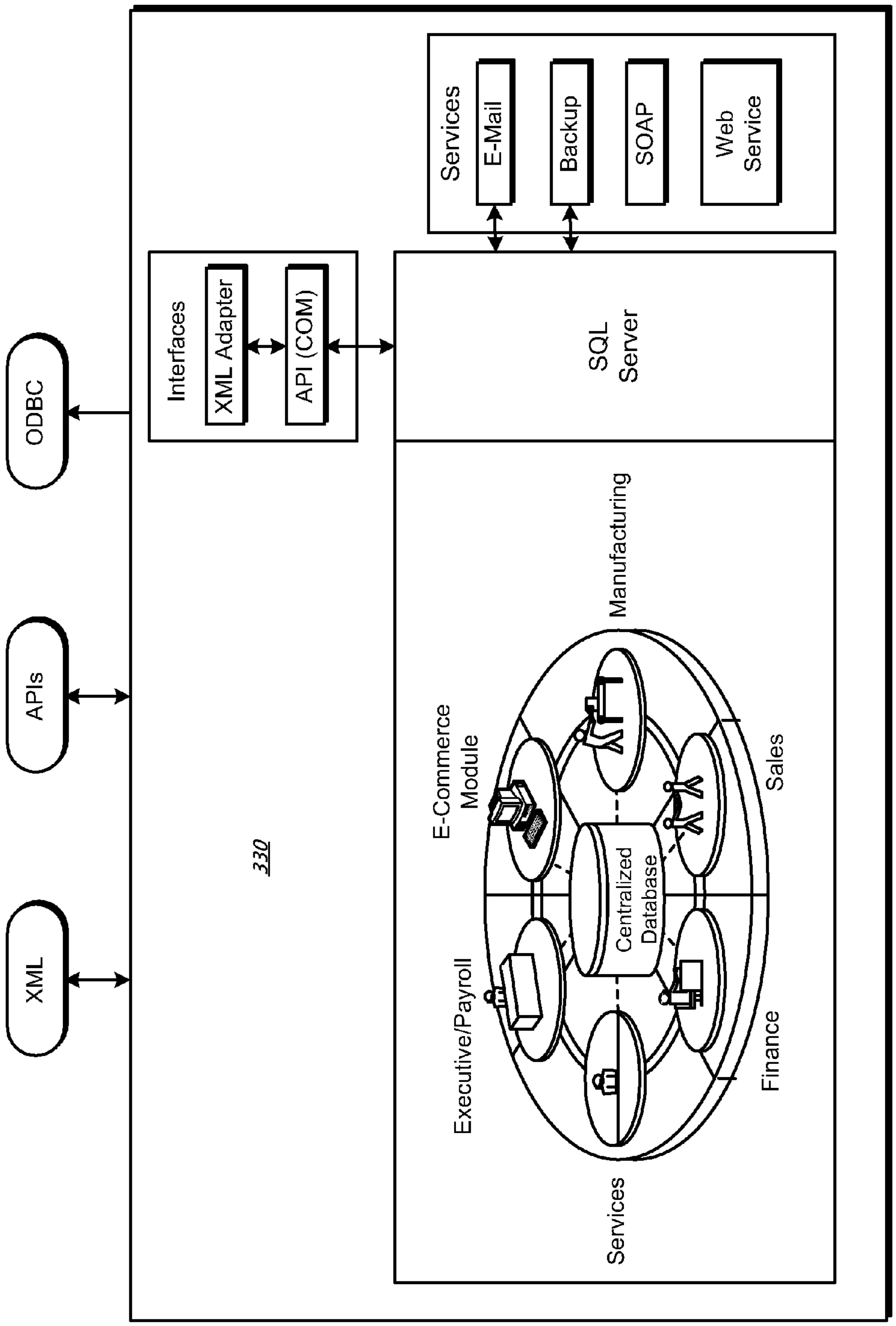
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
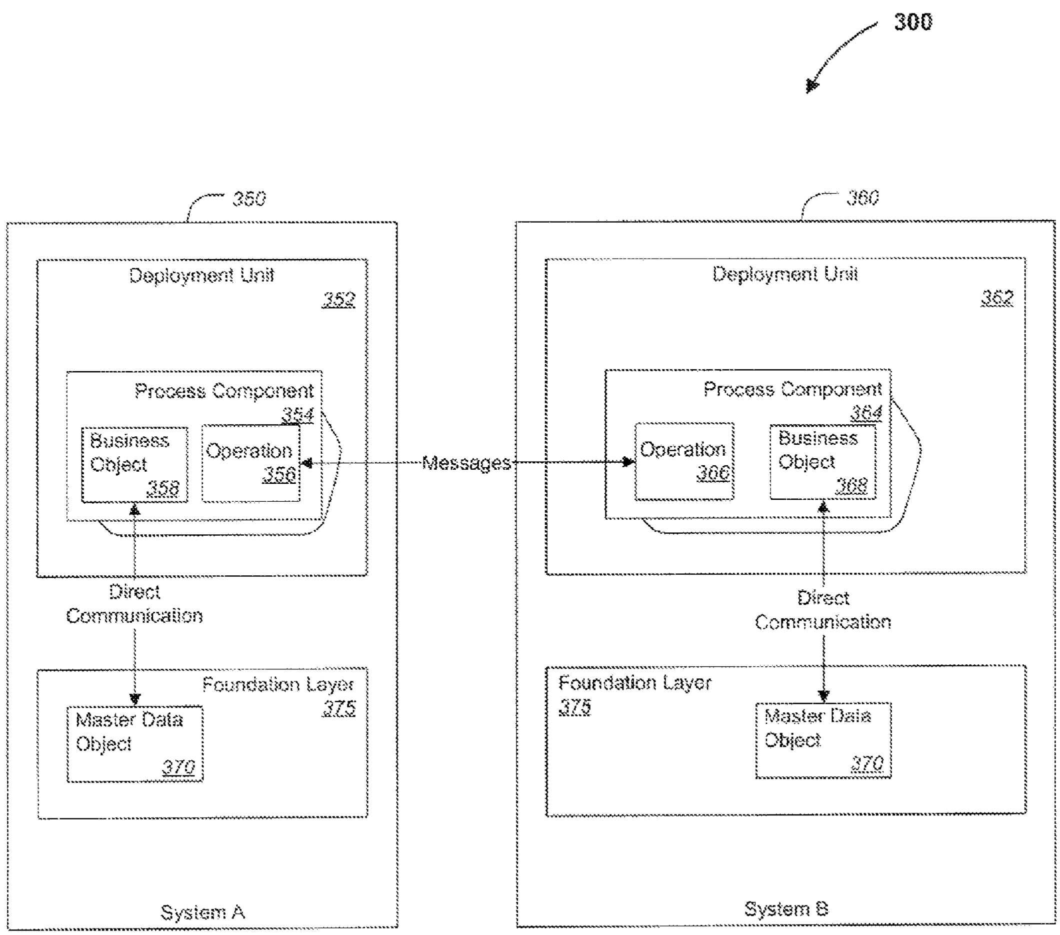

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Figure 5A:
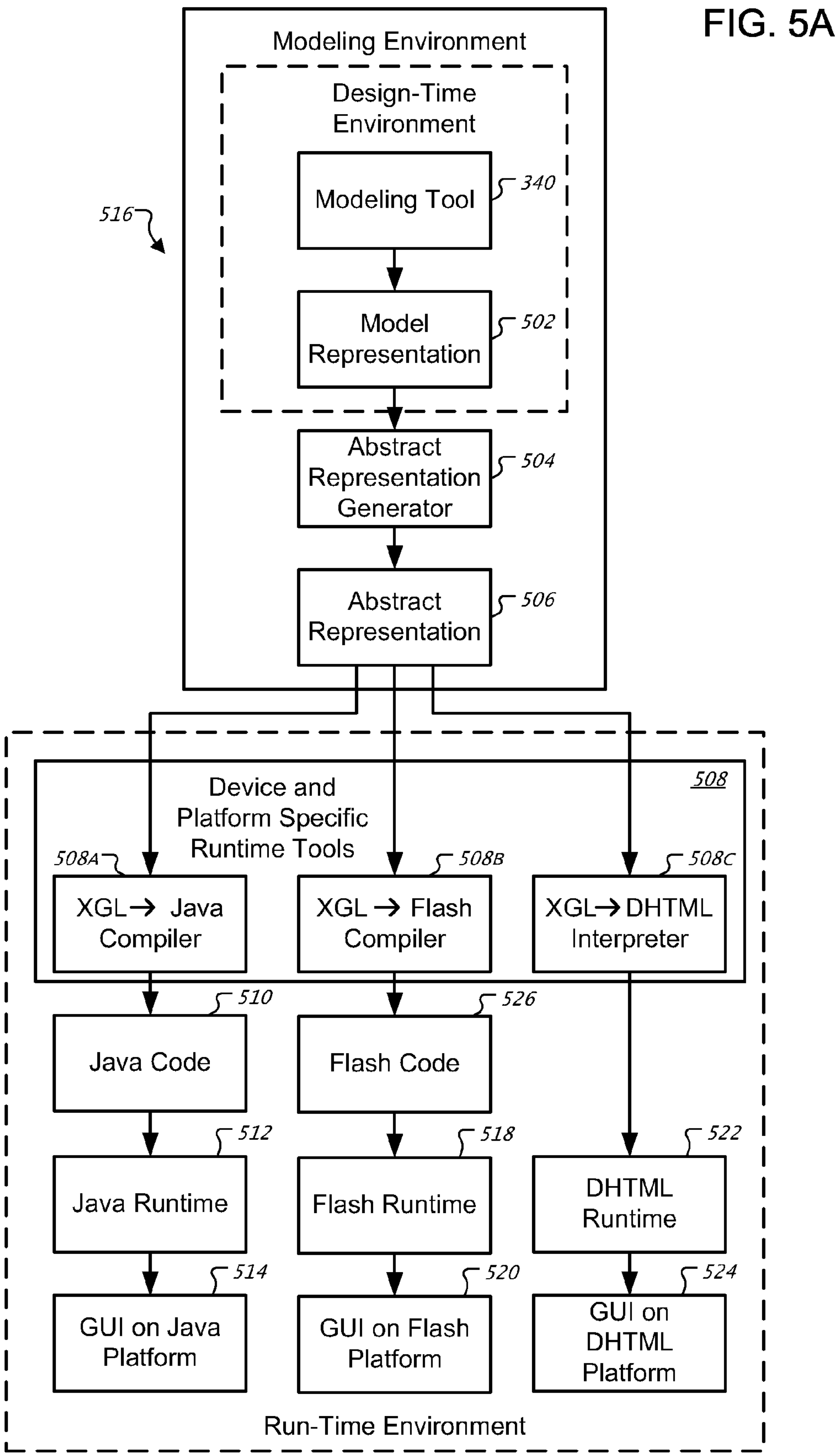
FIG. 5A depicts an example development environment in accordance with one embodiment of FIG. 1.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding. FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
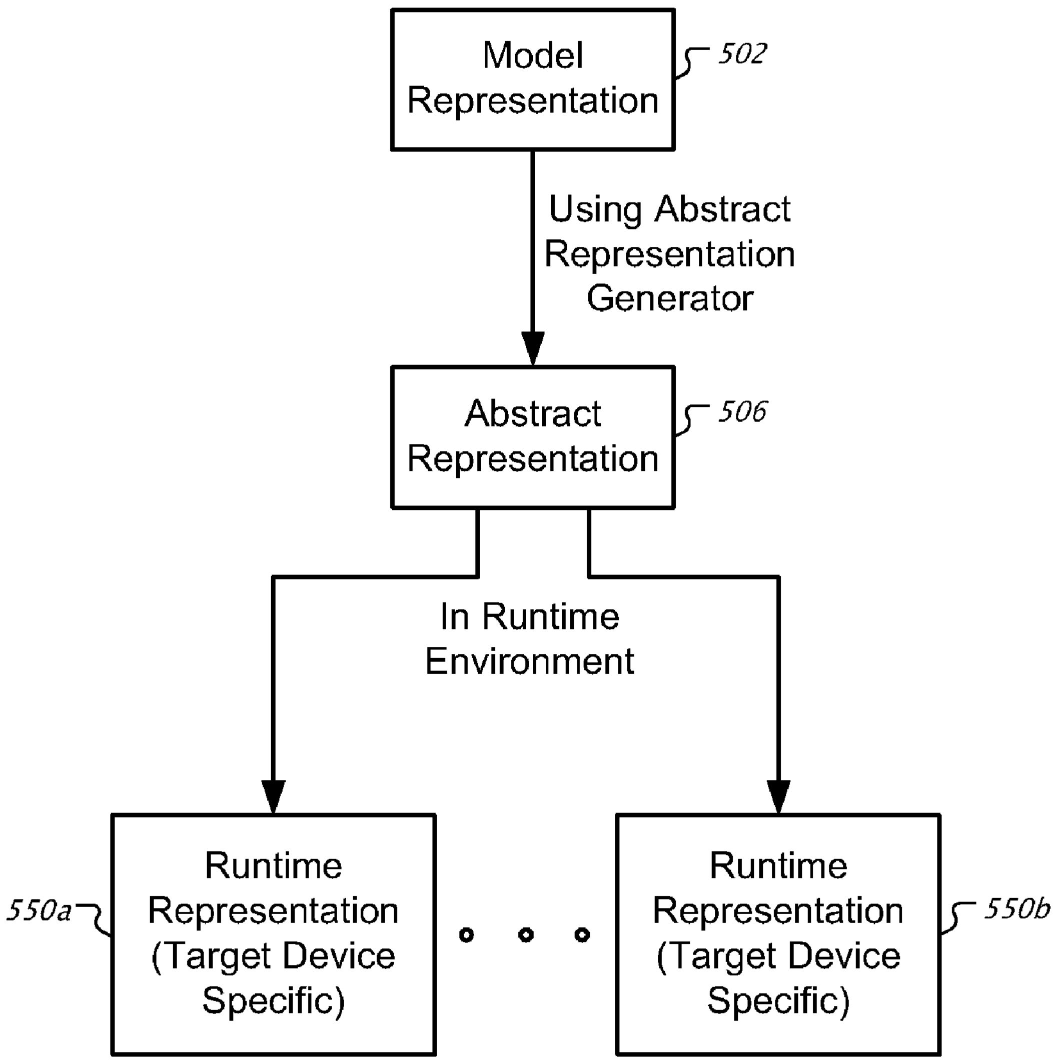
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
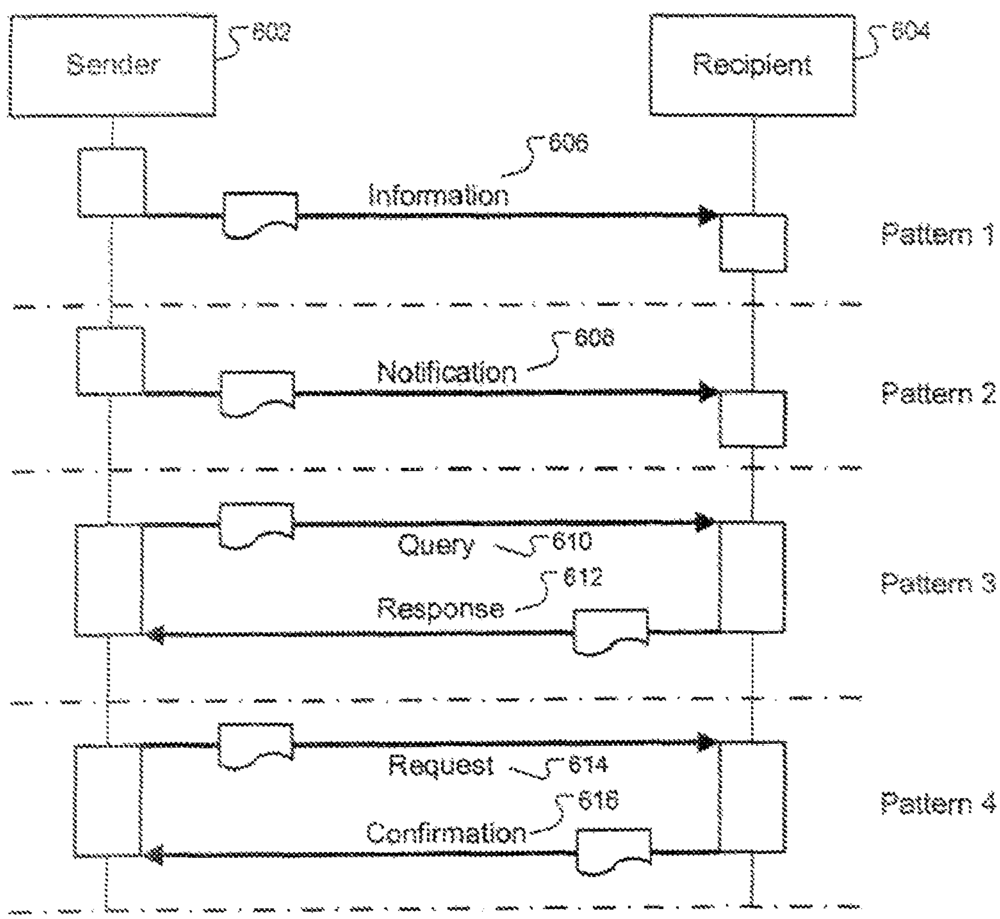
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
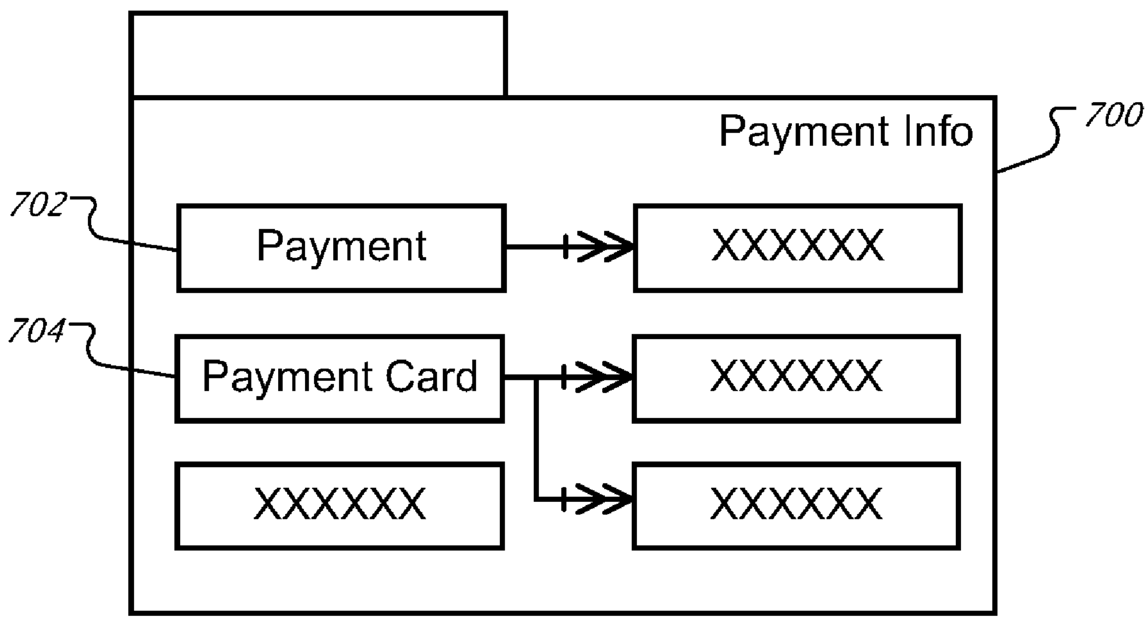
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
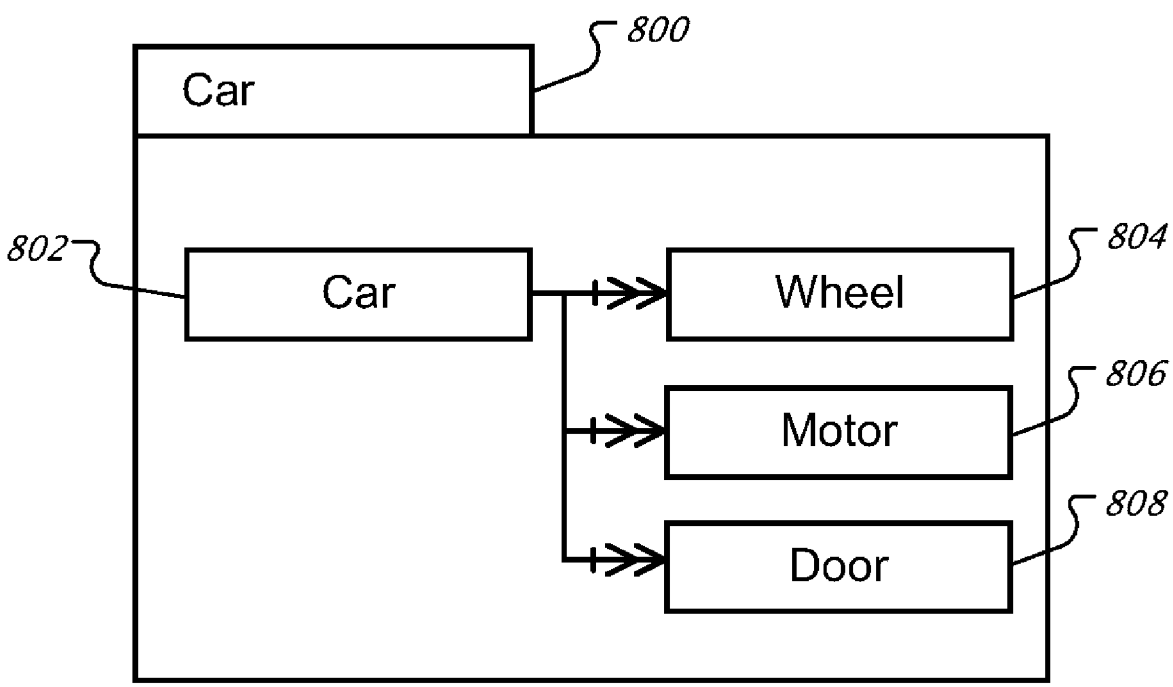
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
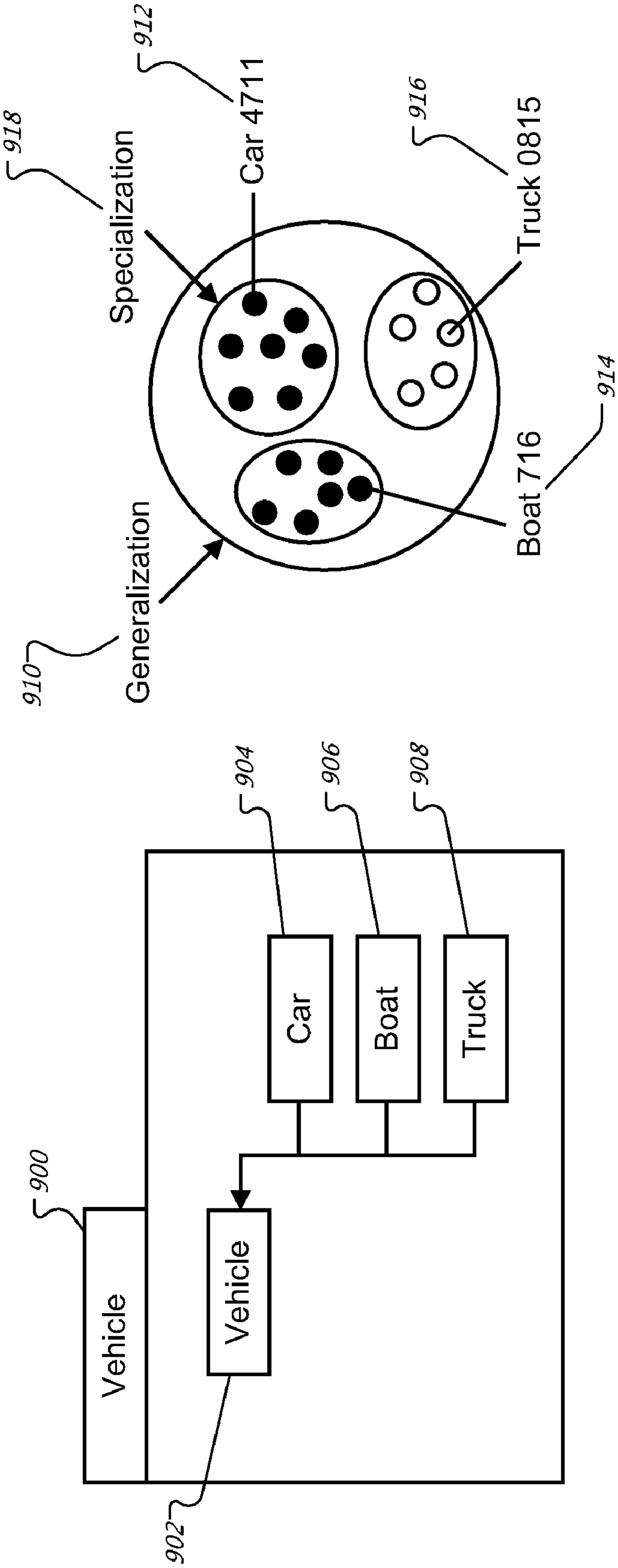
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
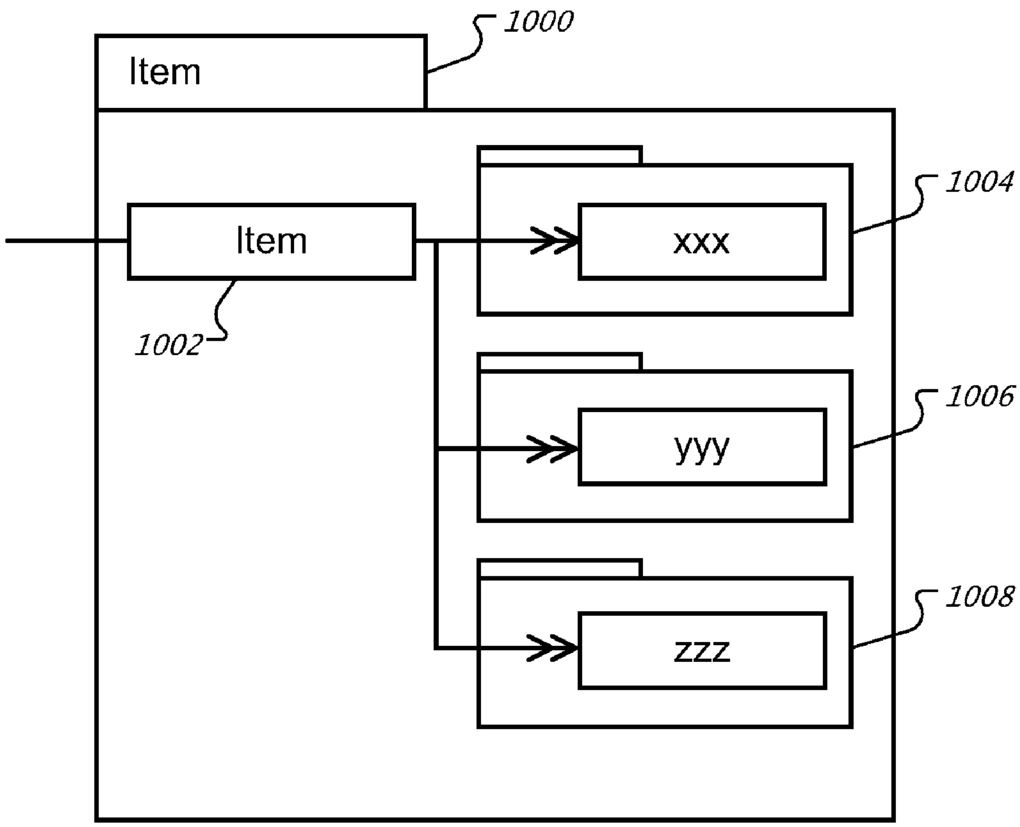
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
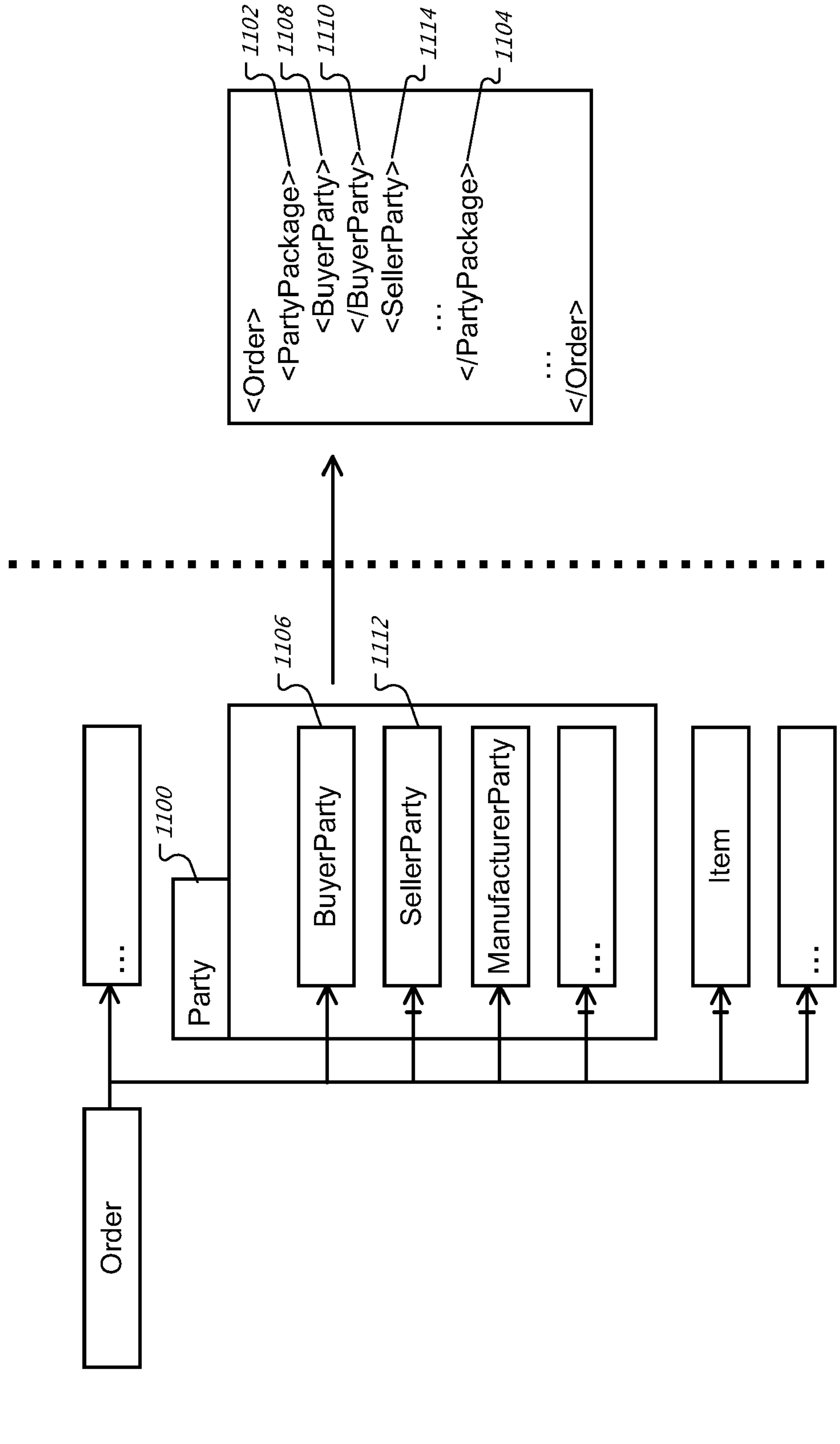
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
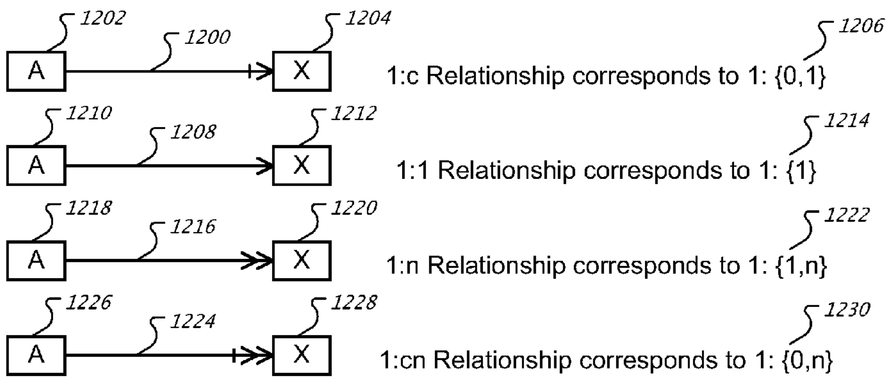
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
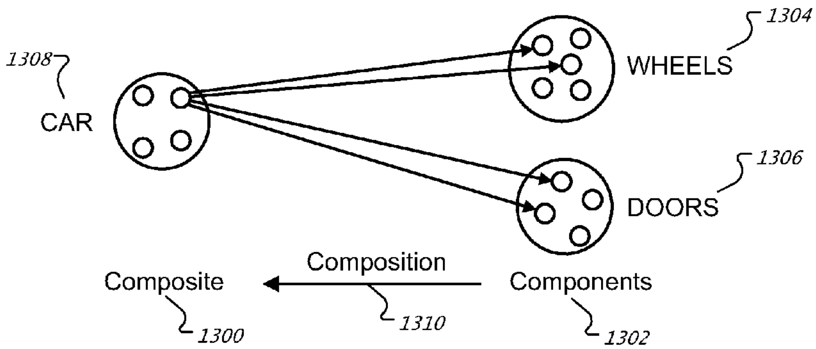
FIG. 13 depicts an example of a composition in accordance with methods and systems consistent with the subject matter described herein.
Figure 14:
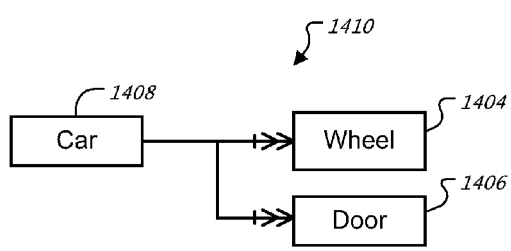
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
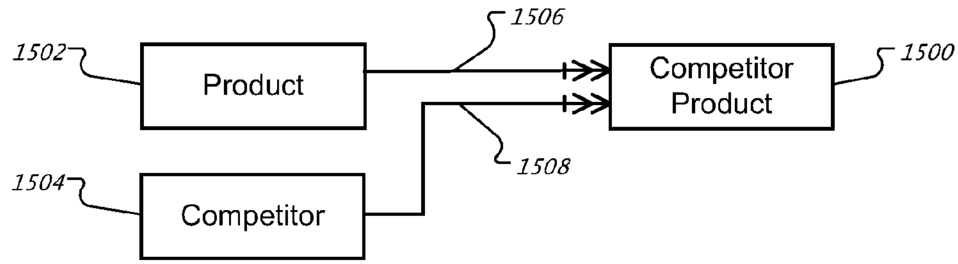
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
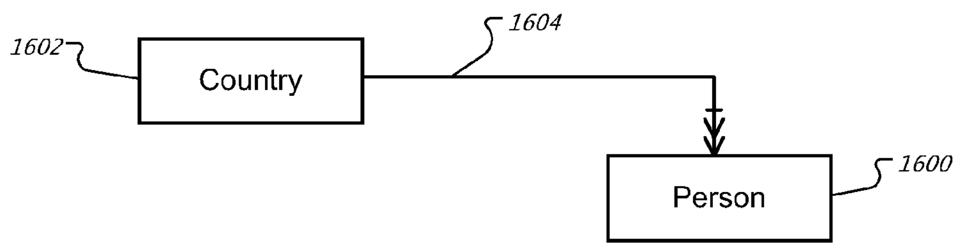
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
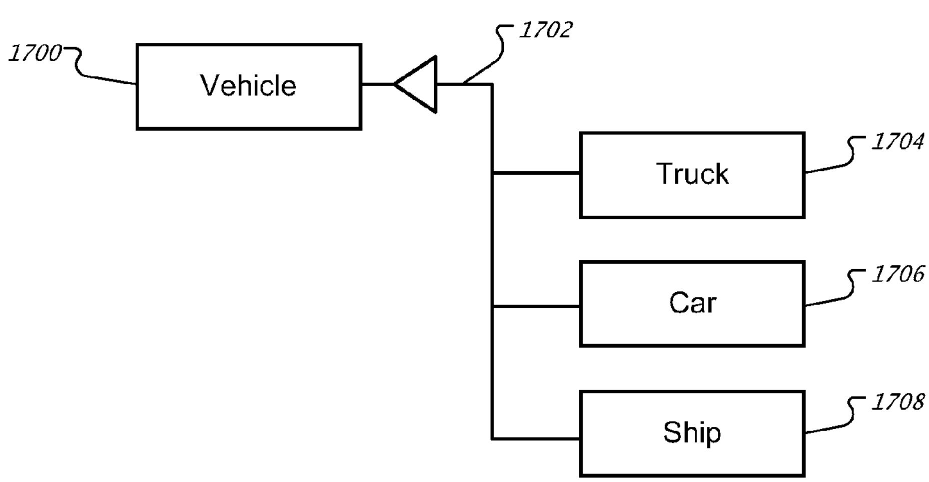
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
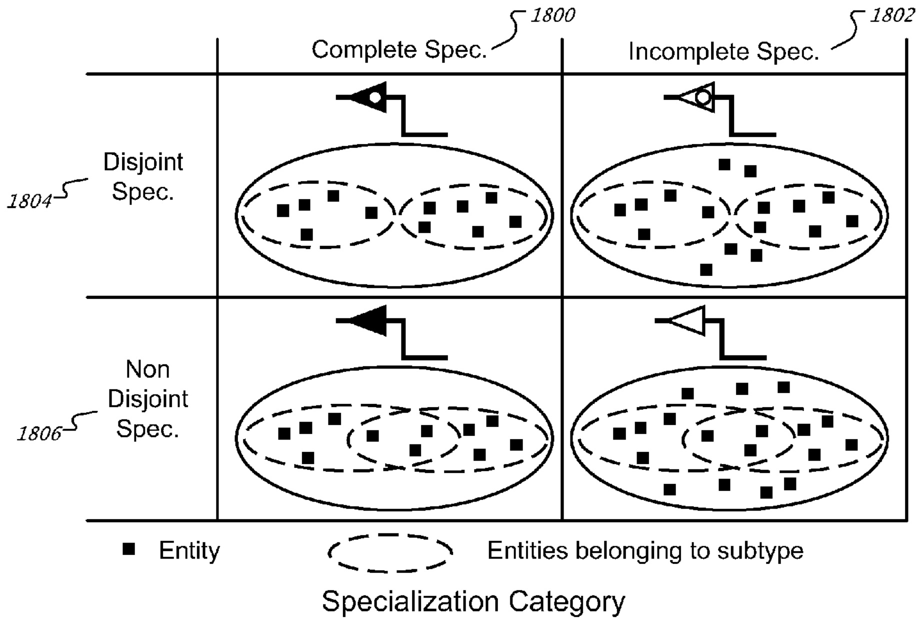
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
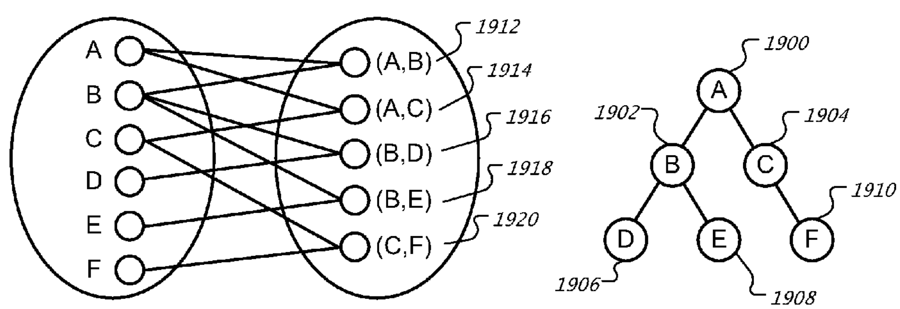
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
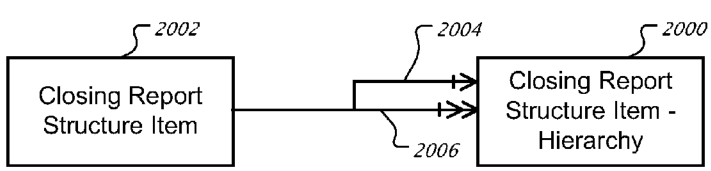
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
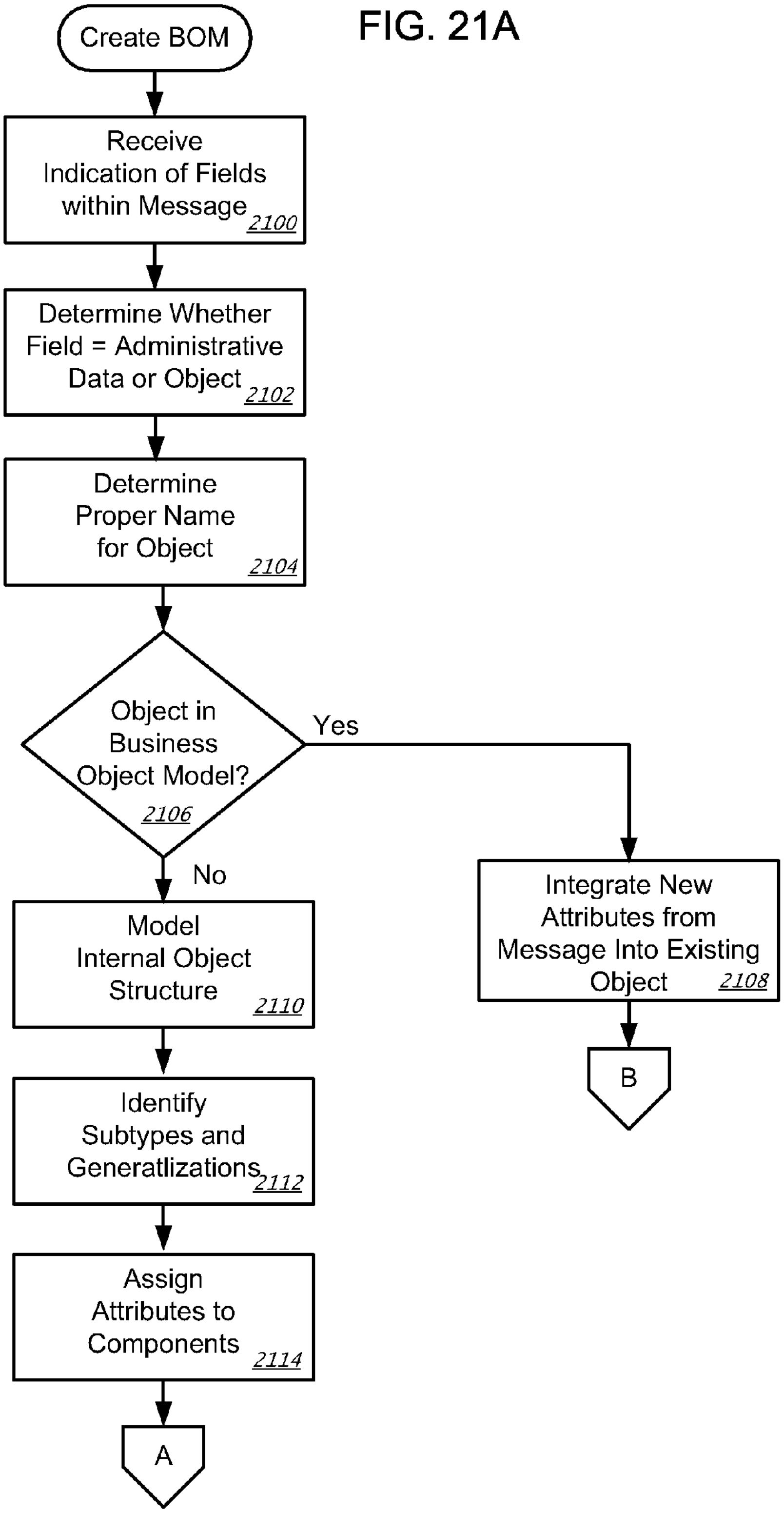
FIGS. 21A-B depict a flow diagram of the steps performed to create a business object model in accordance with methods and systems consistent with the subject matter described herein.
Figure 21B:
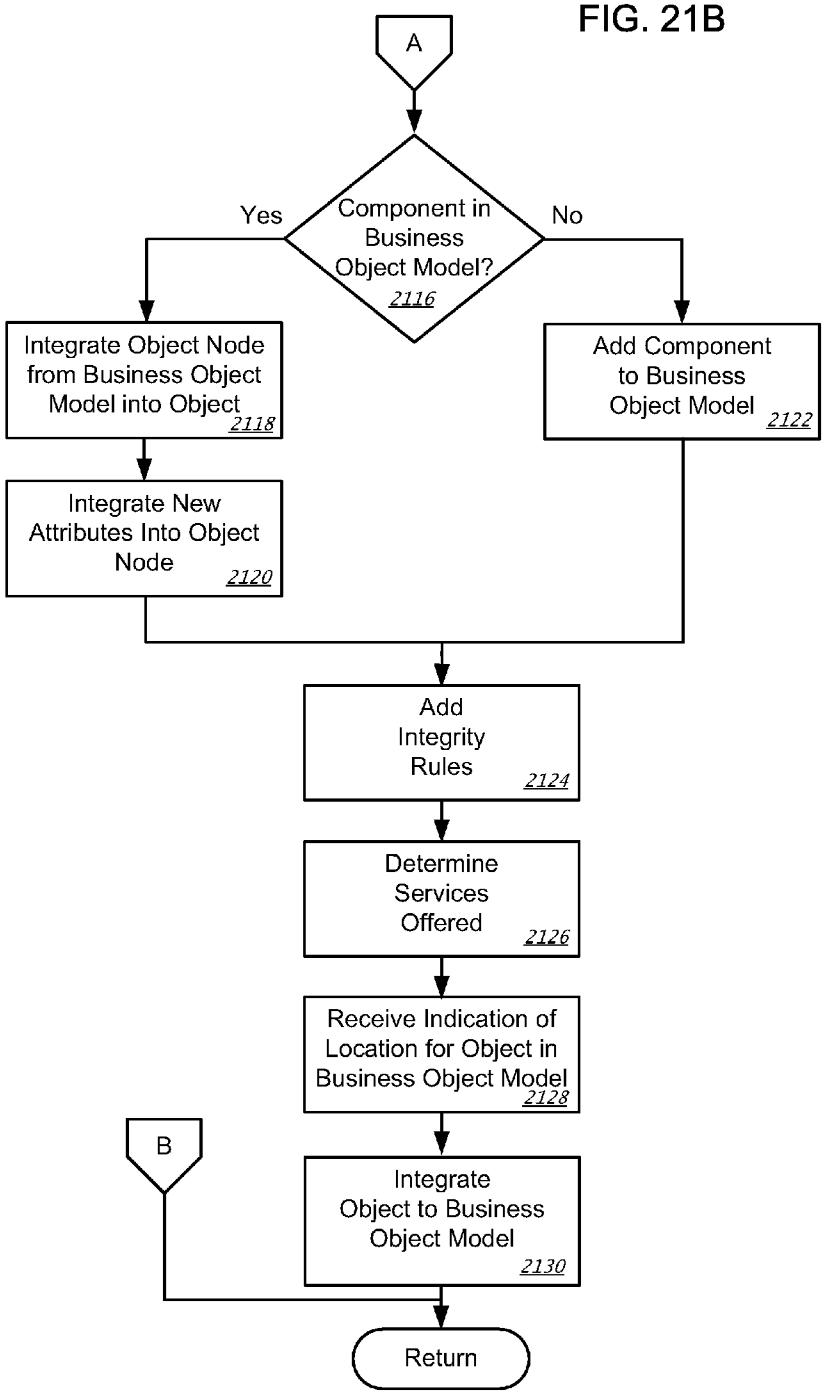

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |

-continued

| |
|---|
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase Order | | |
| AdditionalID | | | |
| PostingDate | | | |
| LastChangeDate | | | |
| AcceptanceStatus | | | |
| Note | | | |
| CompleteTransmission Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof Message | | | |
| FollowUpActivity | | | |
| ItemID | | Purchase Order Item | |
| ParentItemID | | | |
| HierarchyType | | | |
| ProductID | | | Product |
| ProductType | | | |
| ProductNote | | | |
| ProductCategoryID | | | ProductCategory |
| Amount | | | |
| BaseQuantity | | | |
| ConfirmedAmount | | | |
| ConfirmedBaseQuantity | | | |
| ItemBuyer | | | Buyer |
| ItemBuyerOrganisation Name | | | |
| Person Name | | | |
| FunctionalTitle | | | |
| DepartmentName | | | |
| CountryCode | | | |

-continued

| | |
|---|---|
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0..1 |
| | | Address | | 0..1 |
| | | ContactPerson | | 0..1 |
| | | | Address | 0..1 |
| | Seller | | | 0..1 |
| | Location | | | 0..1 |
| | | Address | | 0..1 |
| | DeliveryTerms | | | 0..1 |
| | | Incoterms | | 0..1 |
| | | PartialDelivery | | 0..1 |
| | | Quantity-Tolerance | | 0..1 |
| | | Transport | | 0..1 |
| | CashDiscount-Terms | | | 0..1 |
| | | MaximumCash-Discount | | 0..1 |
| | | NormalCash-Discount | | 0..1 |
| | PaymentForm | | | 0..1 |
| | | PaymentCard | | 0..1 |
| | Attachment | | | 0..n |
| | Description | | | 0..1 |
| | Confirmation Description | | | 0..1 |
| | Item | | | 0..n |
| | | Hierarchy-Relationship | | 0..1 |
| | | Product | | 0..1 |
| | | ProductCategory | | 0..1 |
| | | Price | | 0..1 |
| | | | NetunitPrice | 0..1 |
| | | ConfirmedPrice | | 0..1 |
| | | | NetunitPrice | 0..1 |
| | | Buyer | | 0..1 |
| | | Seller | | 0..1 |
| | | Location | | 0..1 |
| | | DeliveryTerms | | 0..1 |
| | | Attachment | | 0..n |
| | | Description | | 0..1 |
| | | Confirmation-Description | | 0..1 |
| | | ScheduleLine | | 0..n |
| | | | DeliveryPeriod | 1 |
| | | Confirmed-ScheduleLine | | 0..n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | |
|---|---|---|---|---|
| PurchaseOrder | | | | 1 |
| | PurchaseOrder Update | | | |
| | | PurchaseOrder Request | | |
| | | PurchaseOrder Change | | |
| | | PurchaseOrder Confirmation | | |
| | PurchaseOrder Cancellation | | | |
| | PurchaseOrder Information | | | |
| | Party | | | |
| | | BuyerParty | | 0..1 |
| | | | Address | 0..1 |

-continued

| | | | | |
|---|---|---|---|---|
| | | ContactPerson | | 0..1 |
| | | | Address | 0..1 |
| | SellerParty | | | 0..1 |
| Location | | | | |
| | ShipToLocation | | | 0..1 |
| | | Address | | 0..1 |
| | ShipFromLocation | | | 0..1 |
| | | Address | | 0..1 |
| DeliveryTerms | | | | 0..1 |
| | Incoterms | | | 0..1 |
| | PartialDelivery | | | 0..1 |
| | QuantityTolerance | | | 0..1 |
| | Transport | | | 0..1 |
| CashDiscount Terms | | | | 0..1 |
| | MaximumCash Discount | | | 0..1 |
| | NormalCash-Discount | | | 0..1 |
| PaymentForm | | | | 0..1 |
| | PaymentCard | | | 0..1 |
| Attachment | | | | 0..n |
| Description | | | | 0..1 |
| Confirmation | | | | 0..1 |
| Description | | | | |
| Item | | | | 0..n |
| | HierarchyRelationship | | | 0..1 |
| | Product | | | 0..1 |
| | ProductCategory | | | 0..1 |
| | Price | | | 0..1 |
| | | NetunitPrice | | 0..1 |
| | ConfirmedPrice | | | 0..1 |
| | | NetunitPrice | | 0..1 |
| | Party | | | |
| | | BuyerParty | | 0..1 |
| | | SellerParty | | 0..1 |
| | Location | | | |
| | | ShipTo Location | | 0..1 |
| | | ShipFrom Location | | 0..1 |
| | DeliveryTerms | | | 0..1 |
| | Attachment | | | 0..n |
| | Description | | | 0..1 |
| | Confirmation | | | 0..1 |
| | Description | | | |
| | ScheduleLine | | | 0..n |
| | | Delivery Period | | 1 |
| | ConfirmedScheduleLine | | | 0..n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0..1 |
| | BuyerPosting DateTime | 0..1 |
| | BuyerLast ChangeDate Time | 0..1 |
| | SellerPosting DateTime | 0..1 |
| | SellerLast ChangeDate Time | 0..1 |
| | Acceptance StatusCode | 0..1 |
| | Note | 0..1 |
| | ItemList | 0..1 |

-continued

| | | | |
|---|---|---|---|
| Complete Transmission Indicator | | | |
| BuyerParty | | | 0..1 |
| | StandardID | | 0..n |
| | BuyerID | | 0..1 |
| | SellerID | | 0..1 |
| | Address | | 0..1 |
| | ContactPerson | | 0..1 |
| | | BuyerID | 0..1 |
| | | SellerID | 0..1 |
| | | Address | 0..1 |
| SellerParty | | | 0..1 |
| Product | | | 0..1 |
| RecipientParty | | | |
| VendorParty | | | 0..1 |
| Manufacturer Party | | | 0..1 |
| BillToParty | | | 0..1 |
| PayerParty | | | 0..1 |

-continued

| | | | |
|---|---|---|---|
| CarrierParty | | | 0..1 |
| ShipTo Location | | | 0..1 |
| | StandardID | | 0..n |
| | BuyerID | | 0..1 |
| | SellerID | | 0..1 |
| | Address | | 0..1 |
| ShipFrom Location | | | 0..1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
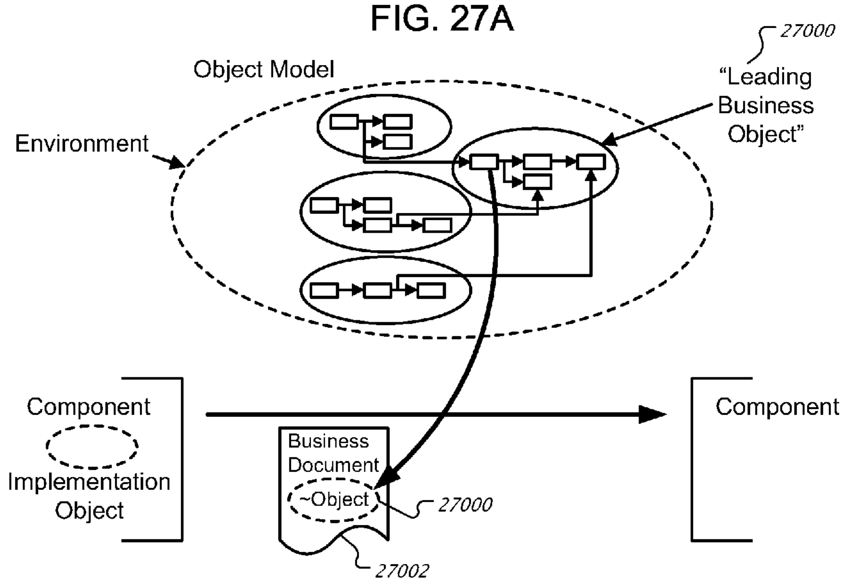
Figure 27B:
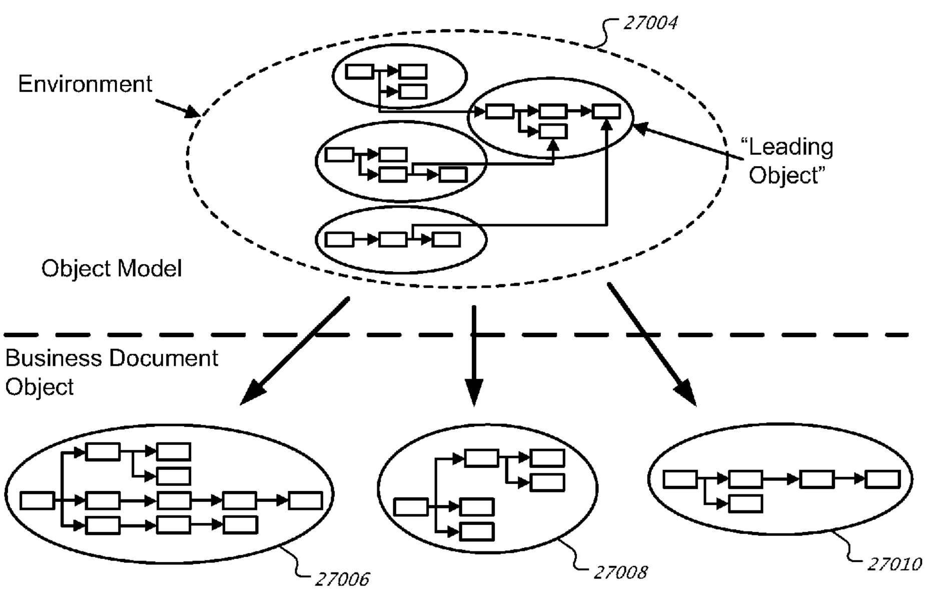

As illustrated in FIG. 27B, several business document objects 27006, 27008, and 27010 as overlapping views may be derived for a given leading object 27004. Each business document object results from the object model by hierarchization.

Figure 27C:
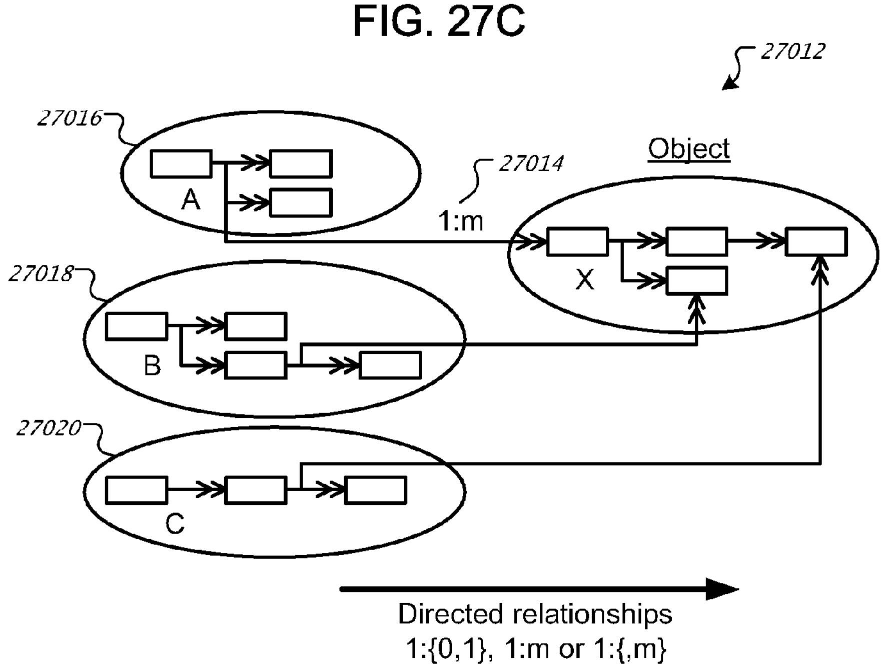

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
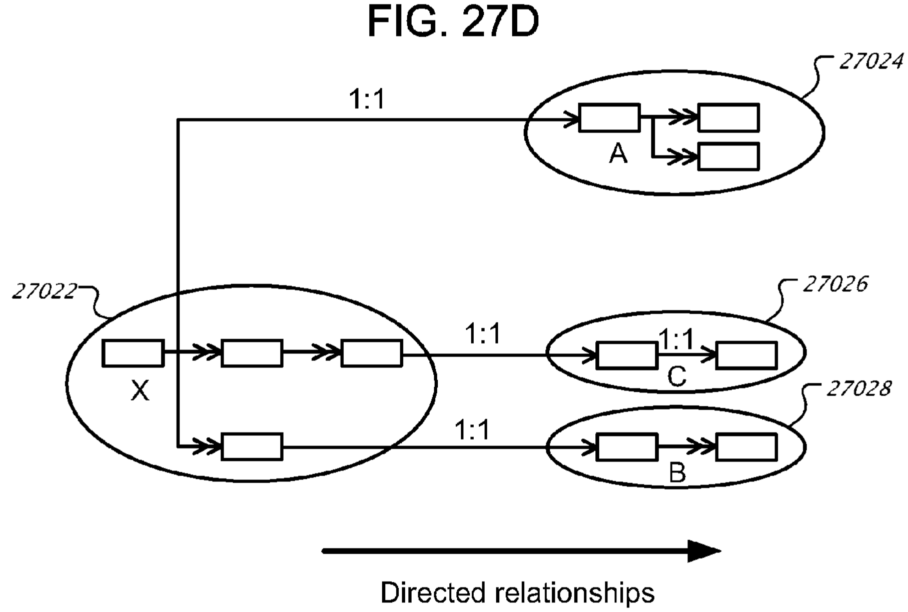

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
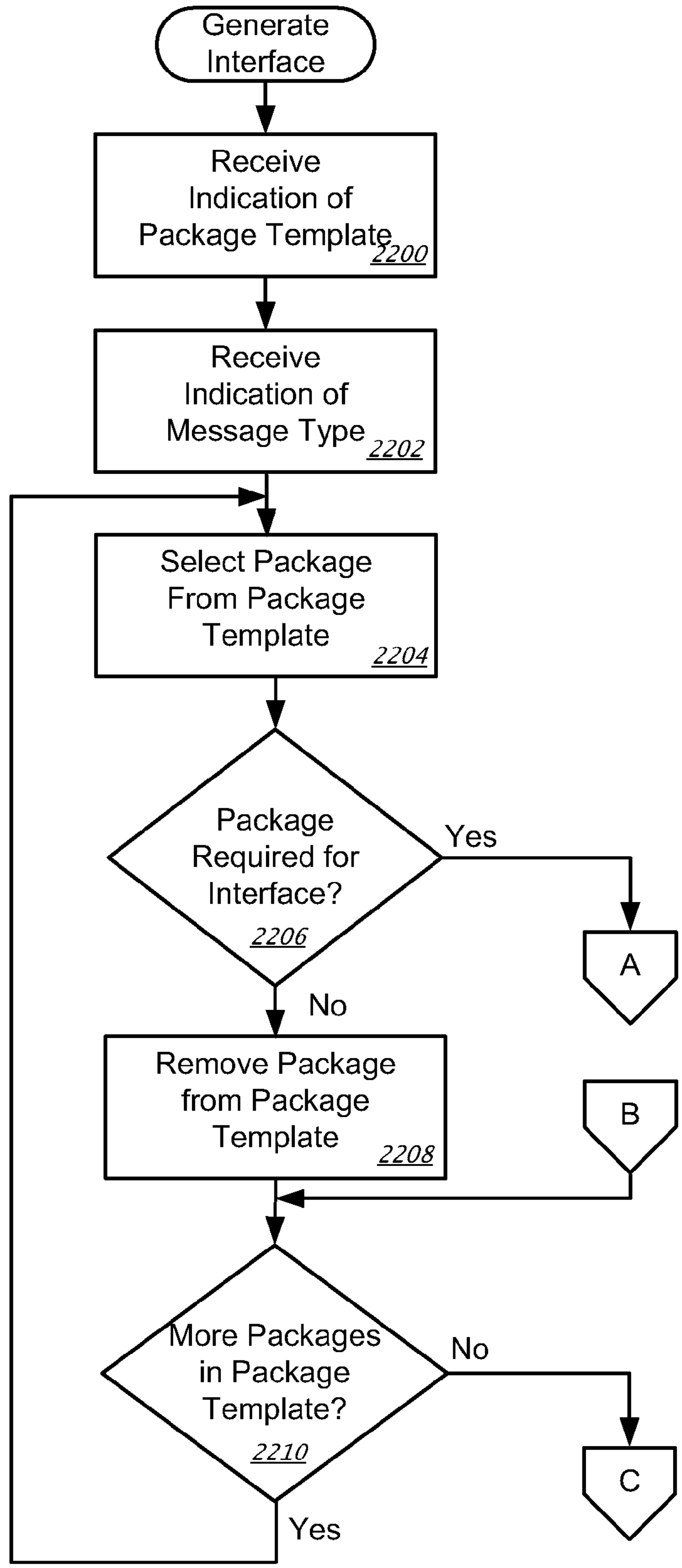
FIGS. 22A-F depict a flow diagram of the steps performed to generate an interface from the business object model in accordance with methods and systems consistent with the subject matter described herein.
Figure 22B:
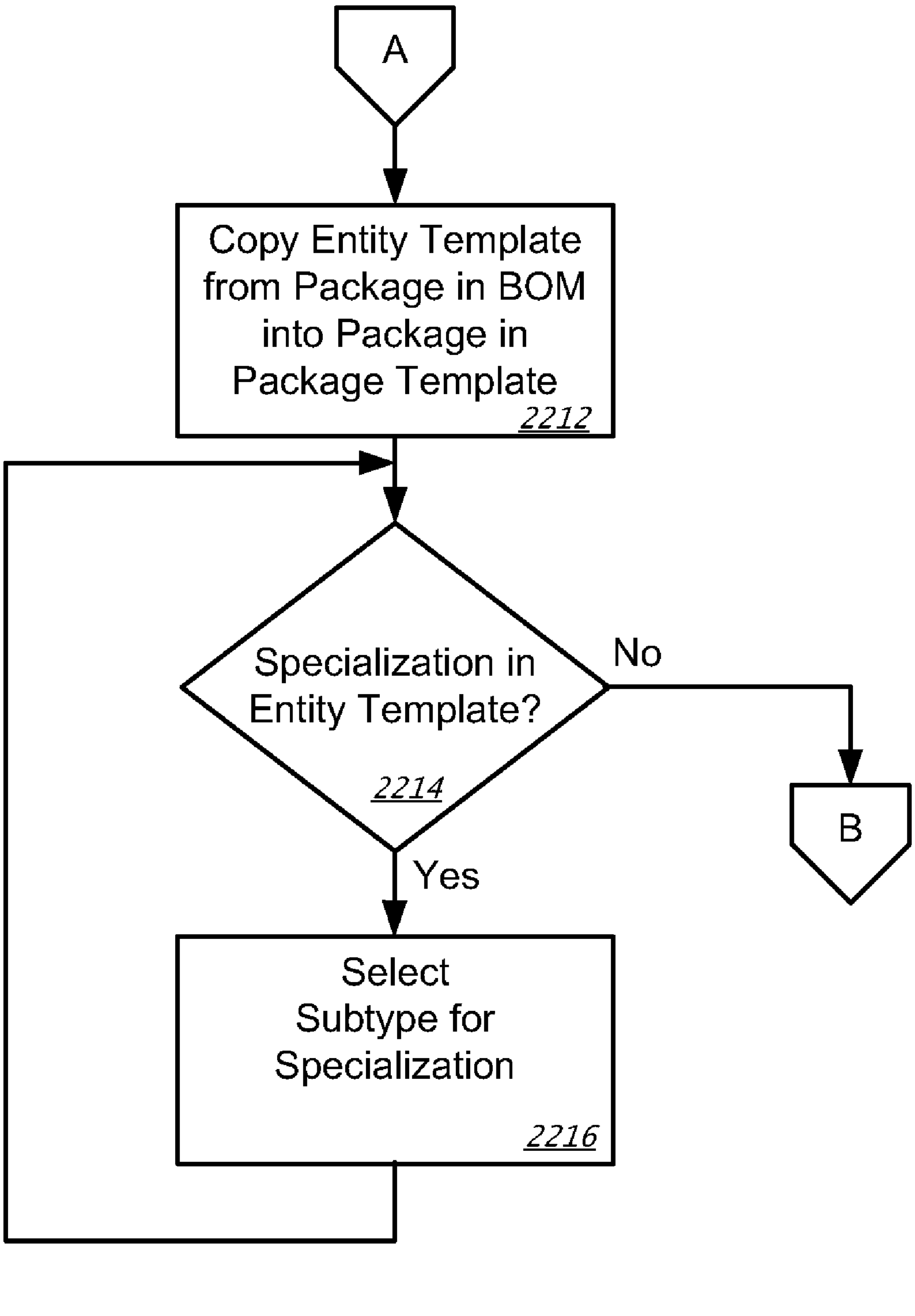
Figure 22C:
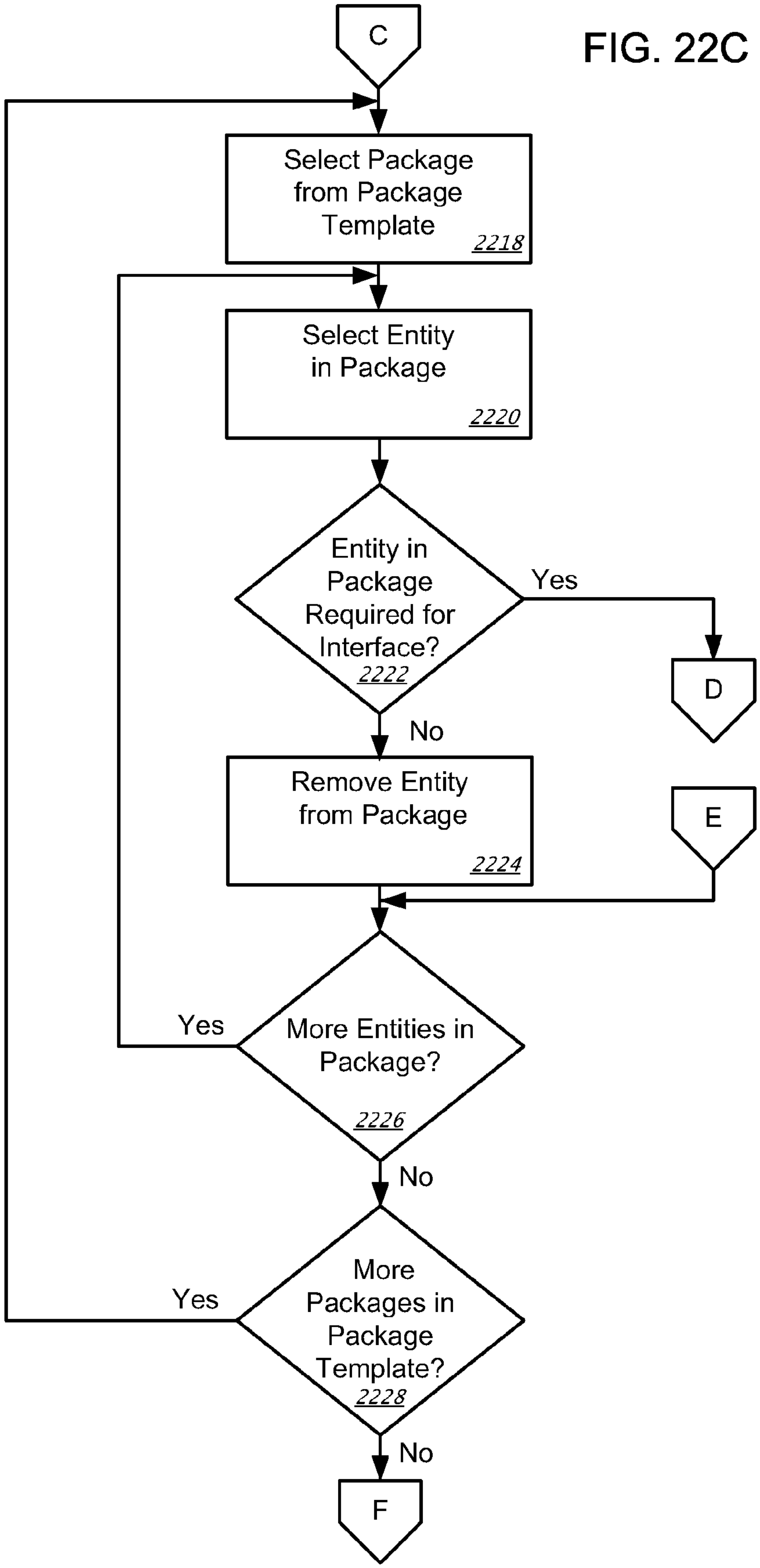

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
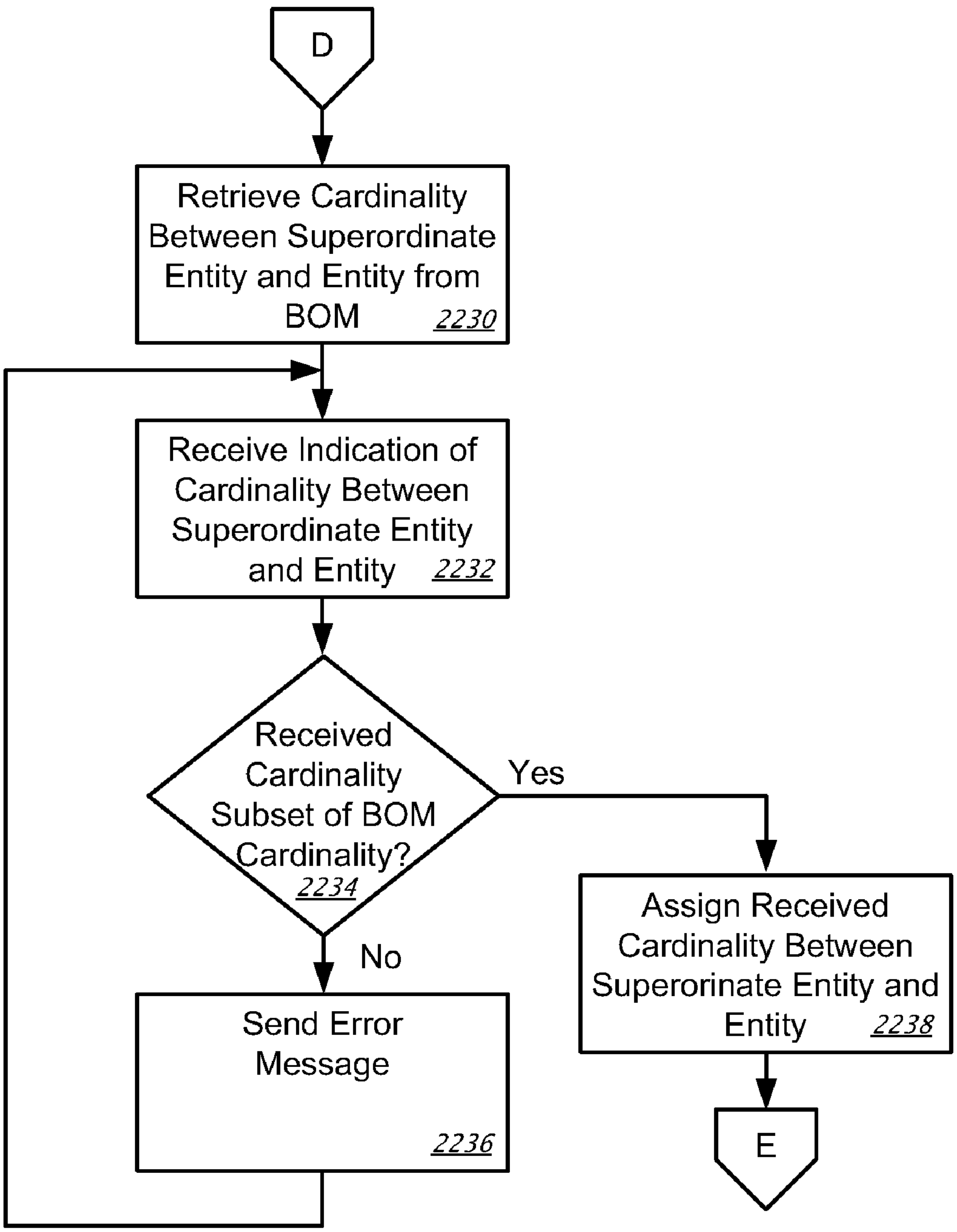

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
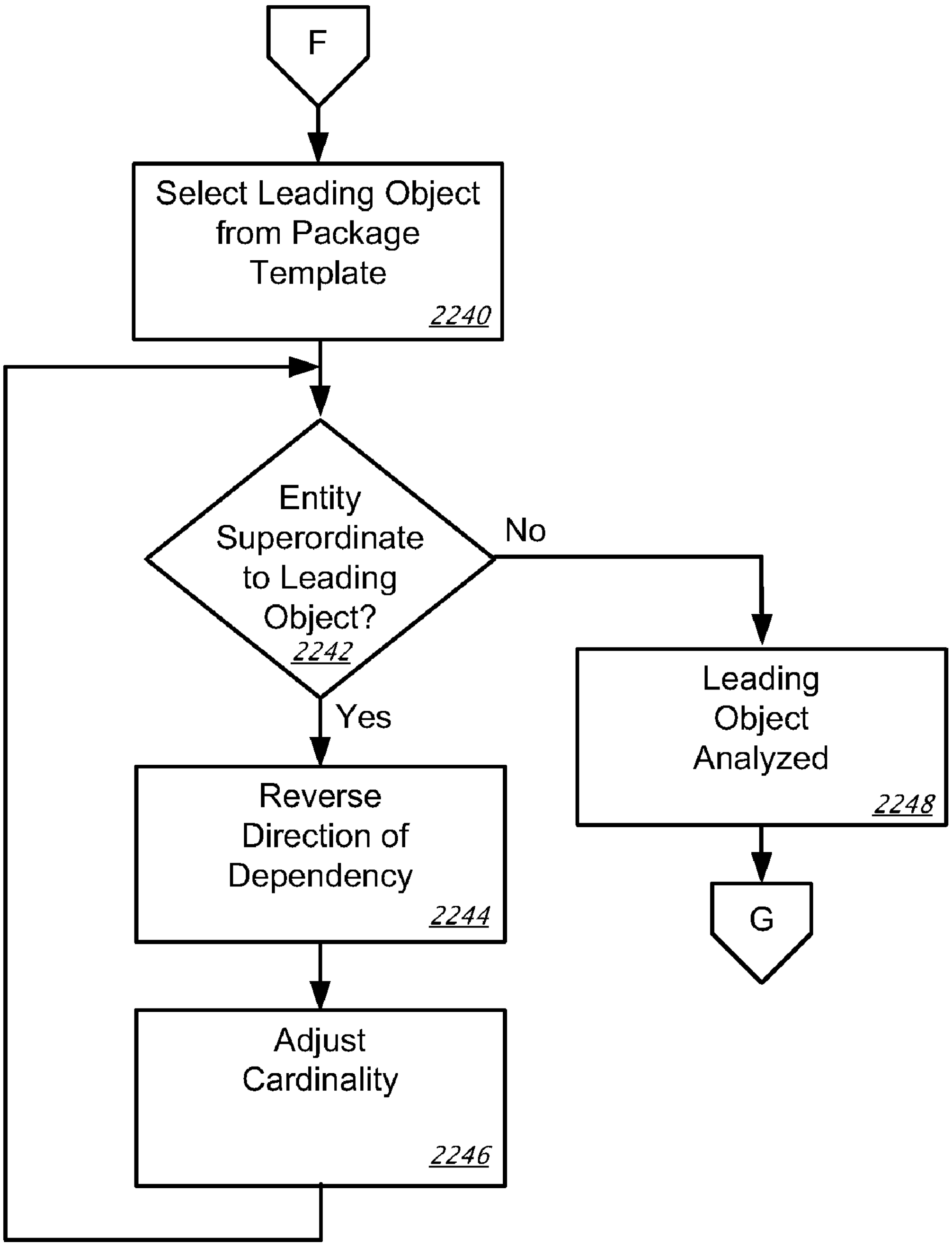

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
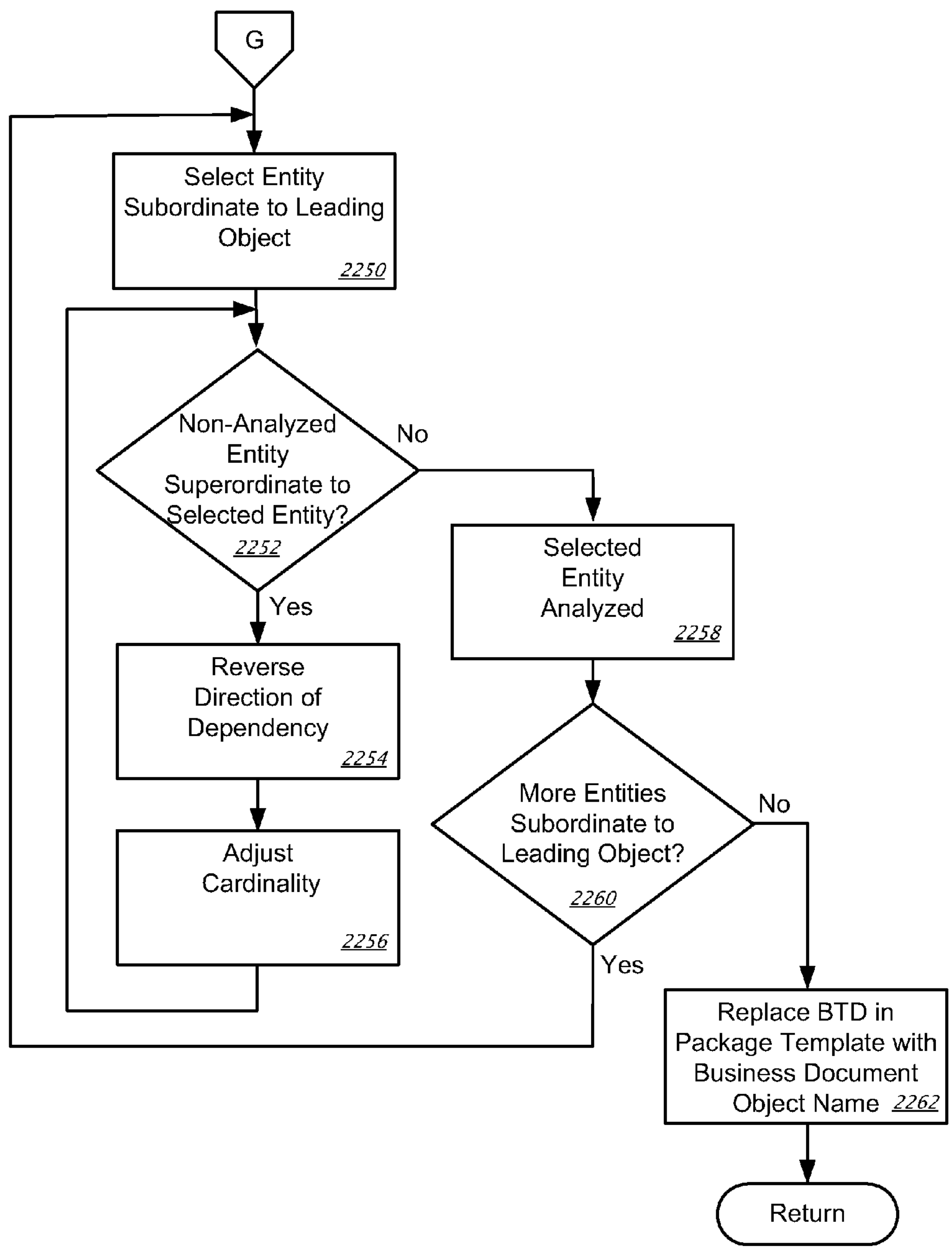

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
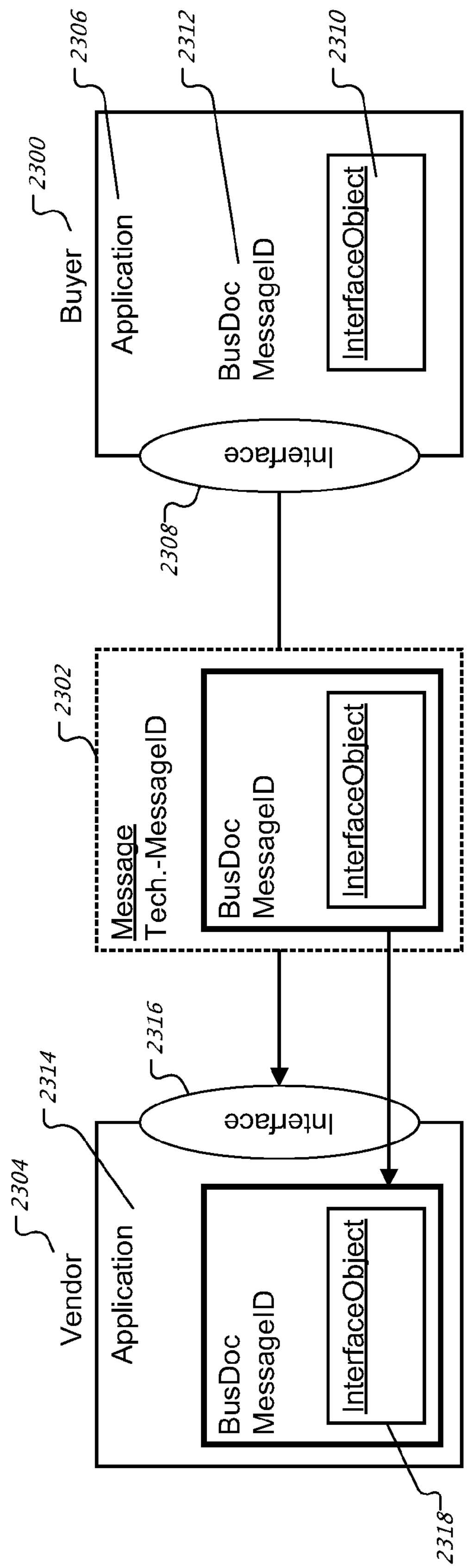
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
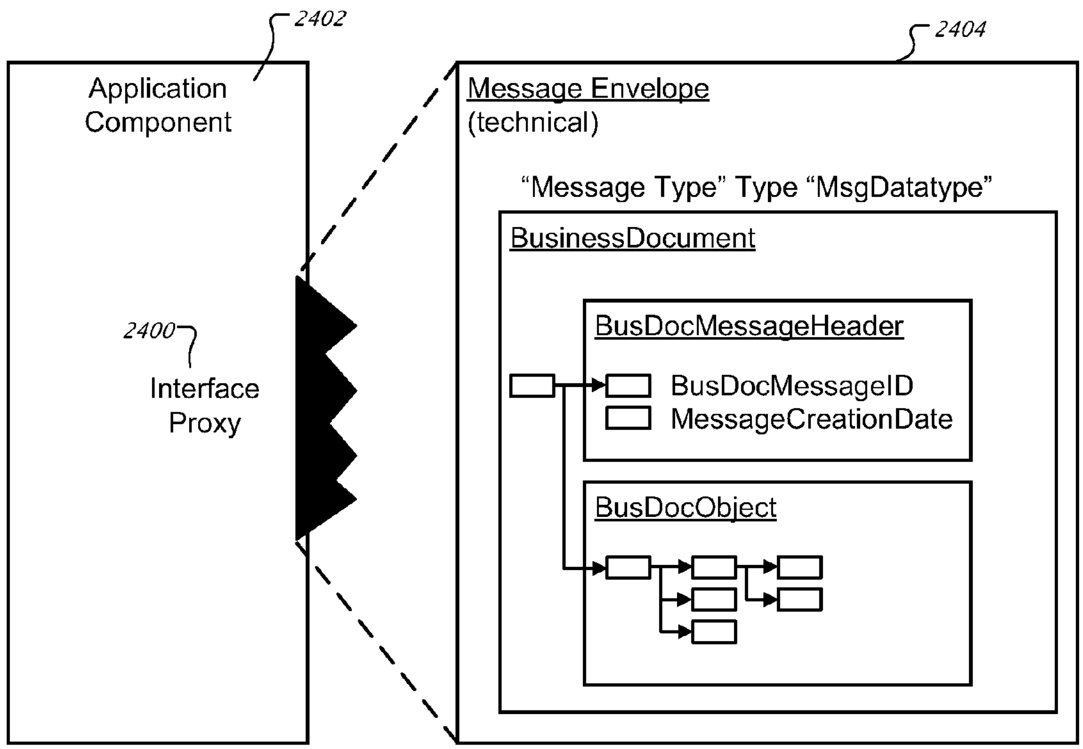
FIG. 24 depicts an interface proxy in accordance with methods and systems consistent with the subject matter described herein.
Figure 25:
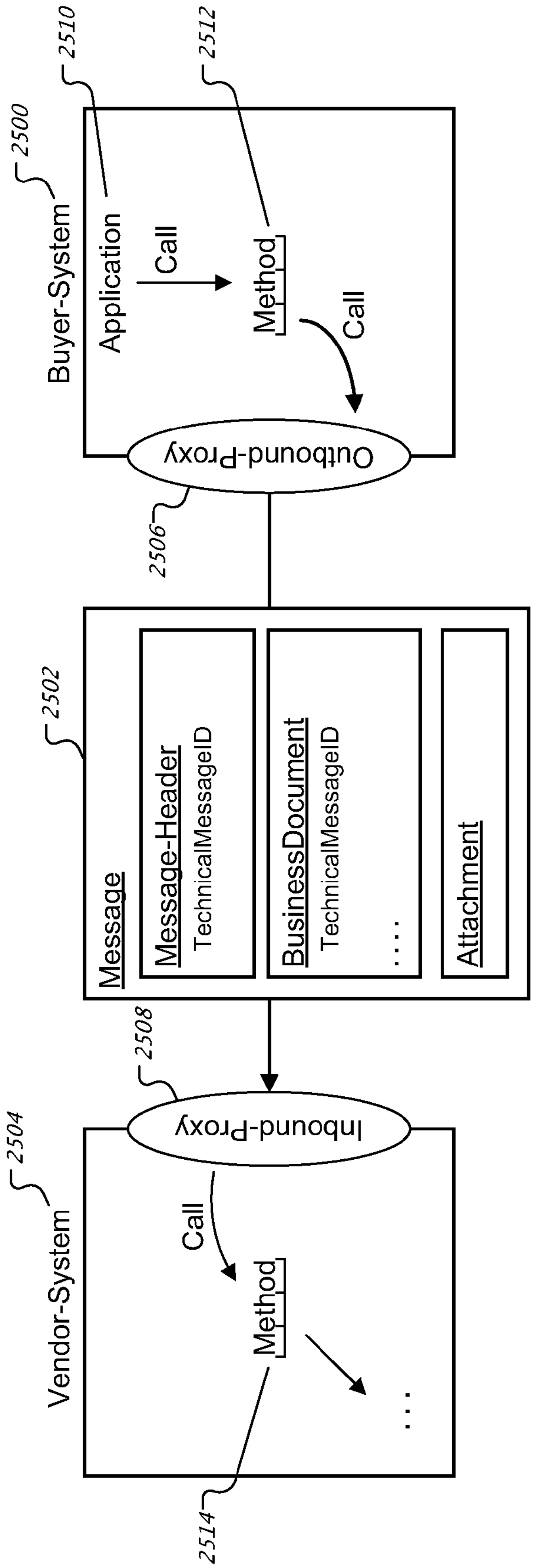
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
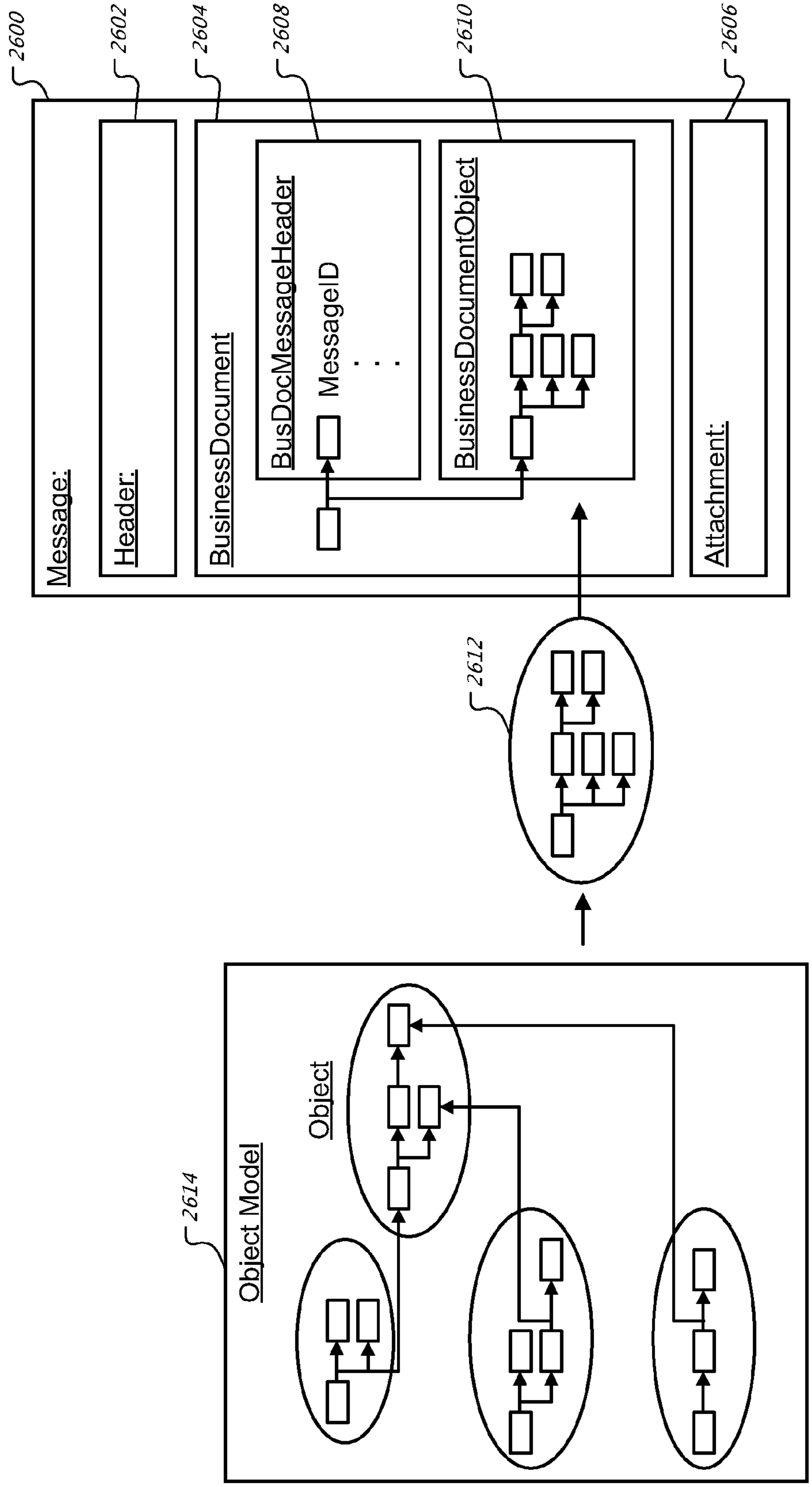
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
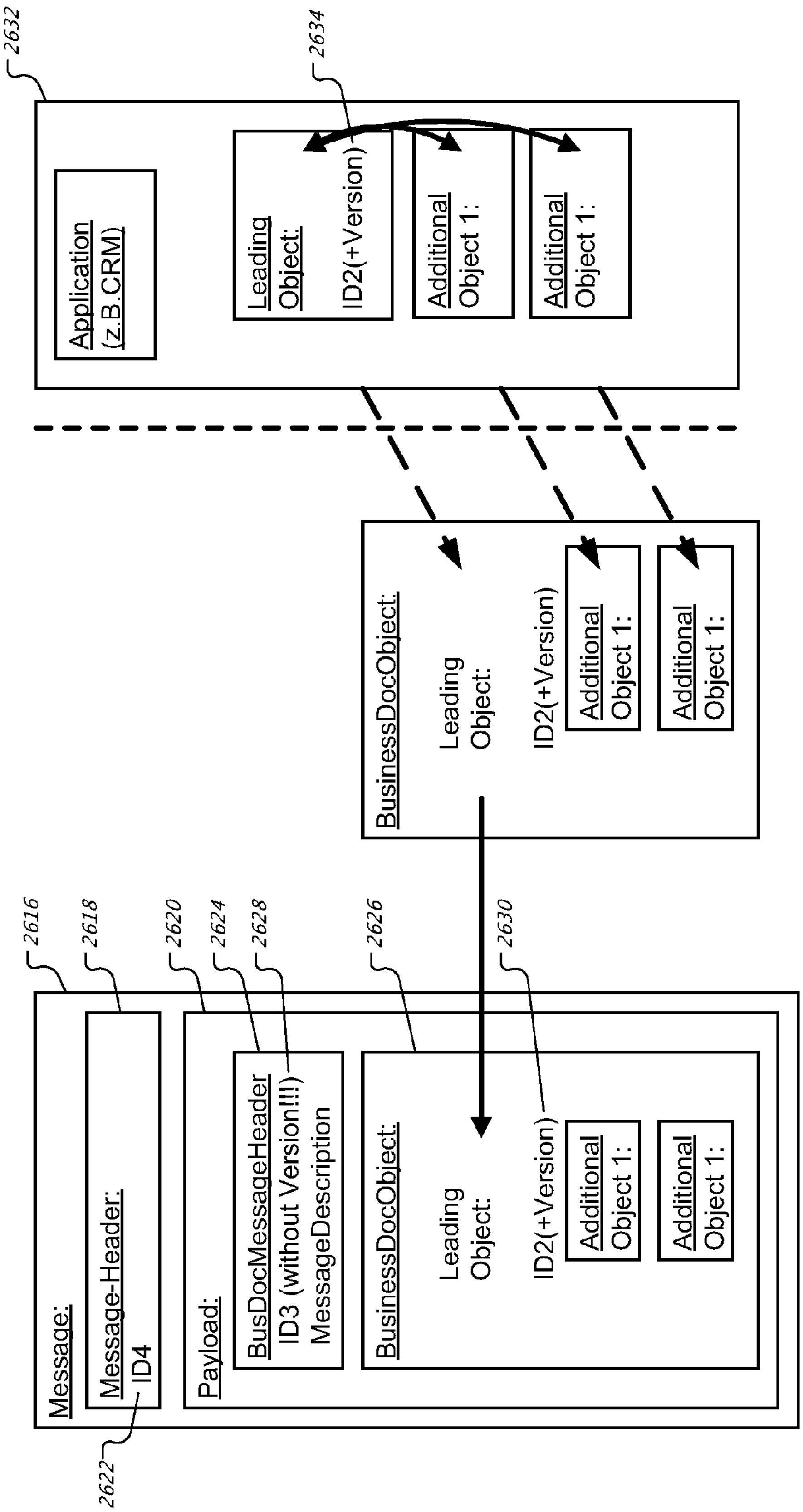
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
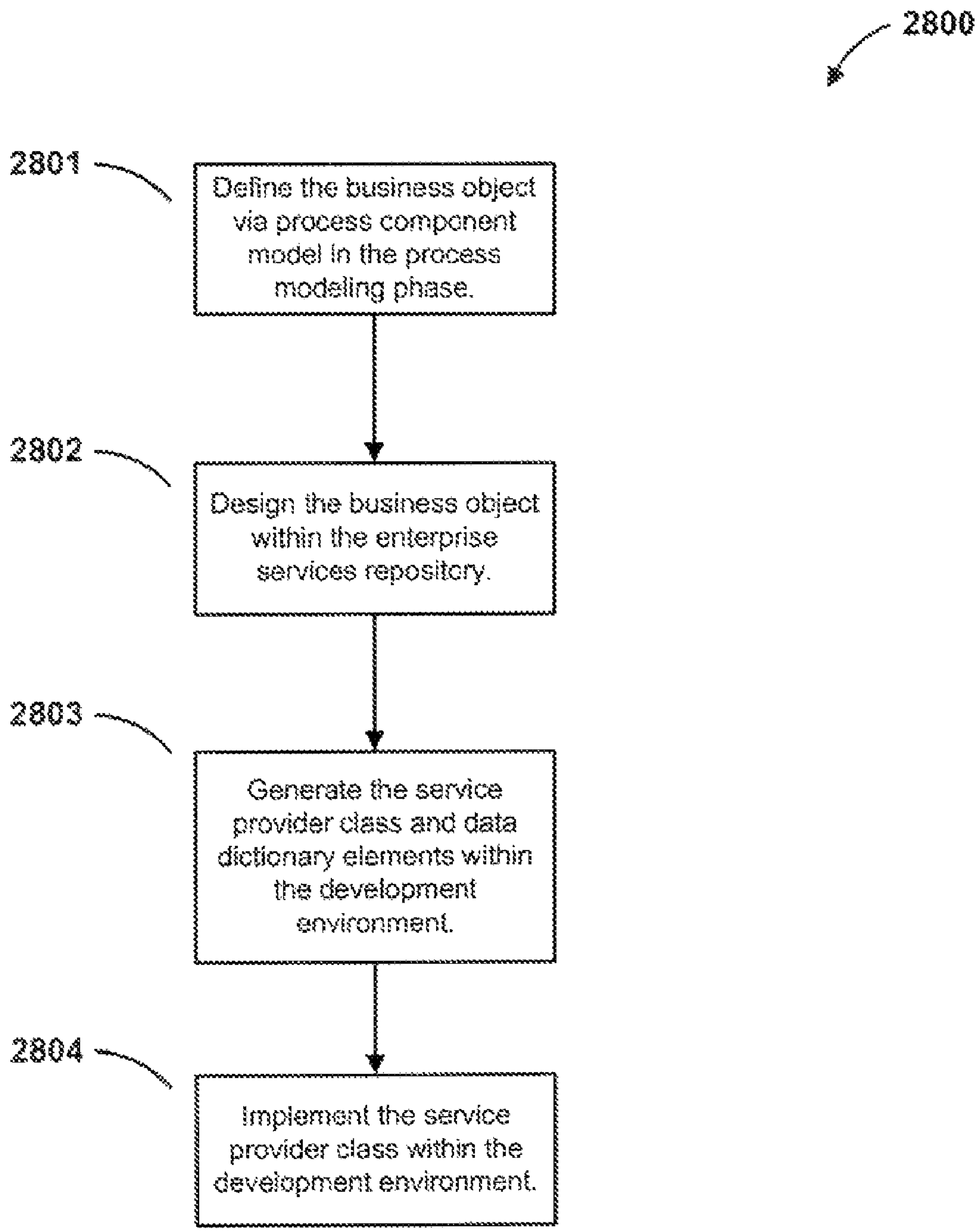
FIG. 28 illustrates an example method for service enabling in accordance with one embodiment of the present disclosure.
Figure 29:
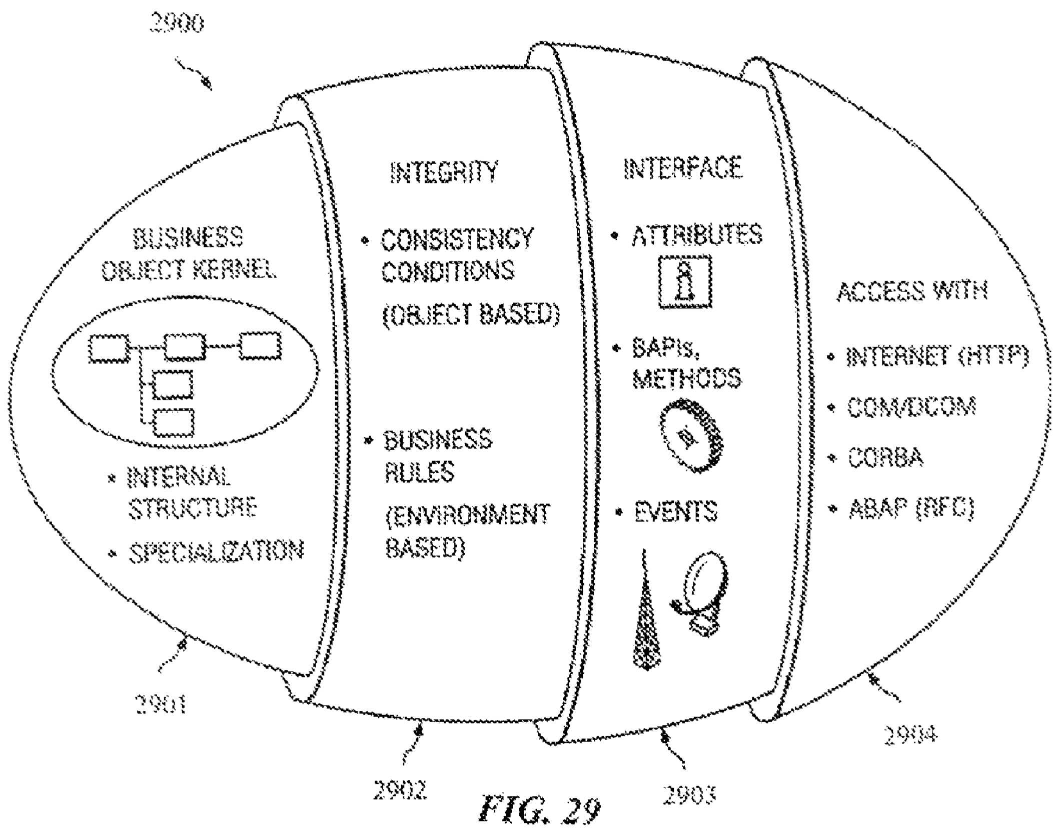
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
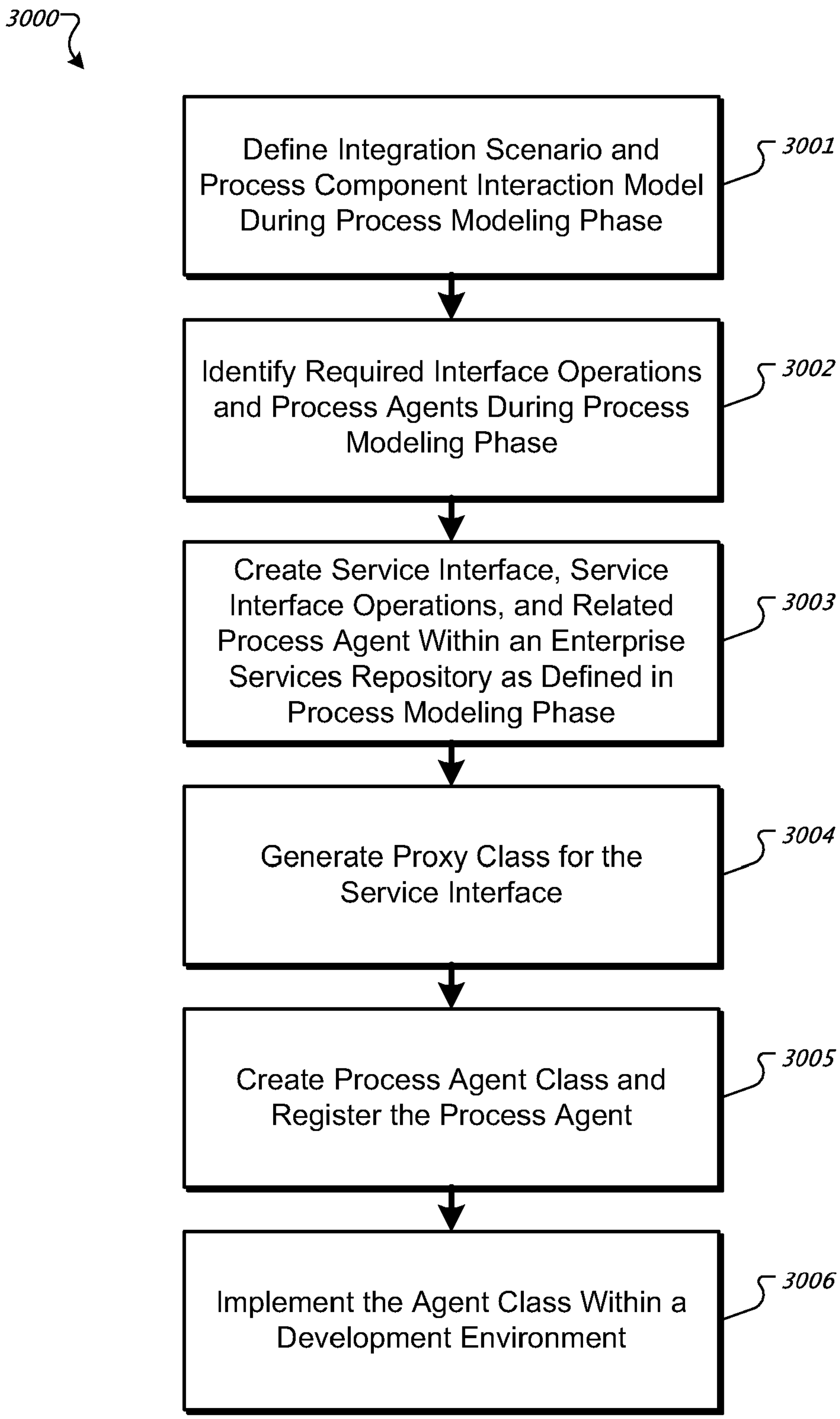
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
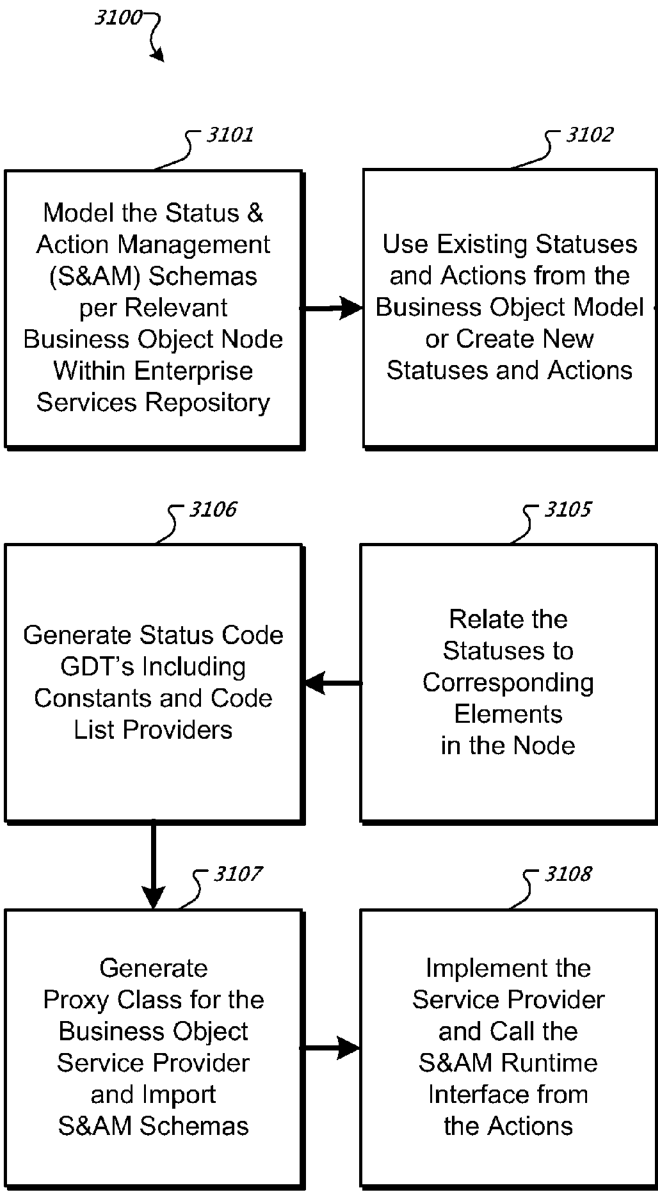
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
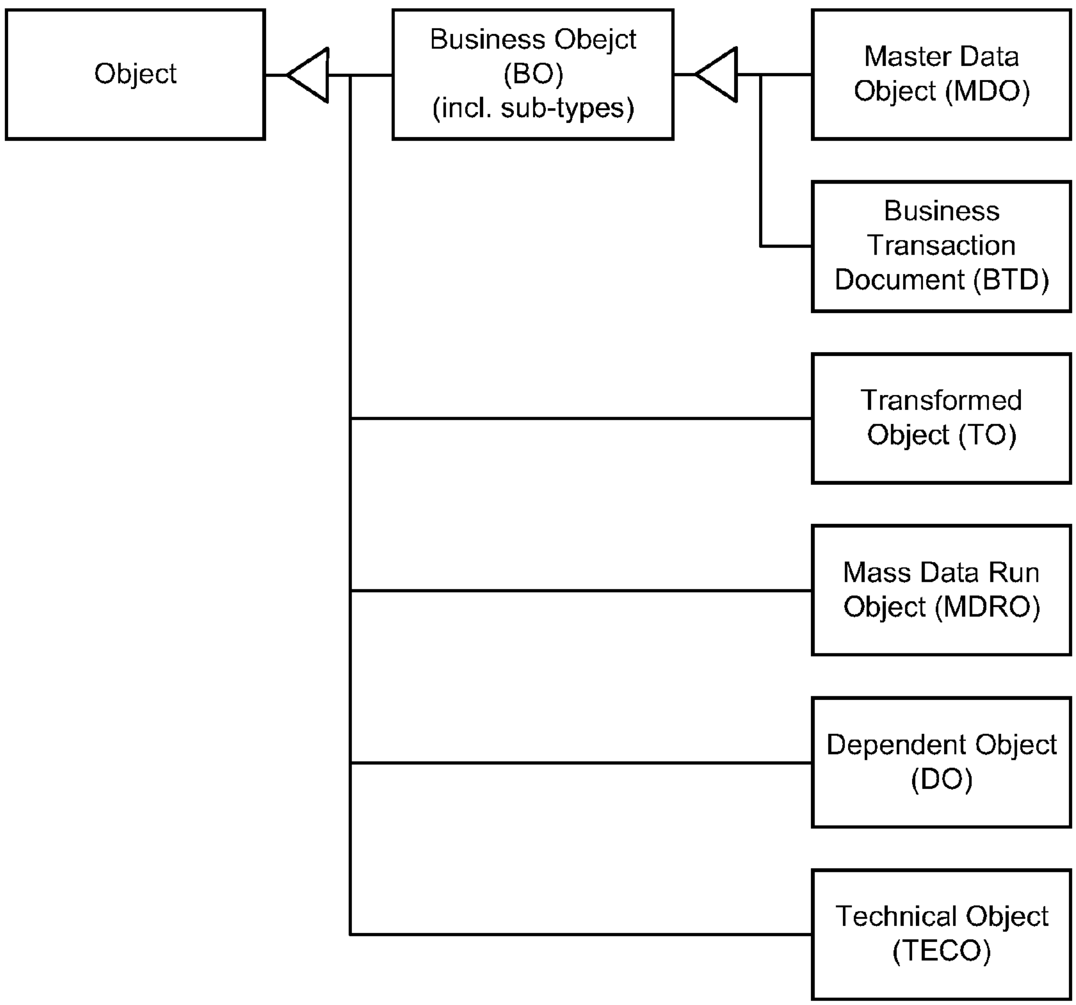
FIG. 32 illustrates various categories of an example object.

FIG. 32 illustrates various categories of an object. The following codelist may be used: Code 1 (i.e., Business Object. A Business Object (BO) may represent a view on a well defined & outlined business content, and may be well known in the business world (for example, in an international standard or industry best practice), and is a self-contained (i.e., capsule), independent business concept), Code 2 (i.e., Master Data Object. A Master Data Object may be considered a business document, which business content is stable over time), Code 3 (i.e., Business Transaction Document. A Business Transaction Document may be considered a document that occurs in business transactions), Code 4 (i.e., Transformed Object. A Transformed Object (TO) may be considered a transformation of multiple Business Objects for a well defined business purpose. It may transform the structure of these BOs with respect to this purpose and contains nodes/attributes derived from the given BOs. It may allow new attributes only for derived information, e.g., summarization, and can implement new Business Logic. It can also contain transformation nodes, but it is not necessary. It may not define UI logic (e.g., the same applies to transformation nodes; UI logic covered by Controller Object)), Code 5 (i.e., Mass Data Run Object. A Mass Data Run Object may be considered a conceptual description of algorithms and their parameters, which modifies/manages/processes a huge amount of data in multiple transactions), Code 6 (i.e., Dependent Object. A Dependent Object ("DO") may be considered a Business Object used as a reuse part in another business object and represents a concept that cannot stand by itself from a business point of view. Instances of dependent objects can only occur in the context of a business objects), Code 7 (i.e., Technical Object. A Technical Object (i.e., TecO) may be considered an object supporting the technical infrastructure or IT Service and Application Management (ITSAM) of application platform. An example of objects for technical infrastructure (i.e., Netweaver) may include:Task, Incident Context).

Demand Plan Interfaces

Supply chain planning integrates information about products, suppliers, manufacturers, retailers, and customers with the primary goal of satisfying customer requirements. The typical planning process in demand planning includes at least the following steps: 1) Create a demand planning scenario using already existing key figures, characteristics, one or more periodicities with optional time stream, unit of measure, and optionally a currency; 2) Create the demand planning characteristic value combinations based on characteristics defined in the demand planning scenario; 3) Create a demand plan as a container for planning data; and 4) Assign to the demand plan at least one planning version. The demand plan can be populated with values after these steps are performed. Optionally, further planning versions can be created for this DemandPlan by repeating step 4.

Figure 33:
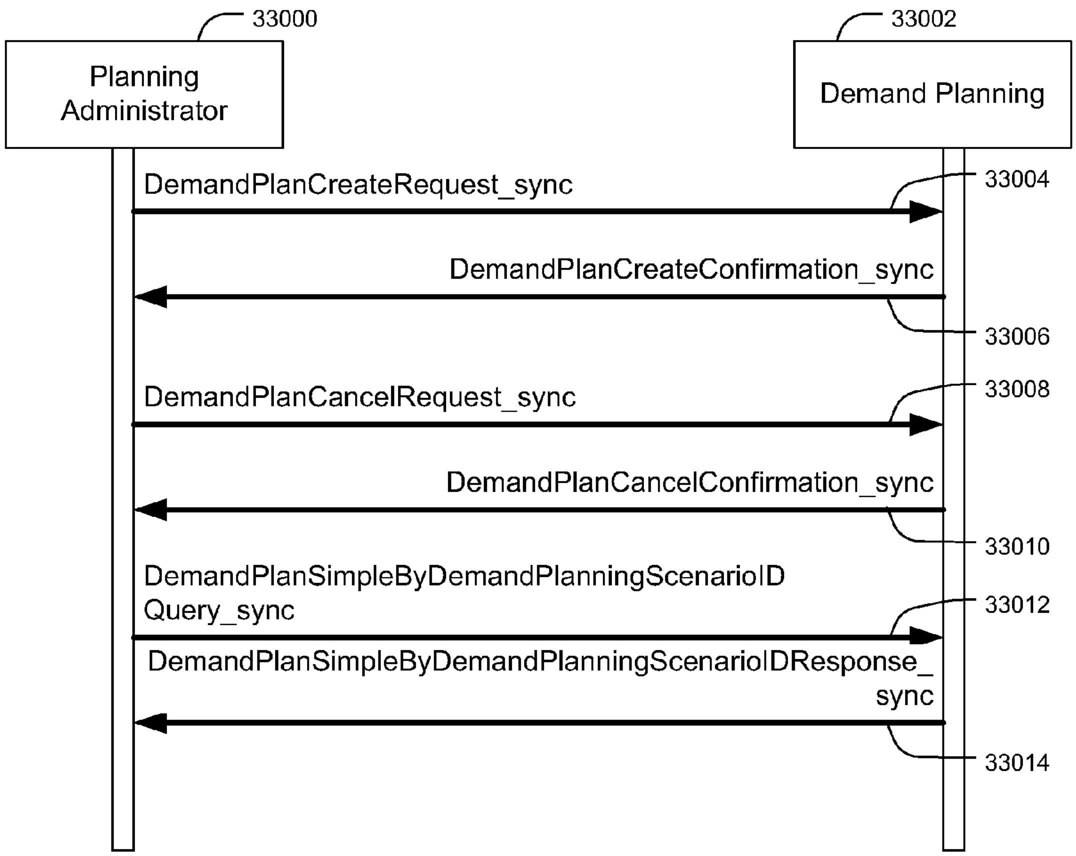
FIG. 33 shows an exemplary DemandPlan Message Choreography.

The message choreography of FIG. 33 describes a possible logical sequence of messages that can be used to realize a DemandPlan business scenario. A "PlanningAdministrator" system 33000 can request demand plan create using a DemandPlanCreateRequest_sync message 33004 as shown, for example, in FIG. 33. A "DemandPlanning" system 33002 can respond to the request using a DemandPlanCreateConfirmation_sync message 33006 as shown, for example, in FIG. 33. The "PlanningAdministrator" system 33000 can request demand plan cancel using a DemandPlanCancelRequest_sync message 33008 as shown, for example, in FIG. 33. The "DemandPlanning" system 33002 can respond to the request using a DemandPlanCancelConfirmation_sync message 33010 as shown, for example, in FIG. 33. The "PlanningAdministrator" system 33000 can query demand plan simple by demand planning scenario ID using a DemandPlanSimpleByDemandPlanningScenarioIDQuery_sync message 33012 as shown, for example, in FIG. 33. The "DemandPlanning" system 33002 can respond to the query using a DemandPlanSimpleByDemandPlanningScenarioIDResponse_sync message 33014 as shown, for example, in FIG. 33.

Figure 34:
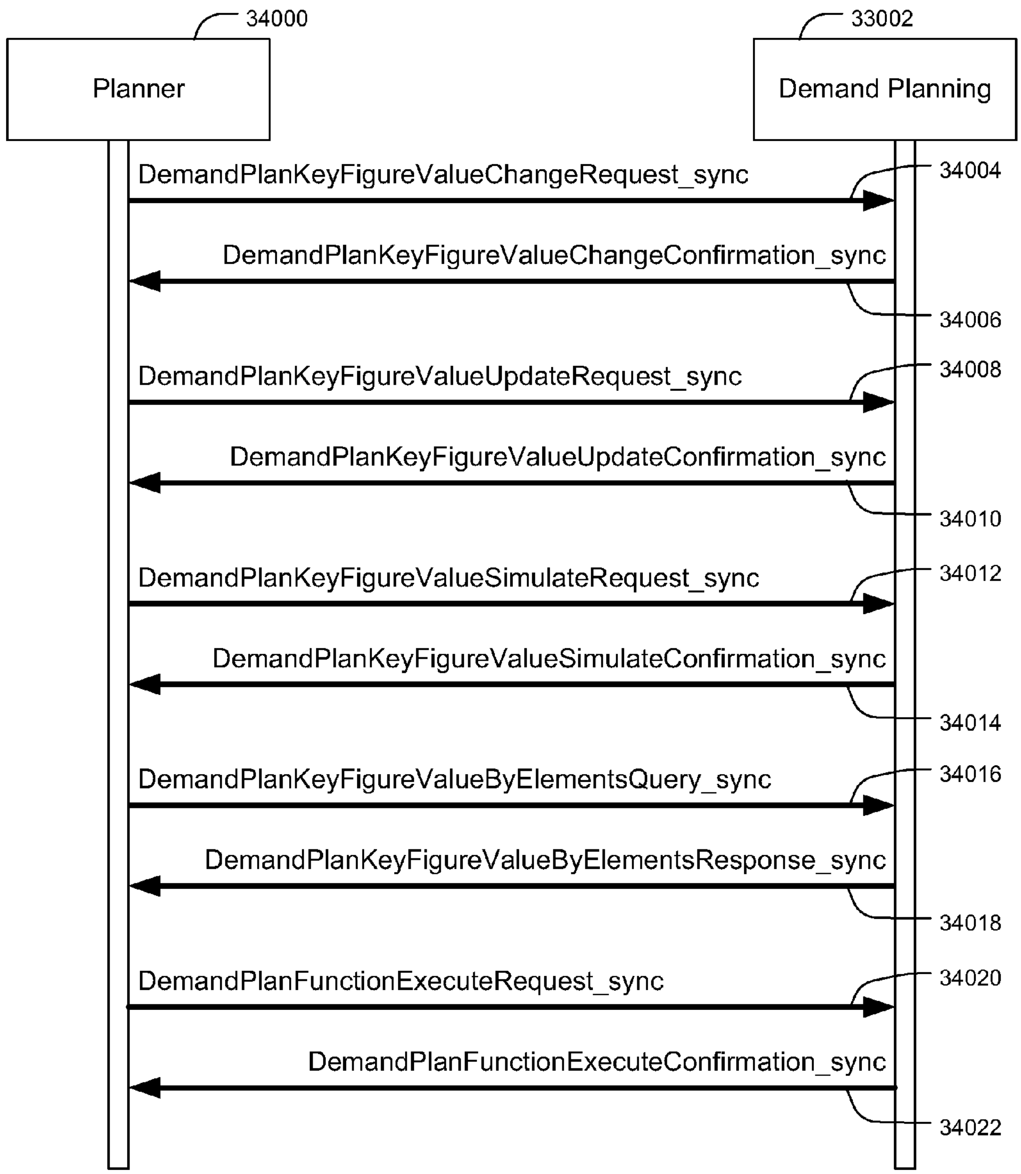
FIG. 34 shows an exemplary DemandPlan Message Choreography.

The message choreography of FIG. 34 describes a possible logical sequence of messages that can be used to realize a DemandPlan business scenario. A "Planner" system 34000 can request demand plan key figure value change using a DemandPlanKeyFigureValueChangeRequest_sync message 34004 as shown, for example, in FIG. 34. A "DemandPlanning" system 34002 can respond to the request using a DemandPlanKeyFigureValueChangeConfirmation_sync message 34006 as shown, for example, in FIG. 34. The "Planner" system 34000 can request demand plan key figure value update using a DemandPlanKeyFigureValueUpdateRequest_sync message 34008 as shown, for example, in FIG. 34. The "DemandPlanning" system 34002 can respond to the request using a DemandPlanKeyFigureValueUpdateConfirmation_sync message 34010 as shown, for example, in FIG. 34. The "Planner" system 34000 can request demand plan key figure value simulate using a DemandPlanKeyFigureValueSimulateRequest_sync message 34012 as shown, for example, in FIG. 34. The "DemandPlanning" system 34002 can respond to the request using a DemandPlanKeyFigureValueSimulateConfirmation_sync message 34014 as shown, for example, in FIG. 34. The "Planner" system 34000 can query demand plan key figure value by elements using a DemandPlanKeyFigureValueByElementsQuery_sync message 34016 as shown, for example, in FIG. 34. The "DemandPlanning" system 34002 can respond to the query using a DemandPlanKeyFigureValueByElementsResponse_sync message 34018 as shown, for example, in FIG. 34. The "Planner" system 34000 can request demand plan function execute using a DemandPlanFunctionExecuteRequest_sync message 34020 as shown, for example, in FIG. 34. The "DemandPlanning" system 34002 can respond to the request using a DemandPlanFunctionExecuteConfirmation_sync message 34022 as shown, for example, in FIG. 34.

Figure 35:
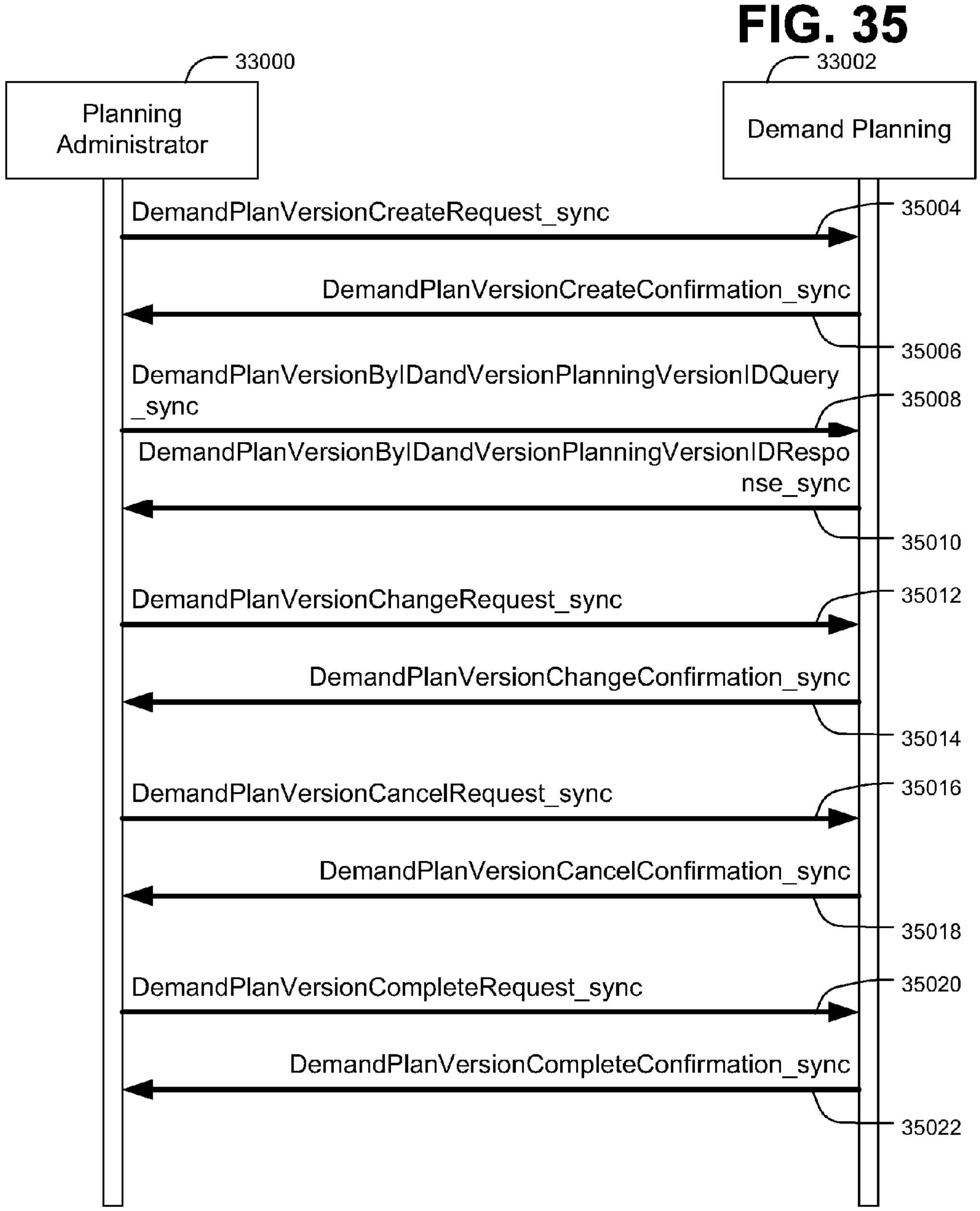
FIG. 35 shows an exemplary DemandPlan Message Choreography.

The message choreography of FIG. 35 describes a possible logical sequence of messages that can be used to realize a DemandPlan business scenario. A "PlanningAdministrator" system 33000 can request demand plan version create using a DemandPlanVersionCreateRequest_sync message 35004 as shown, for example, in FIG. 35. A "DemandPlanning" system 33002 can respond to the request using a DemandPlanVersionCreateConfirmation_sync message 35006 as shown, for example, in FIG. 35. The "PlanningAdministrator" system 33000 can query demand plan version by ID using a DemandPlanVersionByIDandVersionPlanningVersionIDQuery_sync message 35008 as shown, for example, in FIG. 35. The "DemandPlanning" system 33002 can respond to the query using a DemandPlanVersionByIDandVersionPlanningVersionIDResponse_sync message 35010 as shown, for example, in FIG. 35. The "PlanningAdministrator" system 33000 can request demand plan version change using a DemandPlanVersionChangeRequest_sync message 35012 as shown, for example, in FIG. 35. The "DemandPlanning" system 33002 can respond to the request using a DemandPlanVersionChangeConfirmation_sync message 35014 as shown, for example, in FIG. 35. The "PlanningAdministrator" system 33000 can request demand plan version cancel using a DemandPlanVersionCancelRequest_sync message 35016 as shown, for example, in FIG. 35. The "DemandPlanning" system 33002 can respond to the request using a DemandPlanVersionCancelConfirmation_sync message 35018 as shown, for example, in FIG. 35. The "PlanningAdministrator" system 33000 can request demand plan version complete using a DemandPlanVersionCompleteRequest_sync message 35020 as shown, for example, in FIG. 35. The "DemandPlanning"

system 33002 can respond to the request using a DemandPlanVersionCompleteConfirmation_sync message 35022 as shown, for example, in FIG. 35.

Figure 36:
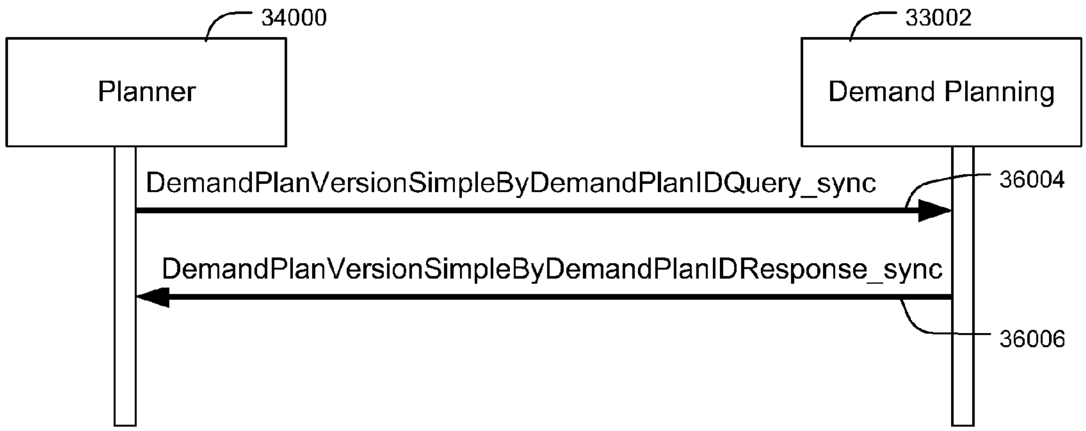
FIG. 36 shows an exemplary DemandPlan Message Choreography.

The message choreography of FIG. 36 describes a possible logical sequence of messages that can be used to realize a DemandPlan business scenario. A "Planner" system 34000 can query demand plan version simple by demand plan ID using a DemandPlanVersionSimpleByDemandPlanIDQuery_sync message 36004 as shown, for example, in FIG. 35. A "DemandPlanning" system 33002 can respond to the query using a DemandPlanVersionSimpleByDemandPlanIDResponse_sync message 36006 as shown, for example, in FIG. 35.

Figure 37:
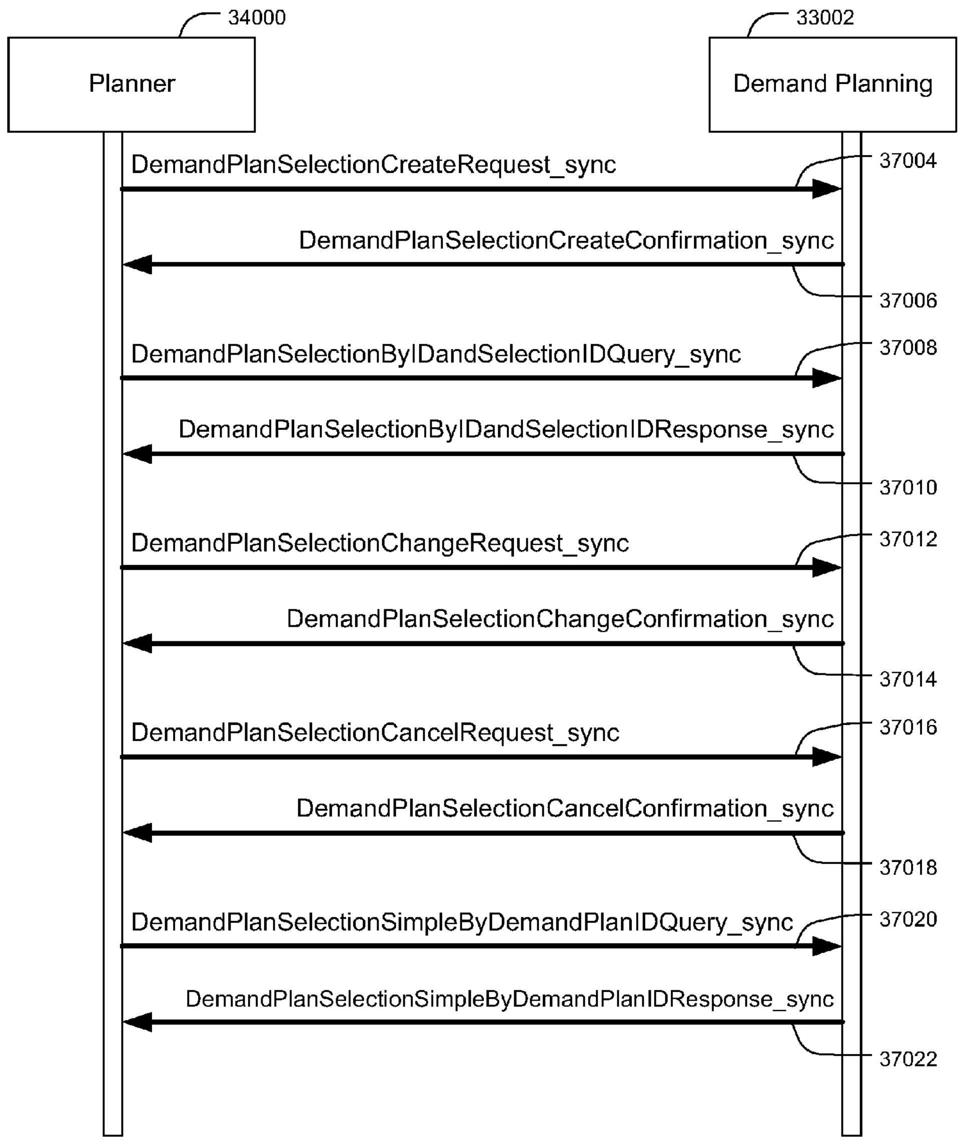
FIG. 37 shows an exemplary DemandPlan Message Choreography.

The message choreography of FIG. 37 describes a possible logical sequence of messages that can be used to realize a DemandPlan business scenario. A "Planner" system 34000 can request demand plan selection create using a DemandPlanSelectionCreateRequest_sync message 37004 as shown, for example, in FIG. 37. A "DemandPlanning" system 33002 can respond to the request using a DemandPlanSelectionCreateConfirmation_sync message 37006 as shown, for example, in FIG. 37. The "Planner" system 34000 can query demand plan selection by ID using a DemandPlanSelectionByIDandSelectionIDQuery_sync message 37008 as shown, for example, in FIG. 37. The "DemandPlanning" system 33002 can respond to the query using a DemandPlanSelectionByIDandSelectionIDResponse_sync message 37010 as shown, for example, in FIG. 37. The "Planner" system 34000 can request demand plan selection change using a DemandPlanSelectionChangeRequest_sync message 37012 as shown, for example, in FIG. 37. The "DemandPlanning" system 33002 can respond to the request using a DemandPlanSelectionChangeConfirmation_sync message 37014 as shown, for example, in FIG. 37. The "Planner" system 34000 can request demand plan selection cancel using a DemandPlanSelectionCancelRequest_sync message 37016 as shown, for example, in FIG. 37. The "DemandPlanning" system 33002 can respond to the request using a DemandPlanSelectionCancelConfirmation_sync message 37018 as shown, for example, in FIG. 37. The "Planner" system 34000 can query demand plan selection simple by demand plan ID using a DemandPlanSelectionSimpleByDemandPlanIDQuery_sync message 37020 as shown, for example, in FIG. 37. The "DemandPlanning" system 33002 can respond to the query using a DemandPlanSelectionSimpleByDemandPlanIDResponse_sync message 37022 as shown, for example, in FIG. 37.

A DemandPlanCreateRequest_sync is a request to create a demand plan for the specified demand planning scenario. The structure of the message type DemandPlanCreateRequest_sync is specified by the message data type DemandPlanCreateRequestMessage_sync. In some implementations, one demand plan might be created for each demand planning scenario. The DemandPlanCreateRequest_sync can create an empty demand plan assigned to the specified demand planning scenario.

A DemandPlanCreateConfirmation_sync is a confirmation from Demand Planning to a DemandPlanCreateRequest_sync. The structure of the message type DemandPlanCreateConfirmation_sync is specified by the message data type DemandPlanCreateConfirmationMessage_sync. The DemandPlanCreateConfirmation_sync confirms the creation of a demand plan by sending the corresponding ID.

A DemandPlanKeyFigureValueChangeRequest_sync is a request to change key figure values of a demand plan. The structure of the message type DemandPlanKeyFigureValueChangeRequest_sync is specified by the message data type DemandPlanKeyFigureValueChangeRequestMessage_sync A DemandPlanKeyFigureValueChangeConfirmation_sync is a confirmation from Demand Planning to a DemandPlanKeyFigureValueChangeRequest_sync. The structure of the message type DemandPlanKeyFigureValueChangeConfirmation_sync is specified by the message data type DemandPlanKeyFigureValueChangeConfirmationMessage_sync.

DemandPlanKeyFigureValueChangeConfirmation_sync contains the confirmed or updated demand plan. It returns the confirmed, adjusted or rejected key figure values.

A DemandPlanKeyFigureValueUpdateRequest_sync is a request to update key figure values of a demand plan. The structure of the message type DemandPlanKeyFigureValueUpdateRequest_sync is specified by the message data type DemandPlanKeyFigureValueUpdateRequestMessage_sync.

The changed key figure values may be permanently saved in Demand Planning if they have not been modified in the meanwhile. In case there was an intermediate change of key figure values, the Log package contains detailed information.

Figure 38:
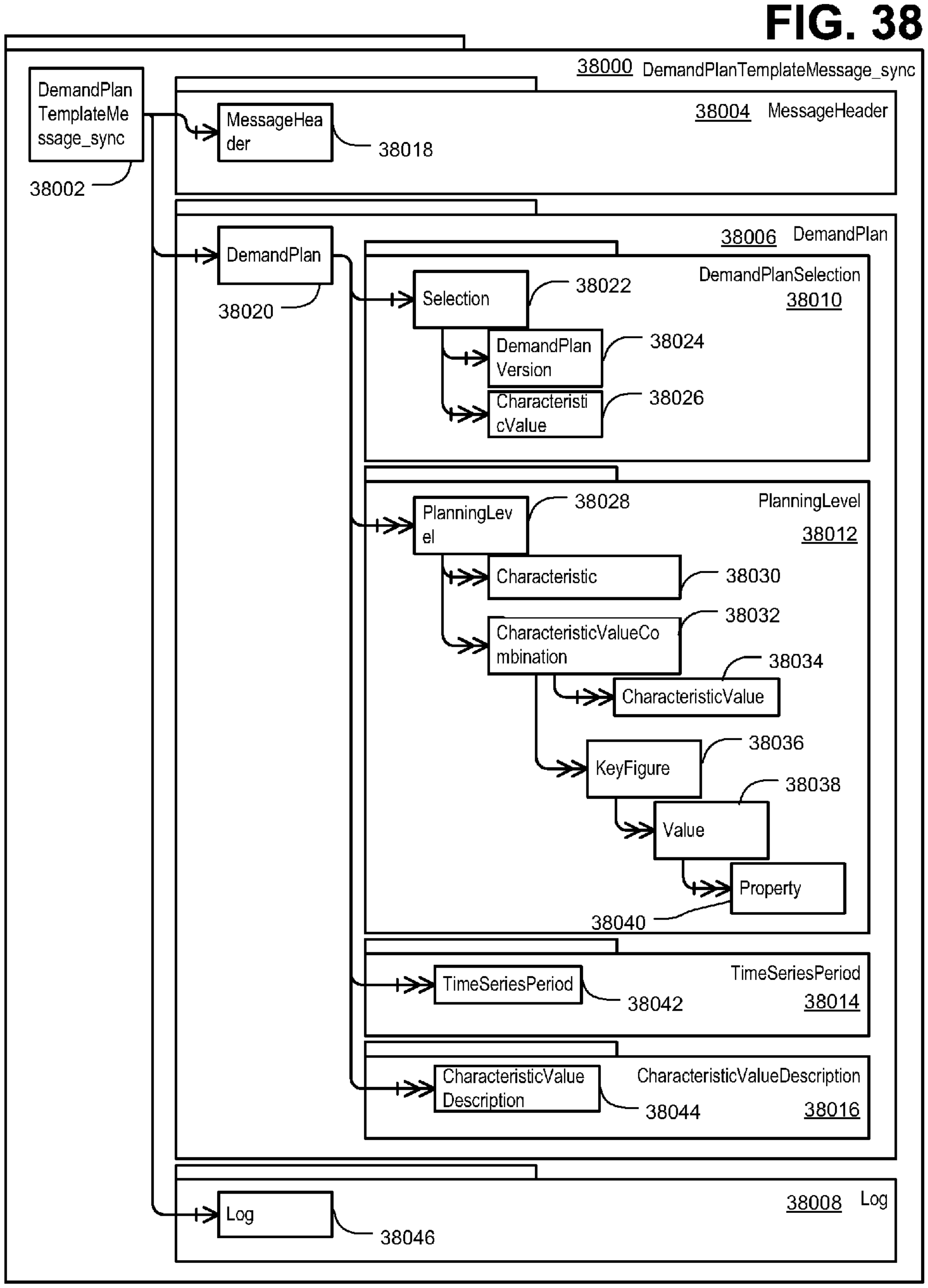
FIG. 38 shows an exemplary DemandPlanTemplateMessage Message Data Type.

FIG. 38 illustrates one example logical configuration of DemandPlanTemplateMessage_sync message 38000. Specifically, this figure depicts the arrangement and hierarchy of various components such as one or more levels of packages, entities, and datatypes, shown here as 38000 to 38046. As described above, packages may be used to represent hierarchy levels. Entities are discrete business elements that are used during a business transaction. Data types are used to type object entities and interfaces with a structure. For example, DemandPlanTemplateMessage_sync message 38000 includes, among other things, DemandPlan 38006. Accordingly, heterogeneous applications may communicate using this consistent message configured as such.

Figure 39:
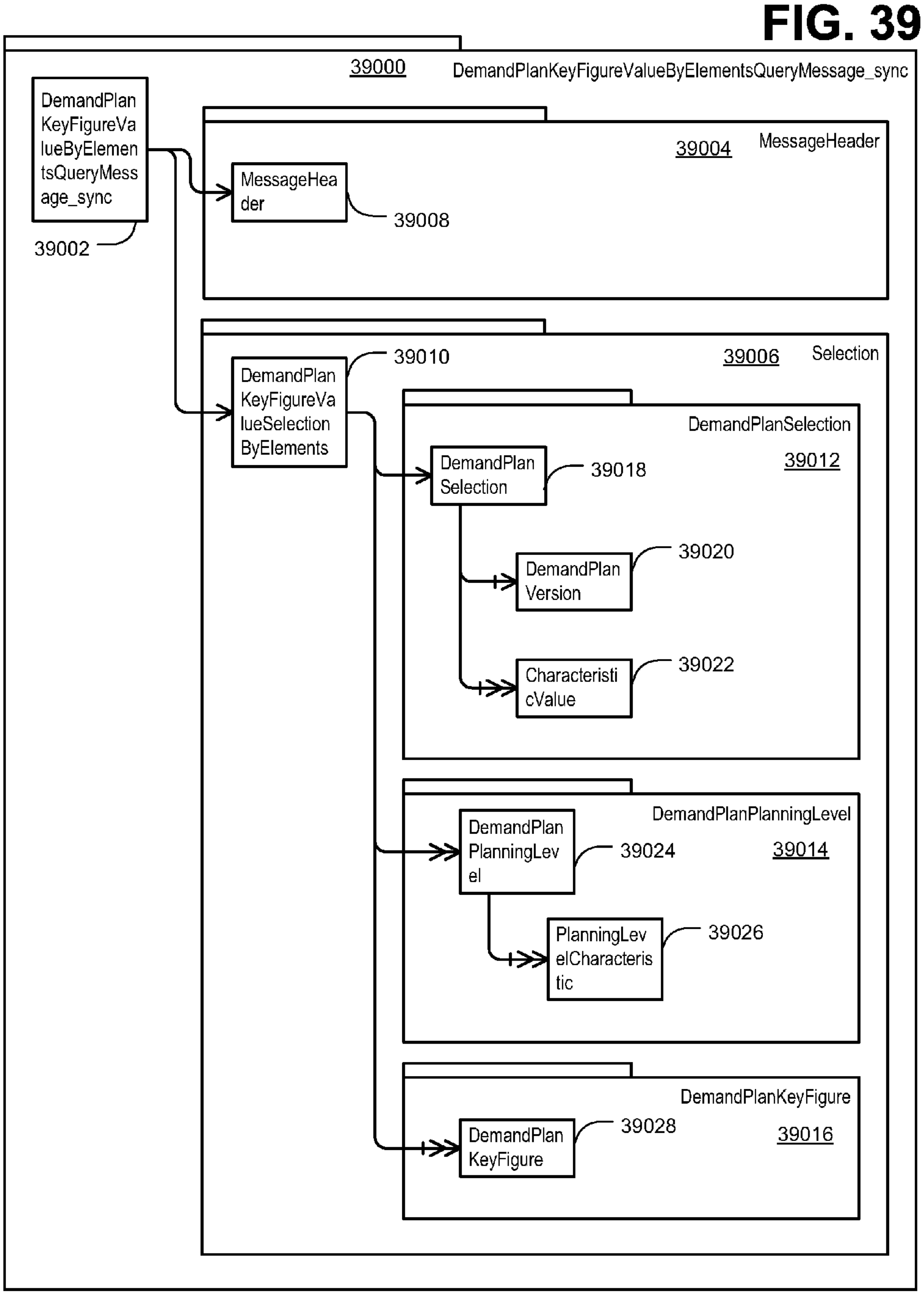
FIG. 39 shows an exemplary DemandPlanKeyFigureValueByElementsQueryMessage Message Data Type.

Additionally, FIG. 39 illustrates one example logical configuration of DemandPlanKeyFigureValueByElementsQueryMessage_sync message 39000. Specifically, this figure depicts the arrangement and hierarchy of various components such as one or more levels of packages, entities, and datatypes, shown here as 39000 to 39028. As described above, packages may be used to represent hierarchy levels. Entities are discrete business elements that are used during a business transaction. Data types are used to type object entities and interfaces with a structure. For example, DemandPlanKeyFigureValueByElementsQueryMessage_sync message 39000 includes, among other things, Selection 39006. Accordingly, heterogeneous applications may communicate using this consistent message configured as such.

Figure 40:
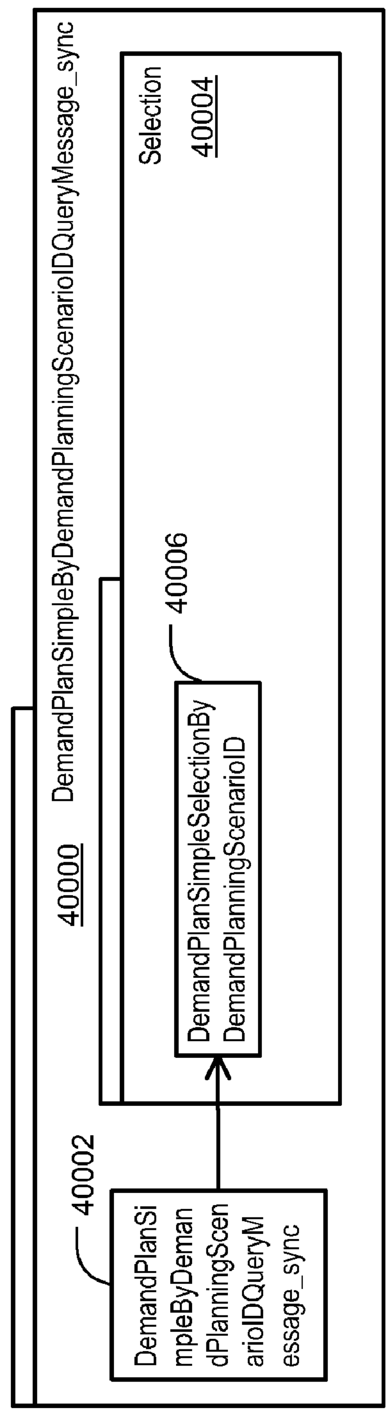
FIG. 40 shows an exemplary DemandPlanSimpleByDemandPlanningScenarioIDQueryMessage Message Data Type.

Additionally, FIG. 40 illustrates one example logical configuration of DemandPlanSimpleByDemandPlanningScenarioIDQueryMessage_sync message 40000. Specifically, this figure depicts the arrangement and hierarchy of various components such as one or more levels of packages, entities, and datatypes, shown here as 40000 to 40006. As described above, packages may be used to represent hierarchy levels. Entities are discrete business elements that are used during a business transaction. Data types are used to type object entities and interfaces with a structure. For example, DemandPlanSimpleByDemandPlanningScenarioIDQueryMessage_sync message 40000 includes, among other things, Selection 40004. Accordingly, heterogeneous applications may communicate using this consistent message configured as such.

Figure 41:
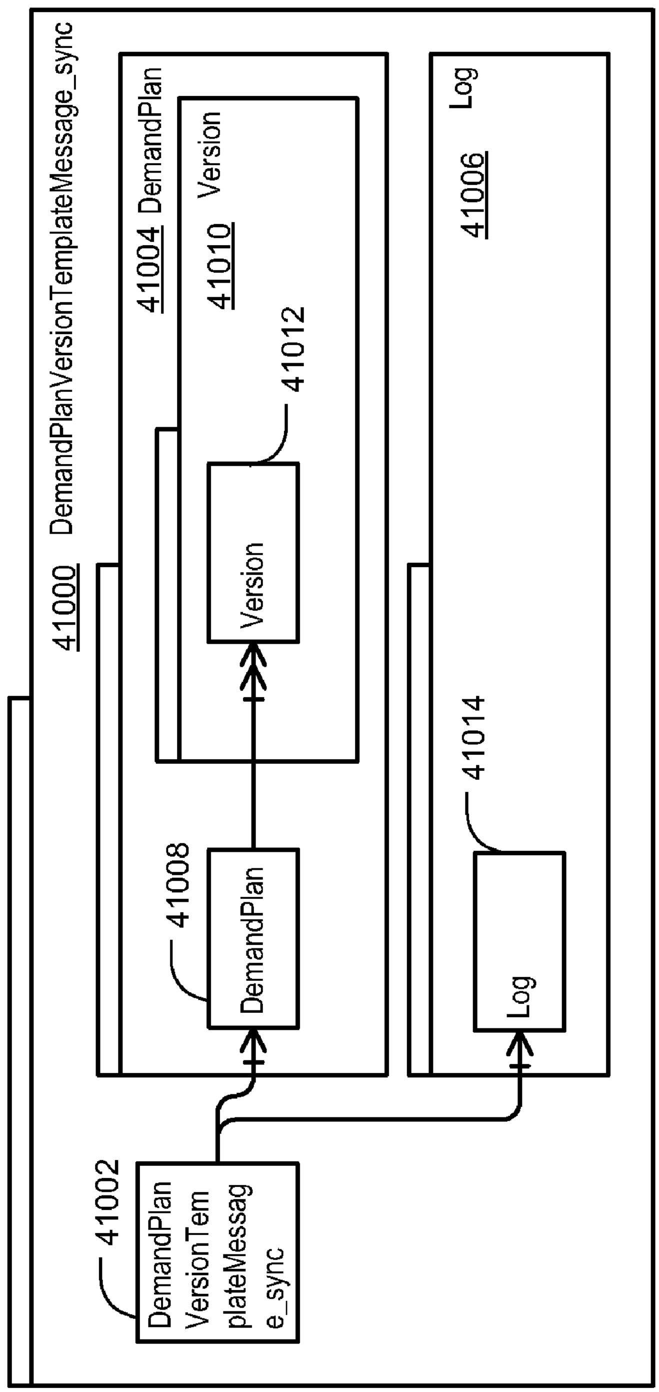
FIG. 41 shows an exemplary DemandPlanVersionTemplateMessage Message Data Type.

Additionally, FIG. 41 illustrates one example logical configuration of DemandPlanVersionTemplateMessage_sync message 41000. Specifically, this figure depicts the arrangement and hierarchy of various components such as one or more levels of packages, entities, and datatypes, shown here as 41000 to 41010. As described above, packages may be used to represent hierarchy levels. Entities are discrete business elements that are used during a business transaction. Data types are used to type object entities and interfaces with a structure. For example, DemandPlanVersionTemplateMessage_sync message 41000 includes, among other things, DemandPlan 41004. Accordingly, heterogeneous applications may communicate using this consistent message configured as such.

Figure 42:
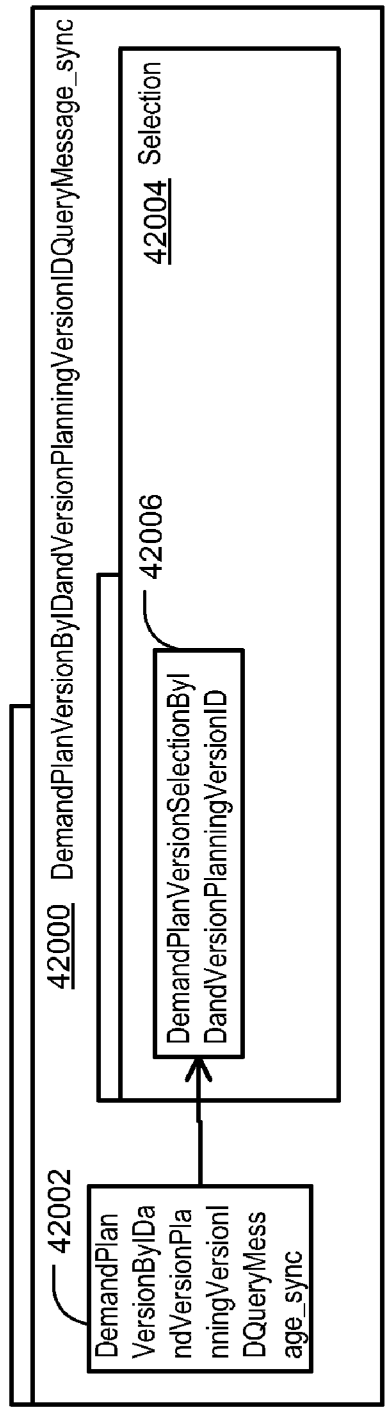
FIG. 42 shows an exemplary DemandPlanVersionByIDandVersionPlanningVersionIDQueryMessage Message Data Type.

Additionally, FIG. 42 illustrates one example logical configuration of DemandPlanVersionByIDandVersionPlanningVersionIDQueryMessage_sync message 42000. Specifically, this figure depicts the arrangement and hierarchy of various components such as one or more levels of packages, entities, and datatypes, shown here as 42000 to 42006. As described above, packages may be used to represent hierarchy levels. Entities are discrete business elements that are used during a business transaction. Data types are used to type object entities and interfaces with a structure. For example, DemandPlanVersionByIDandVersionPlanningVersionIDQueryMessage_sync message 42000 includes, among other things, Selection 42004. Accordingly, heterogeneous applications may communicate using this consistent message configured as such.

Figure 43:
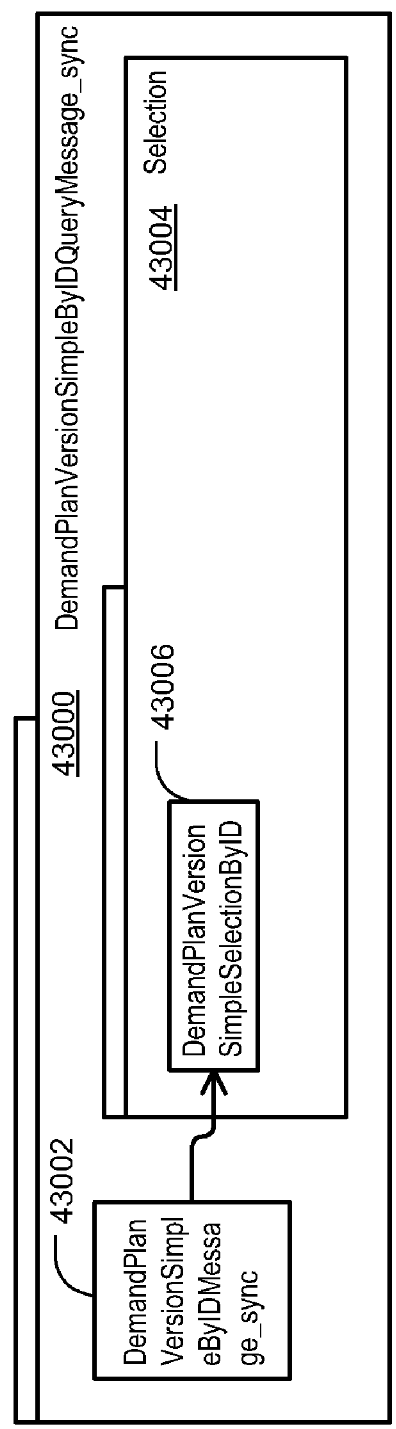
FIG. 43 shows an exemplary DemandPlanVersionSimpleByIDQueryMessage Message Data Type.

Additionally, FIG. 43 illustrates one example logical configuration of DemandPlanVersionSimpleByIDQueryMessage_sync message 43000. Specifically, this figure depicts the arrangement and hierarchy of various components such as one or more levels of packages, entities, and datatypes, shown here as 43000 to 43006. As described above, packages may be used to represent hierarchy levels. Entities are discrete business elements that are used during a business transaction. Data types are used to type object entities and interfaces with a structure. For example, DemandPlanVersionSimpleByIDQueryMessage_sync message 43000 includes, among other things, Selection 43004. Accordingly, heterogeneous applications may communicate using this consistent message configured as such.

Figure 44:
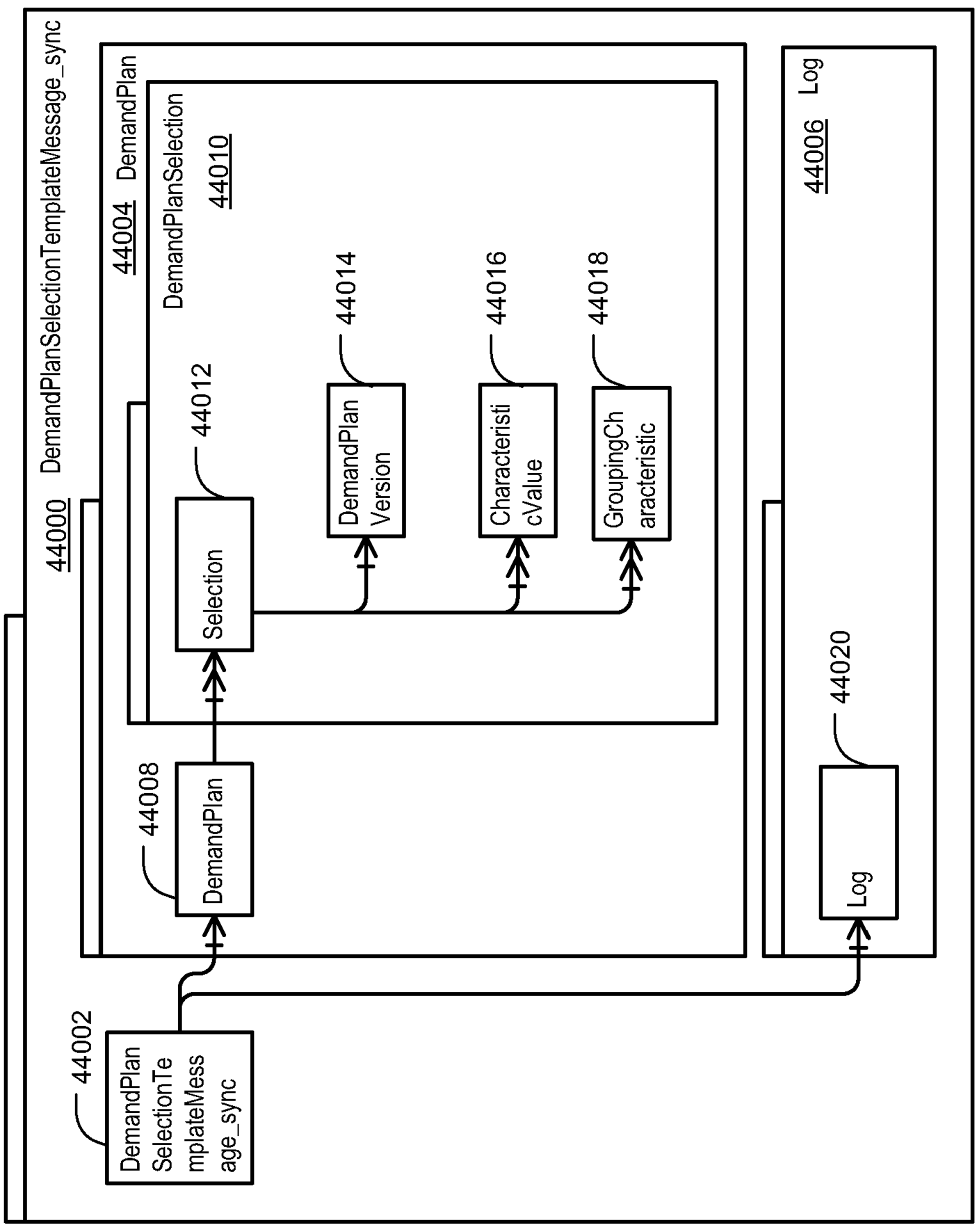
FIG. 44 shows an exemplary DemandPlanSelectionTemplateMessage Message Data Type.

Additionally, FIG. 44 illustrates one example logical configuration of DemandPlanSelectionTemplateMessage_sync message 44000. Specifically, this figure depicts the arrangement and hierarchy of various components such as one or more levels of packages, entities, and datatypes, shown here as 44000 to 44020. As described above, packages may be used to represent hierarchy levels. Entities are discrete business elements that are used during a business transaction. Data types are used to type object entities and interfaces with a structure. For example, DemandPlanSelectionTemplateMessage_sync message 44000 includes, among other things, DemandPlan 44004. Accordingly, heterogeneous applications may communicate using this consistent message configured as such.

Figure 45:
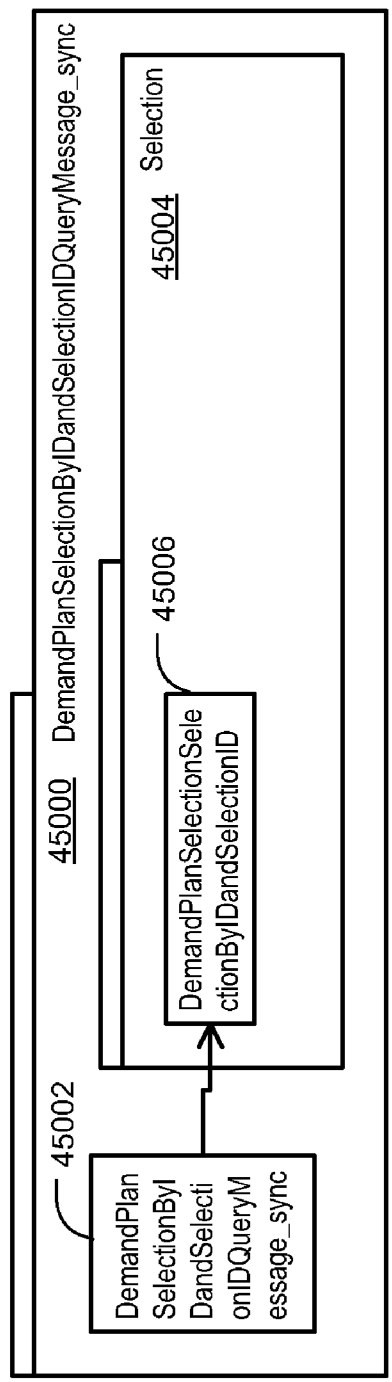
FIG. 45 shows an exemplary DemandPlanSelectionByIDandSelectionIDQueryMessage Message Data Type.

Additionally, FIG. 45 illustrates one example logical configuration of DemandPlanSelectionByIDandSelectionIDQueryMessage_sync message 45000. Specifically, this figure depicts the arrangement and hierarchy of various components such as one or more levels of packages, entities, and datatypes, shown here as 45000 to 45006. As described above, packages may be used to represent hierarchy levels. Entities are discrete business elements that are used during a business transaction. Data types are used to type object entities and interfaces with a structure. For example, DemandPlanSelectionByIDandSelectionIDQueryMessage_sync message 45000 includes, among other things, Selection 45004. Accordingly, heterogeneous applications may communicate using this consistent message configured as such.

Figure 46:
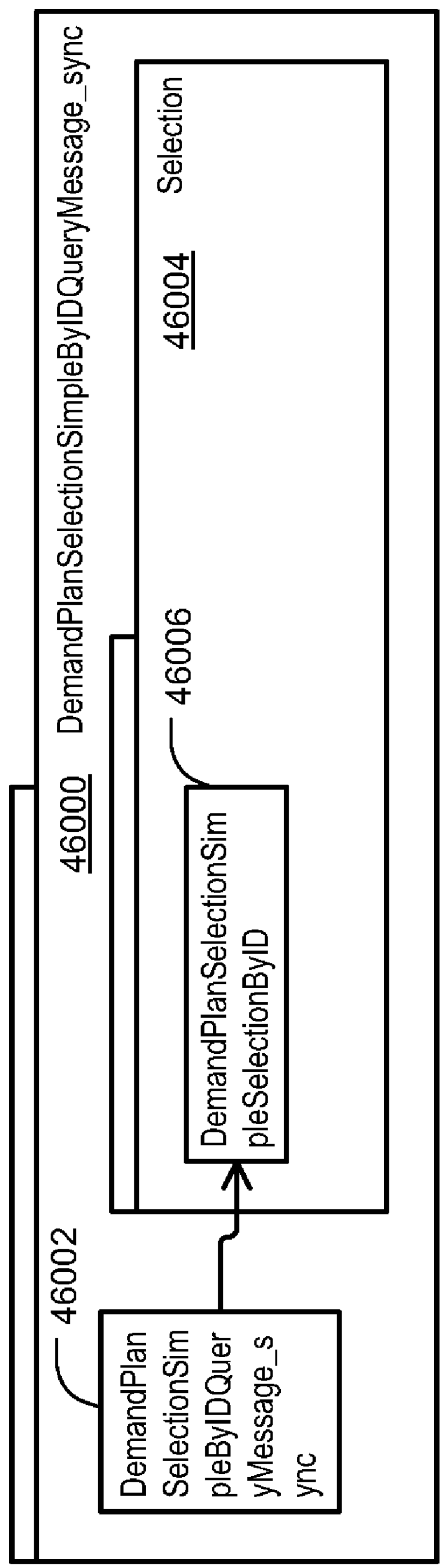
FIG. 46 shows an exemplary DemandPlanSelectionSimpleByIDQueryMessage Message Data Type.

Additionally, FIG. 46 illustrates one example logical configuration of DemandPlanSelectionSimpleByIDQueryMessage_sync message 46000. Specifically, this figure depicts the arrangement and hierarchy of various components such as one or more levels of packages, entities, and datatypes, shown here as 46000 to 46006. As described above, packages may be used to represent hierarchy levels. Entities are discrete business elements that are used during a business transaction. Data types are used to type object entities and interfaces with a structure. For example, DemandPlanSelectionSimpleByIDQueryMessage_sync message 46000 includes, among other things, Selection 46004. Accordingly, heterogeneous applications may communicate using this consistent message configured as such.

Additionally, FIG. 47 illustrates one example logical configuration of DemandPlanCancelConfirmationMessage_sync message 47000. Specifically, this figure depicts the arrangement and hierarchy of various components such as one or more levels of packages, entities, and datatypes, shown here as 47000 to 47024. As described above, packages may be used to represent hierarchy levels. Entities are discrete business elements that are used during a business transaction. Data types are used to type object entities and interfaces with a structure. For example, DemandPlanCancelConfirmationMessage_sync message 47000 includes, among other things, DemandPlan 47006. Accordingly, heterogeneous applications may communicate using this consistent message configured as such.

Additionally, FIG. 48 illustrates one example logical configuration of DemandPlanCancelRequestMessage_sync message 48000. Specifically, this figure depicts the arrangement and hierarchy of various components such as one or more levels of packages, entities, and datatypes, shown here as 48000 to 48016. As described above, packages may be used to represent hierarchy levels. Entities are discrete business elements that are used during a business transaction. Data types are used to type object entities and interfaces with a structure. For example, DemandPlanCancelRequestMessage_sync message 48000 includes, among other things, DemandPlan 48006. Accordingly, heterogeneous applications may communicate using this consistent message configured as such.

Additionally, FIG. 49 illustrates one example logical configuration of DemandPlanCreateConfirmationMessage_sync message 49000. Specifically, this figure depicts the arrangement and hierarchy of various components such as one or more levels of packages, entities, and datatypes, shown here as 49000 to 49036. As described above, packages may be used to represent hierarchy levels. Entities are discrete business elements that are used during a business transaction. Data types are used to type object entities and interfaces with a structure. For example, DemandPlanCreateConfirmationMessage_sync message 49000 includes, among other things, DemandPlan 49006. Accordingly, heterogeneous applications may communicate using this consistent message configured as such.

Additionally, FIG. 50 illustrates one example logical configuration of DemandPlanCreateRequestMessage_sync message 50000. Specifically, this figure depicts the arrangement and hierarchy of various components such as one or more levels of packages, entities, and datatypes, shown here as 50000 to 50022. As described above, packages may be used to represent hierarchy levels. Entities are discrete business elements that are used during a business transaction. Data types are used to type object entities and interfaces with a structure.

For example, DemandPlanCreateRequestMessage_sync message 50000 includes, among other things, DemandPlan 50006. Accordingly, heterogeneous applications may communicate using this consistent message configured as such.

Additionally, FIGS. 51-1 through 51-12 illustrate one example logical configuration of DemandPlanFunctionExecuteConfirmationMessage_sync message 51000. Specifically, this figure depicts the arrangement and hierarchy of various components such as one or more levels of packages, entities, and datatypes, shown here as 51000 to 51298. As described above, packages may be used to represent hierarchy levels. Entities are discrete business elements that are used during a business transaction. Data types are used to type object entities and interfaces with a structure. For example, DemandPlanFunctionExecuteConfirmationMessage_sync message 51000 includes, among other things, MessageHeader 51006. Accordingly, heterogeneous applications may communicate using this consistent message configured as such.

Additionally, FIGS. 52-1 through 52-8 illustrate one example logical configuration of DemandPlanFunctionExecuteRequestMessage_sync message 52000. Specifically, this figure depicts the arrangement and hierarchy of various components such as one or more levels of packages, entities, and datatypes, shown here as 52000 to 52214. As described above, packages may be used to represent hierarchy levels. Entities are discrete business elements that are used during a business transaction. Data types are used to type object entities and interfaces with a structure. For example, DemandPlanFunctionExecuteRequestMessage_sync message 52000 includes, among other things, MessageHeader 52006. Accordingly, heterogeneous applications may communicate using this consistent message configured as such.

Additionally, FIGS. 53-1 through 53-6 illustrate one example logical configuration of DemandPlanKeyFigureValueByElementsQueryMessage_sync message 53000. Specifically, this figure depicts the arrangement and hierarchy of various components such as one or more levels of packages, entities, and datatypes, shown here as 53000 to 53160. As described above, packages may be used to represent hierarchy levels. Entities are discrete business elements that are used during a business transaction. Data types are used to type object entities and interfaces with a structure. For example, DemandPlanKeyFigureValueByElementsQueryMessage_sync message 53000 includes, among other things, MessageHeader 53006. Accordingly, heterogeneous applications may communicate using this consistent message configured as such.

Additionally, FIGS. 54-1 through 54-15 illustrate one example logical configuration of DemandPlanKeyFigureValueByElementsResponseMessage_sync message 54000. Specifically, this figure depicts the arrangement and hierarchy of various components such as one or more levels of packages, entities, and datatypes, shown here as 54000 to 54364. As described above, packages may be used to represent hierarchy levels. Entities are discrete business elements that are used during a business transaction. Data types are used to type object entities and interfaces with a structure. For example, DemandPlanKeyFigureValueByElementsResponseMessage_sync message 54000 includes, among other things, MessageHeader 54006. Accordingly, heterogeneous applications may communicate using this consistent message configured as such.

Additionally, FIGS. 55-1 through 55-11 illustrate one example logical configuration of DemandPlanKeyFigureValueChangeConfirmationMessage_sync message 55000. Specifically, this figure depicts the arrangement and hierarchy of various components such as one or more levels of packages, entities, and datatypes, shown here as 55000 to 55292. As described above, packages may be used to represent hierarchy levels. Entities are discrete business elements that are used during a business transaction. Data types are used to type object entities and interfaces with a structure. For example, DemandPlanKeyFigureValueChangeConfirmationMessage_sync message 55000 includes, among other things, MessageHeader 55006. Accordingly, heterogeneous applications may communicate using this consistent message configured as such.

Additionally, FIGS. 56-1 through 56-7 illustrate one example logical configuration of DemandPlanKeyFigureValueChangeRequestMessage_sync message 56000. Specifically, this figure depicts the arrangement and hierarchy of various components such as one or more levels of packages, entities, and datatypes, shown here as 56000 to 56208. As described above, packages may be used to represent hierarchy levels. Entities are discrete business elements that are used during a business transaction. Data types are used to type object entities and interfaces with a structure. For example, DemandPlanKeyFigureValueChangeRequestMessage_sync message 56000 includes, among other things, MessageHeader 56006. Accordingly, heterogeneous applications may communicate using this consistent message configured as such.

Additionally, FIGS. 57-1 through 57-10 illustrate one example logical configuration of DemandPlanKeyFigureValueSimulateConfirmationMessage_sync message 57000. Specifically, this figure depicts the arrangement and hierarchy of various components such as one or more levels of packages, entities, and datatypes, shown here as 57000 to 57270. As described above, packages may be used to represent hierarchy levels. Entities are discrete business elements that are used during a business transaction. Data types are used to type object entities and interfaces with a structure. For example, DemandPlanKeyFigureValueSimulateConfirmationMessage_sync message 57000 includes, among other things, DemandPlan 57006. Accordingly, heterogeneous applications may communicate using this consistent message configured as such.

Additionally, FIGS. 58-1 through 58-7 illustrate one example logical configuration of DemandPlanKeyFigureValueSimulateRequestMessage_sync message 58000. Specifically, this figure depicts the arrangement and hierarchy of various components such as one or more levels of packages, entities, and datatypes, shown here as 58000 to 58186. As described above, packages may be used to represent hierarchy levels. Entities are discrete business elements that are used during a business transaction. Data types are used to type object entities and interfaces with a structure. For example, DemandPlanKeyFigureValueSimulateRequestMessage_sync message 58000 includes, among other things, DemandPlan 58006. Accordingly, heterogeneous applications may communicate using this consistent message configured as such.

Additionally, FIGS. 59-1 through 59-7 illustrate one example logical configuration of DemandPlanKeyFigureValueUpdateRequestMessage_sync message 59000. Specifically, this figure depicts the arrangement and hierarchy of various components such as one or more levels of packages, entities, and datatypes, shown here as 59000 to 59208. As described above, packages may be used to represent hierarchy levels. Entities are discrete business elements that are used during a business transaction. Data types are used to type object entities and interfaces with a structure. For example, DemandPlanKeyFigureValueUpdateRequestMessage_sync message 59000 includes, among other things, MessageHeader 59006. Accordingly, heterogeneous applications may communicate using this consistent message configured as such.

Additionally, FIGS. 60-1 through 60-12 illustrate one example logical configuration of DemandPlanKeyFigureValueUpdateResponseMessage_sync message 60000. Specifically, this figure depicts the arrangement and hierarchy of various components such as one or more levels of packages, entities, and datatypes, shown here as 60000 to 60292. As described above, packages may be used to represent hierarchy levels. Entities are discrete business elements that are used during a business transaction. Data types are used to type object entities and interfaces with a structure. For example, DemandPlanKeyFigureValueUpdateResponseMessage_sync message 60000 includes, among other things, MessageHeader 60006. Accordingly, heterogeneous applications may communicate using this consistent message configured as such.

Additionally, FIG. 61 illustrates one example logical configuration of DemandPlanSelectionByIDandSelectionIDQueryMessage_sync message 61000. Specifically, this figure depicts the arrangement and hierarchy of various components such as one or more levels of packages, entities, and datatypes, shown here as 61000 to 61022. As described above, packages may be used to represent hierarchy levels. Entities are discrete business elements that are used during a business transaction. Data types are used to type object entities and interfaces with a structure. For example, DemandPlanSelectionByIDandSelectionIDQueryMessage_sync message 61000 includes, among other things, DemandPlanSelectionSelectionByIDandSelectionID 61008. Accordingly, heterogeneous applications may communicate using this consistent message configured as such.

Additionally, FIGS. 62-1 through 62-5 illustrate one example logical configuration of DemandPlanSelectionByIDandSelectionIDResponseMessage_sync message 62000. Specifically, this figure depicts the arrangement and hierarchy of various components such as one or more levels of packages, entities, and datatypes, shown here as 62000 to 62124. As described above, packages may be used to represent hierarchy levels. Entities are discrete business elements that are used during a business transaction. Data types are used to type object entities and interfaces with a structure. For example, DemandPlanSelectionByIDandSelectionIDResponseMessage_sync message 62000 includes, among other things, DemandPlan 62006. Accordingly, heterogeneous applications may communicate using this consistent message configured as such.

Additionally, FIG. 63 illustrates one example logical configuration of DemandPlanSelectionCancelConfirmationMessage_sync message 63000. Specifically, this figure depicts the arrangement and hierarchy of various components such as one or more levels of packages, entities, and datatypes, shown here as 63000 to 63036. As described above, packages may be used to represent hierarchy levels. Entities are discrete business elements that are used during a business transaction. Data types are used to type object entities and interfaces with a structure. For example, DemandPlanSelectionCancelConfirmationMessage_sync message 63000 includes, among other things, DemandPlan 63006. Accordingly, heterogeneous applications may communicate using this consistent message configured as such.

Additionally, FIG. 64 illustrates one example logical configuration of DemandPlanSelectionCancelRequestMessage_sync message 64000. Specifically, this figure depicts the arrangement and hierarchy of various components such as one or more levels of packages, entities, and datatypes, shown here as 64000 to 64028. As described above, packages may be used to represent hierarchy levels. Entities are discrete business elements that are used during a business transaction. Data types are used to type object entities and interfaces with a structure. For example, DemandPlanSelectionCancelRequestMessage_sync message 64000 includes, among other things, DemandPlan 64006. Accordingly, heterogeneous applications may communicate using this consistent message configured as such.

Additionally, FIG. 65 illustrates one example logical configuration of DemandPlanSelectionChangeConfirmationMessage_sync message 65000. Specifically, this figure depicts the arrangement and hierarchy of various components such as one or more levels of packages, entities, and datatypes, shown here as 65000 to 65042. As described above, packages may be used to represent hierarchy levels. Entities are discrete business elements that are used during a business transaction. Data types are used to type object entities and interfaces with a structure. For example, DemandPlanSelectionChangeConfirmationMessage_sync message 65000 includes, among other things, DemandPlan 65006. Accordingly, heterogeneous applications may communicate using this consistent message configured as such.

Additionally, FIGS. 66-1 through 66-4 illustrate one example logical configuration of DemandPlanSelectionChangeRequestMessage_sync message 66000. Specifically, this figure depicts the arrangement and hierarchy of various components such as one or more levels of packages, entities, and datatypes, shown here as 66000 to 66086. As described above, packages may be used to represent hierarchy levels. Entities are discrete business elements that are used during a business transaction. Data types are used to type object entities and interfaces with a structure. For example, DemandPlanSelectionChangeRequestMessage_sync message 66000 includes, among other things, DemandPlan 66006. Accordingly, heterogeneous applications may communicate using this consistent message configured as such.

Additionally, FIG. 67 illustrates one example logical configuration of DemandPlanSelectionCreateConfirmationMessage_sync message 67000. Specifically, this figure depicts the arrangement and hierarchy of various components such as one or more levels of packages, entities, and datatypes, shown here as 67000 to 67042. As described above, packages may be used to represent hierarchy levels. Entities are discrete business elements that are used during a business transaction. Data types are used to type object entities and interfaces with a structure. For example, DemandPlanSelectionCreateConfirmationMessage_sync message 67000 includes, among other things, DemandPlan 67006. Accordingly, heterogeneous applications may communicate using this consistent message configured as such.

Additionally, FIGS. 68-1 through 68-3 illustrate one example logical configuration of DemandPlanSelectionCreateRequestMessage_sync message 68000. Specifically, this figure depicts the arrangement and hierarchy of various components such as one or more levels of packages, entities, and datatypes, shown here as 68000 to 68086. As described above, packages may be used to represent hierarchy levels. Entities are discrete business elements that are used during a business transaction. Data types are used to type object entities and interfaces with a structure. For example, DemandPlanSelectionCreateRequestMessage_sync message 68000 includes, among other things, DemandPlan 68006. Accordingly, heterogeneous applications may communicate using this consistent message configured as such.

Additionally, FIG. 69 illustrates one example logical configuration of DemandPlanSelectionSimpleByIDQueryMessage_sync message 69000. Specifically, this figure depicts the arrangement and hierarchy of various components such as one or more levels of packages, entities, and datatypes, shown here as 69000 to 69016. As described above, packages may be used to represent hierarchy levels. Entities are discrete business elements that are used during a business transaction. Data types are used to type object entities and interfaces with a structure. For example, DemandPlanSelectionSimpleByIDQueryMessage_sync message 69000 includes, among other things, Selection 69006. Accordingly, heterogeneous applications may communicate using this consistent message configured as such.

Additionally, FIG. 70 illustrates one example logical configuration of DemandPlanSelectionSimpleByIDResponseMessage_sync message 70000. Specifically, this figure depicts the arrangement and hierarchy of various components such as one or more levels of packages, entities, and datatypes, shown here as 70000 to 70036. As described above, packages may be used to represent hierarchy levels. Entities are discrete business elements that are used during a business transaction. Data types are used to type object entities and interfaces with a structure. For example, DemandPlanSelectionSimpleByIDResponseMessage_sync message 70000 includes, among other things, DemandPlan 70006. Accordingly, heterogeneous applications may communicate using this consistent message configured as such.

Additionally, FIG. 71 illustrates one example logical configuration of DemandPlanSimpleByDemandPlanningScenarioIDQueryMessage_sync message 71000. Specifically, this figure depicts the arrangement and hierarchy of various components such as one or more levels of packages, entities, and datatypes, shown here as 71000 to 71016. As described above, packages may be used to represent hierarchy levels. Entities are discrete business elements that are used during a business transaction. Data types are used to type object entities and interfaces with a structure. For example, DemandPlanSimpleByDemandPlanningScenarioIDQueryMessage_sync message 71000 includes, among other things, Selection 71006. Accordingly, heterogeneous applications may communicate using this consistent message configured as such.

Additionally, FIG. 72 illustrates one example logical configuration of DemandPlanSimpleByDemandPlanningScenarioIDResponseMessage_sync message 72000. Specifically, this figure depicts the arrangement and hierarchy of various components such as one or more levels of packages, entities, and datatypes, shown here as 72000 to 72024. As described above, packages may be used to represent hierarchy levels. Entities are discrete business elements that are used during a business transaction. Data types are used to type object entities and interfaces with a structure. For example, DemandPlanSimpleByDemandPlanningScenarioIDResponseMessage_sync message 72000 includes, among other things, DemandPlan 72006. Accordingly, heterogeneous applications may communicate using this consistent message configured as such.

Additionally, FIG. 73 illustrates one example logical configuration of DemandPlanVersionByIDandVersionPlanningVersionIDQueryMessage_sync message 73000. Specifically, this figure depicts the arrangement and hierarchy of various components such as one or more levels of packages, entities, and datatypes, shown here as 73000 to 73022. As described above, packages may be used to represent hierarchy levels. Entities are discrete business elements that are used during a business transaction. Data types are used to type object entities and interfaces with a structure. For example, DemandPlanVersionByIDandVersionPlanningVersionIDQueryMessage_sync message 73000 includes, among other things, Selection 73006. Accordingly, heterogeneous applications may communicate using this consistent message configured as such.

Additionally, FIGS. 74-1 through 74-2 illustrate one example logical configuration of DemandPlanVersionByIDandVersionPlanningVersionIDResponseMessage_sync message 74000. Specifically, this figure depicts the arrangement and hierarchy of various components such as one or more levels of packages, entities, and datatypes, shown here as 74000 to 74054. As described above, packages may be used to represent hierarchy levels. Entities are discrete business elements that are used during a business transaction. Data types are used to type object entities and interfaces with a structure. For example, DemandPlanVersionByIDandVersionPlanningVersionIDResponseMessage_sync message 74000 includes, among other things, DemandPlan 74006. Accordingly, heterogeneous applications may communicate using this consistent message configured as such.

Additionally, FIG. 75 illustrates one example logical configuration of DemandPlanVersionCancelConfirmationMessage_sync message 75000. Specifically, this figure depicts the arrangement and hierarchy of various components such as one or more levels of packages, entities, and datatypes, shown here as 75000 to 75036. As described above, packages may be used to represent hierarchy levels. Entities are discrete business elements that are used during a business transaction. Data types are used to type object entities and interfaces with a structure. For example, DemandPlanVersionCancelConfirmationMessage_sync message 75000 includes, among other things, DemandPlan 75006. Accordingly, heterogeneous applications may communicate using this consistent message configured as such.

Additionally, FIG. 76 illustrates one example logical configuration of DemandPlanVersionCancelRequestMessage_sync message 76000. Specifically, this figure depicts the arrangement and hierarchy of various components such as one or more levels of packages, entities, and datatypes, shown here as 76000 to 76028. As described above, packages may be used to represent hierarchy levels. Entities are discrete business elements that are used during a business transaction. Data types are used to type object entities and interfaces with a structure. For example, DemandPlanVersionCancelRequestMessage_sync message 76000 includes, among other things, DemandPlan 76006. Accordingly, heterogeneous applications may communicate using this consistent message configured as such.

Additionally, FIGS. 77-1 through 77-2 illustrate one example logical configuration of DemandPlanVersionChangeConfirmationMessage_sync message 77000. Specifically, this figure depicts the arrangement and hierarchy of various components such as one or more levels of packages, entities, and datatypes, shown here as 77000 to 77048. As described above, packages may be used to represent hierarchy levels. Entities are discrete business elements that are used during a business transaction. Data types are used to type object entities and interfaces with a structure. For example, DemandPlanVersionChangeConfirmationMessage_sync message 77000 includes, among other things, DemandPlan 77006. Accordingly, heterogeneous applications may communicate using this consistent message configured as such.

Additionally, FIG. 78 illustrates one example logical configuration of DemandPlanVersionChangeRequestMessage_sync message 78000. Specifically, this figure depicts the arrangement and hierarchy of various components such as one or more levels of packages, entities, and datatypes, shown here as 78000 to 78034. As described above, packages may be used to represent hierarchy levels. Entities are discrete business elements that are used during a business transaction. Data types are used to type object entities and interfaces with a structure. For example, DemandPlanVersionChangeRequestMessage_sync message 78000 includes, among other things, DemandPlan 78006. Accordingly, heterogeneous applications may communicate using this consistent message configured as such.

Additionally, FIG. 79 illustrates one example logical configuration of DemandPlanVersionCompleteConfirmationMessage_sync message 79000. Specifically, this figure depicts the arrangement and hierarchy of various components such as one or more levels of packages, entities, and datatypes, shown here as 79000 to 79036. As described above, packages may be used to represent hierarchy levels. Entities are discrete business elements that are used during a business transaction. Data types are used to type object entities and interfaces with a structure. For example, DemandPlanVersionCompleteConfirmationMessage_sync message 79000 includes, among other things, DemandPlan 79006. Accordingly, heterogeneous applications may communicate using this consistent message configured as such.

Additionally, FIG. 80 illustrates one example logical configuration of DemandPlanVersionCompleteRequestMessage_sync message 80000. Specifically, this figure depicts the arrangement and hierarchy of various components such as one or more levels of packages, entities, and datatypes, shown here as 80000 to 80028. As described above, packages may be used to represent hierarchy levels. Entities are discrete business elements that are used during a business transaction. Data types are used to type object entities and interfaces with a structure. For example, DemandPlanVersionCompleteRequestMessage_sync message 80000 includes, among other things, DemandPlan 80006. Accordingly, heterogeneous applications may communicate using this consistent message configured as such.

Additionally, FIGS. 81-1 through 81-2 illustrate one example logical configuration of DemandPlanVersionCreateConfirmationMessage_sync message 81000. Specifically, this figure depicts the arrangement and hierarchy of various components such as one or more levels of packages, entities, and datatypes, shown here as 81000 to 81048. As described above, packages may be used to represent hierarchy levels. Entities are discrete business elements that are used during a business transaction. Data types are used to type object entities and interfaces with a structure. For example, DemandPlanVersionCreateConfirmationMessage_sync message 81000 includes, among other things, PlanningVersionID 81024. Accordingly, heterogeneous applications may communicate using this consistent message configured as such.

Additionally, FIG. 82 illustrates one example logical configuration of DemandPlanVersionCreateRequestMessage_sync message 82000. Specifically, this figure depicts the arrangement and hierarchy of various components such as one or more levels of packages, entities, and datatypes, shown here as 82000 to 82034. As described above, packages may be used to represent hierarchy levels. Entities are discrete business elements that are used during a business transaction. Data types are used to type object entities and interfaces with a structure. For example, DemandPlanVersionCreateRequestMessage_sync message 82000 includes, among other things, PlanningVersionID 82024. Accordingly, heterogeneous applications may communicate using this consistent message configured as such.

Additionally, FIG. 83 illustrates one example logical configuration of DemandPlanVersionSimpleByIDQueryMessage_sync message 83000. Specifically, this figure depicts the arrangement and hierarchy of various components such as one or more levels of packages, entities, and datatypes, shown here as 83000 to 83016. As described above, packages may be used to represent hierarchy levels. Entities are discrete business elements that are used during a business transaction. Data types are used to type object entities and interfaces with a structure. For example, DemandPlanVersionSimpleByIDQueryMessage_sync message 83000 includes, among other things, DemandPlanID 83012. Accordingly, heterogeneous applications may communicate using this consistent message configured as such.

Additionally, FIG. 84 illustrates one example logical configuration of DemandPlanVersionSimpleByIDResponseMessage_sync message 84000. Specifically, this figure depicts the arrangement and hierarchy of various components such as one or more levels of packages, entities, and datatypes, shown here as 84000 to 84042. As described above, packages may be used to represent hierarchy levels. Entities are discrete business elements that are used during a business transaction. Data types are used to type object entities and interfaces with a structure. For example, DemandPlanVersionSimpleByIDResponseMessage_sync message 80000 includes, among other things, PlanningVersionID 84000. Accordingly, heterogeneous applications may communicate using this consistent message configured as such.

DemandPlanKeyFigureValueUpdateConfirmation_sync

A DemandPlanKeyFigureValueUpdateConfirmation_sync is a response from Demand Planning to a DemandPlanKeyFigureUpdateRequest_sync. The structure of the message type DemandPlanKeyFigureValueUpdateConfirmation_sync is specified by the message data type DemandPlanKeyFigureValueUpdateConfirmationMessage_sync. It either contains the confirmed Demand Plan if there was no concurrent change of key figure values, or it contains detailed information in the Log package if the Demand Plan was not permanently saved in Demand Planning due to a concurrent change of key figure values.

A DemandPlanCancelRequest_sync is a request to delete a demand plan. The structure of the message type DemandPlanCancelRequest_sync is specified by the message data type DemandPlanCancelRequestMessage_sync.

A DemandPlanCancelConfirmation_sync is a confirmation from Demand Planning to a DemandPlanCancelRequest_sync. The structure of the message type DemandPlanCancelConfirmation_sync is specified by the message data type DemandPlanCancelConfirmationMessage_sync. DemandPlanCancelConfirmation_sync confirms the deletion of a demand plan by sending the corresponding ID.

A DemandPlanKeyFigureValueByElementsQuery_sync is an inquiry for key figure values of a specific version of a demand plan. The structure of the message type DemandPlanKeyFigureValueByElementsQuery_sync is specified by the message data type DemandPlanKeyFigureValueByElementsQueryMessage_sync.

A DemandPlanKeyFigureValueByElementsResponse_sync is a response from Demand Planning to a DemandPlanKeyFigureValueByElementsQuery_sync. The structure of the message type DemandPlanKeyFigureValueByElementsResponse_sync is specified by the message data type DemandPlanKeyFigureValueByElementsResponseMessage_sync.

A DemandPlanSimpleByDemandPlanningScenarioIDQuery_sync retrieves the ID of a demand plan assigned to a specific demand planning scenario. The structure of the message type DemandPlanSimpleByDemandPlanningScenarioIDQuery_sync is specified by the message data type DemandPlanSimpleByDemandPlanningScenarioIDQueryMessage_sync.

A DemandPlanSimpleByDemandPlanningScenarioIDResponse_sync is a response from Demand Planning to a DemandPlanSimpleByDemandPlanningScenarioIDQuery_sync. The structure of the message type DemandPlanSimpleByDemandPlanningScenarioIDResponse_sync is specified by the message data type DemandPlanSimpleByDemandPlanningScenarioIDResponseMessage_sync.

A DemandPlanKeyFigureValueSimulateRequest_sync is a request to simulate the aggregation or disaggregation of key figure values. The structure of the message type DemandPlanKeyFigureValueSimulateRequest_sync is specified by the message data type DemandPlanKeyFigureValueSimulateRequestMessage_sync.

A DemandPlanKeyFigureValueSimulateConfirmation_sync is a confirmation from Demand Planning to a DemandPlanKeyFigureValueSimulateConfirmation_sync. The structure of the message type DemandPlanKeyFigureValueSimulateConfirmation_sync is specified by the message data type DemandPlanKeyFigureValueSimulateConfirmationMessage_sync.

A DemandPlanFunctionExecuteRequest_sync is a request to execute a function on DemandPlan. The structure of the message type DemandPlanFunctionExecuteRequest_sync is specified by the message data type DemandPlanFunctionExecuteRequest_sync.

A DemandPlanFunctionExecuteConfirmation_sync is a confirmation from Demand Planning to a DemandPlanFunctionExecuteRequest_sync. The structure of the message type DemandPlanFunctionExecuteConfirmation_sync is specified by the message data type DemandPlanFunctionExecuteConfirmationMessage_sync. DemandPlanFunctionExecuteConfirmation_sync contains the resulting DemandPlan after the execution of the planning function.

A DemandPlanVersionCreateRequest_sync is a request to create a version of a demand plan. The structure of the message type DemandPlanVersionCreateRequest_sync is specified by the message data type DemandPlanVersionCreateRequestMessage_sync.

A DemandPlanVersionCreateConfirmation_sync is a confirmation from Demand Planning to a DemandPlanVersionCreateRequest_sync. The structure of the message type DemandPlanVersionCreateConfirmation_sync is specified by the message data type DemandPlanVersionCreateConfirmationMessage_sync. A DemandPlanVersionCreateConfirmation_sync confirms the creation of a version of a demand plan by sending the corresponding ID.

A DemandPlanVersionByIDandVersionPlanningVersionIDQuery_sync is an inquiry for a version of a demand plan. The structure of the message type DemandPlanVersionByIDandVersionPlanningVersionIDQuery_sync is specified by the message data type DemandPlanVersionByIDandVersionPlanningVersionIDQueryMessage_sync.

A DemandPlanVersionByIDandVersionPlanningVersionIDResponse_sync is a response from Demand Planning to a DemandPlanVersionByIDandVersionPlanningVersionIDQuery_sync. The structure of the message type DemandPlanVersionByIDandVersionPlanningVersionIDResponse_sync is specified by the message data type DemandPlanVersionByIDandVersionPlanningVersionIDResponseMessage_sync.

A DemandPlanVersionChangeRequest_sync is a request to change a version of a demand plan. The structure of the message type DemandPlanVersionChangeRequest_sync is specified by the message data type DemandPlanVersionChangeRequestMessage_sync.

A DemandPlanVersionChangeConfirmation_sync is a confirmation from Demand Planning to a DemandPlanVersionChangeRequest_sync. The structure of the message type DemandPlanVersionChangeConfirmation_sync is specified by the message data type DemandPlanVersionChangeConfirmationMessage_sync.

A DemandPlanVersionCancelRequest_sync is a request to delete a version of a demand plan. The structure of the message type DemandPlanVersionCancelRequest_sync is specified by the message data type DemandPlanVersionCancelRequestMessage_sync.

A DemandPlanVersionCancelConfirmation_sync is a confirmation from Demand Planning to a DemandPlanVersionCancelRequest_sync. The structure of the message type DemandPlanVersionCancelConfirmation_sync is specified by the message data type DemandPlanVersionCancelConfirmationMessage_sync. A DemandPlanVersionCancelConfirmation_sync confirms the deletion of a version of a demand plan by sending the corresponding ID.

A DemandPlanVersionSimpleByIDQuery_sync is an inquiry for the identifying elements of the versions of a demand plan. The structure of the message type DemandPlanVersionSimpleByIDQuery_sync is specified by the message data type DemandPlanVersionSimpleByIDQueryMessage_sync.

A DemandPlanVersionSimpleByIDResponse_sync is a response from Demand Planning to a DemandPlanVersionSimpleByIDResponse_sync. The structure of the message type DemandPlanVersionSimpleByIDResponse_sync is specified by the message data type DemandPlanVersionSimpleByIDResponseMessage_sync.

A DemandPlanVersionCompleteRequest_sync is a request from a planning administrator to complete missing assignments of key figures to demand planning characteristic value combinations. The structure of the message type DemandPlanVersionCompleteRequest_sync is specified by the message data type DemandPlanVersionCompleteRequest_sync.

A DemandPlanVersionCompleteConfirmation_sync is a confirmation from Demand Planning to a DemandPlanVersionCompleteRequest_sync. The structure of the message type DemandPlanVersionCompleteConfirmation_sync is specified by the message data type DemandPlanVersionCompleteConfirmationMessage_sync.

A DemandPlanSelectionCreateRequest_sync is a request to create a selection of a demand plan. The structure of the message type DemandPlanSelectionCreateRequest_sync is specified by the message data type DemandPlanSelectionCreateRequestMessage_sync.

A DemandPlanSelectionCreateConfirmation_sync is a confirmation from Demand Planning to a DemandPlanSelectionCreateRequest_sync. The structure of the message type DemandPlanSelectionCreateConfirmation_sync is specified by the message data type DemandPlanSelectionCreateConfirmationMessage_sync. A DemandPlanSelectionCreateConfirmation_sync confirms the creation of a selection of a demand plan by sending the corresponding DemandPlanSelectionID.

A DemandPlanSelectionByIDandSelectionIDQuery_sync is an inquiry for a selection of a demand plan. The structure of the message type DemandPlanSelectionByIDandSelectionIDQuery_sync is specified by the message data type DemandPlanSelectionByIDandSelectionIDQueryMessage_sync.

A DemandPlanSelectionByIDandSelectionIDResponse_sync is a response from Demand Planning to a DemandPlanSelectionByIDandSelectionIDQuery_sync. The structure of the message type DemandPlanSelectionByIDandSelectionIDResponse_sync is specified by the message data type DemandPlanSelectionByIDandSelectionIDResponseMessage_sync.

A DemandPlanSelectionChangeRequest_sync is a request to change a selection of a demand plan. The structure of the message type DemandPlanSelectionChangeRequest_sync is specified by the message data type DemandPlanSelectionChangeRequestMessage_sync.

A DemandPlanSelectionChangeConfirmation_sync is a confirmation from Demand Planning to a DemandPlanSelectionChangeRequest_sync. The structure of the message type DemandPlanSelectionChangeConfirmation_sync is specified by the message data type DemandPlanSelectionChangeConfirmationMessage_sync. A DemandPlanSelectionChangeConfirmation_sync confirms the change of a selection of a demand plan by sending the corresponding DemandPlanSelectionID.

A DemandPlanSelectionCancelRequest_sync is a request to delete a selection of a demand plan. The structure of the message type DemandPlanSelectionCancelRequest_sync is specified by the message data type DemandPlanSelectionCancelRequestMessage_sync.

A DemandPlanSelectionCancelConfirmation_sync is a confirmation from Demand Planning to a DemandPlanSelectionCancelRequest_sync. The structure of the message type DemandPlanSelectionCancelConfirmation_sync is specified by the message data type DemandPlanSelectionCancelConfirmationMessage_sync. A DemandPlanSelectionCancelConfirmation_sync confirms the deletion of a selection of a demand plan by sending the corresponding DemandPlanSelectionID.

A DemandPlanSelectionSimpleByIDQuery_sync is an inquiry for the identifying elements of the selections of a demand plan. The structure of the message type DemandPlanSelectionSimpleByIDQuery_sync is specified by the message data type DemandPlanSelectionSimpleByIDQueryMessage_sync.

A DemandPlanSelectionSimpleByIDResponse_sync is a response from Demand Planning to a DemandPlanSelectionSimpleByIDQuery_sync. The structure of the message type DemandPlanSelectionSimpleByIDResponse_sync is specified by the message data type DemandPlanSelectionSimpleByIDResponseMessage_sync.

The DemandPlan messages are implemented by the following message interfaces at Demand Planning side: DemandPlanCreateRequestConfirmation_In, DemandPlanKeyFigureValueChangeRequestConfirmation_In, DemandPlanKeyFigureValueUpdateRequestResponse_In, DemandPlanCancelRequestConfirmation_In, DemandPlanKeyFigureValueByElementsQueryResponse_In DemandPlanSimpleByDemandPlanningScenarioIDQueryResponse_In DemandPlanKeyFigureValueSimulateRequestConfirmation_In, DemandPlanFunctionExecuteRequestConfirmation_In, DemandPlanVersionCreateRequestConfirmation_In, DemandPlanVersionByIDandVersionIDQueryResponse_In, DemandPlanVersionChangeRequestConfirmation_In, DemandPlanVersionCancelRequestConfirmation_In, DemandPlanVersionSimpleByIDQueryResponse_In, DemandPlanVersionCompleteRequestConfirmation_In, DemandPlanSelectionCreateRequestConfirmation_In, DemandPlanSelectionByIDandSelectionIDQueryResponse_In DemandPlanSelectionChangeRequestConfirmation_In, DemandPlanSelectionCancelRequestConfirmation_In, and DemandPlanSelectionSimpleByIDQueryResponse_In.

Message Data Type DemandPlanTemplateMessage_sync

The abstract message data type DemandPlanTemplateMessage_sync includes all data parts of the central part of the Demand Plan, which are relevant for service definitions. It groups the MessageHeader package, DemandPlan package, and Log package. The message data type DemandPlanTemplateMessage_sync is used as an abstract maximal message data type, which unifies all packages and entities for the following concrete message data types:

| Message data type | | | | | |
|---|---|---|---|---|---|
| | DemandPlan-CreateRequest-Message_sync | DemandPlan-CreateConfirmation-Message_sync | DemandPlan-KeyFigureValue-ChangeRequest-Message_sync | DemandPlan-KeyFigureValue-ChangeConfirmation-Message_sync | DemandPlan-KeyFigureValue-UpdateRequest-Message_sync |
| Package/Entity | | | 1 | 1 | 1 |
| MessageHeader | 1 | 0..1 | 1 | 0..1 | 1 |
| DemandPlan | | | 1 | 1 | 1 |
| Selection | | | 0..1 | 1 | 0..1 |
| DemandPlan-Version | | | | | |
| DemandPlanSelection-Characteristic-Value | | | 0..N | 0..N | 0..N |
| PlanningLevel | | | 1..N | 1..N | 1..N |
| PlanningLevel-Characteristic | | | 0..N | 0..N | 0..N |
| Characteristic-ValueCombination | | | 1..N | 1..N | 1..N |
| Characteristic-Value | | | 0..N | 0..N | 0..N |
| KeyFigure | | | 1..N | 1..N | 1..N |
| Value | | | 0..N | 0..N | 0..N |
| Property | | | | 0..N | |
| TimeSeriesPeriod | | | 1..N | 0..N | 1..N |
| Characteristic- | | | | | |

-continued

| Message data type | | | | | |
|---|---|---|---|---|---|
| ValueDescription Log | | 1 | | 1 | |
| | DemandPlan-KeyFigureValue-UpdateConfirmation-Message_sync | DemandPlan-CancelRequest-Message_sync | DemandPlan-Cancel-Confirmation-Message_sync | DemandPlanKey-FigureValueBy-ElementsResponse-Message_sync | DemandPlan-SimpleByDemand-PlanningScenario-IDResponse-Message_sync |
| Package/Entity | 1 | | | 1 | |
| MessageHeader | 0..1 | 1 | 0..1 | 0..1 | 0..1 |
| DemandPlan | 1 | | | 1 | |
| Selection | 1 | | | 1 | |
| DemandPlan-Version | | | | | |
| DemandPlanSelection-Characteristic-Value | 0..N | | | 0..N | |
| PlanningLevel | 0..N | | | 1..N | |
| PlanningLevel-Characteristic | 0..N | | | 0..N | |
| Characteristic-ValueCombination | 1..N | | | 1..N | |
| Characteristic-Value | 0..N | | | 0..N | |
| KeyFigure | 1..N | | | 1..N | |
| Value | 0..N | | | 1..N | |
| Property | 0..N | | | 0..N | |
| TimeSeriesPeriod | 0..N | | | 1..N | |
| Characteristic-ValueDescription | | | | 0..N | |
| Log | 1 | | 1 | 1 | 1 |

| | DemandPlanKey-FigureValue-SimulateRequest-Message_sync | DemandPlanKey-FigureValue-SimulateConfirmation-Message_sync | DemandPlan-Function-ExecuteRequest-Message_sync | DemandPlan-Function-ExecuteConfirmation-Message_sync |
|---|---|---|---|---|
| Package/Entity | | | 1 | 1 |
| MessageHeader | 1 | 0..1 | 1 | 0..1 |
| DemandPlan | 1 | 1 | 1 | 1 |
| Selection | 0..1 | 1 | 0..1 | 1 |
| DemandPlan-Version | | | | |
| DemandPlanSelection-Characteristic-Value | 0..N | 0..N | 0..N | 0..N |
| PlanningLevel | 1..N | 1..N | 1..N | 1..N |
| PlanningLevel-Characteristic | 0..N | 0..N | 0..N | 0..N |
| Characteristic-ValueCombination | 1..N | 1..N | 0..N | 1..N |
| Characteristic-Value | 0..N | 0..N | 0..N | 0..N |
| KeyFigure | 1..N | 1..N | 1..N | 1..N |
| Value | 0..N | 0..N | 0..N | 0..N |
| Property | | . . . N | | 0..N |
| TimeSeriesPeriod | 1..N | 0..N | 0..N | 0..N |
| Characteristic-ValueDescription | | | | |
| Log | | 1 | | 1 |

DemandPlanKeyFigureValueChangeRequest_sync changes the key figure values assigned to Planning Level Characteristic Value Combinations for one or more time periods in the specified Demand Plan Version. The key figure values can be changed at different planning levels. A planning level defines the level of aggregation of Demand Planning Characteristic Value Combinations. Key figure value changes at an aggregated planning level are disaggregated to the most detailed planning level according to the disaggregation rules defined for each Demand Plan Key Figure in the Demand Planning Scenario.

DemandPlanKeyFigureValueByElementsResponse_sync contains the key figure values for the requested key figures in the requested time interval. The key figure values are assigned to Demand Planning Characteristic Value Combinations, which are assigned to a planning level. Furthermore, additional descriptive information is provided, such as planning period descriptions and characteristic value descriptions. The DemandPlanKeyFigureValueByElementsResponse_sync can be used as a template to change the Demand Plan with DemandPlanKeyFigureValueChangeRequest_sync. The reason is that DemandPlanKeyFigureValueByElementsResponse_sync provides the Demand Plan in the proper structure to be used in DemandPlanKeyFigureValueChangeRequest_sync.

DemandPlanKeyFigureValueSimulateRequest_sync aggregates or disaggregates the changed key figure values assigned to Demand Planning Characteristic Value Combinations for one or more time periods in the specified Demand Plan Version. Usually more than one planning level is used in the Demand Plan. A key figure value change at one planning level will result in a key figure value change at the other planning levels. The DemandPlanKeyFigureValueSimulateRequest_sync makes it possible to request this kind of recalculation. The changed key figure values might not be permanently saved in Demand Planning The DemandPlanKeyFigureValueSimulateRequest_sync is thus typically used instead of the DemandPlanKeyFigureValueChangeRequest_sync to simulate the DemandPlanKeyFigureValueChangeRequest_sync without permanently saving the changed key figure values.

DemandPlanKeyFigureValueSimulateConfirmation_sync confirms the successful simulation of a Demand Plan. It contains the confirmed or updated Demand Plan. The key figure values assigned to Demand Planning Characteristic Value Combinations sent with the DemandPlanKeyFigureValueSimulateRequest_sync are confirmed, adjusted, or rejected. If the DemandPlanKeyFigureValueSimulateRequest_sync referred to more than one planning level, changed key figure values at one planning level are aggregated or disaggregated to the other planning levels and the updated key figure values are sent back.

A MessageHeader package groups the business information that is relevant for sending a business document in a message. It contains the MessageHeader entity. A MessageHeader groups the following business information from the perspective of the sending application: information to identify the business document in a message, information about the sender, and information about the recipient.

The MessageHeader contains the SenderParty and RecipientParty entities. It is of type GDT: BusinessDocumentMessageHeader. MessageHeader includes the following elements of the GDT: ID, ReferenceID, SenderParty, RecipientParty, and CreationDateTime. A SenderParty is the party responsible for sending the business document at business application level. The SenderParty is of type GDT:BusinessDocumentMessageHeaderParty. A RecipientParty is the party responsible for receiving the business document at business application level. The RecipientParty is of type GDT:BusinessDocumentMessageHeaderParty.

The DemandPlan package groups the DemandPlan with its packages: DemandPlanSelection package, PlanningLevel package, TimeSeriesPeriod package, and CharacteristicValueDescription. It contains the DemandPlan entity. A DemandPlan is the forecasted future demand of products or product lines as well as the historical demand of products or product lines. The DemandPlan entity can include the following elements: ID, DemandPlanningScenarioID, DemandPlanningViewID, DemandPlanFunctionID, and SystemAdministrativeData. ID is the DemandPlanID is a unique identifier for a Demand Plan, may be of type GDT:DemandPlanID. DemandPlanningScenarioID is the DemandPlanningScenarioID is a unique identifier for a Demand Planning Scenario, and may be of type GDT:DemandPlanningScenarioID. DemandPlanningViewID is the DemandPlanningViewID is a unique identifier for a Demand Planning View, and may be of type GDT:DemandPlanningViewID. DemandPlanFunctionID is the DemandPlanFunctionID is a unique identifier for a DemandPlanFunction, and may be of type GDT:DemandPlanFunctionID. SystemAdministrativeData is the SystemAdministrativeData is administrative data that is stored in a system. It includes system users and change dates/times of the DemandPlan, and may be of type GDT:SystemAdministrativeData.

In some implementations, the element DemandPlanningScenarioID is contained in the entity DemandPlan for the message data types DemandPlanCreateRequestMessage_sync and DemandPlanCreateConfirmationMessage_sync. In some implementations, the element DemandPlanningViewID is contained in the entity DemandPlan for the message data types DemandPlanKeyFigureValueChangeRequestMessage_sync, DemandPlanKeyFigureValueChangeConfirmationMessage_sync, DemandPlanKeyFigureValueUpdateRequestMessage_sync, DemandPlanKeyFigureValueUpdateConfirmationMessage_sync, DemandPlanKeyFigureValueByElementsResponseMessage_sync, DemandPlanKeyFigureValueSimulateRequestMessage_sync, DemandPlanKeyFigureSimulateConfirmationMessage_sync, DemandPlanFunctionExecuteRequestMessage_sync, and DemandPlanFunctionExecuteConfirmationMessage_sync.

The element DemandPlanningViewID may be included in the message data types DemandPlanFunctionExecuteRequestMessage_sync, and DemandPlanFunctionExecuteConfirmationMessage_sync.

In some implementations, the element DemandPlanningViewFunctionID is included in the entity DemandPlan for the message data types DemandPlanFunctionExecuteRequestMessage_sync, and DemandPlanFunctionExecuteConfirmationMessage_sync.

In some implementations, the element SystemAdministrativeData is included in the entity DemandPlan for the message data types DemandPlanCreateConfirmationMessage_sync, and DemandPlanKeyFigureValueByElementsResponseMessage_sync.

The DemandPlanSelection package groups the selection and its properties. It contains the following entities: DemandPlanSelection, DemandPlanVersion, and DemandPlanSelectionCharacteristicValue. A DemandPlanSelection is a filter for the DemandPlanningCharacteristicValueCombinations, and the DemandPlanVersion. The DemandPlanSelection entity contains the ID element. The ID is a unique identifier for a DemandPlanSelection, and may be of type GDT:DemandPlanSelectionID.

For the message data types DemandPlanKeyFigureValueChangeRequestMessage_sync, DemandPlanKeyFigureValueUpdateRequestMessage_sync, DemandPlanKeyFigureValueSimulateRequestMessage_sync, and DemandPlanFunctionExecuteRequestMessage_sync a DemandPlanSelection is specified either by providing the DemandPlanSelectionID or the DemandPlanVersion and CharacteristicValue entities.

The element ID can be include in the message data types DemandPlanKeyFigureValueChangeRequestMessage_sync, DemandPlanKeyFigureValueUpdateRequestMessage_sync, DemandPlanKeyFigureValueSimulateRequestMessage_sync, and DemandPlanFunctionExecuteRequestMessage_sync.

A DemandPlanVersion defines a logically independent version of a demand plan. The DemandPlanVersion entity contains the PlanningVersionID. The PlanningVersionID is an identifier for a version of a Demand Plan, and may be of type GDT:PlanningVersionID. A DemandPlanSelectionCharacteristicValue defines intervals for characteristic values for a certain characteristic.

The DemandPlanSelectionCharacteristicValue entity can include the DemandPlanCharacteristicID and SelectionByDemandPlanCharacteristicValue elements. The DemandPlanCharacteristicID is an identifier for a DemandPlanCharacteristic, and may be based on GDT: DemandPlanCharacteristicID. A SelectionByDemandPlanCharacteristicValue is an interval for characteristic values for a certain characteristic, and may be based on IDT:SelectionByDemandPanCharacteristicValue. The SelectionByDemandPlanCharacteristicValue can include the elements:

InclusionExclusionCode, InclusionExclusionName, InclusionExclusionDescription, IntervalBoundaryTypeCode, IntervalBoundaryTypeName, IntervalBoundaryTypeDescription, LowerBoundaryDemandPlanCharacteristicValue, and UpperBoundaryDemandPlanCharacteristicValue. The InclusionExclusionCode defines if the interval defined by IntervalBoundaryTypeCode, LowerBoundaryDemandPlanCharacteristicValue, and UpperBoundaryDemandPlanCharacteristicValue is included in the result set or excluded, and may be of type GDT:InclusionExclusionCode. The InclusionExclusionName names the InclusionExclusionCode, and may be of type GDT:MEDIUM_Name.

The InclusionExclusionDescription is the representation of the InclusionExclusionCode in natural language, and may be based on GDT:LONG_Description. The IntervalBoundaryTypeCode is a coded representation of an interval boundary type, and may be of type GDT:IntervalBoundaryTypeCode. The IntervalBoundaryTypeName names the IntervalBoundaryTypeCode, and may be of type GDT:MEDIUM_Name. The IntervalBoundaryTypeDescription is the representation of the IntervalBoundaryTypeCode in natural language and may be of type GDT: IntervalBoundaryTypeCode. The LowerBoundaryDemandPlanCharacteristicValue is the lower boundary of the characteristic value interval, and may be based on GDT:DemandPlanCharacteristicValue. The UpperBoundaryDemandPlanCharacteristicValue is the upper boundary of the characteristic value interval, and may be based on GDT:DemandPlanCharacteristicValue. In some implementations, the elements InclusionExclusionName, InclusionExclusionDescription, IntervalBoundaryTypeName, and IntervalBoundaryDescription are contained in the entity DemandPlanSelectionCharacteristicValue for the message data types DemandPlanKeyFigureValueChangeConfirmationMessage_sync, DemandPlanKeyFigureValueUpdateConfirmationMessage_sync, DemandPlanKeyFigureValueByElementsResponseMessage_sync, DemandPlanKeyFigureValueSimulateConfirmationMessage_sync, and DemandPlanFunctionExecuteConfirmationMessage_sync.

The PlanningLevel package groups the planning level and its properties. It contains the following entities: PlanningLevel, PlanningLevelCharacteristic, PlanningLevelCharacteristicValueCombination, PlanningLevelCharacteristicValueCombinationCharacteristicValue, KeyFigure, and KeyFigureValue. A PlanningLevel is a view on the key figure values that can be changed. The PlanningLevel entity contains the OrdinalNumberValue element. The OrdinalNumberValue is an integer defining the position of a PlanningLevel in a sequence of PlanningLevels, and may be based on GDT:OrdinalNumberValue. In some implementations, if multiple PlanningLevels are specified within a message, the OrdinalNumberValues can define a number sequence without gaps starting with 1. Key figure value changes may be disaggregated to the most detailed planning level according to the disaggregation rules defined for each key figure in the Demand Planning Scenario. A PlanningLevelCharacteristic is a characteristic for the PlanningLevel defining the level of aggregation. The PlanningLevelCharacteristic entity contains the DemandPlanCharacteristicID element. The DemandPlanCharacteristicID is an identifier for a Demand Plan Characteristic, and may be based on GDT:DemandPlanCharacteristicID. The PlanningLevelCharacteristics assigned to a PlanningLevel define the level of aggregation of the PlanningLevelCharacteristicValueCombinations assigned to the PlanningLevel. A PlanningLevelCharacteristicValueCombination is a DemandPlanningCharacteristicValueCombination assigned to a PlanningLevel. The PlanningLevelCharacteristicValueCombination entity contains the DemandPlanningCharacteristicValueCombinationID element. The CharacteristicValueCombinationID is an identifier for a PlanningLevelCharacteristicValueCombination, and may be based on GDT:DemandPlanningCharacteristicValueCombinationID. In some implementations, the element DemandPlanningCharacteristicValueCombinationID is contained in the entity CharacteristicValueCombination for the message data types DemandPlanKeyFigureValueChangeRequestMessage_sync, DemandPlanKeyFigureValueChangeConfirmationMessage_sync, DemandPlanKeyFigureValueByElementsResponseMessage_sync, DemandPlanFunctionExecuteRequestMessage_sync, and DemandPlanFunctionExecuteConfirmationMessage_sync. The PlanningLevelCharacteristicValueCombination can be specified by providing the DemandPlanningCharacteristicValueCombinationID or the CharacteristicValues.

A PlanningLevelCharacteristicValueCombinationCharacteristicValue is a combination of a characteristic and a characteristic value defining the PlanningLevelCharacteristicValueCombination. The PlanningLevelCharacteristicValueCombinationCharacteristicValue entity contains the DemandPlanCharacteristicID and DemandPlanCharacteristicValue entities. The DemandPlanCharacteristicID is an identifier for a Demand Plan Characteristic, and may be based on GDT:DemandPlanCharacteristicID. The DemandPlanCharacteristicValue specifies the value assigned to a DemandPlanCharacteristicID, and may be based on GDT:DemandPlanCharacteristicValue. The PlanningLevelCharacteristicValueCombinationCharacteristicValues define the PlanningLevelCharacteristicValueCombination. For each PlanningLevelCharacteristic assigned to the PlanningLevel a PlanningLevelCharacteristicValueCombinationCharacteristicValue can exist.

A KeyFigure represents a planning parameter which holds planning values assigned to a DemandPlanningCharacteristicValueCombination for a DemandPlanVersion and certain time periods. The KeyFigure entity contains the following elements: DemandPlanKeyFigureID, MeasureUnitCode, MeasureUnitName, MeasureUnitDescription, CurrencyCode, CurrencyName, and CurrencyDescription. The DemandPlanKeyFigureID is an identifier for a DemandPlanKeyFigure, and may be based on GDT:DemandPlanKeyFigureID. The MeasureUnitCode is the coded representation of a non-monetary unit of measurement, and may be based on GDT:MeasureUnitCode. The MeasureUnitName names the MeasureUnitCode, and may be based on GDT:MEDIUM_Name. The MeasureUnitDescription is the representation of the MeasureUnitCode in natural language, and may be based on GDT:LONG_Description. The CurrencyCode is the coded representation of the currency, and may be based on GDT:CurrencyCode. The CurrencyName names the CurrencyCode, and may be based on GDT:MEDIUM_Name. The CurrencyDescription is the representation of the CurrencyCode in natural language, and may be based on GDT: LONG_Description. In some implementations, either the elements MeasureUnitCode, MeasureUnitName, and MeasureUnitDescription or the elements CurrencyCode, CurrencyName, and CurrencyDescription are used in the entity KeyFigure depending on the type of the KeyFigureValues. In some implementaitons, the elements MeasureUnitName, MeasureUnitDescription, CurrencyName, and CurrencyDescription can be contained in the entity KeyFigure for the message data types DemandPlanKeyFigureValueChangeConfirmationMessage_sync, DemandPlanKeyFigureValueUpdateConfirmationMessage_sync, DemandPlanKeyFigureValueByElementsResponseMessage_sync, DemandPlanKeyFigureValueSimulateConfirmationMessage_sync, and DemandPlanFunctionExecuteConfirmationMessage_sync. The KeyFigure entity groups all information that is common to all KeyFigureValues assigned to the KeyFigure.

A KeyFigureValue is a single planning value assigned to a certain time period. The KeyFigureValue entity contains the following elements: TimeSeriesPeriodID, Value, FixingCode, FixingName, and FixingDescription. The TimeSeriesPeriodID is a unique identifier of a Time Series Period, and may be based on GDT:TimeSeriesPeriodID. The KeyFigureValue is a value of a key figure in the Time Series Period. The FixingCode is a coded representation of the fixation of the key figure value. The FixingName names the FixingCode. The FixingDescription is the representation of the FixingCode in natural language, and may be based on GDT:LONG_Description. The element Value can be included in the message data types DemandPlanKeyFigureValueChangeRequestMessage_sync, DemandPlanKeyFigureValueUpdateRequestMessage_sync, DemandPlanKeyFigureValueSimulateRequestMessage_sync, and DemandPlanFunctionExecuteRequestMessage_sync. The elements FixingCode, FixingName, and FixingDescription are contained in the entity KeyFigureValue for the message data types DemandPlanKeyFigureValueChangeConfirmationMessage_sync, DemandPlanKeyFigureValueUpdateConfirmationMessage_sync, DemandPlanKeyFigureValueByElementsResponseMessage_sync, DemandPlanKeyFigureValueSimulateConfirmationMessage_sync, and DemandPlanFunctionExecuteConfirmationMessage_sync.

A KeyFigureValueProperty defines a property of a KeyFigureValue. The KeyFigureValueProperty entity contains the ID and Value elements. The ID is a unique identifier for a property, and may be based on GDT:PropertyID. Value describes a value that can be assigned to a property, and may be based on GDT:PropertyValue. The node Property is contained in the message data types DemandPlanKeyFigureValueChangeConfirmationMessage_sync, DemandPlanKeyFigureValueUpdateConfirmationMessage_sync, DemandPlanKeyFigureValueByElementsResponseMessage_sync, DemandPlanKeyFigureValueSimulateConfirmationMessage_sync and DemandPlanFunctionExecuteConfirmationMessage_sync, if the corresponding message data types DemandPlanKeyFigureValueChangeRequestMessage_sync, DemandPlanKeyFigureValueUpdateRequestMessage_sync, DemandPlanKeyFigureValueByElementsQueryMessage_sync, DemandPlanKeyFigureValueSimulateConfirmationMessage_sync, or DemandPlanFunctionExecuteRequestMessage_sync provided the element DemandPlanningView.

The TimeSeriesPeriod package groups the timeseries periods and its properties. It contains the following TimeSeriesPeriod entity. A TimeSeriesPeriod defines the time range of a KeyFigureValue as well as periodicity and textual information. The TimeSeriesPeriod entity contains the following elements: ID, DatePeriod, CalendarUnitCode, CalendarUnitName, CalendarUnitDescription, FiscalYearVariantCode, FiscalYearVariantName, FiscalYearVariantDescription, and Description. The TimeSeriesPeriodID is a unique identifier of a Time Series Period, and may be based on GDT:TimeSeriesPeriodID. The Period defines the start and end date, and may be based on GDT:CLOSED_DatePeriod. The CalendarUnitCode is a coded representation of a calendar-related unit, and may be based on GDT:CalendarUnitCode. The CalendarUnitName names the CalendarUnitCode, and may be based on GDT:MEDIUM_Name. The CalendarUnitDescription is the representation of the CalendarUnitCode in natural language, and may be based on GDT:LONG_Description. The FiscalYearVariantCode is a coded representation of a fiscal year variant, and may be based on GDT:FiscalYearVariantCode. The FiscalYearVariantName names the FiscalYearVariantCode, and may be based on GDT:MEDIUM_Name. The FiscalYearVariantDescription is the representation of the FiscalYearVariantCode in natural language, and may be based on GDT:LONG_Description. The Description is a representation of the Period and CalendarUnitCode in natural language, and may be based on GDT:LEN60_Description. In some implementations, the elements CalendarUnitCode, CalendarUnitName, CalendarUnitDescription, FiscalYearVariantCode, FiscalYearVariantName, FiscalYearVariantDescription, and Description are used in the message data type DemandPlanKeyFigureValueByElementsResponseMessage_sync.

The CharacteristicValueDescription package groups the characteristic values and its descriptions. It contains the CharacteristicValueDescription entity. A CharacteristicValueDescription provides an additional descriptive text to a certain characteristic value. The CharacteristicValueDescription entity contains the following elements: DemandPlanCharacteristicID, DemandPlanCharacteristicValue, and Description. The DemandPlanCharacteristicID is an identifier for a Demand Plan Characteristic, and may be based on GDT: DemandPlanCharacteristicID. The DemandPlanCharacteristicValue specifies the value assigned to a DemandPlanCharacteristicID, and may be based on GDT: DemandPlanCharacteristicValue. The Description is a representation of the DemandPlanCharacteristicValue in natural language, and may be based on GDT: LEN60_Description.

The Log package contains the log information sent by Demand Planning. A Log contains information about the execution of an act. The log is of type GDT: Log. It is a table of elements of type Log.

Message Data Type DemandPlanKeyFigureValueByElementsQueryMessage

The message data type DemandPlanKeyFigureValueByElementsQueryMessage_sync includes all data used to select Key Figure Values of a Demand Plan. It contains the following packages: MessageHeader package and Selection package. A Demand Plan Selection makes it possible to retrieve key figure values of the Demand Plan for a subset of Demand Planning Characteristic Value Combinations assigned to the Demand Planning Scenario. One or more planning levels can be specified to retrieve the key figure values (aggregated) at these planning levels. A subset of key figures assigned to the Demand Planning Scenario can be specified to retrieve the key figure values for these key figures.

Furthermore, a time interval and a periodicity can be specified to retrieve the key figure values for the specified time interval and periodicity. The message data type DemandPlanKeyFigureValueByElementsQueryMessage_sync provides the structure for the message type DemandPlanKeyFigureValueByElementsQuery_sync and the interfaces that are based on it.

The Selection package groups the selection with its packages: DemandPlanSelection package, DemandPlanPlanningLevel package, and DemandPlanKeyFigure package. It contains the DemandPlanKeyFigureValueSelectionByElements entity. The DemandPlanKeyFigureValueSelectionByElements entity contains the DemandPlanID, DemandPlanningViewID, and TimeSeriesPeriod elements. The DemandPlanID is a unique identifier for a Demand Plan, and may be based on GDT:DemandPlanID. The DemandPlanningViewID is a unique identifier for a Demand Planning View, and may be based on GDT:DemandPlanningViewID. A TimeSeriesPeriod defines the time range of a KeyFigureValue as well as periodicity and textual information, and may be based on IDT:TimeSeriesPeriod. The TimeSeriesPeriod contains the DatePeriod, CalendarUnitCode, and FiscalYearVariantCode elements. The DatePeriod defines the start and end date, and may be based on GDT:CLOSED_DatePeriod. The CalendarUnitCode is a coded representation of a calendar-related unit, and may be based on GDT:CalendarUnitCode. The FiscalYearVariantCode is a coded representation of a fiscal year variant, and may be based on GDT:FiscalYearVariantCode. If a DemandPlanningViewID is provided, the CalendarUnitCode and FiscalYearVariantCode are taken from the definition of the corresponding DemandPlanningView. In this case the elements CalendarUnitCode and FiscalYearVariantCode might not be provided. If the TimeSeriesPeriod is not provided, the DatePeriod is taken also from the definition of the corresponding DemandPlanningView. In some implementations, if no DemandPlanningViewID is provided, the elements TimeSeriesPeriod and CalendarUnitCode are provided.

The DemandPlanSelection package groups the selection and its properties. It contains the following entities: DemandPlanSelection, DemandPlanVersion, and DemandPlanSelectionCharacteristicValue.

A DemandPlanSelection is a filter for the DemandPlanningCharacteristicValueCombinations, and the DemandPlanVersion. The DemandPlanSelection entity contains the ID element. The DemandPlanSelectionID is a unique identifier for a DemandPlanSelection, and may be based on GDT: DemandPlanSelectionID. In some implementations, a DemandPlanSelection is specified either by providing the DemandPlanSelectionID or the DemandPlanVersion and CharacteristicValue entities.

A DemandPlanVersion defines a logically independent version of a demand plan. The DemandPlanVersion entity contains the PlanningVersionID element. The PlanningVersionID is an identifier for a version of a Demand Plan, and may be based on GDT:PlanningVersionID. A DemandPlanSelectionCharacteristic groups intervals for characteristic values for a certain characteristic. The DemandPlanSelectionCharacteristic entity can include the DemandPlanCharacteristicID and SelectionByDemandPlanCharacteristicValue elements. The DemandPlanCharacteristicID is an identifier for a Demand Plan Characteristic, and may be based on GDT:DemandPlanCharacteristicID. A SelectionByDemandPlanCharacteristicValue is an interval for characteristic values for a certain characteristic, and may be based on IDT: SelectionByDemandPanCharacteristicValue. The SelectionByDemandPlanCharacteristicValue can include the InclusionExclusionCode, IntervalBoundaryTypeCode, LowerBoundaryDemandPlanCharacteristicValue, and UpperBoundaryDemandPlanCharacteristicValue elements. The InclusionExclusionCode defines if the interval defined by IntervalBoundaryTypeCode, LowerBoundaryDemandPlanCharacteristicValue, and UpperBoundaryDemandPlanCharacteristicValue is included in the result set or excluded, and may be based on GDT:InclusionExclusionCode. The IntervalBoundaryTypeCode is a coded representation of an interval boundary type, and may be based on GDT: IntervalBoundaryTypeCode. The LowerBoundaryDemandPlanCharacteristicValue is the lower boundary of the characteristic value interval, and may be based on GDT: DemandPlanCharacteristicValue. The UpperBoundaryDemandPlanCharacteristicValue is the upper boundary of the characteristic value interval, and may be based on GDT:DemandPlanCharacteristicValue. In some implementations, the IntervalBoundaryTypeCodes 2, 4, 5 are not used.

The DemandPlanPlanningLevel package groups the planning level and its properties. It contains the DemandPlanPlanningLevel and DemandPlanPlanningLevelCharacteristic entities. A PlanningLevel is a view on the key figure values that can be changed. The CharacteristicValueSelection entity can include the OrdinalNumberValue element. The OrdinalNumberValue is an integer defining the position of a PlanningLevel in a sequence of PlanningLevels, and may be based on GDT:OrdinalNumberValue. In some implementations, if multiple PlanningLevels are specified within a message, the OrdinalNumberValues can define a number sequence without gaps starting with 1. Key figure value changes can be disaggregated to the most detailed planning level according to the disaggregation rules defined for each key figure in the Demand Planning Scenario. A PlanningLevelCharacteristic is a characteristic for the PlanningLevel defining the level of aggregation. The PlanningLevelCharacteristic entity can include the DemandPlanCharacteristicID element. The DemandPlanCharacteristicID is an identifier for a Demand Plan Characteristic, and may be based on GDT:DemandPlanCharacteristicID. The PlanningLevelCharacteristics assigned to a PlanningLevel define the level of aggregation of the PlanningLevelCharacteristicValueCombinations assigned to the PlanningLevel.

The DemandPlanKeyFigure package contains the DemandPlanKeyFigure entity. A KeyFigure represents a planning parameter which holds planning values assigned to a DemandPlanningCharacteristicValueCombination for a DemandPlanVersion and certain time periods. The KeyFigure entity can include the DemandPlanKeyFigureID element. The DemandPlanKeyFigureID is an identifier for a DemandPlanKeyFigure, and may be based on GDT:DemandPlanKeyFigureID. In some implementations, the entity DemandPlanKeyFigure is optional if a DemandPlanningViewID is provided.

Message Data Type DemandPlanSimpleByDemandPlanningScenarioIDQueryMessage_sync

The message data type DemandPlanSimpleByDemandPlanningScenarioIDQueryMessage_sync includes all data used to select all Demand Plans assigned to a Demand Planning Scenario (i.e., the DemandPlanningScenarioID). It includes the Selection package. The message data type DemandPlanSimpleByDemandPlanningScenarioIDQueryMessage_sync provides the structure for the message type DemandPlanSimpleByDemandPlanningScenarioIDQuery_sync and the interfaces that are based on it. The Selection package includes the DemandPlan- SimpleSelectionByDemandPlanningSenarioID entity. The DemandPlanSimpleSelectionBy-DemandPlanningScenarioIDentity includes the DemandPlanningScenarioID element. The DemandPlanningScenarioID is a unique identifier for a Demand Planning Scenario, and may be based on GDT:DemandPlanningScenarioID.

Message Data Type DemandPlanVersionTemplateMessage_sync

The abstract message data type DemandPlanVersionTemplateMessage_sync includes all data parts of the central part of the Demand Plan Version, which are relevant for service definitions. It groups the DemandPlan and Log packages. The message data type DemandPlanVersionTemplateMessage_sync is used as an abstract maximal message data type, which unifies all packages and entities for the following concrete message data types:

entity. A DemandPlanVersion defines a logically independent version of a demand plan. The DemandPlanVersion entity can include the following elements: PlanningVersionID, ValidityDatePeriod, SystemAdministrativeData, and Description. The PlanningVersionID is an identifier for a version of a Demand Plan, and may be based on GDT:PlanningVersionID. ValidityDatePeriod is the version of a demand plan can hold key figure values in the time range defined by the ValidityPeriod, and may be based on GDT:CLOSED_DatePeriod. The SystemAdministrativeData is administrative data that is stored in a system. It includes system users and change dates/times of the DemandPlanVersion, and may be based on GDT:SystemAdministrativeData. A description is a representation of the properties of a demand plan version in natural language, and may be based on GDT:LEN40_Description. In some implementations, the element ValidityDatePeriod is

| Message data type | | | | | |
|---|---|---|---|---|---|
| | DemandPlanVersion-CreateRequest-Message_sync | DemandPlanVersion-CreateConfirmation-Message_sync | DemandPlanVersion-ByIDandVersionPlanning-VersionIDResponse-Message_sync | DemandPlanVersion-ChangeRequest-Message_sync | DemandPlanVersion-ChangeConfirmation-Message_sync |
| Package/Entity | 1 | 0..1 | 0..1 | 1 | 0..1 |
| DemandPlan Version | 1 | 1 | 1 | 1 | 1 |
| Log | | 1 | 1 | | 1 |
| | DemandPlanVersion-CancelRequest-Message_sync | DemandPlanVersion-CancelConfirmation-Message_sync | DemandPlanVersion-SimpleByIDResponse-Message_sync | DemandPlanVersion-CompleteRequest-Message_sync | DemandPlanVersion-CompleteConfirmation-Message_sync |
| Package/Entity | 1 | 0..1 | 0..1 | 1 | 0..1 |
| DemandPlan Version | 1 | 1 | 0..N | 1 | 1 |
| Log | | 1 | 1 | | 1 |

DemandPlanVersionCreateRequest_sync creates a new Demand Plan Version for the specified Demand Plan. Key figure values for a Demand Plan Version can exist for the specified validity time interval of the Demand Plan Version. In some implementations, it may not be possible to change key figure values with DemandPlanChangeRequest that are outside of the validity time interval of the Demand Plan Version. The key figure values assigned to the Demand Planning Characteristic Value Combinations can be set to "initial" for the new Demand Plan Version. Several different Demand Plan Versions can be created for a Demand Plan containing independent key figure values for the same Demand Planning Characteristic Value Combinations. Regarding DemandPlanVersionChangeRequest_sync, the key figure values belonging to the intersection of the old and new validity time intervals remain unchanged, while all other key figure values in the new validity time interval are set to "initial". Regarding DemandPlanVersionChangeConfirmation_sync, the validity time interval is automatically adjusted, if necessary, to match periodicity boundaries defined in the Demand Planning Scenario.

The DemandPlan package groups the DemandPlan with its DemandPlanVersion package. It can include the DemandPlan entity. A DemandPlan is the forecasted future demand of products or product lines as well as the historical demand of products or product lines. The DemandPlan entity can include the ID element. The DemandPlanID is a unique identifier for a Demand Plan, and may be based on GDT:DemandPlanID.

The DemandPlanVersion package groups the version of a Demand Plan and its properties. It can include the Version included in the entity DemandPlanVersion for the message data types DemandPlanVersionCreateRequestMessage_sync, DemandPlanVersionCreateConfirmationMessage_sync, DemandPlanVersionByIDandVersionPlanningVersionIDResponseMessage_sync, DemandPlanVersionChangeRequestMessage_sync, and DemandPlanVersionChangeConfirmationMessage_sync. In some implementations, the element SystemAdministrativeData is included in the entity DemandPlanVersion for the message data types DemandPlanVersionCreateConfirmationMessage_sync, DemandPlanVersionByIDandVersionPlanningVersionIDResponseMessage_sync, DemandPlanVersionChangeConfirmationMessage_sync and DemandPlanVersionCompleteConfirmationMessage_sync. In some implementations, the element Description is contained in the entity DemandPlanVersion for the message data types DemandPlanVersionByIDandVersionPlanningVersionIDResponseMessage_sync, and DemandPlanVersionSimpleByIDResponseMessage_sync. A DemandPlanVersion allows holding different independent simulative versions of a Demand Plan.

Message Data Type DemandPlanVersionByIDandVersionPlanningVersionIDQueryMessage_sync The message data type DemandPlanVersionByIDandVersionPlanningVersionIDQueryMessage_sync includes all data used to select a DemandPlanVersion (i.e. the DemandPlanID and the PlanningVersionID). It includes the Selection package. The message data type DemandPlanVersionByIDandVersionPlanningVersionIDQueryMessage_sync provides the structure for the message type DemandPlanVersion- ByIDandVersionPlanningVersionIDQuery_sync and the interfaces that are based on it. The Selection package contains the information to retrieve a DemandPlanVersion. It includes the DemandPlanVersionSelectionByIDandVersionPlanningVersionID entity. A DemandPlanVersionSelectionByIDandVersionPlanningVersionID entity includes the information to retrieve a DemandPlanVersion. The DemandPlanVersionSelectionByIDandVersionPlanningVersionID entity can include the DemandPlanID and the DemandPlanVersionPlanningVersionID elements. The DemandPlanID is a unique identifier for a Demand Plan, and may be based on GDT:DemandPlanID. The DemandPlanVersionPlanningVersionID is an identifier for a version of a Demand Plan, and may be based on GDT:PlanningVersionID.

Message Data Type DemandPlanVersionSimpleByIDQueryMessage

The message data type DemandPlanVersionSimpleByIDQueryMessage_sync includes all data used to select all Versions of a Demand Plan (i.e. the DemandPlanID). It contains the Selection package. The message data type DemandPlanVersionSimpleByIDQueryMessage_sync provides the structure for the message type DemandPlanVersionSimpleByIDQuery_sync and the interfaces that are based on it. The Selection package includes the DemandPlanVersionSimpleSelectionByID entity. The DemandPlanVersionSimpleSelectionByID entity can include the DemandPlanID element. The DemandPlanID is a unique identifier for a Demand Plan, and may be based on GDT:DemandPlanID.

Message Data Type DemandPlanSelectionTemplateMessage

The abstract message data type DemandPlanSelectionTemplateMessage_sync includes all data parts of the central part of the Demand Plan Selection, which are relevant for service definitions. It groups the DemandPlan and Log packages. The message data type DemandPlanSelectionTemplateMessage_sync is used as an abstract maximal message data type, which unifies all packages and entities for the following concrete message data types:

Characteristic Combinations, an optional grouping condition, and a description. Thus it makes it possible to save a certain view on the Demand Plan which covers a subset of the Demand Planning Characteristic Value Combinations.

The DemandPlan package groups the DemandPlan with its DemandPlanSelection package. It contains the DemandPlan entity. A DemandPlan is the forecasted future demand of products or product lines as well as the historical demand of products or product lines. The DemandPlan entity includes the ID element. The DemandPlanID is a unique identifier for a Demand Plan, and may be based on GDT:DemandPlanID. The DemandPlanSelection package groups the selection and its properties. It contains the following entities: Selection, DemandPlanVersion, CharacteristicValue, and GroupingCharacteristic A DemandPlanSelection is a filter for the DemandPlanningCharacteristicValueCombinations, the DemandPlanVersion, and an optional aggregation level. The DemandPlanSelection entity can include the ID and SystemAdministrativeData elements. The DemandPlanSelectionID is a unique identifier for a Demand Plan Selection, and may be based on GDT:DemandPlanSelectionID. The SystemAdministrativeData is administrative data that is stored in a system. It includes system users and change dates/times of the DemandPlanSelection, and may be based on GDT:SystemAdministrativeData. In some implementations, the element SystemAdministrativeData is included in the entity DemandPlanSelection for the message data types DemandPlanSelectionCreateConfirmationMessage_sync, DemandPlanSelectionByIDandSelectionIDResponseMessage_sync, and DemandPlanSelectionChangeConfirmationMessage_sync. A DemandPlanVersion defines a logically independent version of a demand plan. The DemandPlanVersion entity can include the PlanningVersionID element. The PlanningVersionID is an identifier for a version of a Demand Plan, and may be based on GDT:PlanningVersionID. A DemandPlanSelectionCharacteristicValue defines intervals for characteristic values for a certain characteristic. The DemandPlanSelectionCharacteristic entity can include the

| Message data type | | | | |
|---|---|---|---|---|
| | DemandPlanSelection-CreateRequest-Message_sync | DemandPlanSelection-CreateConfirmation-Message_sync | DemandPlanSelection-ByIDandSelectionID-ResponseMessage_sync | DemandPlanSelection-ChangeRequest-Message_sync |
| Package/Entity | 1 | 0..1 | 0..1 | 1 |
| DemandPlan Selection | 1 | 1 | 1 | 1 |
| DemandPlanVersion | 1 | | 1 | 1 |
| CharacteristicValue | 0..N | | 0..N | 0..N |
| GroupingCharacteristic | 0..N | | 0..N | 0..N |
| Log | | 1 | 1 | |
| | DemandPlanSelection-ChangeConfirmation-Message_sync | DemandPlanSelection-CancelRequest-Message_sync | DemandPlanSelection-CancelConfirmation-Message_sync | DemandPlanSelection-SimpleByIDResponse-Message_sync |
| Package/Entity | 0..1 | 1 | 0..1 | 0..1 |
| DemandPlan Selection | 1 | 1 | 1 | 0..N |
| DemandPlanVersion | | | | |
| CharacteristicValue | | | | |
| GroupingCharacteristic | | | | |
| Log | 1 | | 1 | 1 |

DemandPlanSelectionCreateRequest creates a new Demand Plan Selection for the specified Demand Plan. The Demand Plan Selection includes a reference to a Demand Plan Version, a selection condition for the Demand Planning DemandPlanCharacteristicID and SelectionByDemandPlanCharacteristicValue elements. The DemandPlanCharacteristicID is an identifier for a Demand Plan Characteristic, and may be based on GDT:DemandPlanCharacteristicID. A SelectionByDemandPlanCharacteristicValue is an interval for characteristic values for a certain characteristic, and may be based on IDT:SelectionByDemandPanCharacteristicValue. The SelectionByDemandPlanCharacteristicValue can include the InclusionExclusionCode, InclusionExclusionName, InclusionExclusionDescription, IntervalBoundaryTypeCode, IntervalBoundaryTypeName, IntervalBoundaryTypeDescription, LowerBoundaryDemandPlanCharacteristicValue, and UpperBoundaryDemandPlanCharacteristicValue elements. The InclusionExclusionCode defines if the interval defined by IntervalBoundaryTypeCode, LowerBoundaryDemandPlanCharacteristicValue, and UpperBoundaryDemandPlanCharacteristicValue is included in the result set or excluded, and may be based on GDT:InclusionExclusionCode. The InclusionExclusionName names the InclusionExclusionCode, and may be based on GDT:MEDIUM_Name. The InclusionExclusionDescription is the representation of the InclusionExclusionCode in natural language, and may be based on GDT: LONG_Description. The IntervalBoundaryTypeCode is a coded representation of an interval boundary type, and may be based on GDT: IntervalBoundaryTypeCode. The IntervalBoundaryTypeName names the IntervalBoundaryTypeCode, and may be based on GDT:MEDIUM_Name. The IntervalBoundaryTypeDescription is the representation of the IntervalBoundaryTypeCode in natural language, and may be based on GDT: IntervalBoundaryTypeCode. The LowerBoundaryDemandPlanCharacteristicValue is the lower boundary of the characteristic value interval, and may be based on GDT:DemandPlanCharacteristicValue. The UpperBoundaryDemandPlanCharacteristicValue is the upper boundary of the characteristic value interval, and may be based on GDT:DemandPlanCharacteristicValue. In some implementations, the IntervalBoundaryTypeCodes 2, 4, and 5 are not used. The elements InclusionExclusionName, InclusionExclusionDescription, IntervalBoundaryTypeName, and IntervalBoundaryDescription can be included in the entity CharacteristicValue for the message data type DemandPlanSelectionByIDandSelectionIDResponseMessage_sync.

A DemandPlanSelectionGroupingCharacteristic is a characteristic to aggregate DemandPlanningCharacteristicValueCombinations. The DemandPlanSelectionGroupingCharacteristicentity can include the DemandPlanCharacteristicID element. The DemandPlanCharacteristicID is an identifier for a Demand Plan Characteristic, and may be based on GDT:DemandPlanCharacteristicID. When a DemandPlanSelection is performed on a set of DemandPlanningCharacteristicValueCombinations, the characteristic values are returned for the grouping characteristic.

Message Data Type DemandPlanSelectionByIDandSelectionIDQueryMessage_sync

The message data type DemandPlanSelectionByIDandSelectionIDQueryMessage_sync includes all data used to select a DemandPlanSelection (i.e. the DemandPlanID and the DemandPlanSelectionID). It includes the Selection package. The message data type DemandPlanSelectionByIDandSelectionIDQueryMessage_sync provides the structure for the message type DemandPlanSelectionByIDandSelectionIDQuery_sync and the interfaces that are based on it. The Selection package groups contains the information to retrieve a DemandPlanSelection. It includes the DemandPlanSelectionSelectionByIDandSelectionID entity. A DemandPlanSelectionSelectionByIDandSelectionID entity contains the information to retrieve a DemandPlanSelection. The DemandPlanSelectionSelectionByIDandSelectionID entity can include the DemandPlanID and the DemandPlanSelectionID elements. The DemandPlanID is a unique identifier for a Demand Plan, and may be based on GDT: DemandPlanID. The DemandPlanSelectionID is a unique identifier for a Demand Plan Selection, and may be based on GDT:DemandPlanSelectionID.

Message Data Type DemandPlanSelectionSimpleByIDQueryMessage_sync

The message data type DemandPlanSelectionSimpleByIDQueryMessage_sync includes all data used to select all Selections of a Demand Plan (i.e. the DemandPlanID). It contains the Selection package. The message data type DemandPlanSelectionSimpleByIDQueryMessage_sync provides the structure for the message type DemandPlanSelectionSimpleByIDQuery_sync and the interfaces that are based on it. The Selection package contains the DemandPlanSelectionSimpleSelectionByID entity. The DemandPlanSelectionSimpleSelectionByID entity contains the DemandPlanID element. The DemandPlanID is a unique identifier for a Demand Plan, and may be based on GDT: DemandPlanID.

DemandPlanningCharacteristicValueCombination Interface

In some implementations, DemandPlanningCharacteristicValueCombination interfaces are the interfaces that are required in a process to create, change, delete and read DemandPlanningCharacteristicValueCombinations as the masterdata of the planning process. DemandPlanningCharacteristicValueCombinations can represent the master data for the Demand Planning. DemandPlanningCharacteristicValueCombinations can belong to one DemandPlanningScenario. The business object DemandPlanningScenario can be the basic configuration object of the Demand Planning solution.

Figure 85:
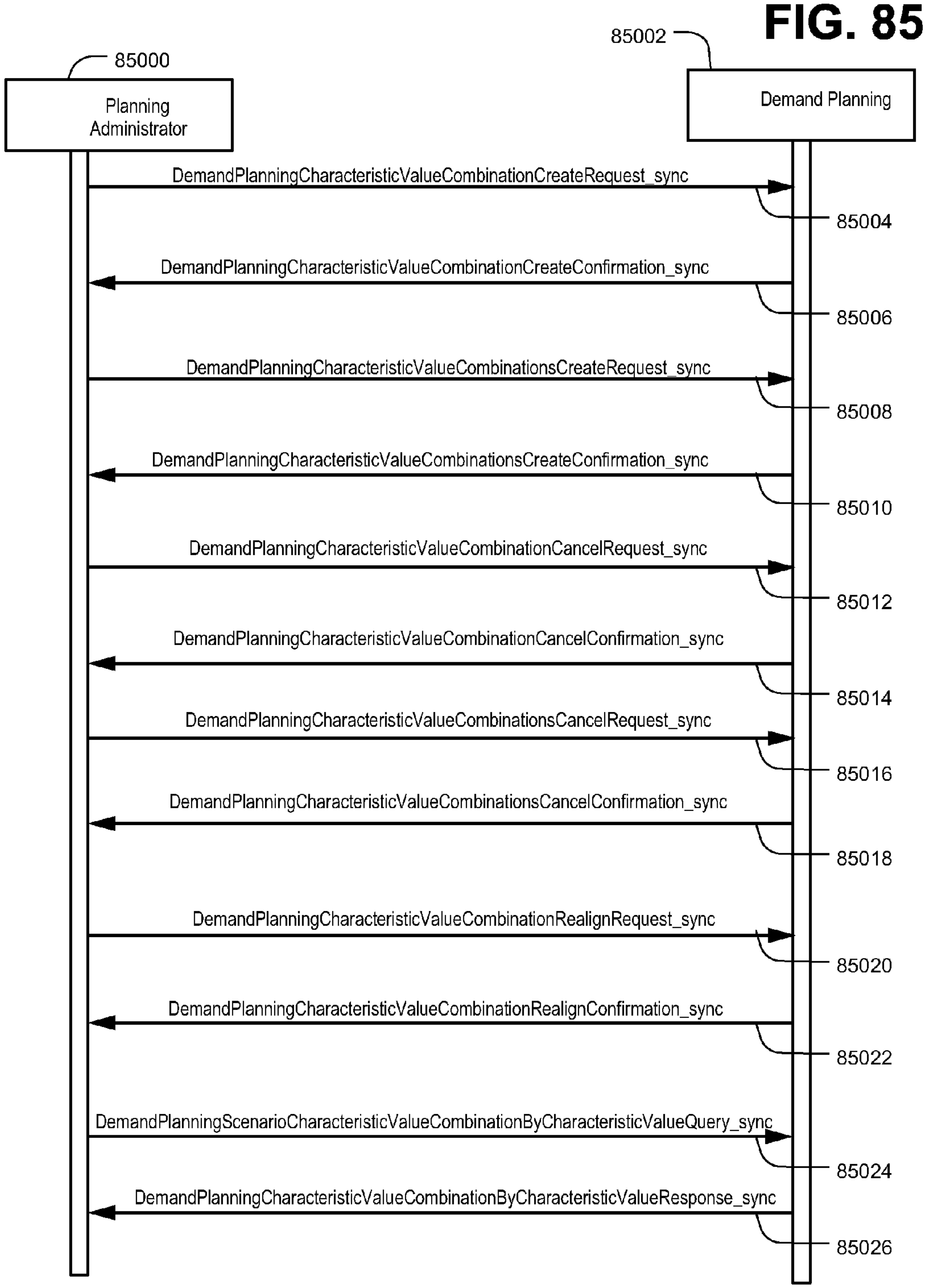
FIG. 85 shows an exemplary DemandPlanningCharacteristicValueCombination Message Choreography.

The message choreography of FIG. 85 describes a possible logical sequence of messages that can be used to realize a DemandPlanningCharacteristicValueCombination business scenario. A "Planning Administrator" system 85000 can request demand planning characteristic value combination create using a DemandPlanningCharacteristicValueCombinationCreateRequest_sync message 85004 as shown, for example, in FIG. 85. A "Demand Planning" system 85002 can respond to the request using a DemandPlanningCharacteristicValueCombinationCreateConfirmation_sync message 85006 as shown, for example, in FIG. 85. The "Planning Administrator" system 85000 can request demand planning characteristic value combinations create using a DemandPlanningCharacteristicValueCombinationsCreateRequest_sync message 85008 as shown, for example, in FIG. 85. The "Demand Planning" system 85002 can respond to the request using a DemandPlanningCharacteristicValueCombinationsCreateConfirmation_sync message 85010 as shown, for example, in FIG. 85. The "Planning Administrator" system 85000 can request demand planning characteristic value combination cancel using a DemandPlanningCharacteristicValueCombinationCancelRequest_sync message 85012 as shown, for example, in FIG. 85. The "Demand Planning" system 85002 can respond to the request using a DemandPlanningCharacteristicValueCombinationCancelConfirmation_sync message 85014 as shown, for example, in FIG. 85. The "Planning Administrator" system 85000 can request demand planning characteristic value combinations cancel using a DemandPlanningCharacteristicValueCombinationsCancelRequest_sync message 85016 as shown, for example, in FIG. 85. The "Demand Planning" system 85002 can respond to the request using a DemandPlanningCharacteristicValue- CombinationsCancelConfirmation_sync message 85018 as shown, for example, in FIG. 85. The "Planning Administrator" system 85000 can request demand planning characteristic value combination realign using a DemandPlanningCharacteristicValueCombinationRealignRequest_sync message 85020 as shown, for example, in FIG. 85. The "Demand Planning" system 85002 can respond to the request using a DemandPlanningCharacteristicValueCombinationRealignConfirmation_sync message 85022 as shown, for example, in FIG. 85. The "Planning Administrator" system 85000 can query demand planning scenario characteristic value combination using a DemandPlanningScenarioCharacteristicValueCombinationByCharacteristicValueQuery_sync message 85024 as shown, for example, in FIG. 85. The "Demand Planning" system 85002 can respond to the query using a DemandPlanningCharacteristicValueCombinationByCharacteristicValueResponse_sync message 85026 as shown, for example, in FIG. 85.

In some implementations, a Message Type DemandPlanningCharacteristicValueCombinationCreateRequest_sync is sent to create a DemandPlanningCharacteristicValueCombinations. The structure of the Message Type DemandPlanningCharacteristicValueCombinationCreateRequest_sync can be specified by the message data type DemandPlanningCharacteristicValueCombinationCreateRequestMessage_sync.

In some implementations, DemandPlanningCharacteristicValueCombinations can be created only by assigning values to the characteristics. The available characteristics can be defined in the DemandPlanningScenario. In some implementations, all characteristics can have a value. The combination can be unique in a DemandPlanningScenario.

In some implementations, a Message Type DemandPlanningCharacteristicValueCombinationCreateConfirmation_sync is sent to provide information about the result of the creation of a DemandPlanningCharacteristicValueCombinations triggered by the message of type DemandPlanningCharacteristicValueCombinationCreateRequest_sync. The structure of the Message Type DemandPlanningCharacteristicValueCombinationCreateConfirmation_sync can be specified by the message data type DemandPlanningCharacteristicValueCombinationCreateConfirmationMessage_sync.

In some implementations, a Message Type DemandPlanningCharacteristicValueCombinationsCreateRequest_sync is sent to create DemandPlanningCharacteristicValueCombinations. The structure of the Message Type DemandPlanningCharacteristicValueCombinationsCreateRequest_sync can be specified by the message data type DemandPlanningCharacteristicValueCombinationsCreateRequestMessage_sync. In some implementations, multiple DemandPlanningCharacteristicValueCombinations can be created, but all combinations can belong to the same DemandPlanningScenario In some implementations, a Message Type DemandPlanningCharacteristicValueCombinationsCreateConfirmation_sync is sent to provide information about the result of the creation of several DemandPlanningCharacteristicValueCombinations triggered by the message of type DemandPlanningCharacteristicValueCombinationsCreateRequest_sync. DemandPlanningCharacteristicValueCombinationsCreateConfirmation_sync can contain DemandPlanningCharacteristicValueCombinationCreateConfirmation_sync messages. The structure of the Message Type DemandPlanningCharacteristicValueCombinationsCreateConfirmation_sync can be specified by the message data type DemandPlanningCharacteristicValueCombinationsCreateConfirmationMessage_sync.

In some implementations, a Message Type DemandPlanningCharacteristicValueCombinationCancelRequest_sync is sent to cancel one or several DemandPlanningCharacteristicValueCombinations. The structure of the Message Type DemandPlanningCharacteristicValueCombinationCancelRequest_sync can be specified by the message data type DemandPlanningCharacteristicValueCombinationCancelRequestMessage_sync. In some implementations, at least one CharacteristicValue can be sent. There can be the possibility to delete every combination (sending one CharacteristicValue with value '*', e.g.: 9AMATNR=*). There can be the possibility to cancel a singe DemandPlanningCharacteristicValueCombination and aggregated DemandPlanningCharacteristicValueCombinations by sending an aggregated combination in the request.

In some implementations, a Message Type DemandPlanningCharacteristicValueCombinationCancelConfirmation_sync is sent to provide information about the result of the cancellation of a DemandPlanningCharacteristicValueCombination triggered by the message data type DemandPlanningCharacteristicValueCombinationCancelRequest_sync. The structure of the Message Type DemandPlanningCharacteristicValueCombinationCancelConfirmation_sync can be specified by the message data type DemandPlanningCharacteristicValueCombinationCancelConfirmationMessage_sync.

In some implementations, a Message Type DemandPlanningCharacteristicValueCombinationCancelRequest_sync is sent to cancel several DemandPlanningCharacteristicValueCombinations_sync. DemandPlanningCharacteristicValueCombinationCancelRequest_sync can contain the DemandPlanning.CharacteristicValueCombinationCancelRequest_sync messages. The structure of the Message Type DemandPlanningCharacteristicValueCombinationsCancelRequest_sync can be specified by the message data type DemandPlanningCharacteristicValueCombinationsCanelRequestMessage_sync.

In some implementations, a Message Type DemandPlanningCharacteristicValueCombinationsCaneelConfirmation_sync is sent to provide information about the result of the cancellation of several DemandPlanningCharacteristicValueCombinations triggered by the message of type DemandPlanningCharacteristicValueCombinationsCancelRequest_sync. DemandPlanningCharacteristicValueCombinationsCaneelConfirmation_sync can contain DemandPlanningCharacteristicValueCombinationCancelConfirmation_sync messages. The structure of the Message Type DemandPlanningCharacteristicValueCombinationsCaneelConfirmation_sync can be specified by the message data type DemandPlanningCharacteristicValueCombinationsCaneelConfirmationMessage_sync.

In some implementations, a Message Type DemandPlanningCharacteristicValueCombinationRealignRequest_sync is sent to change an existing DemandPlanningCharacteristicValueCombination. The structure of the Message Type DemandPlanningCharacteristicValueCombinationRealignRequest_sync can be specified by the message data type DemandPlanningCharacteristicValueCombinationRealignRequestMessage_sync. In some implementations, realignment of a DemandPlanning- CharacteristicValueCombination means that a new (target) DemandPlanningCharacteristicValueCombination is created with changed CharacteristicValues, and the old (source) DemandPlanningCharacteristicValueCombination is cancelled. Continuing the example, the planning data remains unchanged, but it is associated with the new DemandPlanningCharacteristicValueCombination.

In some implementations, a Message Type DemandPlanningCharacteristicValueCombinationRealignConfirmation_sync is sent to provide information about the result of the change of a DemandPlanningCharacteristicValueCombination triggered by the message of type DemandPlanningCharacteristicValueCombinationRealignRequest_sync. The structure of the Message Type DemandPlanningCharacteristicValueCombinationRealignConfirmation_sync can be specified by the message data type DemandPlanningCharacteristicValueCombinationRealignConfirmationMessage_sync.

In some implementations, a Message Type DemandPlanningCharacteristicValueCombinationByCharacteristicValueQuery_sync is sent to retrieve DemandPlanningCharacteristicValueCombinations. The structure of the Message Type DemandPlanningCharacteristicValueCombinationByCharacteristicValueQuery_sync can be specified by the message data type DemandPlanningCharacteristicValueCombinationByCharacteristicValueQueryMessage_sync In some implementations, a message type DemandPlanningCharacteristicValueCombinationByCharacteristicValueResponse_sync is sent to provide result of the query requested by message type DemandPlanningCharacteristicValueCombinationByCharacteristicValueQuery_sync. The structure of the Message Type DemandPlanningCharacteristicValueCombinationByCharacteristicValueRespons_sync can be specified by the message data type DemandPlanningCharacteristicValueCombinationByCharacteristicValueResponseMessage_sync. In the query aggregated combination can be used (e.g.: select all combinations where characteristic PRODUCT has value "A"). Interfaces can include DemandPlanningCharacteristicValueCombinationCreateRequestConfirmation_In, DemandPlanningCharacteristicValueCombinationsCreateRequestConfirmation_In, DemandPlanningCharacteristicValueCombinationRealignRequestConfirmation_In, DemandPlanningCharacteristicValueCombinationCancelRequestConfirmation_In, DemandPlanningCharacteristicValueCombinationsCancelRequestConfirmation_In, and DemandPlanningCharacteristicValueCombinationByCharacteristicValueQueryResponse_In.

Figure 86:
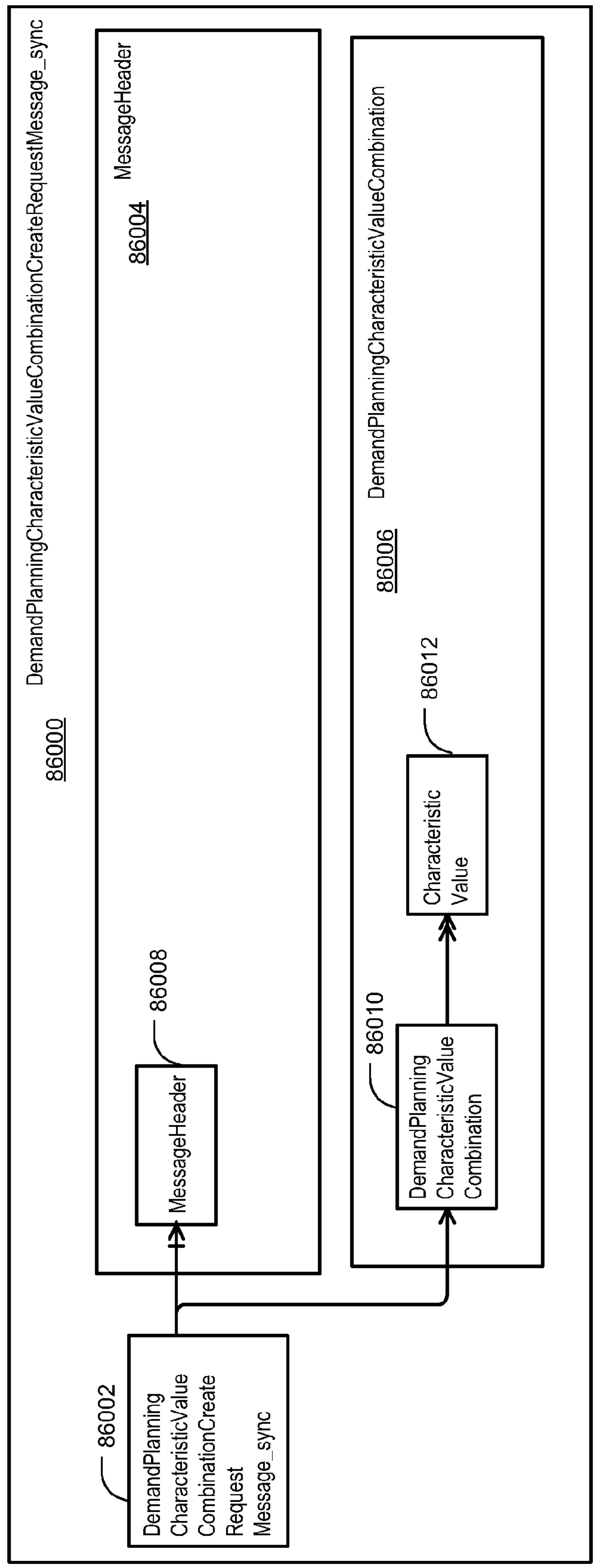
FIG. 86 shows an exemplary DemandPlanningCharacteristicValueCombinationCreateRequestMessage Message Data Type.

FIG. 86 illustrates one example logical configuration of DemandPlanningCharacteristicValueCombinationCreateRequestMessage_sync message 85004. Specifically, this figure depicts the arrangement and hierarchy of various components such as one or more levels of packages, entities, and datatypes, shown here as 86002 to 86012. As described above, packages may be used to represent hierarchy levels. Entities are discrete business elements that are used during a business transaction. Data types are used to type object entities and interfaces with a structure. For example, DemandPlanningCharacteristicValueCombinationCreateRequestMessage_sync message 85004 includes, among other things, MessageHeader 86004. Accordingly, heterogeneous applications may communicate using this consistent message configured as such.

Figure 87:
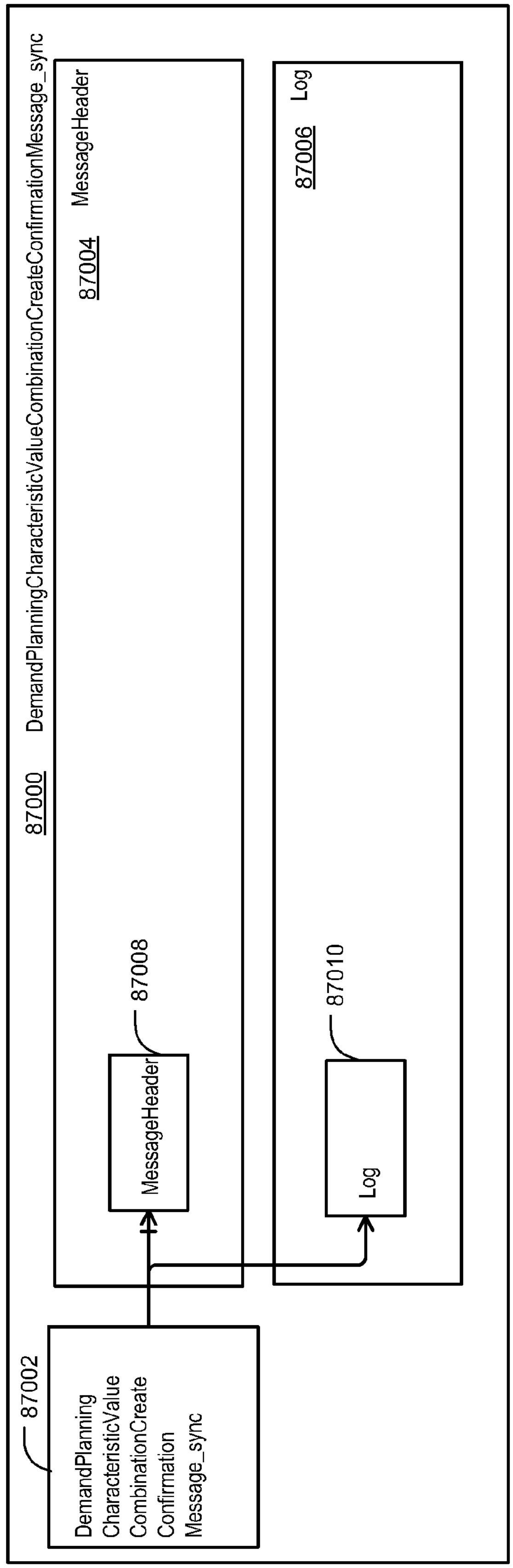
FIG. 87 shows an exemplary DemandPlanningCharacteristicValueCombinationCreateConfirmationMessage Message Data Type.

Additionally, FIG. 87 illustrates one example logical configuration of DemandPlanningCharacteristicValueCombinationCreateConfirmationMessage_sync message 85006. Specifically, this figure depicts the arrangement and hierarchy of various components such as one or more levels of packages, entities, and datatypes, shown here as 87002 to 87010. As described above, packages may be used to represent hierarchy levels. Entities are discrete business elements that are used during a business transaction. Data types are used to type object entities and interfaces with a structure. For example, DemandPlanningCharacteristicValueCombinationCreateConfirmationMessage_sync message 85006 includes, among other things, MessageHeader 87004. Accordingly, heterogeneous applications may communicate using this consistent message configured as such.

Figure 88:
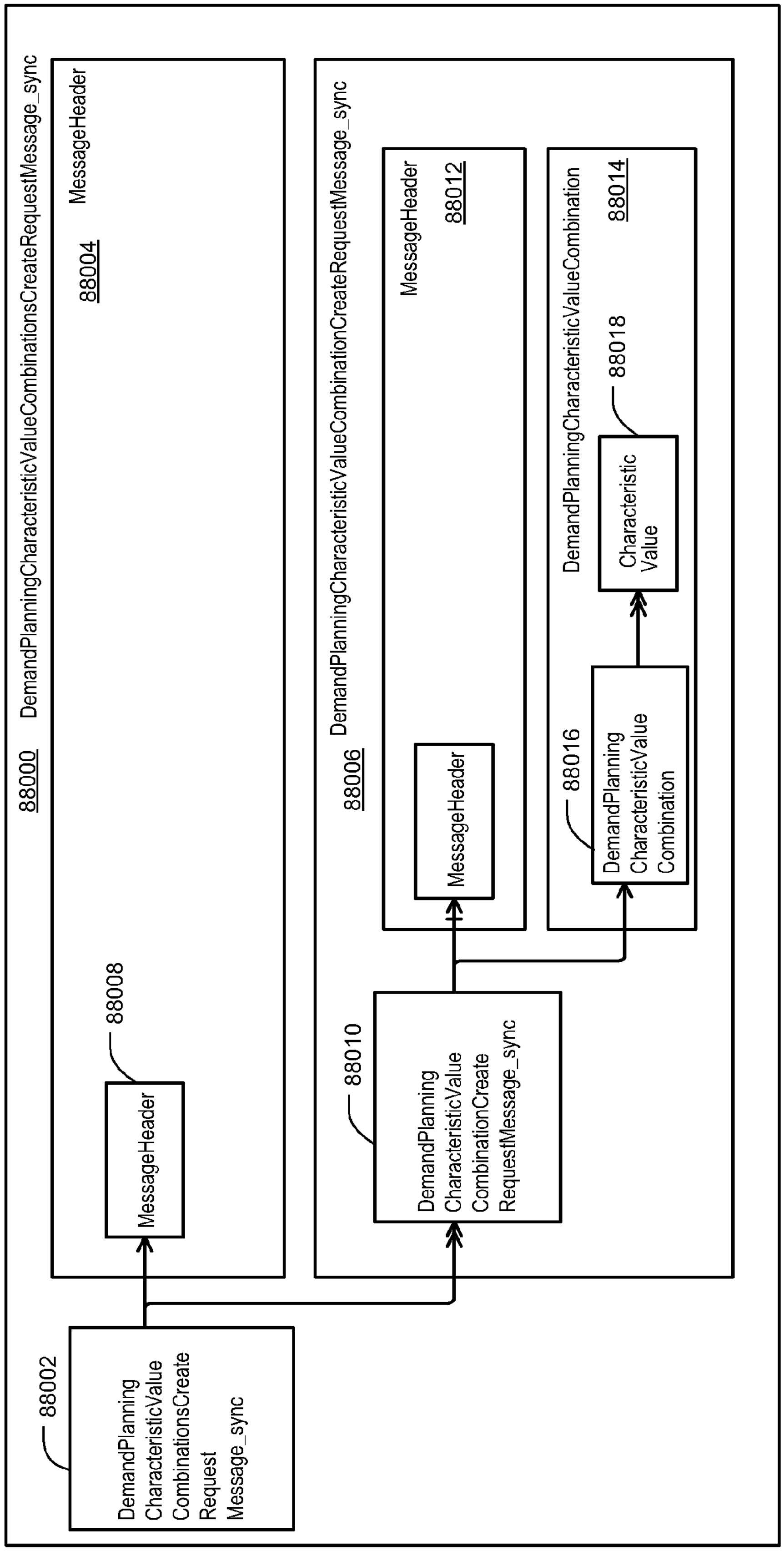
FIG. 88 shows an exemplary DemandPlanningCharacteristicValueCombinationsCreateRequestMessage Message Data Type.

Additionally, FIG. 88 illustrates one example logical configuration of DemandPlanningCharacteristicValueCombinationsCreateRequestMessage_sync message 85008. Specifically, this figure depicts the arrangement and hierarchy of various components such as one or more levels of packages, entities, and datatypes, shown here as 88002 to 88018. As described above, packages may be used to represent hierarchy levels. Entities are discrete business elements that are used during a business transaction. Data types are used to type object entities and interfaces with a structure. For example, DemandPlanningCharacteristicValueCombinationsCreateRequestMessage_sync message 85008 includes, among other things, MessageHeader 88004. Accordingly, heterogeneous applications may communicate using this consistent message configured as such.

Figure 89:
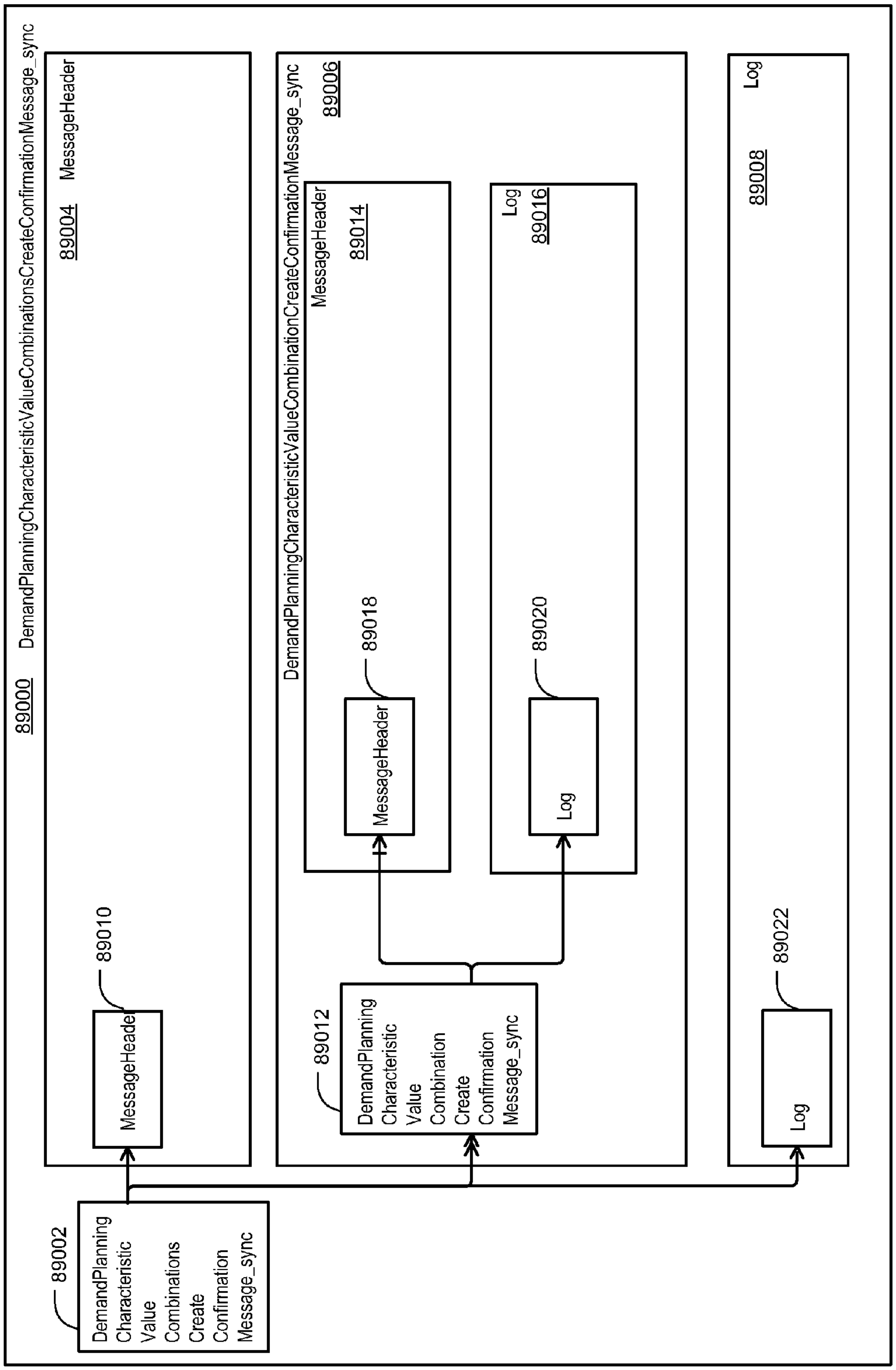
FIG. 89 shows an exemplary DemandPlanningCharacteristicValueCombinationsCreateConfirmationMessage Message Data Type.

Additionally, FIG. 89 illustrates one example logical configuration of DemandPlanningCharacteristicValueCombinationsCreateConfirmationMessage_sync message 85010. Specifically, this figure depicts the arrangement and hierarchy of various components such as one or more levels of packages, entities, and datatypes, shown here as 89002 to 89022. As described above, packages may be used to represent hierarchy levels. Entities are discrete business elements that are used during a business transaction. Data types are used to type object entities and interfaces with a structure. For example, DemandPlanningCharacteristicValueCombinationsCreateConfirmationMessage_sync message 85010 includes, among other things, MessageHeader 89004. Accordingly, heterogeneous applications may communicate using this consistent message configured as such.

Figure 90:
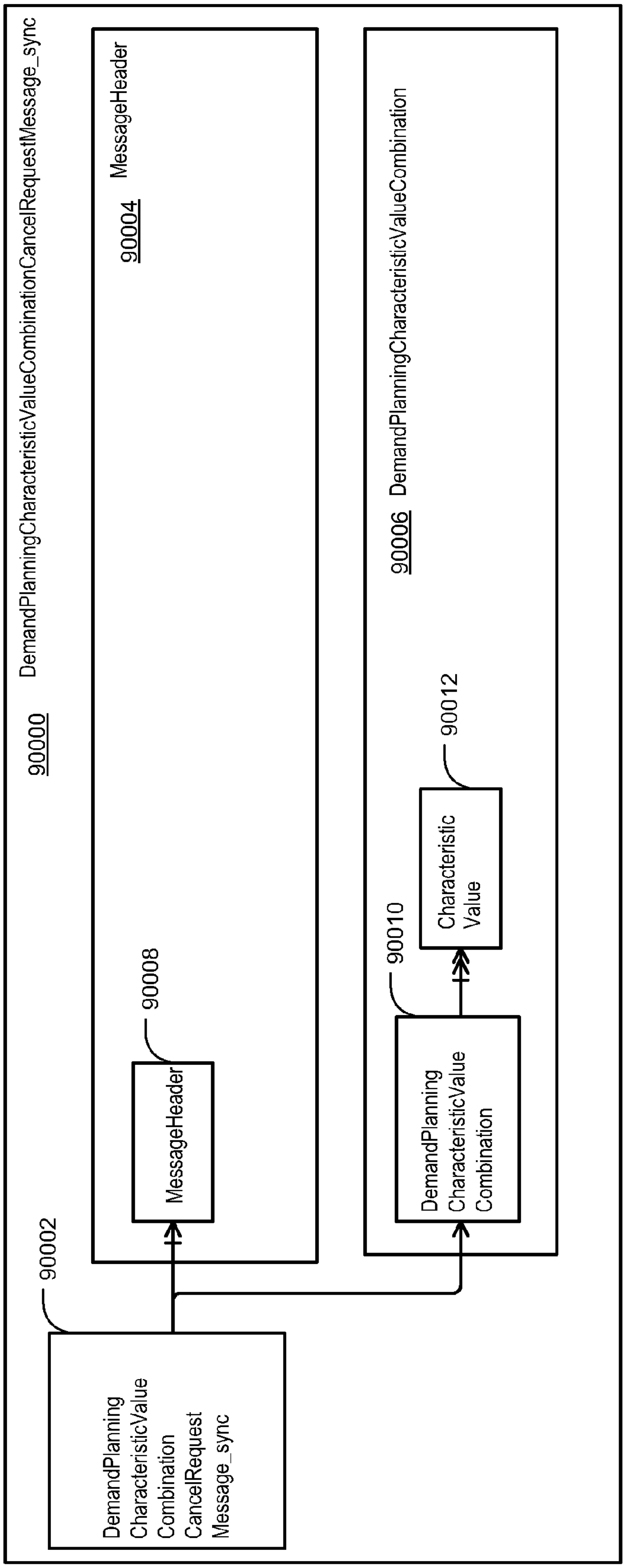
FIG. 90 shows an exemplary DemandPlanningCharacteristicValueCombinationCancelRequestMessage Message Data Type.

Additionally, FIG. 90 illustrates one example logical configuration of DemandPlanningCharacteristicValueCombinationCancelRequestMessage_sync message 85012. Specifically, this figure depicts the arrangement and hierarchy of various components such as one or more levels of packages, entities, and datatypes, shown here as 90002 to 90012. As described above, packages may be used to represent hierarchy levels. Entities are discrete business elements that are used during a business transaction. Data types are used to type object entities and interfaces with a structure. For example, DemandPlanningCharacteristicValueCombinationCancelRequestMessage_sync message 85012 includes, among other things, MessageHeader 90004. Accordingly, heterogeneous applications may communicate using this consistent message configured as such.

Figure 91:
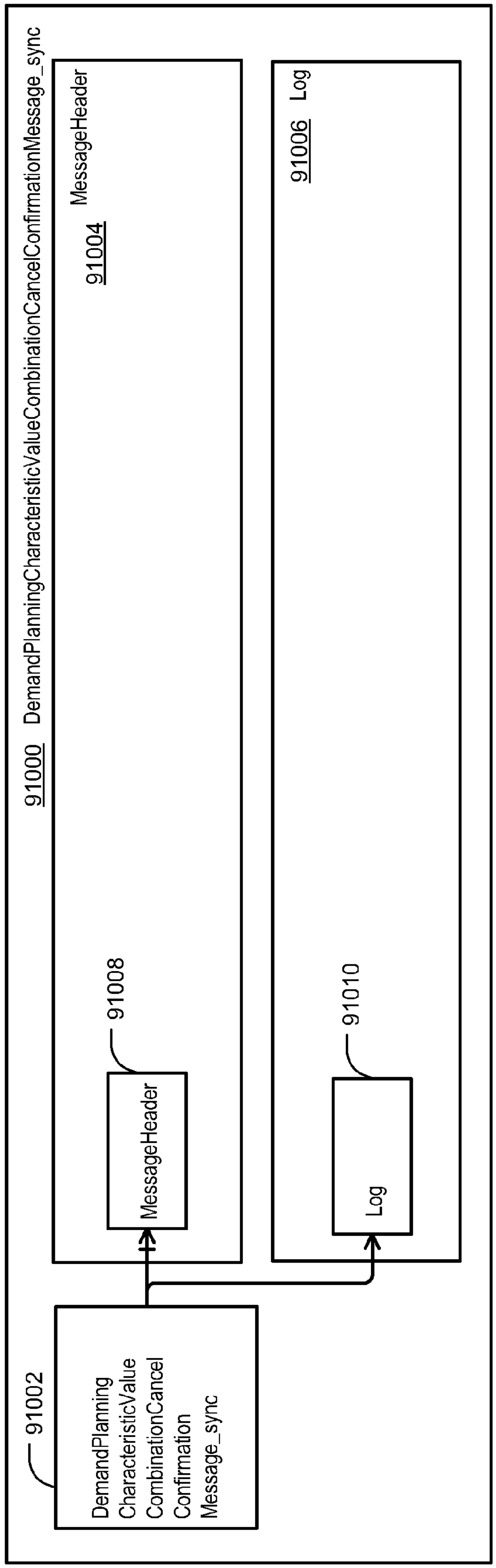
FIG. 91 shows an exemplary DemandPlanningCharacteristicValueCombinationCancelConfirmationMessage Message Data Type.

Additionally, FIG. 91 illustrates one example logical configuration of DemandPlanningCharacteristicValueCombinationCancelConfirmationMessage_sync message 85014. Specifically, this figure depicts the arrangement and hierarchy of various components such as one or more levels of packages, entities, and datatypes, shown here as 91002 to 91010. As described above, packages may be used to represent hierarchy levels. Entities are discrete business elements that are used during a business transaction. Data types are used to type object entities and interfaces with a structure. For example, DemandPlanningCharacteristicValueCombinationCancelConfirmationMessage_sync message 85014 includes, among other things, MessageHeader 91004. Accordingly, heterogeneous applications may communicate using this consistent message configured as such.

Figure 92:
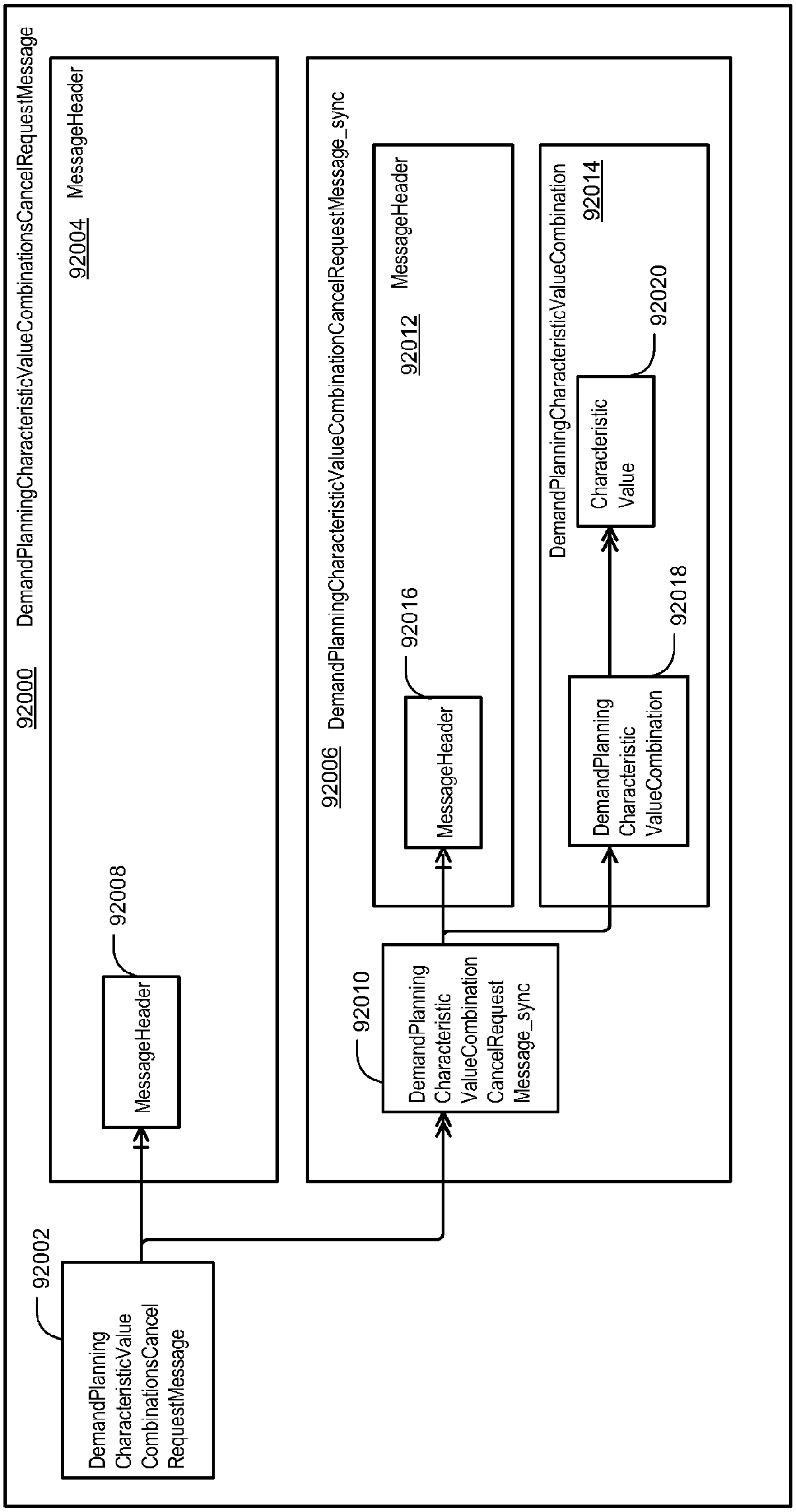
FIG. 92 shows an exemplary DemandPlanningCharacteristicValueCombinationCancelRequestMessage Message Data Type.

Additionally, FIG. 92 illustrates one example logical configuration of DemandPlanningCharacteristicValueCombinationsCanelRequestMessage_sync message 85016. Specifically, this figure depicts the arrangement and hierarchy of various components such as one or more levels of packages, entities, and datatypes, shown here as 92002 to 92020. As described above, packages may be used to represent hierarchy levels. Entities are discrete business elements that are used during a business transaction. Data types are used to type object entities and interfaces with a structure. For example, DemandPlanningCharacteristicValueCombinationsCaneelRequestMessage_sync message 85016 includes, among other things, MessageHeader 92004. Accordingly, heterogeneous applications may communicate using this consistent message configured as such.

Figure 93:
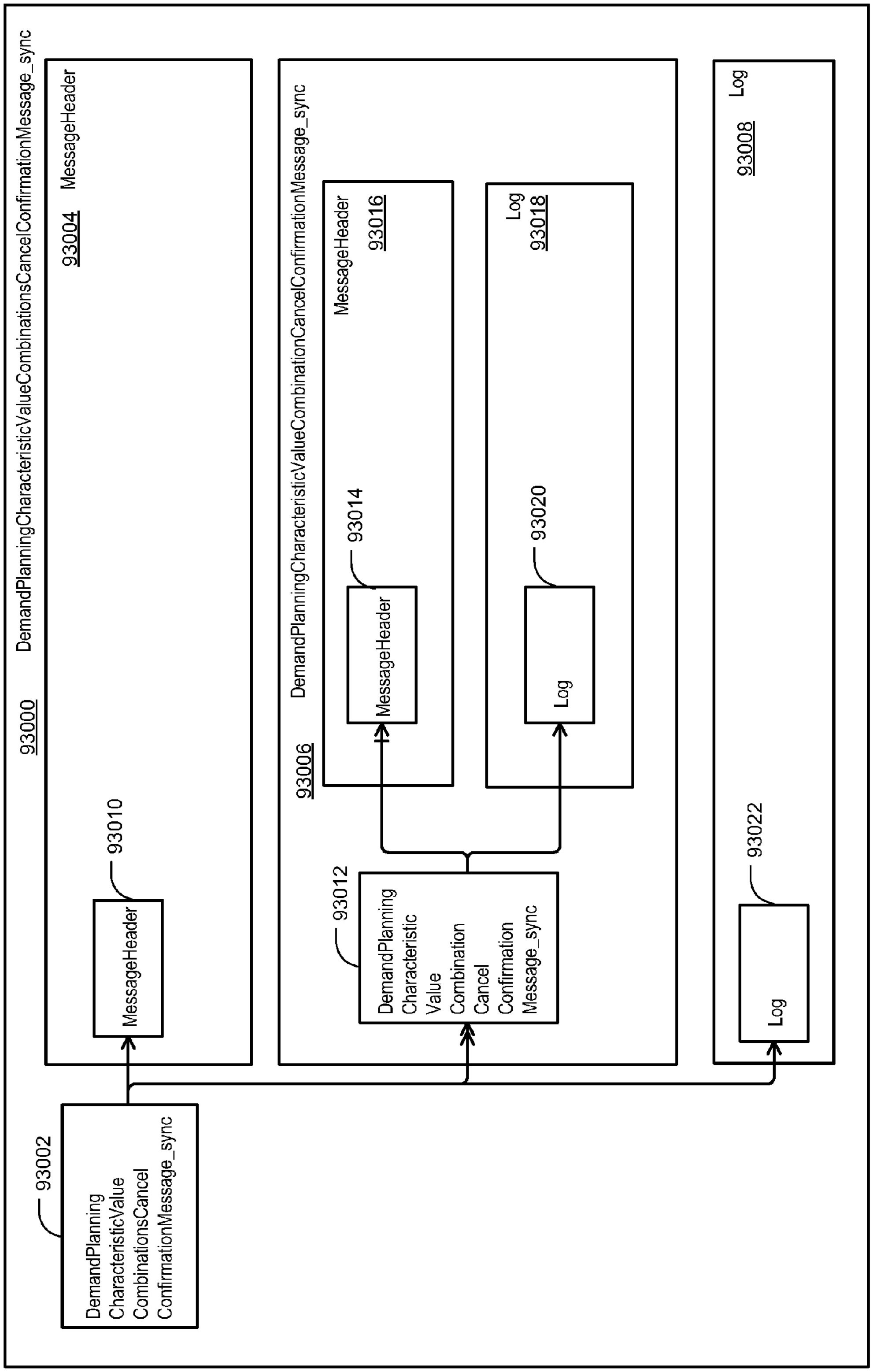
FIG. 93 shows an exemplary DemandPlanningCharacteristicValueCombinationsCancelConfirmationMessage Message Data Type.

Additionally, FIG. 93 illustrates one example logical configuration of DemandPlanningCharacteristicValueCombinationsCanelConfirmMessage_sync message 85018. Specifically, this figure depicts the arrangement and hierarchy of various components such as one or more levels of packages, entities, and datatypes, shown here as 93002 to 93022. As described above, packages may be used to represent hierarchy levels. Entities are discrete business elements that are used during a business transaction. Data types are used to type object entities and interfaces with a structure. For example, DemandPlanningCharacteristicValueCombinationsCancelConfirmMessage_sync message 85018 includes, among other things, MessageHeader 93004. Accordingly, heterogeneous applications may communicate using this consistent message configured as such.

Figure 94:
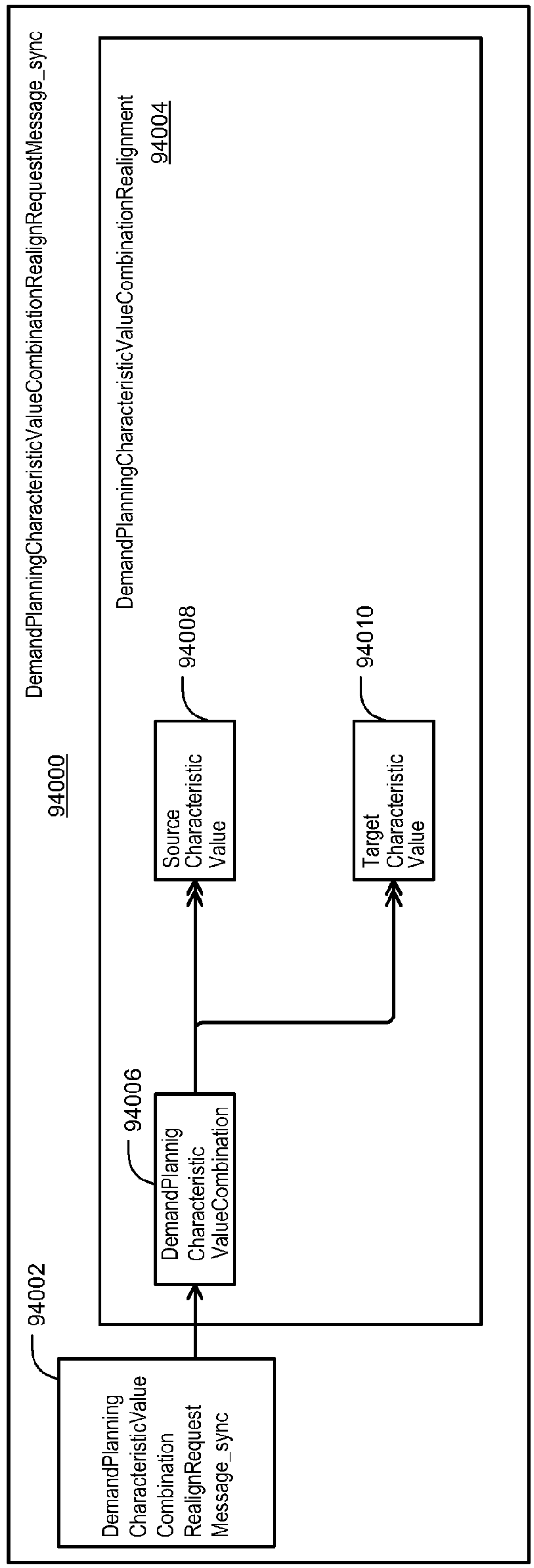
FIG. 94 shows an exemplary DemandPlanningCharacteristicValueCombinationRealignRequestMessage Message Data Type.

Additionally, FIG. 94 illustrates one example logical configuration of DemandPlanningCharacteristicValueCombinationRealignRequestMessage_sync message 85020. Specifically, this figure depicts the arrangement and hierarchy of various components such as one or more levels of packages, entities, and datatypes, shown here as 94002 to 94010. As described above, packages may be used to represent hierarchy levels. Entities are discrete business elements that are used during a business transaction. Data types are used to type object entities and interfaces with a structure. For example, DemandPlanningCharacteristicValueCombinationRealignRequestMessage_sync message 85020 includes, among other things, DemandPlanningCharacteristicValueCombinationRealignment 94004. Accordingly, heterogeneous applications may communicate using this consistent message configured as such.

Figure 95:
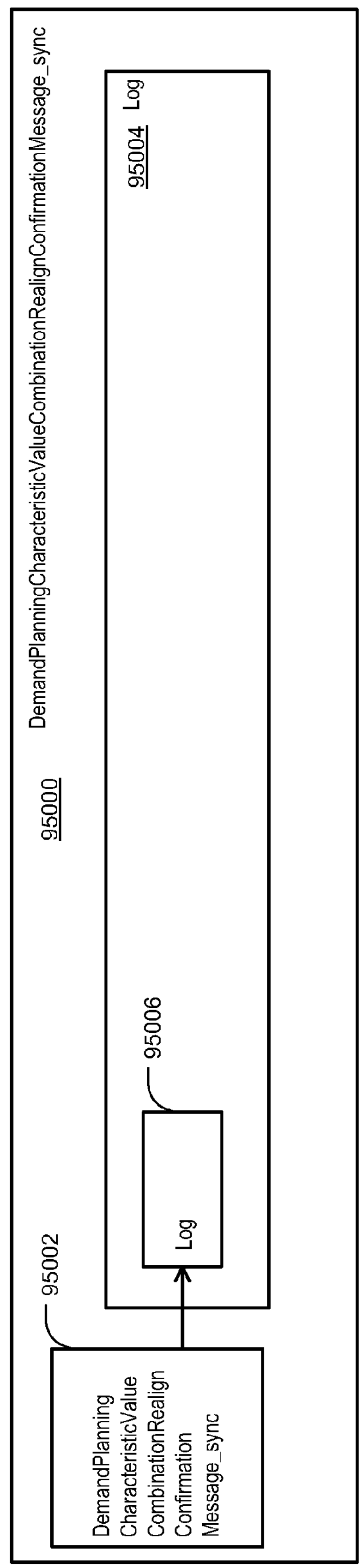
FIG. 95 shows an exemplary DemandPlanningCharacteristicValueCombinationRealignConfirmationMessage Message Data Type.

Additionally, FIG. 95 illustrates one example logical configuration of DemandPlanningCharacteristicValueCombinationRealignConfirmationMessage_sync message 85022. Specifically, this figure depicts the arrangement and hierarchy of various components such as one or more levels of packages, entities, and datatypes, shown here as 95002 to 95006. As described above, packages may be used to represent hierarchy levels. Entities are discrete business elements that are used during a business transaction. Data types are used to type object entities and interfaces with a structure. For example, DemandPlanningCharacteristicValueCombinationRealignConfirmationMessage_sync message 85022 includes, among other things, Log 95004. Accordingly, heterogeneous applications may communicate using this consistent message configured as such.

Figure 96:
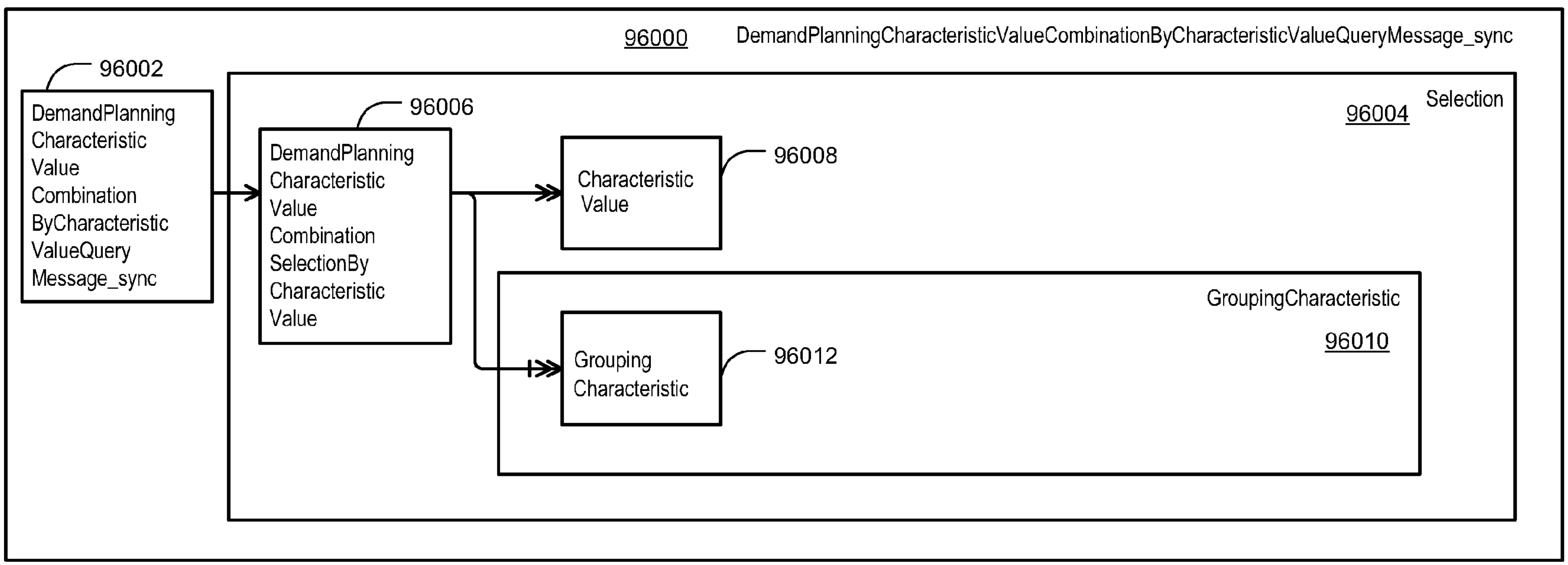
FIG. 96 shows an exemplary DemandPlanningCharacteristicValueCombinationByCharacteristicValueQueryMessage Message Data Type.

Additionally, FIG. 96 illustrates one example logical configuration of DemandPlanningCharacteristicValueCombinationByCharacteristicValueQueryMessage_sync message 85024. Specifically, this figure depicts the arrangement and hierarchy of various components such as one or more levels of packages, entities, and datatypes, shown here as 96002 to 96012. As described above, packages may be used to represent hierarchy levels. Entities are discrete business elements that are used during a business transaction. Data types are used to type object entities and interfaces with a structure. For example, DemandPlanningCharacteristicValueCombinationByCharacteristicValueQueryMessage_sync message 85024 includes, among other things, Selection 96004. Accordingly, heterogeneous applications may communicate using this consistent message configured as such.

Figure 97:
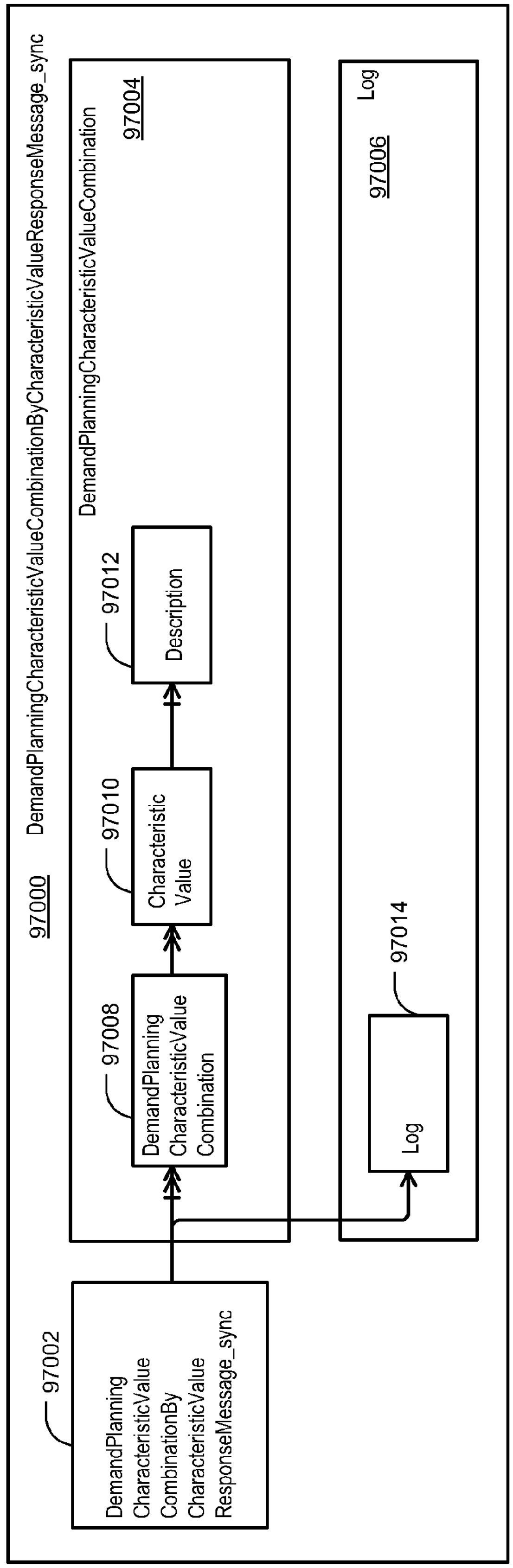
FIG. 97 shows an exemplary DemandPlanningCharacteristicValueCombinationByCharacteristicValueResponseMessage Message Data Type.

Additionally, FIG. 97 illustrates one example logical configuration of DemandPlanningCharacteristicValueCombinationByCharacteristicValueResponseMessage_sync message 85026. Specifically, this figure depicts the arrangement and hierarchy of various components such as one or more levels of packages, entities, and datatypes, shown here as 97002 to 97014. As described above, packages may be used to represent hierarchy levels. Entities are discrete business elements that are used during a business transaction. Data types are used to type object entities and interfaces with a structure. For example, DemandPlanningCharacteristicValueCombinationByCharacteristicValueResponseMessage_sync message 85026 includes, among other things, DemandPlanningCharacteristicValueCombination 97004. Accordingly, heterogeneous applications may communicate using this consistent message configured as such.

Additionally, FIGS. 98-1 through 98-3 illustrate one example logical configuration of DemandPlanningCharacteristicValueCombinationByCharacteristicValueQueryMessage_sync message 98000. Specifically, this figure depicts the arrangement and hierarchy of various components such as one or more levels of packages, entities, and datatypes, shown here as 98000 to 98072. As described above, packages may be used to represent hierarchy levels. Entities are discrete business elements that are used during a business transaction. Data types are used to type object entities and interfaces with a structure. For example, DemandPlanningCharacteristicValueCombinationByCharacteristicValueQueryMessage_sync message 98000 includes, among other things, Selection 98006. Accordingly, heterogeneous applications may communicate using this consistent message configured as such.

Additionally, FIGS. 99-1 through 99-3 illustrate one example logical configuration of DemandPlanningCharacteristicValueCombinationByCharacteristicValueResponseMessage_sync message 99000. Specifically, this figure depicts the arrangement and hierarchy of various components such as one or more levels of packages, entities, and datatypes, shown here as 99000 to 99074. As described above, packages may be used to represent hierarchy levels. Entities are discrete business elements that are used during a business transaction. Data types are used to type object entities and interfaces with a structure. For example, DemandPlanningCharacteristicValueCombinationByCharacteristicValueResponseMessage_sync message 99000 includes, among other things, DemandPlanningCharacteristicValueCombination 99006. Accordingly, heterogeneous applications may communicate using this consistent message configured as such.

Additionally, FIG. 100 illustrates one example logical configuration of DemandPlanningCharacteristicValueCombinationCancelConfirmationMessage_sync message 100000. Specifically, this figure depicts the arrangement and hierarchy of various components such as one or more levels of packages, entities, and datatypes, shown here as 100000 to 100028. As described above, packages may be used to represent hierarchy levels. Entities are discrete business elements that are used during a business transaction. Data types are used to type object entities and interfaces with a structure. For example, DemandPlanningCharacteristicValueCombinationCancelConfirmationMessage_sync message 100000 includes, among other things, MessageHeader 100006. Accordingly, heterogeneous applications may communicate using this consistent message configured as such.

Additionally, FIGS. 101-1 through 101-2 illustrate one example logical configuration of DemandPlanningCharacteristicValueCombinationCancelRequestMessage_sync message 101000. Specifically, this figure depicts the arrangement and hierarchy of various components such as one or more levels of packages, entities, and datatypes, shown here as 101000 to 101054. As described above, packages may be used to represent hierarchy levels. Entities are discrete business elements that are used during a business transaction. Data types are used to type object entities and interfaces with a structure. For example, DemandPlanningCharacteristicValueCombinationCancelRequestMessage_sync message 101000 includes, among other things, MessageHeader 101006. Accordingly, heterogeneous applications may communicate using this consistent message configured as such.

Additionally, FIG. 102 illustrates one example logical configuration of DemandPlanningCharacteristicValueCombinationCreateConfirmationMessage_sync message 102000. Specifically, this figure depicts the arrangement and hierarchy of various components such as one or more levels of packages, entities, and datatypes, shown here as 102000 to 102028. As described above, packages may be used to represent hierarchy levels. Entities are discrete business elements that are used during a business transaction. Data types are used to type object entities and interfaces with a structure. For example, DemandPlanningCharacteristicValueCombinationCreateConfirmationMessage_sync message 102000 includes, among other things, MessageHeader 102006. Accordingly, heterogeneous applications may communicate using this consistent message configured as such.

Additionally, FIGS. 103-1 through 103-2 illustrate one example logical configuration of DemandPlanningCharacteristicValueCombinationCreateRequestMessage_sync message 103000. Specifically, this figure depicts the arrangement and hierarchy of various components such as one or more levels of packages, entities, and datatypes, shown here as 103000 to 103048. As described above, packages may be used to represent hierarchy levels. Entities are discrete business elements that are used during a business transaction. Data types are used to type object entities and interfaces with a structure. For example, DemandPlanningCharacteristicValueCombinationCreateRequestMessage_sync message 103000 includes, among other things, MessageHeader 103006. Accordingly, heterogeneous applications may communicate using this consistent message configured as such.

Additionally, FIG. 104 illustrates one example logical configuration of DemandPlanningCharacteristicValueCombinationRealignConfirmationMessage_sync message 104000. Specifically, this figure depicts the arrangement and hierarchy of various components such as one or more levels of packages, entities, and datatypes, shown here as 104000 to 104012. As described above, packages may be used to represent hierarchy levels. Entities are discrete business elements that are used during a business transaction. Data types are used to type object entities and interfaces with a structure. For example, DemandPlanningCharacteristicValueCombinationRealignConfirmationMessage_sync message 104000 includes, among other things, Log 104006. Accordingly, heterogeneous applications may communicate using this consistent message configured as such.

Additionally, FIGS. 105-1 through 105-2 illustrate one example logical configuration of DemandPlanningCharacteristicValueCombinationRealignRequestMessage_sync message 105000. Specifically, this figure depicts the arrangement and hierarchy of various components such as one or more levels of packages, entities, and datatypes, shown here as 105000 to 105048. As described above, packages may be used to represent hierarchy levels. Entities are discrete business elements that are used during a business transaction. Data types are used to type object entities and interfaces with a structure. For example, DemandPlanningCharacteristicValueCombinationRealignRequestMessage_sync message 105000 includes, among other things, DemandPlanningCharacteristicValuerCombination 105006. Accordingly, heterogeneous applications may communicate using this consistent message configured as such.

Additionally, FIG. 106 illustrates one example logical configuration of DemandPlanningCharacteristicValueCombinationsCancelConfirmationMessage_sync message 106000. Specifically, this figure depicts the arrangement and hierarchy of various components such as one or more levels of packages, entities, and datatypes, shown here as 106000 to 106036. As described above, packages may be used to represent hierarchy levels. Entities are discrete business elements that are used during a business transaction. Data types are used to type object entities and interfaces with a structure. For example, DemandPlanningCharacteristicValueCombinationsCancelConfirmationMessage_sync message 106000 includes, among other things, MessageHeader 106006. Accordingly, heterogeneous applications may communicate using this consistent message configured as such.

Additionally, FIG. 107 illustrates one example logical configuration of DemandPlanningCharacteristicValueCombinationsCancelRequestMessage_sync message 107000. Specifically, this figure depicts the arrangement and hierarchy of various components such as one or more levels of packages, entities, and datatypes, shown here as 107000 to 107028. As described above, packages may be used to represent hierarchy levels. Entities are discrete business elements that are used during a business transaction. Data types are used to type object entities and interfaces with a structure. For example, DemandPlanningCharacteristicValueCombinationsCancelRequestMessage_sync message 107000 includes, among other things, MessageHeader

107006. Accordingly, heterogeneous applications may communicate using this consistent message configured as such.

Additionally, FIGS. 108-1 through 108-2 illustrate one example logical configuration of DemandPlanningCharacteristicValueCombinationsCreateConfirmationMessage_sync message 108000. Specifically, this figure depicts the arrangement and hierarchy of various components such as one or more levels of packages, entities, and datatypes, shown here as 108000 to 108036. As described above, packages may be used to represent hierarchy levels. Entities are discrete business elements that are used during a business transaction. Data types are used to type object entities and interfaces with a structure. For example, DemandPlanningCharacteristicValueCombinationsCreateConfirmationMessage_sync message 108000 includes, among other things, MessageHeader 108006. Accordingly, heterogeneous applications may communicate using this consistent message configured as such.

Additionally, FIG. 109 illustrates one example logical configuration of DemandPlanningCharacteristicValueCombinationsCreateRequestMessage_sync message 109000. Specifically, this figure depicts the arrangement and hierarchy of various components such as one or more levels of packages, entities, and datatypes, shown here as 109000 to 109028. As described above, packages may be used to represent hierarchy levels. Entities are discrete business elements that are used during a business transaction. Data types are used to type object entities and interfaces with a structure. For example, DemandPlanningCharacteristicValueCombinationsCreateRequestMessage_sync message 109000 includes, among other things, MessageHeader 109006. Accordingly, heterogeneous applications may communicate using this consistent message configured as such.

Message Data Type DemandPlanningCharacteristicValueCombinationCreateRequestMessage_sync The message data type DemandPlanningCharacteristicValueCombinationCreateRequestMessage_sync can contain the DemandPlanningCharacteristicValueCombination included in the business document and the business information that is relevant for sending a business document in a message. DemandPlanningCharacteristicValueCombinationCreateRequestMessage_sync can contain the packages MessageHeader package, and DemandPlanningCharacteristicValueCombination package.

In some implementations, a MessageHeader package groups the business information that is relevant for sending a business document in a message. MessageHeader can contain the entity MessageHeader.

In some implementations, a MessageHeader groups business information from the perspective of the sending application information to identify the business document in a message. MessageHeader can have a GDT of type BasicBusinessDocumentMessageHeader, whereby the following elements of the GDT are used: ID, ReferenceID, UUID, and ReferenceUUID. ID can be an identifier of the business document message. ReferenceID can be a reference to the Identifier of the message. UUID can be a Universal Unique identifier of the instance of the business document message. ReferenceUUID can be a reference to the Universal Unique identifier of the instance of the business document message. The BasicBusinessDocumentMessageHeader can be used for processing mass operations for several instances of DemandPlanningCharacteristicValueCombination In some implementations, the DemandPlanningCharacteristicValueCombination package contains the entities DemandPlanningCharacteristicValueCombination, and CharacteristicValue. In some implementations, a DemandPlanningCharacteristicValueCombination is a unique combination of values for the characteristics defined in the DemandPlanningScenario. The DemandPlanningCharacteristicValueCombination can include the element DemandPlanningScenarioID, which can be based on GDT DemandPlanningScenarioID. DemandPlanningScenarioID can be a unique identifier for a DemandPlanningScenario.

In some implementations, each Characteristic Value belongs to a Characteristic. A Characteristic can represent a property of describing and distinguishing between objects, and can provide classification possibilities. CharacteristicValue can contain exemplary elements such as DemandPlanCharacteristicID and DemandPlanCharacteristicValue. DemandPlanCharacteristicID can be based on GDT DemandPlanCharacteristicID, which can be a unique identifier for a DemandPlanCharacteristic. DemandPlanCharacteristicValue can be based on GDT DemandPlanCharacteristicValue, which can be an arbitrary value that a demand plan characteristic can have. An exemplary Characteristic is "Region" and examples for Characteristic Values are "North", "Central", "South".

Message Data Type DemandPlanningCharacteristicValueCombinationCreateConfirmationMessage_sync In some embodiments, the message data type DemandPlanningCharacteristicValueCombinationCreateConfirmationMessage_sync can contains the business information that is relevant for sending a business document in a message and/or the log information with detailed textual messages about the creation of the DemandPlanningCharacteristicValueCombination. It can contain the packages MessageHeader and/or Log. In some embodiments, the entity log contains the information about the execution of an action, is of type GDT Log, and can be a table of elements of type Log.

Message Data Type DemandPlanningCharacteristicValueCombinationsCreateRequestMessage_sync The message data type DemandPlanningCharacteristicValueCombinationsCreateRequestMessage_sync can contain Message Header, DemandPlanningCharacteristicValueCombinationCreateRequestMessages, and/or business information that is relevant for sending a business document in the message. It can contain the MessageHeader package and the DemandPlanningCharacteristicValueCombinationCreateRequestMessage_sync.

A MessageHeader package can group the business information that is relevant for sending several business documents in a message. It can contain the entity MessageHeader.

In some implementations, a MessageHeader can group business information from the perspective of the sending application and can provide information to identify the mass-message. It is of type GDT BasicBusinessDocumentMessageHeader and exemplary elements of the GDT that are used include ID, ReferenceID, UUID, and ReferenceUUID. In this example, ID is an identifier of the business document message, ReferenceID is a reference to the Identifier of the message, UUID is a universal unique identifier of the instance of the business document message, and ReferenceUUID is a reference to the Universal Unique identifier of the instance of the business document message. The ID can identify the mass-message. Each message in the mass-message can have its own header with its own ID. In some embodiments, the usage of MessageHeader is obligatory.

Message Data Type DemandPlanningCharacteristicValueCombinationsCreateConfirmationMessage_sync The message data type DemandPlanningCharacteristicValueCombinationsCreateConfirmationMessage_sync can contain DemandPlanningcharacteristicValueCombinationCreateConfirmationMessages, and/or the business information that is relevant for sending a business document in the message. It can contain the MessageHeader package, DemandPlanningCharacteristicValueCombinationCreateConfirmationMessage_sync, and/or Log.

Message Data Type DemandPlanningCharacteristicValueCombinationCancelRequestMessage_sync The message data type DemandPlanningCharacteristicValueCombinationCancelRequestMessage_sync can contain the DemandPlanningCharacteristicValueCombination included in the business document and/or the business information that is relevant for sending a business document in a message. It can contain the packages MessageHeader package and/or DemandPlanningCharacteristicValueCombination package. Demand Planning Characteristic Value Combinations can be deleted by ID and by characteristic values as well. In some embodiments, if the ID is provided, CharacteristicValue needs to be empty. If the ID is not provided, CharacteristicValue can be filled. A single Demand Planning Characteristic Combination can be cancelled by giving its characteristic values, but it is also possible to cancel several combinations by giving a subset of characteristic values. For example, the DemandPlanningScenario has the characteristics Product, Location, and Brand. To delete one single combination, use the values Product=PROD1, Location=LOC1, and Brand=BRAND1. To delete all combinations where Location is "LOC1", use the value Location=LOC1.

The DemandPlanningCharacteristicValueCombination package can contains the entities DemandPlanningCharacteristicValueCombination, and CharacteristicValue. A DemandPlanningCharacteristicValueCombination can be a unique combination of values for the characteristics defined in the DemandPlanningScenario. In some embodiments, the DemandPlanningScenario is of type GDT DemandPlanningScenario and contains the elements ID and DemandPlanningScenarioID. ID can be an optional element and is of type GDT DemandPlanningCharacteristicValueCombinationID, which is a unique identifier for a DemandPlanningCharacteristicValueCombination. DemandPlanningScenarioID can be a required element and is of type GDT DemandPlanningScenarioID, which is a unique identifier for a DemandPlanningScenario. Each Characteristic Value can belong to a Characteristic. Characteristics represent a property of describing and distinguishing between objects, and can provide classification possibilities. CharacteristicValue contains the exemplary elements DemandPlanCharacteristicID and DemandPlanCharacteristicValue. In some embodiments, DemandPlanCharacteristicID is of type GDT DemandPlanCharacteristicID, which is a unique identifier for a DemandPlanCharacteristic. DemandPlanCharacteristicValue can be of type GDT DemandPlanCharacteristicValue, which can be an arbitrary value that a demand plan characteristic can have.

Message Data Type DemandPlanningCharacteristicValueCombinationCancelConfirmationMessage_sync Exemplary message data types DemandPlanningCharacteristicValueCombinationCancelConfirmationMessage_sync can contain the business information that is relevant for sending a business document in a message and/or the log information with detailed textual messages about the cancellation of the DemandPlanningCharacteristicValueCombination. It can contain the packages MessageHeader and/or Log.

Message Data Type DemandPlanningCharacteristicValueCombinationsCancelRequestMessage_sync The message data type DemandPlanningCharacteristicValueCombinationsCancelRequestMessage_sync can contain DemandPlanningCharacteristicValueCombinationCancelRequestMessages and/or the business information that is relevant for sending a business documents in the message. It can contain the MessageHeader package and DemandPlanningCharacteristicValueCombinationCancelRequestMessage_sync.

Message Data Type DemandPlanningCharacteristicValueCombinationsCancelConfirmationMessage_sync In some embodiments, the message data type DemandPlanningCharacteristicValueCombinationsCancelConfirmationMessage_sync contains DemandPlanningcharacteristicValueCombinationCancelConfirmationMessages and/or the business information that is relevant for sending a business documents in the message. It can contain the MessageHeader package, DemandPlanningCharacteristicValueCombinationCancelConfirmationMessage_sync, and Log.

Message Data Type DemandPlanningCharacteristicValueCombinationRealignRequestMessage_sync The message data type DemandPlanningCharacteristicValueCombinationRealignRequestMessage_sync can contain The DemandPlanningCharacteristicValueCombination included in the business document and/or the business information that is relevant for sending a business document in a message. It can contain the package DemandPlanningCharacteristicValueCombinationRealignment.

Exemplary DemandPlanningCharacteristicValueCombinationRealignment packages can group the entites DemandPlanningCharacteristicValueCombination, SourceCharacteristicValue, and/or TargetCharacteristicValue. A DemandPlanningCharacteristicValueCombination can be a unique combination of values for the characteristics defined in the DemandPlanningScenario. In some implementations, the DemandPlanningScenario is of type GDT DemandPlanningScenario and contains the exemplary element DemandPlanningScenarioID, which can be of type GDT DemandPlanningScenarioID, which is a unique identifier for a DemandPlanningScenario. Exemplary constraints can include that SourceCharacteristicValue can exist, TargetCharacteristicValue might not exist (i.e., can be unique), at least one Characteristic has to be specified in Target and SourceCharacteristicValue, the same Characteristics have to be specified in Target and SourceCharacteristicValue, and/or the used Characteristics are defined in the DemandPlanningScenario. Source characteristic value combinations can be cancelled and target characteristic value combinations can be created during the realignment. The corresponding planning data can remain unchanged. Each Characteristic Value can belong to a Characteristic. Exemplary Characteristics represent a property of describing and distinguishing between objects, and/or provide classification possibilities. SourceCharacteristicValue can contain the exemplary elements DemandPlanCharacteristicID and DemandPlanCharacteristicValue. DemandPlanCharacteristicID can be of type GDT DemandPlanCharacteristicID, which is a unique identifier for a DemandPlanCharacteristic. DemandPlanCharacteristicValue can be of type GDT DemandPlanCharacteristicValue, which is an arbitrary value that a demand plan characteristic can have. Each Characteristic Value can belong to a Characteristic. In some embodiments, characteristics represent a property of describing and distinguishing between objects and/or provide classification possibilities. TargetCharacteristicValue can contain the exemplary attributes DemandPlanCharacteristicID and DemandPlanCharacteristicValue. DemandPlanCharacteristicID can be of type GDT DemandPlanCharacteristicID, which is a unique identifier for a DemandPlanCharacteristic. DemandPlanCharacteristicValue can be of type GDT DemandPlanCharacteristicValue, which is an arbitrary value that a demand plan characteristic can have.

Message Data Type DemandPlanningCharacteristicValueCombinationRealignConfirmationMessage_sync The message data type DemandPlanningCharacteristicValueCombinationRealignConfirmationMessage_sync can contain the business information that is relevant for sending a business document in a message and/or the log information with detailed textual messages about the realignment of the DemandPlanningCharacteristicValueCombinations. It can contain the package Log.

Message Data Type DemandPlanningCharacteristicValueCombinationByCharacteristicValueQueryMessage_sync The message data type DemandPlanningCharacteristicValueCombinationByCharacteristicValueQueryMessage_sync can contain the Selection included in the business document and/or the business information that is relevant for sending a business document in a message. It can contain Selection package.

The Selection package can group the exemplary entities DemandPlanningCharacteristicValueByCharacteristicValueSelection and CharacteristicValue and can contain the package GroupingCharacteristic. Selection criteria can be used in querying DemandPlanningCharacteristicValueCombination. DemandPlanningCharacteristicValueCombinationSelectionByCharacteristicValue can contain the exemplary elements DemandPlanningScenarioID and MaximumNumberValue. DemandPlanningScenarioID can be of type GDT DemandPlanningScenarioID, which is a unique identifier for a DemandPlanningScenario. MaximumNumberValue can be of type GDT NumberValue with a Qualifier Maximum. The MaximumNumberValue can determine the maximum number of DemandPlanningCharacterisiticValueCombination matching the selection criteria of the Inquiry and being displayed in the result list.

In some embodiments, each Characteristic Value can belong to a Characteristic. Characteristics represent a property of describing and distinguishing between objects, characteristics provide classification possibilities. CharacteristicValue can contain the exemplary elements DemandPlanCharacteristicID and SelectionByDemandPlanCharacteristicValue. DemandPlanCharacteristicID can be of type GDT DemandPlanCharacteristicID, which is a unique identifier for a DemandPlanCharacteristic. SelectionByDemandPlanCharacteristicValue can be an interval for characteristic values for a certain characteristic. The SelectionByDemandPlanCharacteristicValue can contain the exemplary elements InclusionExclusionCode, IntervalBoundaryTypeCode, LowerBoundaryDemandPlanCharacteristicValue, and/or UpperBoundaryDemandPlanCharacteristicValue. InclusionExclusionCode can be optional, of type GDT InclusionExclusionCode, and defined if the interval defined by IntervalBoundaryTypeCode, LowerBoundaryDemandPlanCharacteristicValue, and UpperBoundaryDemandPlanCharacteristicValue is included in the result set or excluded. IntervalBoundaryTypeCode can be of type GDT IntervalBoundaryTypeCode, and a coded representation of an interval boundary type. LowerBoundaryDemandPlanCharacteristicValue can be optional, of type GDT DemandPlanCharacteristicValue, and the lower boundary of the characteristic value interval. UpperBoundaryDemandPlanCharacteristicValue can be optional, of type GDT DemandPlanCharacteristicValue, and the upper boundary of the characteristic value interval. Exemplary GroupingCharacteristics contains the entity GroupingCharacteristic. In some embodiments, the query of aggregated DemandPlanningCharacteristicValueCombinations is supported. CharacteristicGrouping is a set of Characteristics and determines the aggregation level of the DemandPlanningCharacteristicValueCombinations. CharacteristicGrouping can contain the element DemandPlanCharacteristicID, which can be of type GDT DemandPlanCharacteristicID, and a unique identifier for a DemandPlanCharacteristic.

Message Data Type DemandPlanningCharacteristicValueCombinationByCharacteristicValueRespons eMessage In some embodiments, the message data type DemandPlanningCharacteristicValueCombinationByCharacteristicValueResponse_sync message contains the business information that is relevant for sending a business document in a message, the DemandPlanningCharacteristicValueCombinations in the business document, and/or the log information with detailed textual messages about the query of the DemandPlanningCharacteristicValueCombinations. It can contain the packages DemandPlanningCharacteristicValueCombination and Log.

The DemandPlanningCharacteristicValueCombination package can contain the entities DemandPlanningCharacteristicValueCombination, CharacteristicValue, and/or Description. A DemandPlanningCharacteristicValueCombination can be a unique combination of values for the characteristics defined in the DemandPlanningScenario. The DemandPlanningCharacteristicValueCombination can contain the elements ID and DemandPlanningScenarioID. ID can be of type GDT DemandPlanningCharacteristicValueCombinationID, and the unique identifier for a DemandPlanningCharacteristicValueCombination. DemandPlanningScenarioID can be of type GDT DemandPlanningScenarioID, and a unique identifier for a DemandPlanningScenario. Each Characteristic Value can belong to a Characteristic. Characteristics represent a property of describing and distinguishing between objects and can provide classification possibilities. CharacteristicValue can contain the exemplary elements DemandPlanCharacteristicID and DemandPlanCharacteristicValue. DemandPlanCharacteristicID can be of type GDT DemandPlanCharacteristicID, and a unique identifier for a DemandPlanCharacteristic. DemandPlanCharacteristicValue can be of type GDT DemandPlanCharacteristicValue, and an arbitrary value that a demand plan characteristic can have. Description can provide an additional descriptive text to a certain DemandPlanCharacteristicValue. Description can contain the exemplary elements Description, ShortDescription, MediumDescription, and LongDescription. Description can be optional, of type GDT LEN60_Description, and a representation of the properties of an object in natural language. This element can contain a free text describing a DemandPlanCharacteristicValue. ShortDescription can be optional, of type GDT LEN20_Description, and a representation of the properties of an object in natural language. This element can contain a free text describing a DemandPlanCharacteristicValue. MediumDescription can be optional, of type GDT LEN40_Description, and a representation of the properties of an object in natural language. This element can contain free text describing a DemandPlanCharacteristicValue. LongDescription can be optional, of type GDT LEN60_Description,and a representation of the properties of an object in natural language. This element can contain free text describing a DemandPlanCharacteristicValue. DemandViewOfPromotion Interfaces Supply chain planning integrates information about products, suppliers, manufacturers, retailers, and customers with the goal of optimizing processes throughout the supply chain, which also involves creating a more accurate demand plan by using promotions. The effects of the sales promotion activities are stored in the DemandViewOfPromotion. Using the services described in this document has the following prerequisites: 1) Create a demand planning scenario using already existing key figures, characteristics, one or more periodicities with optional time stream, unit of measure, and optionally a currency; 2) Create the demand planning characteristic value combinations based on characteristics defined in the demand planning scenario; 3) Create a demand plan as a container for planning data; and 4) Assign to the demand plan at least one planning version.

Figure 110:
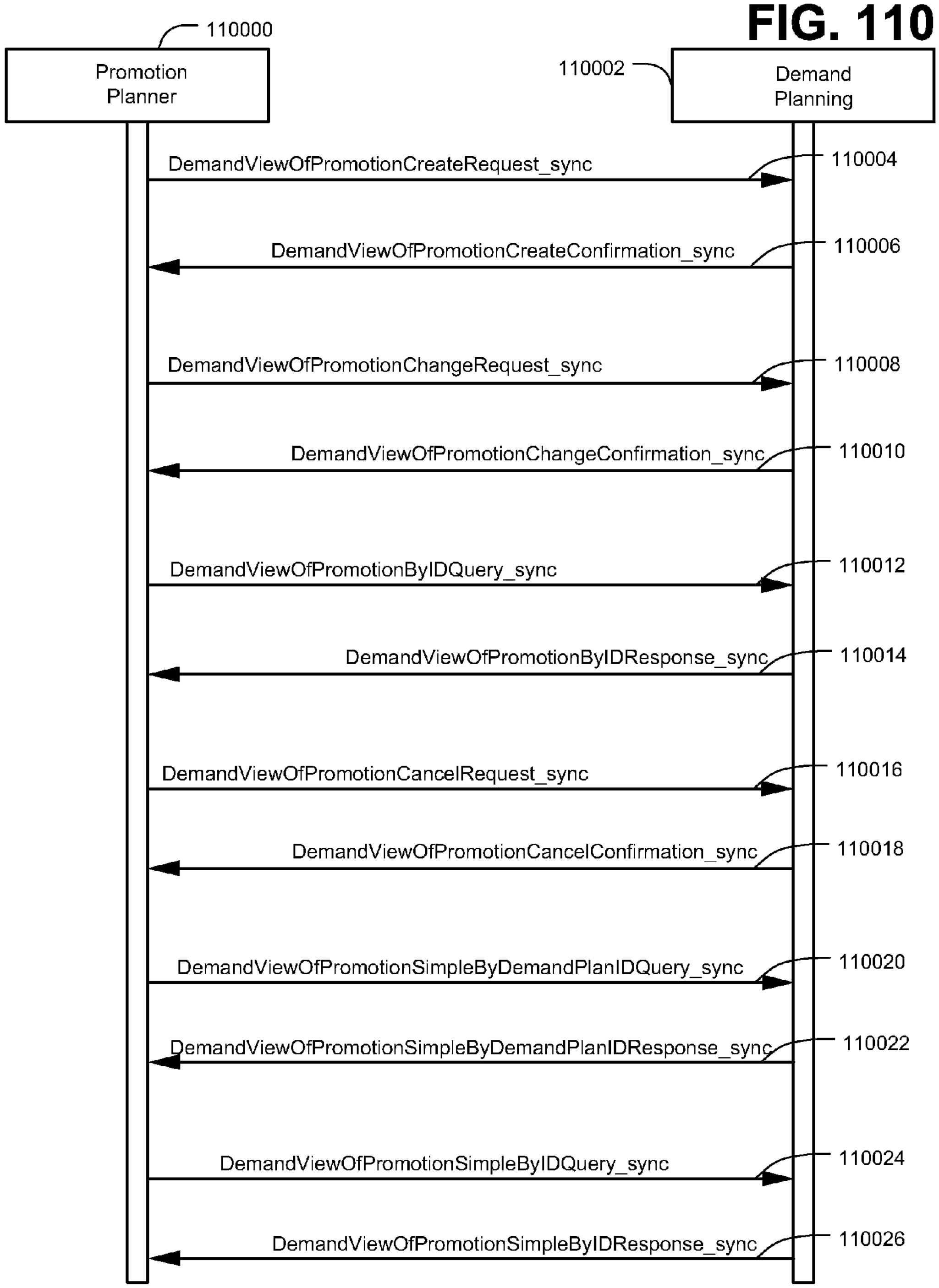
FIG. 110 shows an exemplary DemandViewOfPromotion Message Choreography.

The message choreography of FIG. 110 describes a possible logical sequence of messages that can be used to realize a DemandViewOfPromotion business scenario. A "PromotionPlanner" system 110000 can request demand view of promotion create using a DemandViewOfPromotionCreateRequest_sync message 110004 as shown, for example, in FIG. 110. A "DemandPlanning" system 110002 can respond to the request using a DemandViewOfPromotionCreateConfirmation_sync message 110006 as shown, for example, in FIG. 110. The "PromotionPlanner" system 110000 can request demand view of promotion change using a DemandViewOfPromotionChangeRequest_sync message 110008 as shown, for example, in FIG. 110. The "DemandPlanning" system 110002 can respond to the request using a DemandViewOfPromotionChangeConfirmation_sync message 110010 as shown, for example, in FIG. 110. The "PromotionPlanner" system 110000 can query demand view of promotion by ID using a DemandViewOfPromotionByIDQuery_sync message 110012 as shown, for example, in FIG. 110. The "DemandPlanning" system 110002 can respond to the query using a DemandViewOfPromotionByIDResponse_sync message 110014 as shown, for example, in FIG. 110. The "PromotionPlanner" system 110000 can request demand view of promotion cancel using a DemandViewOfPromotionCancelRequest_sync message 110016 as shown, for example, in FIG. 110. The "DemandPlanning" system 110002 can respond to the request using a DemandViewOfPromotionCancelConfirmation_sync message 110018 as shown, for example, in FIG. 110. The "PromotionPlanner" system 110000 can query demand view of promotion simple by demand plan ID using a DemandViewOfPromotionSimpleByDemandPlanIDQuery_sync message 110020 as shown, for example, in FIG. 110. The "DemandPlanning" system 110002 can respond to the query using a DemandViewOfPromotionSimpleByDemandPlanIDResponse_sync message 110022 as shown, for example, in FIG. 110. The "PromotionPlanner" system 110000 can query demand view of promotion simple by ID using a DemandViewOfPromotionSimpleByIDQuery_sync message 110024 as shown, for example, in FIG. 110. The "DemandPlanning" system 110002 can respond to the query using a DemandViewOfPromotionSimpleByIDResponse_sync message 110026 as shown, for example, in FIG. 110.

A DemandViewOfPromotionCreateRequest_sync is a request to Demand Planning to create a DemandViewOfPromotion. The structure of the message type DemandViewOfPromotionCreateRequest_sync is specified by the message data type DemandViewOfPromotionCreateRequestMessage_sync. In some implementations, absolute promotions can be created.

A DemandViewOfPromotionCreateConfirmation_sync is a confirmation from Demand Planning to a DemandViewOfPromotionCreateRequest_sync. The structure of the message type DemandViewOfPromotionCreateConfirmation_sync is specified by the message data type DemandViewOfPromotionCreateConfirmationMessage_sync Message Type DemandViewOfPromotionChangeRequest_sync.

A DemandViewOfPromotionChangeRequest_sync is a request to Demand Planning to change a DemandViewOfPromotion. The structure of the message type DemandViewOfPromotionChangeRequest_sync is specified by the message data type DemandViewOfPromotionChangeRequestMessage_sync.

A DemandViewOfPromotionChangeConfirmation_sync is a confirmation from Demand Planning to a DemandViewOfPromotionChangeRequest_sync. The structure of the message type DemandViewOfPromotionChangeConfirmation_sync is specified by the message data type DemandViewOfPromotionChangeConfirmationMessage_sync Message Type DemandViewOfPromotionCancelRequest_sync.

A DemandViewOfPromotionCancelRequest_sync is a request to Demand Planning to delete a DemandViewOfPromotion. The structure of the message type DemandViewOfPromotionCancelRequest_sync is specified by the message data type DemandViewOfPromotionCancelRequestMessage_sync.

A DemandViewOfPromotionCancelConfirmation_sync is a confirmation from Demand Planning to a DemandViewOfPromotionCancelRequest_sync. The structure of the message type DemandViewOfPromotionCancelConfirmation_sync is specified by the message data type DemandViewOfPromotionCancelConfirmationMessage_sync.

A DemandViewOfPromotionByIDQuery_sync is an inquiry to Demand Planning for a DemandViewOfPromotion. The structure of the message type DemandViewOfPromotionByIDQuery_sync is specified by the message data type DemandViewOfPromotionQueryMessage_sync.

A DemandViewOfPromotionByIDResponse_sync is a response from Demand Planning to Promotion Planning to a DemandViewOfPromotionByIDQuery_sync. The structure of the message type DemandViewOfPromotionByIDResponse_sync is specified by the message data type DemandViewOfPromotionByIDResponseMessage_sync.

A DemandViewOfPromotionSimpleByDemandPlanIDQuery_sync is an inquiry for identifying elements of DemandViewOfPromotions of a DemandPlan. The structure of the message type DemandViewOfPromotionSimpleByDemandPlanIDQuery_sync is specified by the message data type DemandViewOfPromotionSimpleByDemandPlanIDQueryMessage_sync A DemandViewOfPromotionSimpleByDemandPlanIDResponse_sync is a response from Demand Planning to a DemandViewOfPromotionSimpleByDemandPlanIDQuery_sync. The structure of the message type DemandViewOfPromotionSimpleByDemandPlanIDResponse_sync is specified by the message data type DemandViewOfPromotionSimpleByDemandPlanIDResponseMessage_sync.

A DemandViewOfPromotionSimpleByIDQuery_sync is an inquiry for the identifying elements of DemandViewOfPromotions. The structure of the message type DemandViewOfPromotionSimpleByIDQuery_sync is specified by the message data type DemandViewOfPromotionSimpleByIDQueryMessage_sync.

A DemandViewOfPromotionSimpleByIDResponse_sync is a response from DemandPlanning to a DemandViewOfPromotionSimpleByDemandPlanSimpleByIDQuery_sync. The structure of the message type DemandViewOfPromotionSimpleByIDResponse_sync is specified by the message data type DemandViewOfPromotionSimpleByIDResponseMessage_sync.

Interfaces can include DemandViewOfPromotionCreateRequestConfirmation_In, DemandViewOfPromotionChangeRequestConfirmation_In, DemandViewOfPromotionCancelRequestConfirmation_In, DemandViewOfPromotionByIDQueryResponse_In, DemandViewOfPromotionSimpleByDemandPlanIDQueryResponse_In, and DemandViewOfPromotionSimpleByIDQueryResponse_In.

Figure 111:
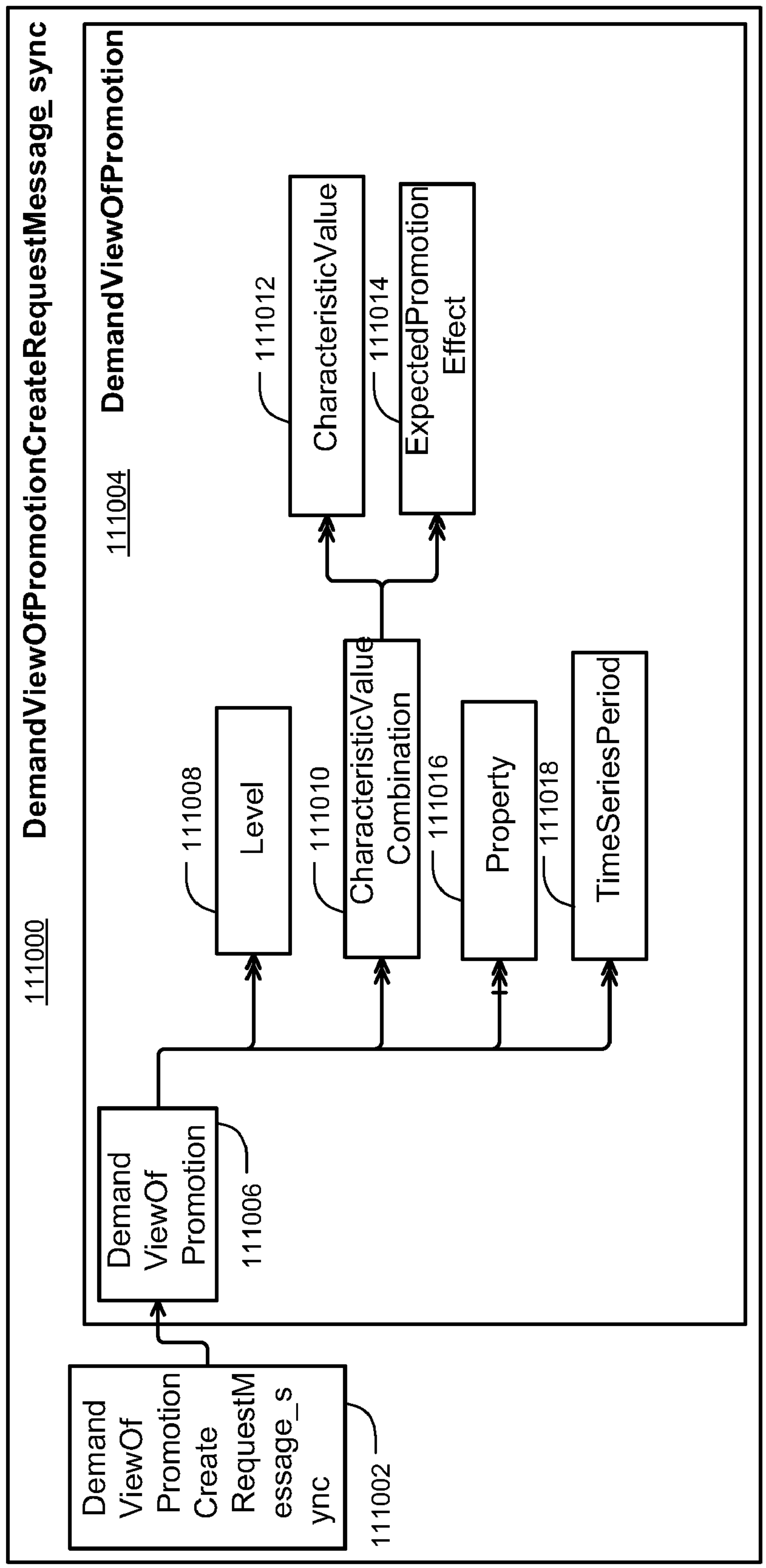
FIG. 111 shows an exemplary DemandViewOfPromotionCreateRequest Message Data Type.

FIG. 111 illustrates one example logical configuration of DemandViewOfPromotionCreateRequestMessage_sync message 111000. Specifically, this figure depicts the arrangement and hierarchy of various components such as one or more levels of packages, entities, and datatypes, shown here as 111000 to 111018. As described above, packages may be used to represent hierarchy levels. Entities are discrete business elements that are used during a business transaction. Data types are used to type object entities and interfaces with a structure. For example, DemandViewOfPromotionCreateRequestMessage_sync message 111000 includes, among other things, DemandViewOfPromotion 111004. Accordingly, heterogeneous applications may communicate using this consistent message configured as such.

Figure 112:
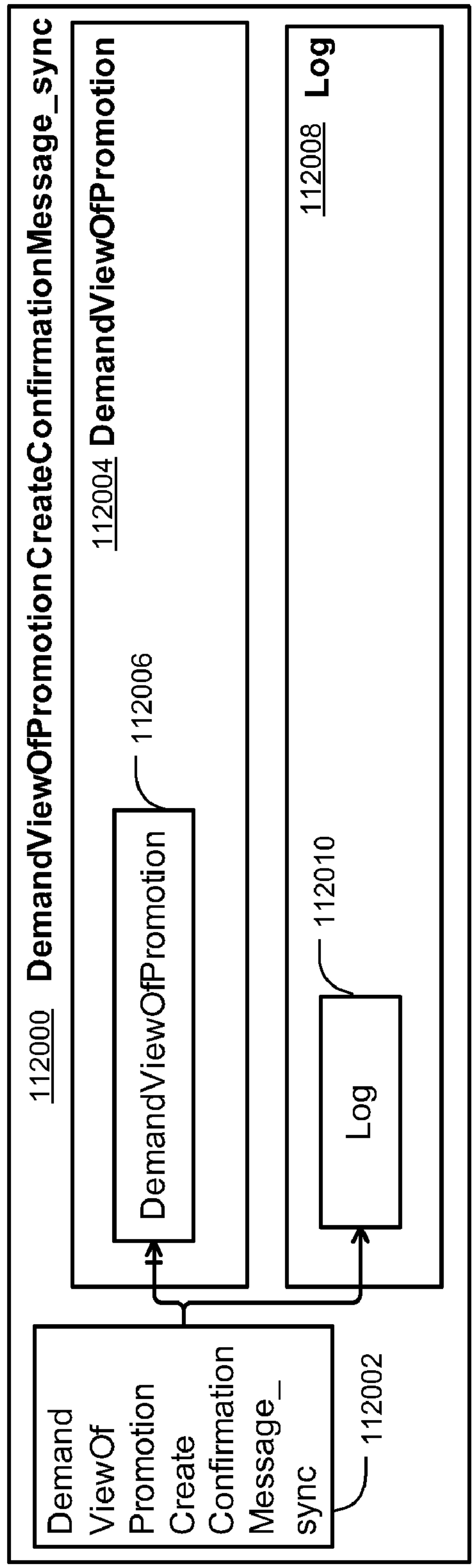
FIG. 112 shows an exemplary DemandViewOfPromotionCreateConfirmation Message Data Type.

Additionally, FIG. 112 illustrates one example logical configuration of DemandViewOfPromotionCreateConfirmationMessage_sync message 112000. Specifically, this figure depicts the arrangement and hierarchy of various components such as one or more levels of packages, entities, and datatypes, shown here as 112000 to 112010. As described above, packages may be used to represent hierarchy levels. Entities are discrete business elements that are used during a business transaction. Data types are used to type object entities and interfaces with a structure. For example, DemandViewOfPromotionCreateConfirmationMessage_sync message 112000 includes, among other things, DemandViewOfPromotion 112004. Accordingly, heterogeneous applications may communicate using this consistent message configured as such.

Figure 113:
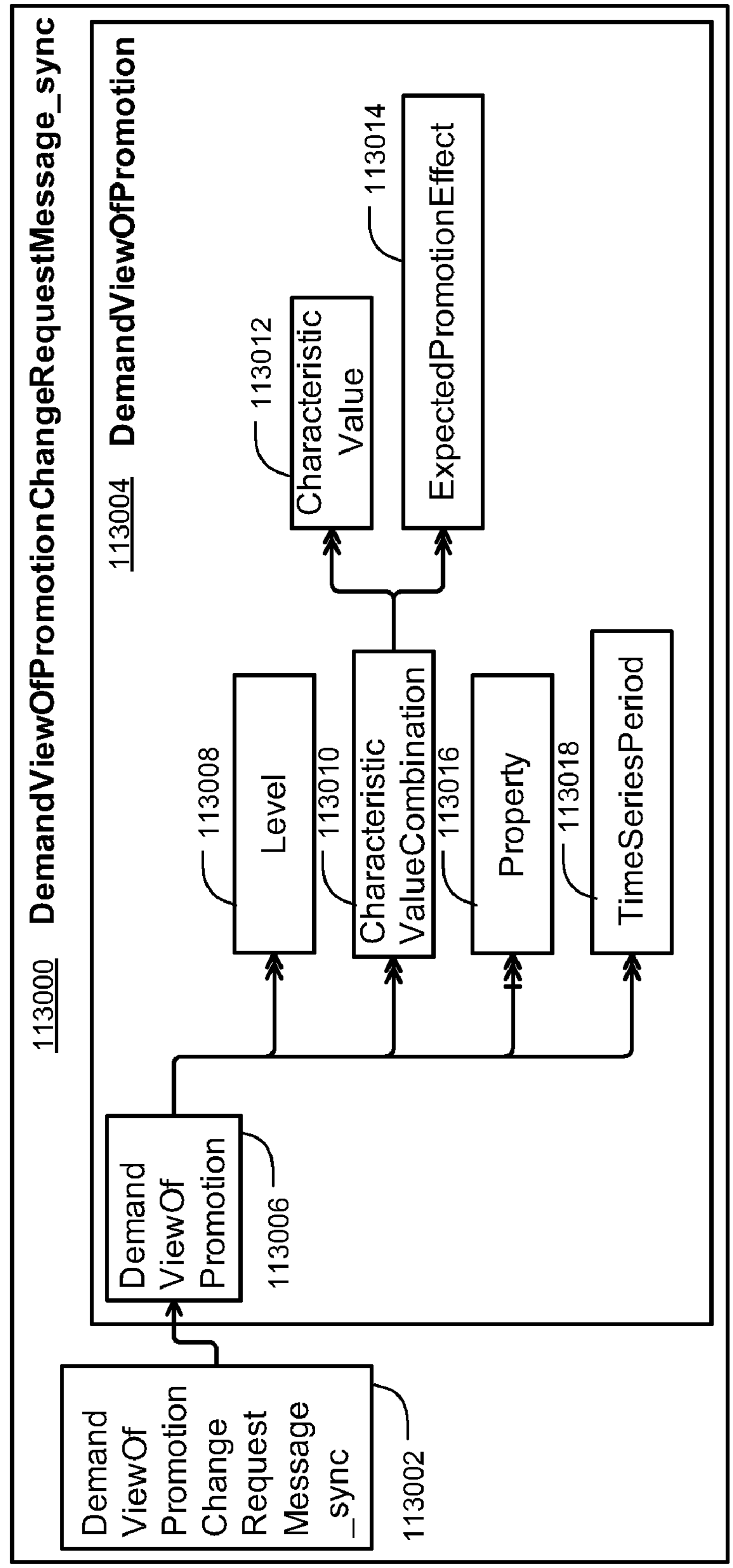
FIG. 113 shows an exemplary DemandViewOfPromotionChangeRequest Message Data Type.

Additionally, FIG. 113 illustrates one example logical configuration of DemandViewOfPromotionChangeRequestMessage_sync message 113000. Specifically, this figure depicts the arrangement and hierarchy of various components such as one or more levels of packages, entities, and datatypes, shown here as 113000 to 113018. As described above, packages may be used to represent hierarchy levels. Entities are discrete business elements that are used during a business transaction. Data types are used to type object entities and interfaces with a structure. For example, DemandViewOfPromotionChangeRequestMessage_sync message 113000 includes, among other things, DemandViewOfPromotion 113004. Accordingly, heterogeneous applications may communicate using this consistent message configured as such.

Figure 114:
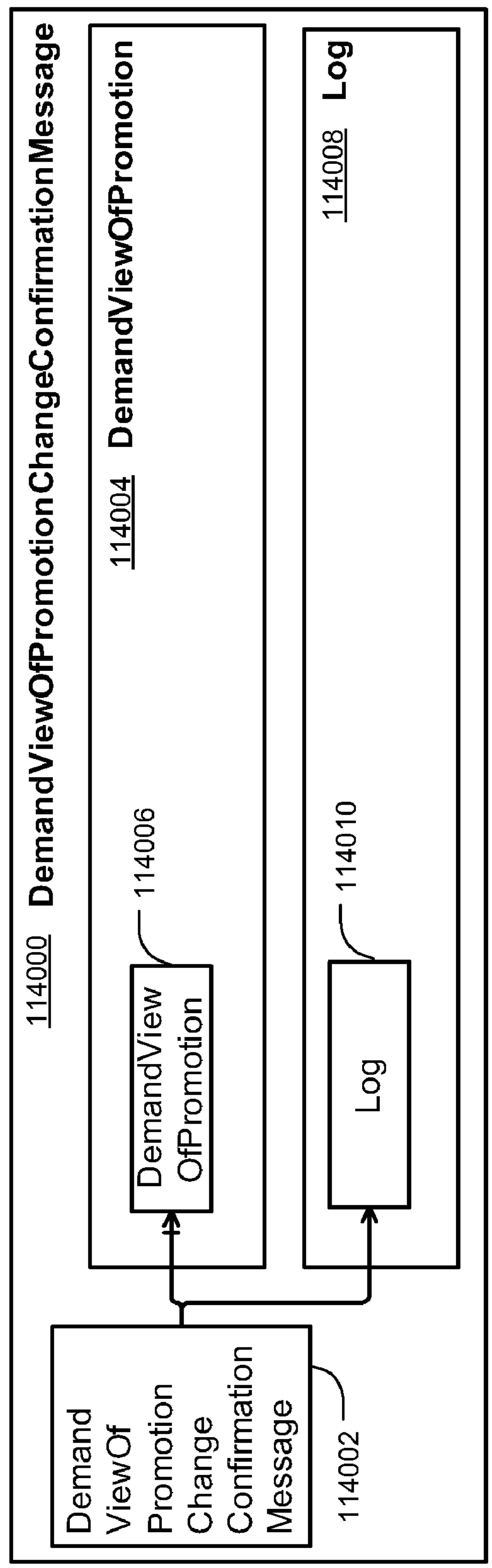
FIG. 114 shows an exemplary DemandViewOfPromotionChangeConfirmation Message Data Type.

Additionally, FIG. 114 illustrates one example logical configuration of DemandViewOfPromotionChangeConfirmationMessage_sync message 114000. Specifically, this figure depicts the arrangement and hierarchy of various components such as one or more levels of packages, entities, and datatypes, shown here as 114000 to 114010. As described above, packages may be used to represent hierarchy levels. Entities are discrete business elements that are used during a business transaction. Data types are used to type object entities and interfaces with a structure. For example, DemandViewOfPromotionChangeConfirmationMessage_sync message 114000 includes, among other things, DemandViewOfPromotion 114004. Accordingly, heterogeneous applications may communicate using this consistent message configured as such.

Figure 115:
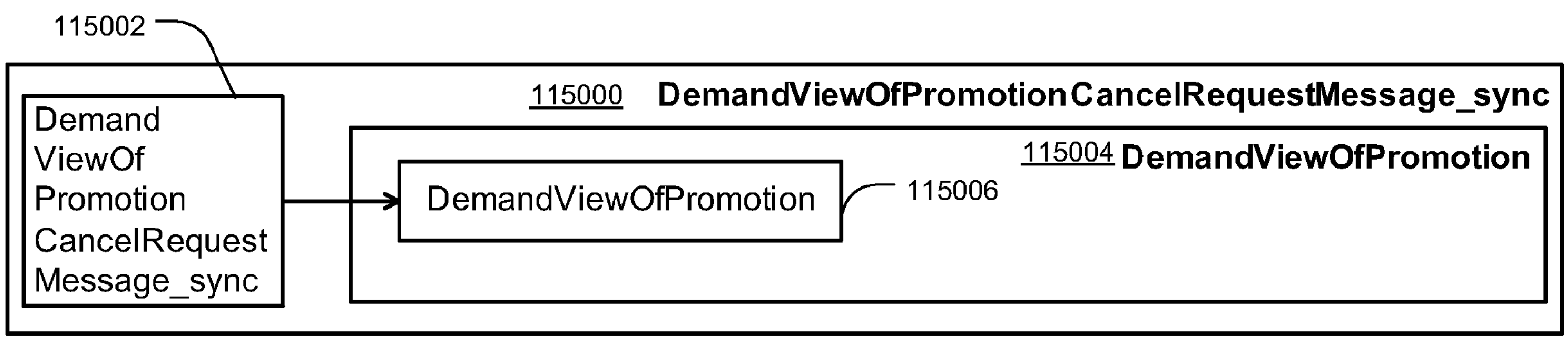
FIG. 115 shows an exemplary DemandViewOfPromotionCancelRequest Message Data Type.

Additionally, FIG. 115 illustrates one example logical configuration of DemandViewOfPromotionCancelRequestMessage_sync message 115000. Specifically, this figure depicts the arrangement and hierarchy of various components such as one or more levels of packages, entities, and datatypes, shown here as 115000 to 115006. As described above, packages may be used to represent hierarchy levels. Entities are discrete business elements that are used during a business transaction. Data types are used to type object entities and interfaces with a structure. For example, DemandViewOfPromotionCancelRequestMessage_sync message 115000 includes, among other things, DemandViewOfPromotion 115004. Accordingly, heterogeneous applications may communicate using this consistent message configured as such.

Figure 116:
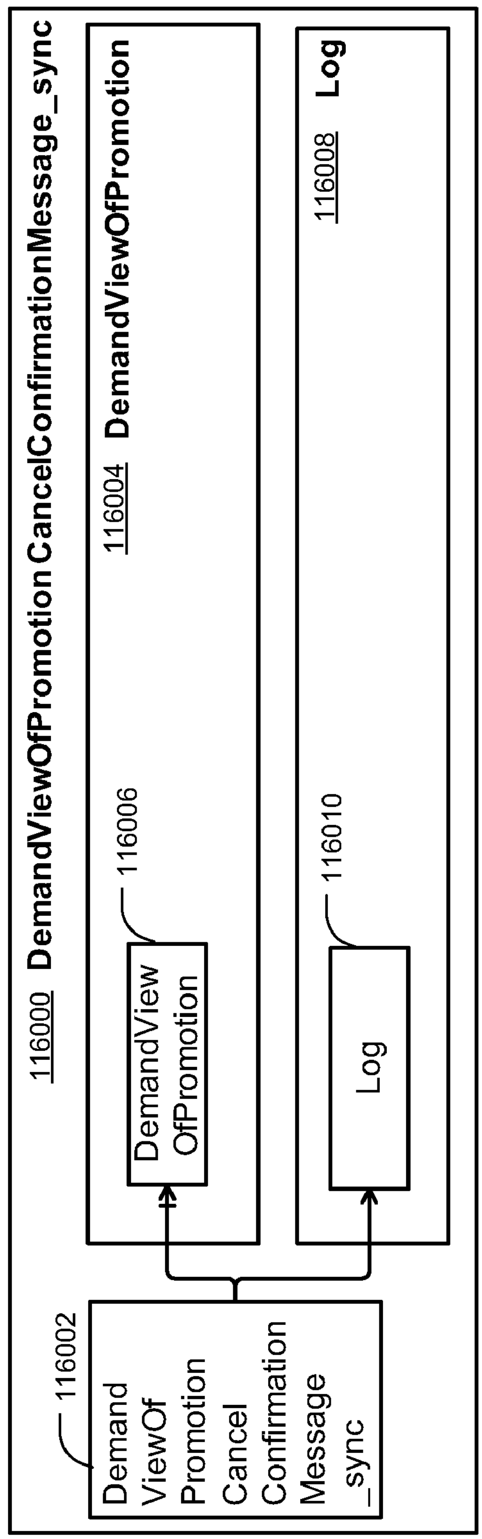
FIG. 116 shows an exemplary DemandViewOfPromotionCancelConfirmation Message Data Type.

Additionally, FIG. 116 illustrates one example logical configuration of DemandViewOfPromotionCancelConfirmationMessage_sync message 116000. Specifically, this figure depicts the arrangement and hierarchy of various components such as one or more levels of packages, entities, and datatypes, shown here as 116000 to 116010. As described above, packages may be used to represent hierarchy levels. Entities are discrete business elements that are used during a business transaction. Data types are used to type object entities and interfaces with a structure. For example, DemandViewOfPromotionCancelConfirmationMessage_sync message 116000 includes, among other things, DemandViewOfPromotion 116004. Accordingly, heterogeneous applications may communicate using this consistent message configured as such.

Figure 117:
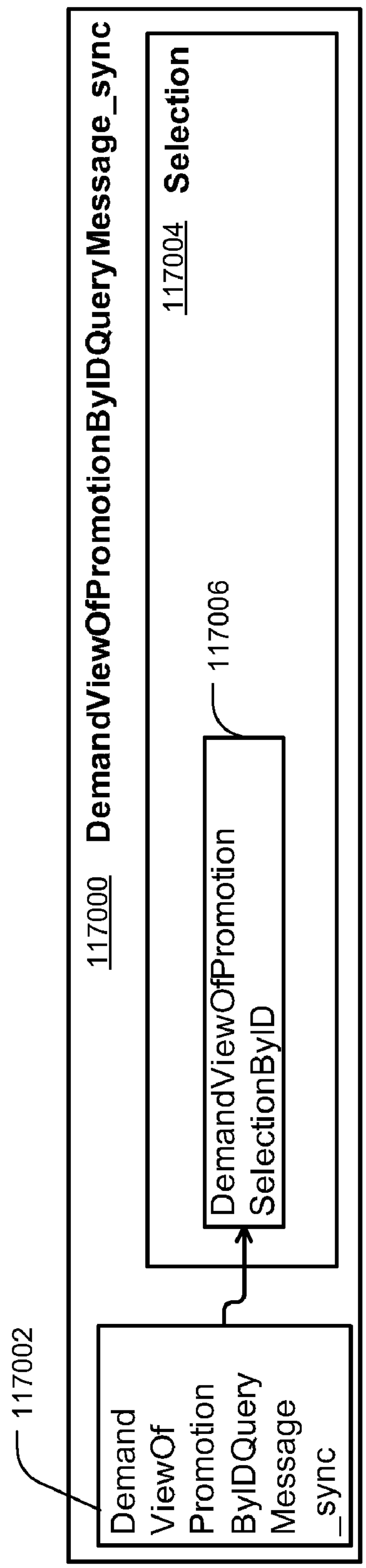
FIG. 117 shows an exemplary DemandViewOfPromotionByIDQuery Message Data Type.

Additionally, FIG. 117 illustrates one example logical configuration of DemandViewOfPromotionByIDQueryMessage_sync message 117000. Specifically, this figure depicts the arrangement and hierarchy of various components such as one or more levels of packages, entities, and datatypes, shown here as 117000 to 117006. As described above, packages may be used to represent hierarchy levels. Entities are discrete business elements that are used during a business transaction. Data types are used to type object entities and interfaces with a structure. For example, DemandViewOfPromotionByIDQueryMessage_sync message 117000 includes, among other things, Selection 117004. Accordingly, heterogeneous applications may communicate using this consistent message configured as such.

Figure 118:
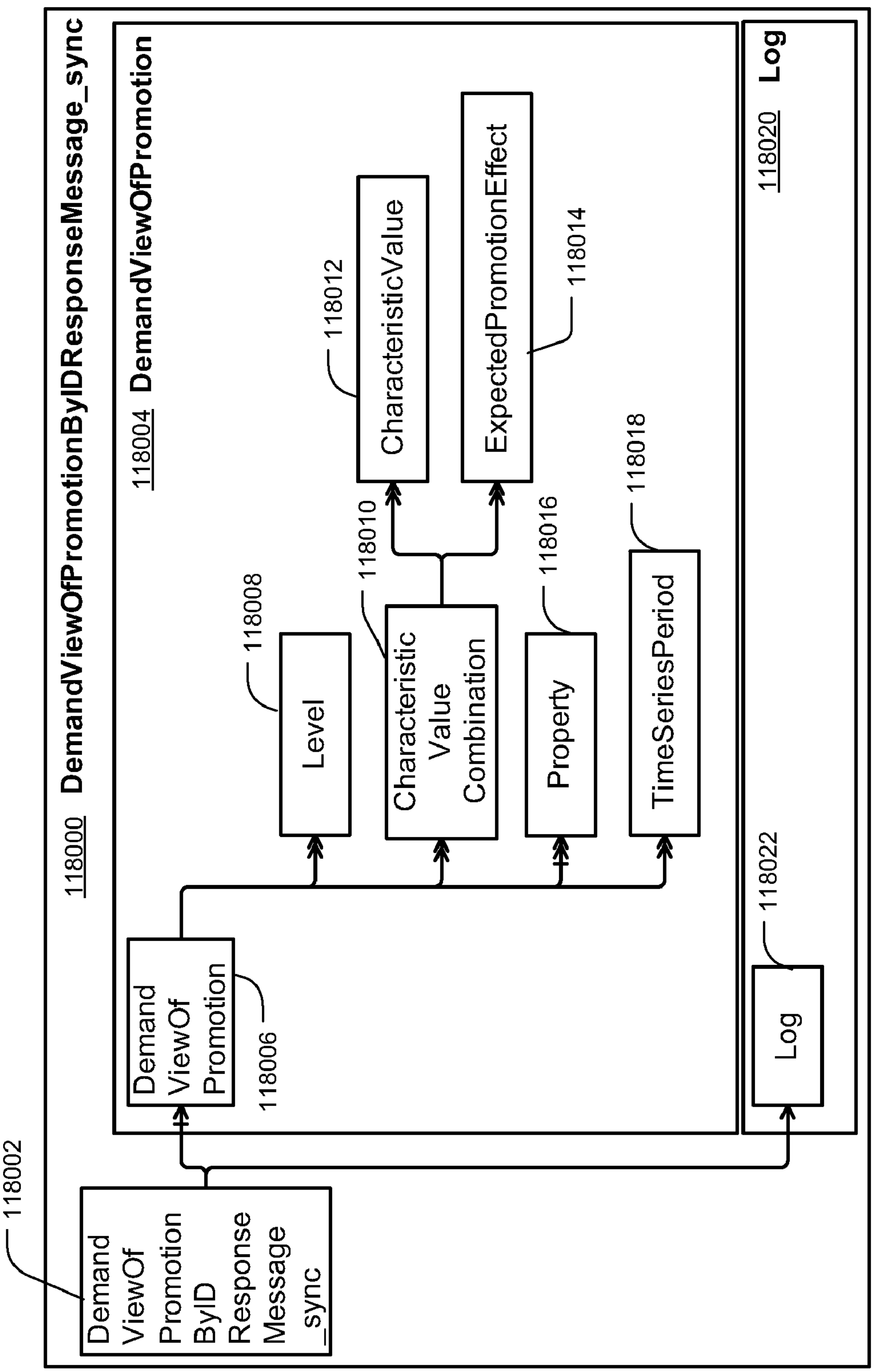

Additionally, FIG. 118 illustrates one example logical configuration of DemandViewOfPromotionByIDResponseMessage_sync message 118000. Specifically, this figure depicts the arrangement and hierarchy of various components such as one or more levels of packages, entities, and datatypes, shown here as 118000 to 118022. As described above, packages may be used to represent hierarchy levels. Entities are discrete business elements that are used during a business transaction. Data types are used to type object entities and interfaces with a structure. For example, Demand- ViewOfPromotionByIDResponseMessage_sync message 118000 includes, among other things, DemandViewOfPromotion 118004. Accordingly, heterogeneous applications may communicate using this consistent message configured as such.

Figure 119:
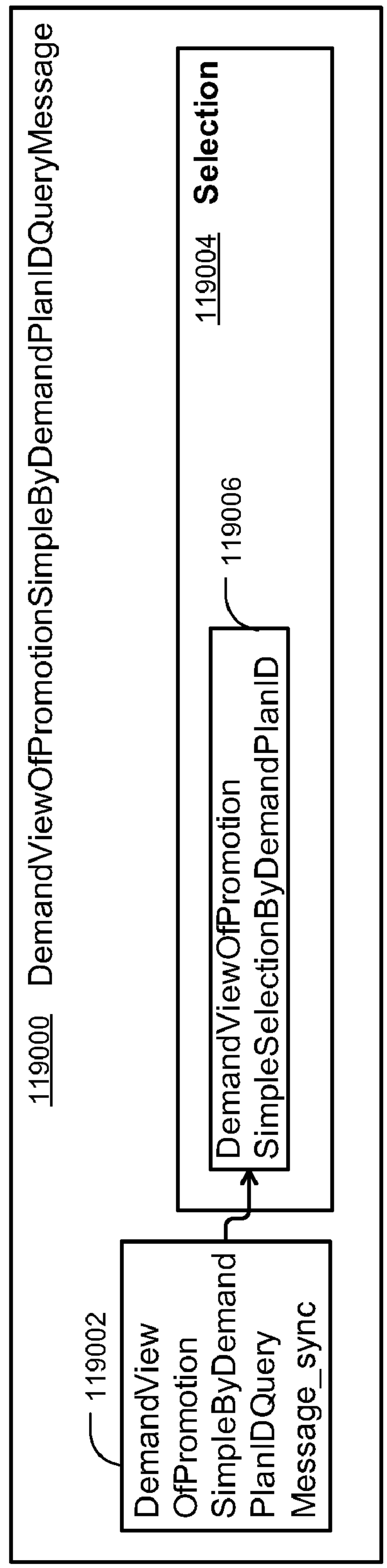

Additionally, FIG. 119 illustrates one example logical configuration of DemandViewOfPromotionSimpleByDemandPlanIDQueryMessage_sync message 119000. Specifically, this figure depicts the arrangement and hierarchy of various components such as one or more levels of packages, entities, and datatypes, shown here as 119000 to 119006. As described above, packages may be used to represent hierarchy levels. Entities are discrete business elements that are used during a business transaction. Data types are used to type object entities and interfaces with a structure. For example, DemandViewOfPromotionSimpleByDemandPlanIDQueryMessage_sync message 119000 includes, among other things, Selection 119004. Accordingly, heterogeneous applications may communicate using this consistent message configured as such.

Figure 120:
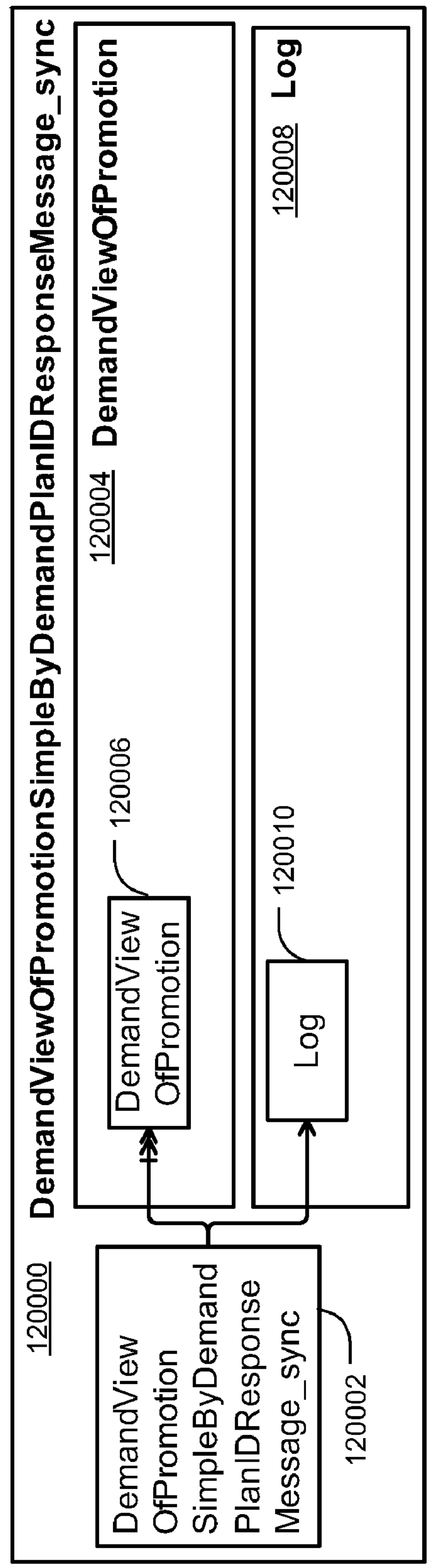

Additionally, FIG. 120 illustrates one example logical configuration of DemandViewOfPromotionSimpleByDemandPlanIDResponseMessage_sync message 120000. Specifically, this figure depicts the arrangement and hierarchy of various components such as one or more levels of packages, entities, and datatypes, shown here as 120000 to 120010. As described above, packages may be used to represent hierarchy levels. Entities are discrete business elements that are used during a business transaction. Data types are used to type object entities and interfaces with a structure. For example, DemandViewOfPromotionSimpleByDemandPlanIDResponseMessage_sync message 120000 includes, among other things, DemandViewOfPromotion 120004. Accordingly, heterogeneous applications may communicate using this consistent message configured as such.

Figure 121:
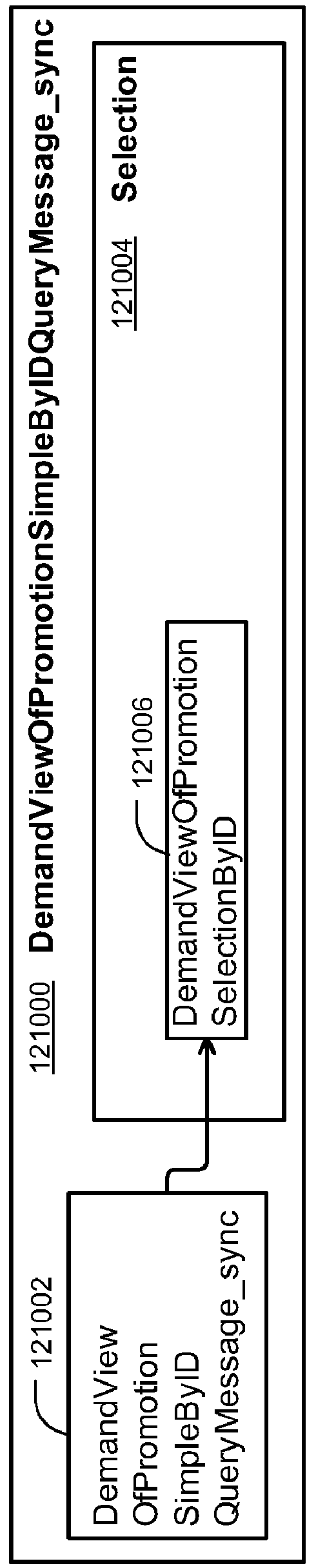

Additionally, FIG. 121 illustrates one example logical configuration of DemandViewOfPromotionSimpleByIDQueryMessage_sync message 121000. Specifically, this figure depicts the arrangement and hierarchy of various components such as one or more levels of packages, entities, and datatypes, shown here as 121000 to 121006. As described above, packages may be used to represent hierarchy levels. Entities are discrete business elements that are used during a business transaction. Data types are used to type object entities and interfaces with a structure. For example, DemandViewOfPromotionSimpleByIDQueryMessage_sync message 121000 includes, among other things, Selection 121004. Accordingly, heterogeneous applications may communicate using this consistent message configured as such.

Figure 122:
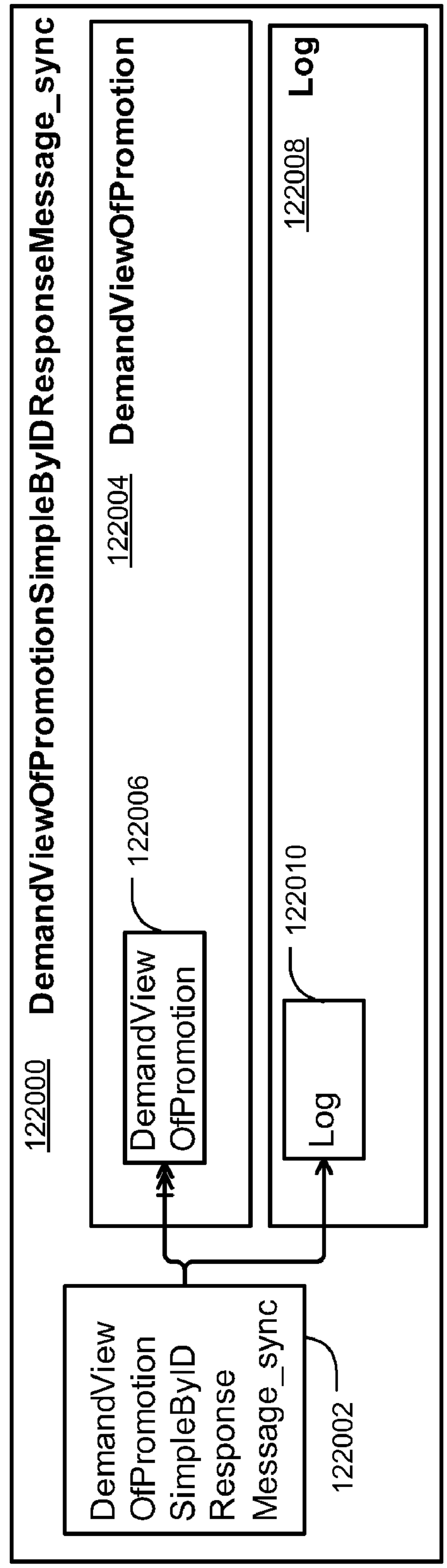

Additionally, FIG. 122 illustrates one example logical configuration of DemandViewOfPromotionSimpleByIDResponseMessage_sync message 122000. Specifically, this figure depicts the arrangement and hierarchy of various components such as one or more levels of packages, entities, and datatypes, shown here as 122000 to 122010. As described above, packages may be used to represent hierarchy levels. Entities are discrete business elements that are used during a business transaction. Data types are used to type object entities and interfaces with a structure. For example, DemandViewOfPromotionSimpleByIDResponseMessage_sync message 122000 includes, among other things, DemandViewOfPromotion 122004. Accordingly, heterogeneous applications may communicate using this consistent message configured as such.

Additionally, FIG. 123 illustrates one example logical configuration of DemandViewOfPromotionByIDQueryMessage_sync message 123000. Specifically, this figure depicts the arrangement and hierarchy of various components such as one or more levels of packages, entities, and datatypes, shown here as 123000 to 123016. As described above, packages may be used to represent hierarchy levels. Entities are discrete business elements that are used during a business transaction. Data types are used to type object entities and interfaces with a structure. For example, DemandViewOfPromotionByIDQueryMessage_sync message 123000 includes, among other things, Selection 123006. Accordingly, heterogeneous applications may communicate using this consistent message configured as such.

Additionally, FIGS. 124-1 through 124-7 illustrate one example logical configuration of DemandViewOfPromotionByIDResponseMessage_sync message 124000. Specifically, this figure depicts the arrangement and hierarchy of various components such as one or more levels of packages, entities, and datatypes, shown here as 124000 to 124198. As described above, packages may be used to represent hierarchy levels. Entities are discrete business elements that are used during a business transaction. Data types are used to type object entities and interfaces with a structure. For example, DemandViewOfPromotionByIDResponseMessage_sync message 124000 includes, among other things, DemandViewOfPromotion 124006. Accordingly, heterogeneous applications may communicate using this consistent message configured as such.

Additionally, FIG. 125 illustrates one example logical configuration of DemandViewOfPromotionCancelConfirmationMessage_sync message 125000. Specifically, this figure depicts the arrangement and hierarchy of various components such as one or more levels of packages, entities, and datatypes, shown here as 125000 to 125024. As described above, packages may be used to represent hierarchy levels. Entities are discrete business elements that are used during a business transaction. Data types are used to type object entities and interfaces with a structure. For example, DemandViewOfPromotionCancelConfirmationMessage_sync message 125000 includes, among other things, DemandViewOfPromotion 125006. Accordingly, heterogeneous applications may communicate using this consistent message configured as such.

Additionally, FIG. 126 illustrates one example logical configuration of DemandViewOfPromotionCancelRequestMessage_sync message 126000. Specifically, this figure depicts the arrangement and hierarchy of various components such as one or more levels of packages, entities, and datatypes, shown here as 126000 to 126016. As described above, packages may be used to represent hierarchy levels. Entities are discrete business elements that are used during a business transaction. Data types are used to type object entities and interfaces with a structure. For example, DemandViewOfPromotionCancelRequestMessage_sync message 126000 includes, among other things, DemandViewOfPromotion 126006. Accordingly, heterogeneous applications may communicate using this consistent message configured as such.

Additionally, FIGS. 127-1 through 127-2 illustrate one example logical configuration of DemandViewOfPromotionChangeConfirmationMessage_sync message 127000. Specifically, this figure depicts the arrangement and hierarchy of various components such as one or more levels of packages, entities, and datatypes, shown here as 127000 to 127048. As described above, packages may be used to represent hierarchy levels. Entities are discrete business elements that are used during a business transaction. Data types are used to type object entities and interfaces with a structure. For example, DemandViewOfPromotionChange-ConfirmationMessage_sync message 127000 includes, among other things, DemandViewOfPromotion 127006. Accordingly, heterogeneous applications may communicate using this consistent message configured as such.

Additionally, FIGS. 128-1 through 128-5 illustrate one example logical configuration of DemandViewOfPromotion-ChangeRequestMessage_sync message 128000. Specifically, this figure depicts the arrangement and hierarchy of various components such as one or more levels of packages, entities, and datatypes, shown here as 128000 to 128136. As described above, packages may be used to represent hierarchy levels. Entities are discrete business elements that are used during a business transaction. Data types are used to type object entities and interfaces with a structure. For example, DemandViewOfPromotionChangeRequestMessage_sync message 128000 includes, among other things, Demand-ViewOfPromotion 128006. Accordingly, heterogeneous applications may communicate using this consistent message configured as such.

Additionally, FIGS. 129-1 through 129-2 illustrate one example logical configuration of DemandViewOfPromotion-CreateConfirmationMessage_sync message 129000. Specifically, this figure depicts the arrangement and hierarchy of various components such as one or more levels of packages, entities, and datatypes, shown here as 129000 to 129048. As described above, packages may be used to represent hierarchy levels. Entities are discrete business elements that are used during a business transaction. Data types are used to type object entities and interfaces with a structure. For example, DemandViewOfPromotionCreate-ConfirmationMessage_sync message 129000 includes, among other things, DemandViewOfPromotion 129006. Accordingly, heterogeneous applications may communicate using this consistent message configured as such.

Additionally, FIGS. 130-1 through 130-5 illustrate one example logical configuration of DemandViewOfPromotion-CreateRequestMessage_sync message 130000. Specifically, this figure depicts the arrangement and hierarchy of various components such as one or more levels of packages, entities, and datatypes, shown here as 130000 to 130148. As described above, packages may be used to represent hierarchy levels. Entities are discrete business elements that are used during a business transaction. Data types are used to type object entities and interfaces with a structure. For example, Demand-ViewOfPromotionCreateRequestMessage_sync message 130000 includes, among other things, DemandViewOfPromotion 130006. Accordingly, heterogeneous applications may communicate using this consistent message configured as such.

Additionally, FIG. 131 illustrates one example logical configuration of DemandViewOfPromotionSimple-ByDemandPlanIDQueryMessage_sync message 131000. Specifically, this figure depicts the arrangement and hierarchy of various components such as one or more levels of packages, entities, and datatypes, shown here as 131000 to 131016. As described above, packages may be used to represent hierarchy levels. Entities are discrete business elements that are used during a business transaction. Data types are used to type object entities and interfaces with a structure. For example, DemandViewOfPromotionSimple-ByDemandPlanIDQueryMessage_sync message 131000 includes, among other things, Selection 131006. Accordingly, heterogeneous applications may communicate using this consistent message configured as such.

Additionally, FIGS. 132-1 through 132-2 illustrate one example logical configuration of DemandViewOfPromotion-SimpleByDemandPlanIDResponseMessage_sync message 132000. Specifically, this figure depicts the arrangement and hierarchy of various components such as one or more levels of packages, entities, and datatypes, shown here as 132000 to 132048. As described above, packages may be used to represent hierarchy levels. Entities are discrete business elements that are used during a business transaction. Data types are used to type object entities and interfaces with a structure. For example, DemandViewOfPromotionSimple-ByDemandPlanIDResponseMessage_sync message 132000 includes, among other things, DemandViewOfPromotion 132006. Accordingly, heterogeneous applications may communicate using this consistent message configured as such.

Additionally, FIGS. 133-1 through 133-2 illustrate one example logical configuration of DemandViewOfPromotion-SimpleByIDQueryMessage_sync message 133000. Specifically, this figure depicts the arrangement and hierarchy of various components such as one or more levels of packages, entities, and datatypes, shown here as 133000 to 133040. As described above, packages may be used to represent hierarchy levels. Entities are discrete business elements that are used during a business transaction. Data types are used to type object entities and interfaces with a structure. For example, DemandViewOfPromotionSimple-ByIDQueryMessage_sync message 133000 includes, among other things, Selection 133006. Accordingly, heterogeneous applications may communicate using this consistent message configured as such.

Additionally, FIGS. 134-1 through 134-2 illustrate one example logical configuration of DemandViewOfPromotion-SimpleByIDResponseMessage_sync message 134000. Specifically, this figure depicts the arrangement and hierarchy of various components such as one or more levels of packages, entities, and datatypes, shown here as 134000 to 134048. As described above, packages may be used to represent hierarchy levels. Entities are discrete business elements that are used during a business transaction. Data types are used to type object entities and interfaces with a structure. For example, DemandViewOfPromotionSimple-ByIDResponseMessage_sync message 134000 includes, among other things, DemandViewOfPromotion 134006. Accordingly, heterogeneous applications may communicate using this consistent message configured as such. Message Data Type DemandViewOfPromotionCreat-eRequestMessage_sync The message data type DemandViewOfPromotionCreat-eRequestMessage_sync contains the DemandViewOfPromotion. It can include the DemandViewOfPromotion package. The DemandViewOfPromotion package groups the DemandViewOfPromotion and the following entities: Level, CharacteristicValueCombination, CharacteristicValue, ExpectedPromotionEffect, Property, and TimeSeriesPeriod.

The DemandViewOfPromotion is the expected increase in the demand of CharacteristicValueCombinations for certain periods. The DemandViewOfPromotion can include the following attributes: ID, DemandPlanID, PlanningVersionID, DemandPlanKeyFigureID, StatusCode, Description, and Note. The DemandViewOfPromotionID is a unique identifier of the DemandViewOfPromotion, and may be of type GDT: DemandViewOfPromotionID. The DemandPlanID is a unique identifier for a Demand Plan, and may be of type GDT:DemandPlanID. The PlanningVersionID is a unique identifier referring to a DemandPlanVersion of the Demand Plan for which the DemandViewOfPromotion is created, and may be of type GDT:PlanningVersionID. The DemandPlan- KeyFigureID is an identifier for a DemandPlanKeyFigure, and may be of type GDT:DemandPlanKeyFigureID. The DemandViewOfPromotionStatusCode is the status of approval and execution of the marketing activity represented by the DemandViewOfPromotion, and may be of type GDT: DemandViewOfPromotionStatusCode. The DemandViewOfPromotionDescription is an short text for describing the DemandViewOfPromotion in one particular language, and may be of type GDT: LEN40_Description. The DemandViewOfPromotionNote is an arbitrary long text for describing the DemandViewOfPromotion, and may be of type GDT: Note. In some implementations, if Description or Note is not given a default empty string may be used.

A Level is a characteristic of the DemandPlanningScenario representing a certain level of aggregation of the DemandViewOfPromotion. The Level has the following attributes: DemandPlanCharacteristicID and OrdinalNumberValue. The DemandPlanCharacteristicID is an identifier for a demand plan characteristic, and may be of type GDT:DemandPlanCharacteristicID. The OrdinalNumberValue is a number that indicates the position of an element in a linearly ordered set that is ordered according to particular factors. In the context of a DemandViewOfPromotion the OrdinalNumberValue is defining the position of a DemandViewOfPromotionLevel in a sequence of several levels, and may be of type GDT:OrdinalNumberValue. In some implementations, the characteristic used on the lowest level of detail can be the promotion level. The promotion level represents the lowest level of detail for every DemandViewOfPromotion that is created for one particular DemandPlanningScenario.

A CharacteristicValueCombination is a combination of CharacteristicValues provided for all DemandViewOfPromotionLevels. The CharacteristicValueCombination can include the CharacteristicValue and ExpectedPromotionEffect entities. Each Characteristic Value belongs to a Characteristic. Characteristics represent a property of describing and distinguishing between objects, characteristics provide classification possibilities. CharacteristicValue can include the DemandPlanCharacteristicID and DemandPlanCharacteristicValue elements. The DemandPlanCharacteristicID is an identifier for a demand plan characteristic, and may be of type GDT:DemandPlanCharacteristicID. The DemandPlanCharacteristicValue specifies the value assigned to a DemandPlanCharacteristicID, and may be based on GDT:DemandPlanCharacteristicValue.

An ExpectedPromotionEffect is the expected effect of the promotion on the demand of one CharacteristicValueCombination in one particular period. The ExpectedPromotionEffect can have the TimeSeriesPeriodID and Value elements. The TimeSeriesPeriodID is a unique identifier of a time series period, and may be based on GDT:TimeSeriesPeriodID. The Value is a float value that represents the expected promotion effect in one time series period, and may be based on GDT: FloatValue.

A Property is a property of one DemandViewOfPromotion which describes and classifies the promotion. The PromotionProperty can have the ID and Value elements. The ID is an aspect of the marketing activity which classifies the promotion, and may be based on GDT:PropertyID. Value describes a value that can be assigned to a property, and may be based on GDT:PropertyValue.

A TimeSeriesPeriod defines the time range of a ExpectedPromotionEffect as well as periodicity information. The TimeSeriesPeriod entity can include the ID, DatePeriod, CalendarUnitCode, and FiscalYearVariantCode elements. The TimeSeriesPeriodID is a unique identifier of a Time Series Period, and may be based on GDT:TimeSeriesPeriodID. DatePeriod is the period defines the start and end date, and may be based on GDT:CLOSED_DatePeriod. The CalendarUnitCode is a coded representation of a calendar-related unit, and may be based on GDT:CalendarUnitCode. The FiscalYearVariantCode is a coded representation of a fiscal year variant, and may be based on GDT:FiscalYearVariantCode. In some implementations, all TimeSeriesPeriods can use the same CalendarUnitCode. In some implementations, the CalendarUnitCodes that are specified for the DemandPlanningScenario to which the Demand Plan belongs are allowed.

Message Data Type DemandViewOfPromotionCreateConfirmationMessage_sync

The message data type DemandViewOfPromotionCreateConfirmationMessage_sync can include the DemandViewOfPromotionID and the log information with detailed textual messages about the creation of a DemandViewOfPromotion. It can include the DemandViewOfPromotion package and the Log package. The DemandViewOfPromotion package describes the DemandViewOfPromotion which was created by calling a DemandViewOfPromotionCreateRequestMessage_sync prior to sending this message. The DemandViewOfPromotion package includes the DemandViewOfPromotion entity. The DemandViewOfPromotion is the expected increase in the demand of CharacteristicValueCombinations for certain periods. The DemandViewOfPromotion contains the following attributes: ID, StatusCode, StatusName, StatusDescription, and SystemAdministrativeData. The DemandViewOfPromotionID is an identifier, which can be unique, of the DemandViewOfPromotion, and may be based on GDT:DemandViewOfPromotionID. The DemandViewOfPromotionStatusCode is the status of approval and execution of the marketing activity represented by the DemandViewOfPromotion, and may be based on GDT:DemandViewOfPromotionStatusCode. The DemandViewOfPromotionStatusName is the name of the status referred to by the DemandViewOfPromotionStatusCode, and may be based on GDT:MEDIUM_Name. The DemandViewOfPromotionStatusDescription is the description of the status referred to by the DemandViewOfPromotionStatusCode, and may be based on GDT:LONG_Description. The SystemAdministrativeData is administrative data that is stored in a system. It includes system users and change dates/times of the DemandViewOfPromotion, and may be based on GDT:SystemAdministrativeData.

A Log package groups the information that is relevant for tracking the error or success messages of service execution. It contains the following entity Log. A Log groups several system messages that indicate the outcome of service execution. In some implementations, the attributes TypeID, SeverityCode, and Note are used in the LogItem.

Message Data Type DemandViewOfPromotionChangeRequestMessage_sync

The message data type DemandViewOfPromotionChangeRequestMessage_sync includes the DemandViewOfPromotion. It includes the DemandViewOfPromotion package. When creating a DemandViewOfPromotion, you can a Description for a language. However, by using the DemandViewOfPromotionChangeRequestMessage_sync message, you can make changes to or add subsequent Description entities to the DemandViewOfPromotion object to enhance it with further descriptions in different languages. The DemandViewOfPromotion package groups the DemandViewOfPromotion and the entities: Level, CharacteristicValueCombination, CharacteriticValue, ExpectedPromotionEffect, Property, and TimeSeriesPeriod. The DemandViewOfPromotion is the expected increase in the demand of CharacteristicValueCombinations for certain periods. The DemandViewOfPromotion includes the following attributes: ID, DemandPlanKeyFigureID, StatusCode, Description, and Note. The DemandViewOfPromotionID is an identifier, which may be unique, of the DemandViewOfPromotion. The DemandPlanKeyFigureID is an identifier for a DemandPlanKeyFigure which includes the planning data, and may be based on GDT:DemandPlanKeyFigureID. The DemandViewOfPromotionStatusCode is the status of approval and execution of the marketing activity represented by the DemandViewOfPromotion, and may be based on GDT:DemandViewOfPromotionStatusCode. The DemandViewOfPromotionDescription is a short text for describing the DemandViewOfPromotion in one particular language, and may be based on GDT:LEN40_Description. The DemandViewOfPromotionNote is an arbitrary long text for describing the DemandViewOfPromotion, and may be based on GDT:Note. When creating a DemandViewOfPromotion a Description for a particular language can be given. A Level is a characteristic of the DemandPlanningScenario representing a certain level of aggregation of the DemandViewOfPromotion. The Level can have the DemandPlanCharacteristicID and OrdinalNumberValue attributes. The DemandPlanCharacteristicID is an identifier for a demand plan characteristic, and may be based on GDT:DemandPlanCharacteristicID. The OrdinalNumberValue is a number that indicates the position of an element in a linearly ordered set that is ordered according to particular factors. In the context of a DemandViewOfPromotion the OrdinalNumberValue is defining the position of a DemandViewOfPromotionLevel in a sequence of several levels, and may be based on GDT:OrdinalNumberValue. In some implementations, the characteristic used on the lowest level of detail can be the promotion level. The promotion level represents the lowest level of detail for every DemandViewOfPromotion that is created for one particular DemandPlanningScenario.

A CharacteristicValueCombination is a combination of CharacteristicValues provided for all DemandViewOfPromotionLevels. The CharacteristicValueCombination can include the CharacteristicValue and ExpectedPromotionEffect entities. In some implementations, the CharacteristicValues are given for the specified Levels. A Characteristic Value can belong to a Characteristic. Characteristics represent a property of describing and distinguishing between objects, characteristics provide classification possibilities. CharacteristicValue can include the DemandPlanCharacteristicID and DemandPlanCharacteristicValue attributes. The DemandPlanCharacteristicID is an identifier for a demand plan characteristic, and may be based on GDT:DemandPlanCharacteristicID. The DemandPlanCharacteristicValue specifies the value assigned to a DemandPlanCharacteristicID, and may be based on GDT:DemandPlanCharacteristicValue. An example for Characteristic is “Region” and examples for Characteristic Values are “North”, “Central”, “South”. An ExpectedPromotionEffect is the expected effect of the promotion on the demand of one CharacteristicValueCombination in one particular period. The ExpectedPromotionEffect can include the TimeSeriesPeriodID and Value elements. The TimeSeriesPeriodID is a unique identifier of a time series period, and may be based on GDT:TimeSeriesPeriodID. The Value is a float value that represents the expected promotion effect in one time series period, and may be based on GDT:FloatValue. Each CharacteristicValueCombination cam have ExpectedPromotionEffects for each TimeSeriesPeriod of the DemandViewOfPromotion. A Property is a property of one DemandViewOfPromotion which describes and classifies the promotion. The PromotionProperty can have the ID and Value attributes. The ID is an aspect of the marketing activity which classifies the promotion, and may be of type GDT:PropertyID. Value describes a value that can be assigned to a property, and may be of type GDT:PropertyValue. Examples of PropertyID include media used, and method of execution. Examples for PropertyValue include “TV, radio, outdoors”, “price discount, piggyback, 2 for 1”. A TimeSeriesPeriod defines the time range of a ExpectedPromotionEffect as well as periodicity information. The TimeSeriesPeriod entity can include the ID, DatePeriod, CalendarUnitCode, and FiscalYearVariantCode elements. The TimeSeriesPeriodID is an identifier, which may be unique, of a Time Series Period, and may be based on GDT:TimeSeriesPeriodID. DatePeriod is the Period defines the start and end date, and may be based on GDT:CLOSED_DatePeriod. The CalendarUnitCode is a coded representation of a calendar-related unit, and may be based on GDT:CalendarUnitCode. The FiscalYearVariantCode is a coded representation of a fiscal year variant, and may be based on GDT:FiscalYearVariantCode. In some implementations, all TimeSeriesPeriods can use the same CalendarUnitCode. In some implementations, the CalendarUnitCodes that are specified for the DemandPlanningScenario to which the Demand Plan belongs are used.

Message Data Type DemandViewOfPromotionChangeConfirmationMessage_sync

The message data type DemandViewOfPromotionChangeConfirmationMessage_sync includes the DemandViewOfPromotion for which a change was requested. It includes the DemandViewOfPromotion and Log packages. The DemandViewOfPromotion package describes the DemandViewOfPromotion which was changed by calling a DemandViewOfPromotionChangeRequestMessage_sync prior to sending this message.

The DemandViewOfPromotion package contains the DemandViewOfPromotion. The DemandViewOfPromotion is the expected increase in the demand of CharacteristicValueCombinations for certain periods. The DemandViewOfPromotion can include the following attributes: ID, StatusCode, StatusName, StatusDescription, and SystemAdministrativeData. The DemandViewOfPromotionID is an identifier, which can be unique, of the DemandViewOfPromotion, and may be based on GDT:DemandViewOfPromotionID. The DemandViewOfPromotionStatusCode is the status of approval and execution of the marketing activity represented by the DemandViewOfPromotion, and may be based on GDT:DemandViewOfPromotionStatusCode. The DemandViewOfPromotionStatusName is the name of the status referred to by the DemandViewOfPromotionStatusCode, and may be based on GDT:MEDIUM_Name. The DemandViewOfPromotionStatusDescription is the description of the status referred to by the DemandViewOfPromotionStatusCode, and may be based on GDT:LONG_Description. The SystemAdministrativeData is administrative data that is stored in a system. It includes system users and change dates/times of the DemandViewOfPromotion, and may be based on GDT:SystemAdministrativeData. Message Data Type DemandViewOfPromotionCancelRequestMessage_sync The message data type DemandViewOfPromotionCancelRequestMessage_sync includes the DemandViewOfPromotion which is to be cancelled. It can include the DemandViewOfPromotion package.

The DemandViewOfPromotion package describes the DemandViewOfPromotion which is cancelled by calling this message. The DemandViewOfPromotion package includes the DemandViewOfPromotion. The DemandViewOfPromotion is the expected increase in the demand of CharacteristicValueCombinations in each period. The DemandViewQf- Promotion can include the ID attribute. The DemandViewOfPromotionID is an identifier, which may be unique, of the DemandViewOfPromotion, and may be based on GDT:DemandViewOfPromotionID.

Message Data Type DemandViewOfPromotionCancelConfirmationMessage_sync

The message data type DemandViewOfPromotionCancelConfirmationMessage_sync includes the DemandViewOfPromotion for which cancellation was requested. It includes the following DemandViewOfPromotion package and the Log package. A message type DemandViewOfPromotionCancelConfirmation_sync can be sent from the Demand Planning environment to provide information about the result of the cancel operation performed on a DemandViewOfPromotion. This message type can be triggered by the message type DemandViewOfPromotionCancelRequest_sync and includes the identifier of the DemandViewOfPromotion which was cancelled.

The DemandViewOfPromotion package describes the DemandViewOfPromotion which was cancelled by calling a DemandViewOfPromotionCancelRequestMessage_sync prior to sending this message. The DemandViewOfPromotion package includes the DemandViewOfPromotion entity. The DemandViewOfPromotion is the expected increase in the demand of CharacteristicValueCombinations for certain periods. The DemandViewQfPromotion can include the ID attribute. The DemandViewOfPromotionID is an identifier, which may be unique, of the DemandViewOfPromotion, and may be based on GDT:DemandViewOfPromotionID.

Message Data Type DemandViewOfPromotionByIDQueryMessage_sync

The message data type DemandViewOfPromotionByIDQueryMessage_sync includes the information that is needed to retrieve details of an existing DemandViewOfPromotion. The message data type includes Selection package. A message type DemandViewOfPromotionByIDQuery_sync can be sent to the Demand Planning environment to provide detailed information about an existing DemandViewOfPromotion. The Selection package describes the DemandViewOfPromotion for which details are desired. The Selection package includes the DemandViewOfPromotionSelectionByID. The DemandViewOfPromotion is the expected increase in the demand of CharacteristicValueCombinations for certain periods. The DemandViewOfPromotionSelectionByID can include the DemandViewOfPromotionID attribute. The DemandViewOfPromotionID is an identifier, which may be unique, of the DemandViewOfPromotion, and may be based on GDT:DemandViewOfPromotionID.

Message Data Type DemandViewOfPromotionByIDResponseMessage_sync

The message data type DemandViewOfPromotionByIDResponseMessage_sync includes all details of an existing DemandViewOfPromotion. It includes the DemandViewOfPromotion package and the Log package. The message data type DemandViewOfPromotionByIDResponseMessage_sync provides the structure for the message type DemandViewOfPromotionByIDResponse and the interface that is based on it. The DemandViewOfPromotion package groups the DemandViewOfPromotion and the entities: Description, Level, CharacteristicValueCombination, CharacteristicValue, ExpectedPromotionEffect, Property and TimeSeriesPeriod. The DemandViewOfPromotion is the expected increase in the demand of CharacteristicValueCombinations for certain periods. The DemandViewOfPromotion contains the following attributes: ID, DemandPlanID, PlanningVersionID, DemandPlanKeyFigureID, StatusCode, StatusName, StatusDescription, Description, Note, and SystemAdministrativeData. The DemandViewOfPromotionID is a unique identifier of the DemandViewOfPromotion, and may be based on GDT:DemandViewOfPromotionID. The DemandPlanID is a unique identifier for a Demand Plan, and may be based on GDT:DemandPlanID. The PlanningVersionID is a unique identifier referring to a DemandPlanVersion of the Demand Plan for which the DemandViewOfPromotion is created, and may be based on GDT: PlanningVersionID. The DemandPlanKeyFigureID is an identifier for a DemandPlanKeyFigure, and may be based on GDT:DemandPlanKeyFigureID. The DemandViewOfPromotionStatusCode is the status of approval and execution of the marketing activity represented by the DemandViewOfPromotion, and may be based on GDT:DemandViewOfPromotionStatusCode.

The DemandViewOfPromotionStatusName is the name of the status referred to by the DemandViewOfPromotionStatusCode, and may be based on GDT:MEDIUM_Name. The DemandViewOfPromotionStatusDescription is the description of the status referred to by the DemandViewOfPromotionStatusCode, and may be based on GDT:LONG_Description. The DemandViewOfPromotionDescription is a short text for describing the DemandViewOfPromotion in one particular language, and may be based on GDT: LEN40_Description. The DemandViewOfPromotionNote is an arbitrary long text for describing the DemandViewOfPromotion, and may be based on GDT:Note. The SystemAdministrativeData is administrative data that is stored in a system. It includes system users and change dates/times of the DemandViewOfPromotion, and may be based on GDT: SystemAdministrativeData.

A Level is a characteristic of the DemandPlanningScenario representing a certain level of aggregation of the DemandViewOfPromotion. The Level can include the DemandPlanCharacteristicID and OrdinalNumberValue attributes. The DemandPlanCharacteristicID is an identifier for a demand plan characteristic, and may be based on GDT:DemandPlanCharacteristicID. The OrdinalNumberValue is a number that indicates the position of an element in a linearly ordered set that is ordered according to particular factors. In the context of a DemandViewOfPromotion the OrdinalNumberValue can define the position of a DemandViewOfPromotionLevel in a sequence of several levels, and may be of type GDT:OrdinalNumberValue.

A CharacteristicValueCombination is a combination of CharacteristicValues provided for all DemandViewOfPromotionLevels. The CharacteristicValueCombination includes the CharacteristicValue and ExpectedPromotionEffect entities. Each Characteristic Value can belong to a Characteristic. Characteristics represent a property of describing and distinguishing between objects, characteristics provide classification possibilities. CharacteristicValue can include the DemandPlanCharacteristicID and DemandPlanCharacteristicValue elements. The DemandPlanCharacteristicID is an identifier for a demand plan characteristic, and may be based on GDT:DemandPlanCharacteristicID. The DemandPlanCharacteristicValue specifies the value assigned to a DemandPlanCharacteristicID, and may be based on GDT: DemandPlanCharacteristicValue. An ExpectedPromotionEffect is the expected effect of the promotion on the demand of one CharacteristicValueCombination in one particular period. The ExpectedPromotionEffect can include the TimeSeriesPeriodID and Value attributes. The TimeSeriesPeriodID is an identifier, which can be unique, of a time series period, and may be of type GDT:TimeSeriesPeriodID. The Value is a float value that represents the expected promotion effect in one time series period, and may be of type GDT: FloatValue.

A Property is a property of one DemandViewOfPromotion which describes and classifies the promotion. The PromotionProperty can include the ID and Value attributes. The ID is an aspect of the marketing activity which classifies the promotion, and may be based on GDT:PropertyID. Value describes a value that can be assigned to a property, and may be based on GDT:PropertyValue.

A TimeSeriesPeriod defines the time range of a ExpectedPromotionEffect as well as periodicity information. The TimeSeriesPeriod entity can include the ID, DatePeriod, CalendarUnitCode, CalenderUnitName, FiscalYearVariantCode, FiscalYearVariantName, and FiscalYearVariantDescription. The TimeSeriesPeriodID is a unique identifier of a Time Series Period, and may be based on GDT:TimeSeriesPeriodID. DatePeriod is the Period defines the start and end date, and may be based on GDT:CLOSED_DatePeriod. The CalendarUnitCode is a coded representation of a calendar-related unit, and may be based on GDT:CalendarUnitCode. The CalenderUnitName is a name of the CalendarUnitCode, and may be based on GDT: MEDIUM_Name. The CalenderUnitDescription is a description of the CalendarUnitCode, and may be based on GDT: LONG_Description. The FiscalYearVariantCode is a coded representation of a fiscal year variant, and may be based on GDT:FiscalYearVariantCode. The FiscalYearVariantName is a name for the FiscalYearVariantCode, and may be based on GDT:MEDIUM_Name. The FiscalYearVariantDescription is a description for the FiscalYearVariantCode, and may be based on GDT:LONG_Description.

Message Data Type DemandViewOfPromotionSimpleByDemandPlanIDQueryMessage_sync

The message data type DemandViewOfPromotionSimpleByDemandPlanIDQueryMessage_sync contains the DemandPlan identifier for which existing DemandViewOfPromotion objects need to be retrieved. The message data type can include the Selection package. A message type DemandViewOfPromotionSimpleByDemandPlanIDQuery_sync can be sent to the Demand Planning environment to provide a list of existing DemandViewOfPromotions for the given DemandPlan. The Selection package contains the DemandPlan ID for which the list of existing DemandViewOfPromotions is requested. The Selection package can include the DemandViewOfPromotionSimpleSelectionByDemandPlanID entity. A DemandViewOfPromotionSimpleSelectionByDemandPlanID is used to identify the DemandPlan ID for which the list of existing DemandViewOfPromotions is requested. The DemandViewOfPromotionSimpleSelectionByDemandPlanID entity can include the DemandPlanID attribute. The DemandPlanID is an identifier, which may be unique, for a Demand Plan, and may be based on GDT:DemandPlanID.

Message Data Type DemandViewOfPromotionSimpleByDemandPlanIDResponseMessage_sync

The message data type DemandViewOfPromotionSimpleByDemandPlanIDResponseMessage_sync includes the DemandViewOfPromotions which exists for the DemandPlan ID given in the DemandViewOfPromotionSimpleByDemandPlanIDQueryMessage_sync. The DemandViewOfPromotionSimpleByDemandPlanIDResponseMessage_sync message data type includes the DemandViewOfPromotion package and the Log package. A message type DemandViewOfPromotionSimpleByDemandPlanIDResponse_sync can be sent from the Demand Planning environment to provide a list of existing DemandViewOfPromotion. The DemandViewOfPromotion package describes the DemandViewOfPromotions which exist for the DemandPlan ID given in the corresponding DemandViewOfPromotionSimpleByDemandPlanIDQueryMessage_sync. The DemandViewOfPromotion package includes the entity DemandViewOfPromotion. The DemandViewOfPromotion is the expected increase in the demand of CharacteristicValueCombinations for certain periods. The DemandViewOfPromotion can include: ID, StatusCode, StatusName, StatusDescription, and Description. The DemandViewOfPromotionID is an identifier, which may be unique, of the DemandViewOfPromotion, and may be based on GDT:DemandViewOfPromotionID.

The DemandViewOfPromotionStatusCode is the status of approval and execution of the marketing activity represented by the DemandViewOfPromotion, and may be based on GDT:DemandViewOfPromotionStatusCode. The DemandViewOfPromotionStatusName is the name of the status referred to by the DemandViewOfPromotionStatusCode, and may be based on GDT:MEDIUM_Name. The DemandViewOfPromotionStatusDescription is the description of the status referred to by the DemandViewOfPromotionStatusCode, and may be based on GDT:LONG_Description. The DemandViewOfPromotionDescription is a short text for describing the DemandViewOfPromotion in one particular language, and may be based on GDT: LEN40_Description.

Message Data Type DemandViewOfPromotionSimpleByIDQueryMessage_sync

The message data type DemandViewOfPromotionSimpleByDemandPlanQueryMessage_sync contains a selection condition of DemandViewOfPromotion identifiers which needs to be checked for existence. The message data type DemandViewOfPromotionSimpleByDemandPlanQueryMessage_sync includes the Selection package. A message type DemandViewOfPromotionSimpleByIDQuery_sync can be sent to the Demand Planning environment to provide a list of existing DemandViewOfPromotions. The Selection package contains selections on the identifier of the DemandViewOfPromotion.

It contains the entity DemandViewOfPromotionSelectionByID. The DemandViewOfPromotionSelectionByID is a selection on the identifier of the DemandViewOfPromotion objects. The DemandViewOfPromotionSelectionByID can include the SelectionByDemandViewOfPromotionID element. The SelectionByDemandViewOfPromotionID is a range of DemandViewOfPromotion identifiers, and may be based on the intermediate data type SelectionByDemandViewOfPromotionalID. A DemandViewOfPromotionSelectionByID can include the SelectionByDemandViewOfPromotionID element, which is a range of DemandViewOfPromotionID identifies, and which may be based on the intermediate data type SelectionByDemandViewOfPromotionID. The SelectionByDemandViewOfPromotionID can include InclusionExclusionCode, IntervalBoundaryTypeCode, LowerBoundaryDemandViewOfPromotionID, and UpperBoundaryDemandViewOfPromotionID. InclusionExclusionCode is a coded representation of the inclusion of a set into a result set or the exclusion of it, and may be based on GDT:InclusionExclusionCode. The IntervalBoundaryTypeCode is a coded representation of an interval boundary type, and may be based on GDT: IntervalBoundaryTypeCode. The DemandViewOfPromotionID is an identifier, which can be unique, of the DemandViewOfPromotion. The LowerBoundaryDemandViewOfPromotionID is the lower boundary of the DemandViewOfPromotion identifier interval, and may be based on GDT:DemandViewOfPromotionID. UpperBoundaryDemandViewOfPromotionID is a unique identifier of the DemandViewOfPromotion. The UpperBoundaryDemandViewOfPromotionID is the upper boundary of the DemandViewOfPromotion identifier interval, and may be based on GDT:DemandViewOfPromotionID.

Message Data Type DemandViewOfPromotionSimpleByIDResponseMessage_sync

The message data type DemandViewOfPromotionSimpleByIDResponseMessage_sync contains the DemandViewOfPromotions which exists for the selection given in the DemandViewOfPromotionSimpleByIDQueryMessage_sync. The message data type DemandViewOfPromotionSimpleByIDResponseMessage_sync includes the DemandViewOfPromotion package and the Log package. A message type DemandViewOfPromotionSimpleByIDResponse_sync can be sent from the Demand Planning environment to provide a list of existing DemandViewOfPromotion. The DemandViewOfPromotion package describes the DemandViewOfPromotions which exist for the selections given on the identifiers in the corresponding DemandViewOfPromotionSimpleByIDQueryMessage_sync. The DemandViewOfPromotion package includes the entity DemandViewOfPromotion. The DemandViewOfPromotion is the expected increase in the demand of CharacteristicValueCombinations for certain periods. The DemandViewOfPromotion contains the following attributes: ID, StatusCode, StatusName, StatusDescription, and Description. The DemandViewOfPromotionID is a unique identifier of the DemandViewOfPromotion, and may be based on GDT:DemandViewOfPromotionID. The DemandViewOfPromotionStatusCode is the status of approval and execution of the marketing activity represented by the DemandViewOfPromotion, and may be based on GDT:DemandViewOfPromotionStatusCode. The DemandViewOfPromotionStatusName is the name of the status referred to by the DemandViewOfPromotionStatusCode, and may be based on GDT:MEDIUM_Name. The DemandViewOfPromotionStatusDescription is the description of the status referred to by the DemandViewOfPromotionStatusCode, and may be based on GDT:LONG_Description. The DemandViewOfPromotionDescription is a short text for describing the DemandViewOfPromotion in one particular language, and may be based on GDT: LEN40_Description.

As described in more detail above, variations of the subject matter described herein and all of the functional operations described in this specification can be implemented in digital electronic circuitry, or in computer software, including the structures disclosed in this specification and their structural equivalents, or in combinations of one or more of them. Variations of the subject matter described herein can be implemented as one or more computer program products, i.e., one or more modules of computer program instructions encoded on a computer readable medium for execution by, or to control the operation of, data processing apparatus. Such computer readable medium can be a machine-readable storage device, a machine-readable storage substrate, a memory device, a composition of matter effecting a machine-readable propagated signal, or a combination of one or more them. A propagated signal is an artificially generated signal, e.g., a machine-generated electrical, optical, or electromagnetic signal, that is generated to encode information for transmission to suitable receiver apparatus. In short, although a few variations have been described in detail above, other modifications are possible. For example, the logic flow depicted in the accompanying figures and described herein do not require the particular order shown, or sequential order, to achieve desirable results. Other embodiments may be within the scope of the following claims. In short, although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A computer-implemented method for integrating information about at least one of a product, a supplier, a manufacturer, a retailer, and a customer, the method steps performed by a processor and comprising:

generating a first message by a first application, the first application executing in an environment of computer systems providing message-based services, wherein the first message comprises a request to create a demand plan for a specified demand planning scenario and includes a first message package hierarchically organized in memory as:

a demand plan create request message entity; and a demand plan package including a demand plan entity, the demand plan entity including an ID and a demand planning scenario ID;

processing a second message received from a heterogeneous second application in response to the second application's processing of the first message according to the hierarchical organization of the first message package, the second application executing in the environment of computer systems providing message-based services, wherein the second message comprises a confirmation of the request to create the demand plan for a specified demand planning scenario and includes a second message package hierarchically organized in memory as:

a demand plan create confirmation message entity; and a log package, the log package including a log entity;

generating a third message by the first application, wherein the third message comprises a request to delete a demand plan and includes a third message package comprising a demand plan package;

processing a fourth message received from the second application in response to the second application's processing of the third message, wherein the fourth message comprises a confirmation to delete the demand plan and includes a fourth message package;

generating a fifth message by the first application, wherein the fifth message comprises a request to retrieve an ID of a demand plan assigned to a specific demand planning scenario and includes a fifth message package comprising a selection package that includes a demand plan simple selection by demand planning scenario ID package; and processing a sixth message from the second application in response to the second application's processing of the fifth message, wherein the sixth message comprises a response to the request to retrieve the ID of a demand plan assigned to a specific demand planning scenario.

2. A computer-implemented method for at least one of creating, changing, deleting, and reading a master data of a planning process, the method steps performed by a processor and comprising:

generating a first message by a first application, the first application executing in an environment of computer systems providing message-based services, wherein the first message comprises a request to create demand planning characteristic value combinations and includes a first message package hierarchically organized in memory as:

a demand planning characteristic value combination create request message entity; and a demand planning characteristic value combination package including a demand planning characteristic value combination entity;

processing a second message from a heterogeneous second application in response to the second application's processing of the first message according to the hierarchical organization of the first message package, the second application executing in the environment of computer systems providing message-based services, wherein the second message comprises a provision of information about a result of the creation of the demand planning characteristic value combinations and includes a second message package hierarchically organized in memory as:

a demand planning characteristic value combination create confirmation message entity; and a log package including a log entity;

generating a third message by the first application, wherein the third message comprises a request to create demand planning characteristic value combinations and includes a third message package comprising a demand planning characteristic value combination create request message sync package;

processing a fourth message from the second application in response to the second application's processing of the third message, wherein the fourth message comprises a response to provide information about a result of the creation of several demand planning characteristic value combinations and includes a fourth message package comprising a demand planning characteristic value combination create confirmation message sync package;

generating a fifth message by the first application, wherein the fifth message comprises a request to cancel one or more demand planning characteristic value combinations and includes a fifth message package comprising a demand planning characteristic value combination package;

processing a sixth message from the second application in response to the second application's processing of the fifth message, wherein the sixth message comprises a confirmation to cancel one or more demand planning characteristic value combinations and includes a sixth message package;

generating a seventh message by the first application, wherein the seventh message comprises a request to cancel several demand planning characteristic value combination sync and includes a seventh message package comprising a demand planning characteristic value combination cancel request message sync package;

processing an eighth message from the second application in response to the second application's processing of the seventh message, wherein the eighth message comprises a response sent to provide information about a result of a cancellation of several demand planning characteristic value combinations and includes an eighth message package comprising a demand planning characteristic value combination cancel request message sync package;

generating a ninth message by the first application, wherein the ninth message comprises a request to change an existing demand planning characteristic value combination and includes a ninth message package comprising a demand planning characteristic value combination package;

processing a tenth message from the second application in response to the second application's processing of the ninth message, wherein the tenth message comprises a response sent to provide information about a result of a change of a demand planning characteristic value combination and includes a tenth message package;

generating an eleventh message by the first application, wherein the eleventh message comprises a request to retrieve demand planning characteristic value combinations and includes an eleventh message package comprising a selection package and a grouping characteristic package; and processing a twelfth message from the second application in response to the second application's processing of the eleventh message, wherein the twelfth message comprises a response to provide a result of a query requested by a message type demand planning characteristic value combination by characteristic value query sync and includes a twelfth message package comprising a demand planning characteristic value combination package.

3. A computer-implemented method for storing one or more effects of sales promotion activities, the method steps performed by a processor and comprising:

generating a first message by a first application, the first application executing in an environment of computer systems providing message-based services, wherein the first message comprises a request to create a demand view of promotion and includes a first message package hierarchically organized in memory as:

a demand view of promotion create request message entity; and a demand view of promotion package including a demand view of promotion entity, the demand view of promotion entity including an ID, a demand plan ID, a planning version ID, a demand plan key FIG. 1D, a status code, at least one level, at least one time series period, and at least one characteristic value combination, each level including a demand plan characteristic ID and an ordinal number value, each time series period including an ID, date period, and calendar unit code, and each characteristic value combination including a least one characteristic value and expected promotion effect, each characteristic value including a demand plan characteristic ID and a demand plan characteristic value, and each expected promotion effect including a time series period ID and a value;

processing a second message from a heterogeneous second application in response to the second application's processing of the first message according to the hierarchical organization of the first message package, the second application executing in the environment of computer systems providing message-based services, wherein the second message comprises a confirmation to a demand view of promotion create request sync and includes a second message package hierarchically organized as:

a demand view of promotion create confirmation message entity; and a demand view of promotion package and a log package, the demand view of promotion package including a demand view of promotion entity, the demand view of promotion entity including an ID, a status code, a status name, and a system administrative data value, the log package include a log entity;

generating a third message by the first application, wherein the third message comprises a request to change a demand view of promotion and includes a third message package comprising a demand view of promotion package;

processing a fourth message from the second application in response to the second application's processing of the third message, wherein the fourth message comprises a confirmation to a demand view of promotion change request sync and includes a fourth message package comprising a demand view of promotion package;

generating a fifth message by the first application, wherein the fifth message comprises a request to delete a demand view of promotion and includes a fifth message package comprising a demand view of promotion package;

processing a sixth message from the second application in response to the second application's processing of the fifth message, wherein the sixth message comprises a confirmation to a demand view of promotion cancel request sync and includes a sixth message package comprising a demand view of promotion package;

generating a seventh message by the first application, wherein the seventh message comprises a request of an inquiry for a demand view of promotion and includes a seventh message package comprising a selection package;

processing an eighth message from the second application in response to the second application's processing of the seventh message, wherein the eighth message comprises a response to a demand view of promotion by ID query sync and includes an eighth message package comprising a demand view of promotion package;

generating a ninth message by the first application, wherein the ninth message comprises an inquiry for identifying elements of a demand view of promotions of a demand plan and includes a ninth message package comprising comprises a selection package;

processing a tenth message from the second application in response to the second application's processing of the ninth message, wherein the tenth message comprises a response to a demand view of promotion simple by demand plan ID query sync and includes a tenth message package comprising a demand view of promotion package;

generating an eleventh message by the first application, wherein the eleventh message comprises a request of an inquiry for the identifying elements of a demand view of promotions and includes an eleventh message package comprising a selection package; and processing a twelfth message from the second application in response to the second application's processing of the eleventh message, wherein the twelfth message comprises a response to a demand view of promotion simple by demand plan simple by ID query sync and includes a twelfth message package comprising a demand view of promotion package.

* * * * *